US008595103B1

(12) United States Patent
Wargin et al.

(10) Patent No.: US 8,595,103 B1
(45) Date of Patent: Nov. 26, 2013

(54) DEPLOYMENT AND RELEASE COMPONENT SYSTEM

(75) Inventors: Jeffrey M. Wargin, Rancho Palos Verdes, CA (US); Andy I-Hong Chen, Chicago, IL (US); Richard Carl Brandt, Chicago, IL (US)

(73) Assignee: Accenture Global Services Limited, Dublin (IE)

( * ) Notice: Subject to any disclaimer, the term of this patent is extended or adjusted under 35 U.S.C. 154(b) by 386 days.

(21) Appl. No.: 12/895,250

(22) Filed: Sep. 30, 2010

Related U.S. Application Data

(63) Continuation-in-part of application No. 12/569,678, filed on Sep. 29, 2009, now abandoned, which is a continuation-in-part of application No. 12/569,594, filed on Sep. 29, 2009, application No. 12/895,250, which is a continuation-in-part of application No. 12/569,621, filed on Sep. 29, 2009.

(60) Provisional application No. 61/248,342, filed on Oct. 2, 2009, provisional application No. 61/367,271, filed on Jul. 23, 2010, provisional application No. 61/101,608, filed on Sep. 30, 2008, provisional application No. 61/101,633, filed on Sep. 30, 2008.

(51) Int. Cl.
*G06Q 40/00* (2012.01)
(52) U.S. Cl.
USPC .............................................. 705/35; 705/38
(58) Field of Classification Search
CPC ..................................................... G06Q 40/00
USPC ........................................................... 705/35
See application file for complete search history.

(56) References Cited

U.S. PATENT DOCUMENTS

| 5,523,942 A | 6/1996 | Tyler et al. |
| 5,655,085 A | 8/1997 | Ryan et al. .................... 364/401 |
| 5,991,823 A | 11/1999 | Cavanaugh, III et al. ..... 709/304 |
| 6,018,743 A | 1/2000 | Xu ................................ 707/103 |
| 6,134,559 A | 10/2000 | Brumme et al. .............. 707/103 |

(Continued)

FOREIGN PATENT DOCUMENTS

JP          2001-306792         11/2001     .............. G06F 17/60

OTHER PUBLICATIONS

"CCSRL, SRP, NSRP, and WNSRP Protocols for 3G-324M on PowerQUICC Processors," by David Turvey; An3092, Rev. 0, Sep. 2006; Freescale Semiconductor Inc. 16 pgs.

(Continued)

*Primary Examiner* — Bruce I Ebersman
*Assistant Examiner* — John Anderson
(74) *Attorney, Agent, or Firm* — Brinks Gilson & Lione

(57) ABSTRACT

A system and operations include software, servers, templates, databases, and user interfaces for initializing and deploying insurance products and offerings into test runtime environments, modeling runtime environments, and commercial product runtime environments. The system may process an insurance product offering having insurance product components based on a package manifest. The package manifest may be generated prior to deployment based on arrangement of the insurance product components in an insurance product framework of the insurance product offering and third part engine servers executable in conjunction with the insurance product components. As a prerequisite to generation of the package manifest, the system may perform a coherency check of the insurance product offering to confirm compliance with a set of coherency check rules.

27 Claims, 58 Drawing Sheets

(56) References Cited

U.S. PATENT DOCUMENTS

| | | | |
|---|---|---|---|
| 6,523,042 | B2 | 2/2003 | Milleker et al. .............. 707/102 |
| 7,043,687 | B2 | 5/2006 | Knauss et al. ................ 715/513 |
| 7,162,534 | B2 | 1/2007 | Schleiss et al. .............. 709/232 |
| 7,451,097 | B1 | 11/2008 | Faupel et al. ..................... 705/4 |
| 7,631,299 | B2 * | 12/2009 | Kannenberg ................. 717/121 |
| 7,774,217 | B1 | 8/2010 | Yager et al. |
| 2001/0034619 | A1 | 10/2001 | Sherman ........................... 705/4 |
| 2001/0056398 | A1 | 12/2001 | Scheirer .......................... 705/38 |
| 2002/0173995 | A1 | 11/2002 | Schiminovich ................... 705/4 |
| 2003/0055767 | A1 | 3/2003 | Tamura et al. ................. 705/36 |
| 2003/0101132 | A1 | 5/2003 | Gaubatz et al. ................ 705/38 |
| 2003/0115207 | A1 | 6/2003 | Bowman et al. ............. 707/100 |
| 2003/0144910 | A1 | 7/2003 | Flaherty et al. ................ 705/22 |
| 2003/0204583 | A1 | 10/2003 | Kaneda et al. ................ 709/223 |
| 2003/0233367 | A1 | 12/2003 | Uluakar et al. |
| 2003/0233370 | A1 | 12/2003 | Barabas et al. .............. 707/103 |
| 2004/0143464 | A1 | 7/2004 | Houle et al. ....................... 705/4 |
| 2004/0143646 | A1 | 7/2004 | Klubertanz ................... 709/219 |
| 2005/0015283 | A1 | 1/2005 | Iino et al. .......................... 705/4 |
| 2005/0022171 | A1 | 1/2005 | Langkafel et al. ............ 717/136 |
| 2005/0261953 | A1 | 11/2005 | Malek et al. .................... 705/10 |
| 2006/0004612 | A1 | 1/2006 | Chewning et al. ................ 705/4 |
| 2006/0100912 | A1 * | 5/2006 | Kumar et al. ..................... 705/4 |
| 2006/0106627 | A1 | 5/2006 | Al-Nujaidi ......................... 705/1 |
| 2006/0293928 | A1 | 12/2006 | Schumacher et al. ............ 705/4 |
| 2007/0282666 | A1 | 12/2007 | Afeyan et al. ................... 705/10 |
| 2008/0016099 | A1 | 1/2008 | Ikeda ............................ 707/102 |
| 2008/0319900 | A1 | 12/2008 | Schiminovich ................. 705/40 |
| 2009/0012840 | A1 | 1/2009 | Gaubatz et al. ................. 705/10 |
| 2009/0063275 | A1 | 3/2009 | Barak |
| 2009/0210259 | A1 | 8/2009 | Cardot et al. ..................... 705/4 |
| 2010/0023355 | A1 * | 1/2010 | Sagalow et al. .................. 705/4 |
| 2010/0223078 | A1 * | 9/2010 | Willis et al. ....................... 705/4 |

OTHER PUBLICATIONS

U.S. Office Action issued in U.S. Appl. No. 12/895,135, dated Sep. 27, 2012 (42 pgs.); U.S. Patent and Trademark Office, Alexandria, VA.

U.S. Office Action issued in U.S. Appl. No. 12/569,594, dated Oct. 24, 2012 (68 pgs.); U.S. Patent and Trademark Office, Alexandria, VA.

Databases and Database Management Systems; Nov. 6, 2004; 6 pages—www.asiplease.net/computing/access/dbase.htm URL: http://web.archive.org/web/20041106221041/http://www.asiplease.net/computing/accerss/dbase.htm.

U.S. Office Action issued in U.S. Appl. No. 12/569,594, dated Dec. 12, 2011 (56 pgs.); U.S. Patent and Trademark Office, Alexandria, VA.

U.S. Office Action issued in U.S. Appl. No. 12/569,594, dated May 21, 2012 (77 pgs.); U.S. Patent and Trademark Office, Alexandria, VA.

U.S. Office Action issued in U.S. Appl. No. 12/569,678, dated May 24, 2012 (25 pgs.); U.S. Patent and Trademark Office, Alexandria, VA.

U.S. Office Action issued in U.S. Appl. No. 12/569,621, dated Jun. 7, 2012 (6 pgs.); U.S. Patent and Trademark Office, Alexandria, VA.

U.S. Office Action issued in U.S. Appl. No. 12/895,135, dated Mar. 26, 2012 (24 pgs.); U.S. Patent and Trademark Office, Alexandria, VA.

"Reader's Digest says Internet key to its future," Direct Marketing, Hoke Communications, Inc. 1999, pp. 1-2; HighBeam Research Dec. 3, 2011; URL: http://www.highbeam.com/doc/1G1-54710928.html.

U.S. Office Action issued in U.S. Appl. No. 12/569,621, dated Dec. 28, 2012 (pp. 1-19); U.S. Patent and Trademark Office, Alexandria, VA.

U.S. Office Action issued in U.S. Appl. No. 12/569,678, dated Nov. 21, 2012 (pp. 1-18); U.S. Patent and Trademark Office, Alexandria, VA.

Advisory Action issued in U.S. Appl. No. 12/569,678, dated Feb. 26, 2013 (pp. 1-3) U.S. Patent and Trademark Office, Alexandria, VA.

Brostoff, Steven. "Technical snag in Medigap law is alarming insurers. (Omnibus Budget Reconciliation Act of 1990)." National Underwriter Life & Health-Financial Services Edition. Summit Business Media. 1991. HighBeam Research. May 22, 2013 <http://www.highbeam.com>.

U.S. Office Action issued in U.S. Appl. No. 12/569,621, dated Aug. 29, 2013 pp. 1-13, U.S. Patent and Trademark Office, Alexandria, VA.

U.S. Office Action issued in U.S. Appl. No. 12/895,135, dated Jun. 4, 2013 pp. 1-26; U.S. Patent and Trademark Office, Alexandria, VA.

U.S. Notice of Allowance and Fee(s) Due, issued in U.S. Appl. No. 12/895,135, dated Aug. 29, 2013 pp. 1-19; U.S. Patent and Trademark Office, Alexandria, VA.

\* cited by examiner

Insurance Configuration Facility
New Offering Summary

Print  Help

Save and Continue

Summary

*Offering Name: ←1310
Short Name: ←1320
ID: ←1322
Version Number: ←1324
Description: ←1326
                ←1328

Author: ←1330
Location: <Select> ←1332
Published?: ☐ ←1334
Published Date: ←1336
Status: ←1338
State: Countrywide  ←1340
       Alabama
       Alaska Last Modified By: ←1342
Last Modified Date: ←1344
System Effective Date: ←1346
System Expiration Date: ←1348
Destruction Date: ←1350

Notes: ←1352

Save and Continue ←1360

Information
There are no Details associated to this Component

Products

| Name | Description | Business Eff Date | Business Exp Date | Actions |
|---|---|---|---|---|
| BOP v3 | BOP Description | 1/1/1995 | 1/1/2049 | Remove |
| Add Product | | | | |

Rule Types

- ☐ Underwriting
  - Financials
    - ☐ Credit
    - ☐ Bankruptcy
  - Eligibility
    - ☐ Accept
    - ☐ Decline
  - Risk Assessment
    - ☐ Building Size
    - ☐ Annual Revenue
- ☐ Rating
  - Manual Premium
    - ☐ Group 1
    - ☐ Group 2
    - ☐ AOC Export Component | Create New Version | Create Like | Edit Previously Viewed Components ▲
LOB – General Liability v1

Information
Mandatory     Detailed Name           Value
☑             Coinsurance - Maximum   100
☑             Coinsurance - Minimum   0
Add/Remove Details Rule Types
☐ Underwriting — 2118
  ☐ Financials — 2120
  ☐ Credit — 2122
  ☐ Bankruptcy — 2124
☐ Eligibility — 2126
  ☐ Accept
  ☐ Decline
☐ Risk Assessment
  ☐ Building Size
  ☐ Annual Revenue
☐ Rating
  ☐ Manual Premium
  ☐ Group 1
  ☐ Group 2
  ☐ AOC Reset   Save

FIG. 22B

Information
Add Details

Products
| Name | Description | Business Eff Date | Business Exp Date |
|---|---|---|---|
| BOP v3 | BOP Description | 1/1/1995 | 1/1/2049 |

2212

Rule Types

☐ Underwriting
  ☐ Financials
    ☐ Credit
    ☐ Bankruptcy
  ☐ Eligibility
    ☐ Accept
    ☐ Decline
  ☐ Risk Assessment
    ☐ Building Size
    ☐ Annual Revenue ☐ Rating
  ☐ Manual Premium
    ☐ Group 1
    ☐ Group 2
    ☐ AOC Reset   Save

— 2310

Name: Building
Short Name: Building
ID: COV003
Version Number: 1
Description: Building Coverage Description
Author: joesmi
Location: Repository
Published?: Yes
Published Date: 1/1/2007
Status: In Progress
State: Washington
Last Modified By: marsmi
Last Modified Date: 1/1/2007
System Effective Date: 1/1/2007
System Expiration Date: 12/31/2007
Production Load Date:
Production Expiration Date:
New Business Effective Date:
New Business Expiration Dare:
Renewal Effective Date:
Renewal Expiration Date:
Market Available Date:
Market Expiration Date:
State Ins Dept Approval Date:
State Ins Dept Rejected Date:
Filed Date:
Destruction Date:
Notes: This is the Building Coverage Coverage Information

FIG. 23B

Previously Viewed Components ▲

COV – Building v1
OFF – BOP v1
LOB – General Liability v1

Coverage Information

| Mandatory | Detailed Name | | Value |
|---|---|---|---|
| Yes | Coinsurance – Maximum: | | 100 |
| Yes | Coinsurance – Minimum: | | 0 |

SubCoverages

| Name | Description | Business Start Date | Business End Date | Action |
|---|---|---|---|---|
| Ordinance or Law v1 | Ordinance or Law Description | 1/1/1995 | 1/1/2049 | Remove |
| Improvements & Betterments v1 | Improvements & Betterment Description | 1/1/1995 | 1/1/2049 | | Remove |
| Add SubCoverage | | | | |

Covered Items

| Name | Description | Business Start Date | Business End Date | Action |
|---|---|---|---|---|
| Building v1 | Building Description | 1/1/1995 | 1/1/2049 | Remove |
| Add Covered Item | | | | |

Rule Types

☑ Underwriting
  ☑ Financials
      Credit
      Bankruptcy
  ☐ Eligibility
      ☐ Accept
      ☐ Decline
  ☐ Risk Assessment
      ☐ Building Size
      ☐ Annual Revenue
☐ Rating
  ☐ Manual Premium
      ☐ Group 1
      ☐ Group 2
      ☐ AOC

[Export Component] [Create New Version] [Create Like] [Edit]

Production Expiration Date:
New Business Effective Date:
New Business Expiration Date:
Renewal Effective Date:
Renewal Expiration Date:
Market Available Date:
Market Expiration Date:
State Ins Dept Approval Date:
State Ins Dept Rejected Date:
Filed Date:
Destruction Date:
Notes: This is the Building Special Coverage

Coverage Information
| Mandatory | Detail Name | Value |
|---|---|---|
| Yes | Coinsurance – Maximum: | 100 |
| Yes | Coinsurance – Minimum: | 0 |

Add/Remove Details

SubCoverages

2422

Previously Viewed Components
COV – Building Spcl v2
COV – Building Spcl v1
COV – Building v1
OFF – BOP v1
LOB – General Liability v1

FIG. 24C

SubCoverages

| Name | Description | Business Eff Date | Business Exp Date |
|---|---|---|---|
| Ordinance or Law v1 | Ordinance or Law Description | 1/1/1995 | 1/1/2049 |
| Improvements & Betterments v1 | Improvements & Betterments Description | 1/1/1995 | 1/1/2049 |

← 2424

Covered Items

| Name | Description | Business Eff Date | Business Exp Date |
|---|---|---|---|
| Building v1 | Building Description | 1/1/1995 | 1/1/2049 |

← 2426

Coverage Rule Types

☑ Underwriting
   ☑ Financials
      ☐ Credit
      ☐ Bankruptcy
   ☐ Eligibility
      ☐ Accept
      ☐ Decline
   ☐ Risk Assessment
      ☐ Building Size
      ☐ Annual Revenue
☐ Rating
   ☐ Manual Premium
      ☐ Group 1
      ☐ Group 2
      ☐ AOC

← 2428

[Reset] [Save]

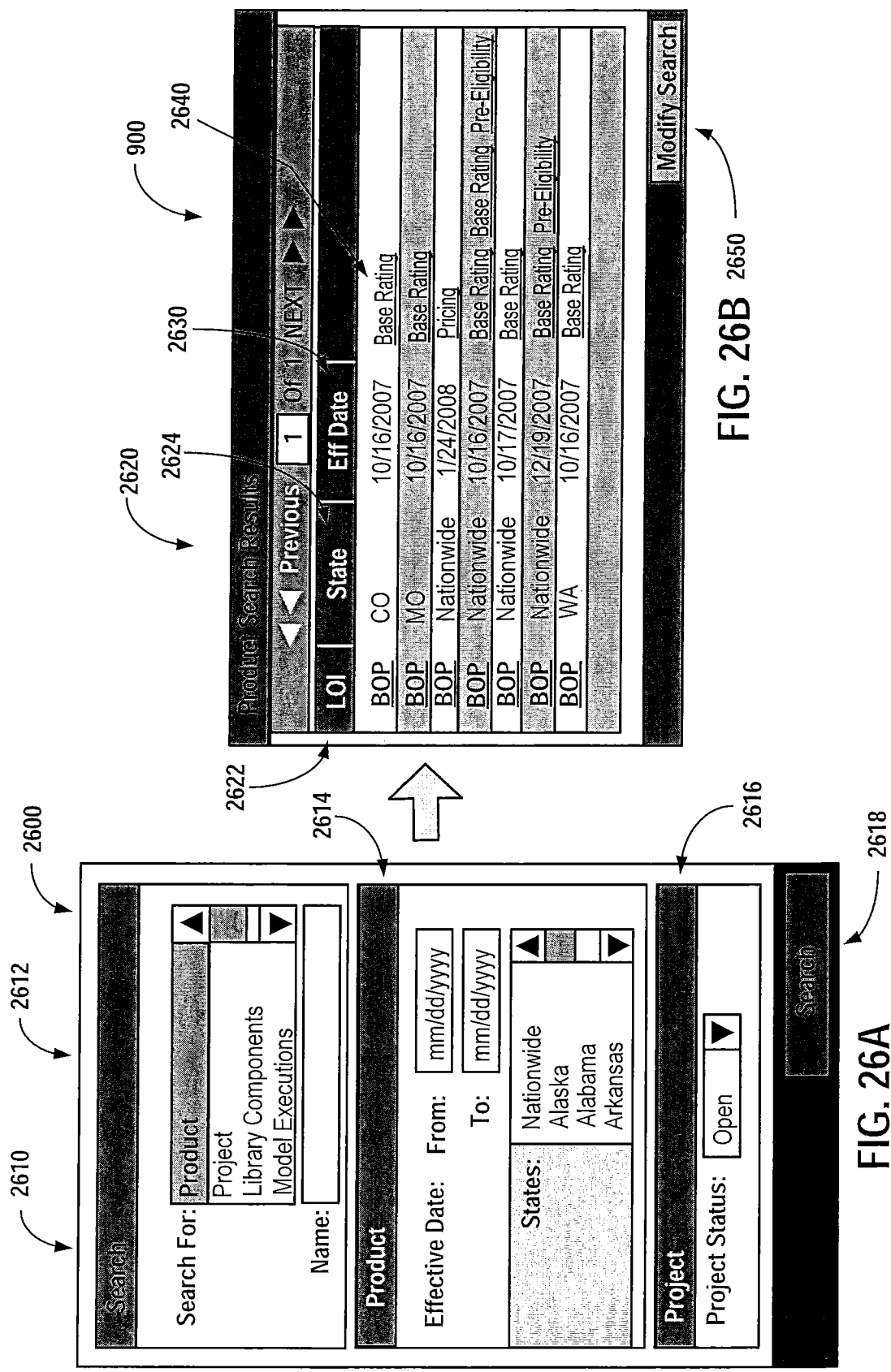

| BMCompID | RULE_TYPE | CID | CVID | COMP_TYPE | ATTRIBUTE | VALUE_DATE | VALUE_STRING | VALUE_INT |
|---|---|---|---|---|---|---|---|---|
| 444 | UWCat | 78 | 178 | Rule | NBEff | 1/1/2008 | | |
| 444 | UWCat | 78 | 178 | Rule | NBExp | 12/31/2008 | | |
| 444 | UWCat | 78 | 178 | LOB | LOBID | | BOP | |
| 444 | UWCat | 78 | 178 | Off | SIC | | 5732 | |
| 444 | UWCat | 78 | 178 | BSvc | Ent | | SBI | |
| 444 | UWCat | 78 | 178 | Svc | Prod | | BOP | |
| 444 | UWRA | 78 | 178 | Rule | NBEff | 1/1/2008 | | |
| 444 | UWCat | 78 | 178 | Rule | NBExp | 12/31/2009 | | |
| 444 | UWCat | 78 | 178 | LOB | LOBID | | BOP | |
| 444 | UWCat | 78 | 178 | Off | SIC | | 5732 | |
| 444 | UWCat | 78 | 178 | BSvc | Ent | | SBI | |
| 444 | UWCat | 78 | 178 | Svc | Prod | | BOP | |
| 555 | Rate | 85 | 185 | Rule | NBEff | 1/1/2007 | | |
| 555 | Rate | 85 | 185 | Rule | NBExp | 6/8/2011 | | |
| 555 | Rate | 85 | 185 | LOB | LOBID | | BOP | |
| 555 | Rate | 85 | 185 | State | StateID | | CA | |
| 555 | Rate | 85 | 185 | BSvc | Ent | | SBI | |
| 555 | Rate | 85 | 185 | Svc | Prod | | BOP | |

FIG. 43

DEPLOYMENT AND RELEASE COMPONENT SYSTEM

This application claims priority under 35 U.S.C. §119(e) to U.S. Provisional Application No. 61/248,342, entitled "DEPLOYMENT COMPONENT AND POST DEPLOYMENT QUERY SYSTEM," filed on Oct. 2, 2009, and U.S. Provisional Application No. 61/367,271, entitled "DEPLOYMENT AND RELEASE COMPONENT SYSTEM," filed on Jul. 23, 2010. The entire contents of both of these provisionals are hereby incorporated herein by reference.

This application is also a continuation-in-part of U.S. patent application Ser. No. 12/569,678, filed Sep. 29, 2009, entitled "DEPLOYMENT COMPONENT AND POST DEPLOYMENT QUERY SYSTEM," the entire contents of which are hereby incorporated by reference, which claims priority to U.S. Provisional Application No. 61/101,608, entitled "REUSABLE PRODUCT SYSTEM," filed Sep. 30, 2008, the entire contents of which are hereby incorporated herein by reference and U.S. Provisional Application No. 61/101,633, entitled "ADAPTOR SERVICES," filed Sep. 30, 2008, the entire contents of both are also incorporated herein by reference.

This application is also a continuation-in-part of U.S. patent application Ser. No. 12/569,594, filed Sep. 29, 2009, entitled INSURANCE CONFIGURATION COMPONENTS," the entire contents of which are hereby incorporated by reference, which claims priority to U.S. Provisional Application No. 61/101,608, entitled "REUSABLE PRODUCT SYSTEM," filed Sep. 30, 2008 and U.S. Provisional Application No. 61/101,633, entitled "ADAPTOR SERVICES," filed Sep. 30, 2008, the entire contents of both are also incorporated herein by reference.

This application is also a continuation-in-part of U.S. patent application Ser. No. 12/569,621, filed Sep. 29, 2009, entitled "REUSABLE PRODUCT SYSTEM," the entire contents of which are hereby incorporated herein by reference, which claims priority to U.S. Provisional Application No. 61/101,608, entitled "REUSABLE PRODUCT SYSTEM," filed Sep. 30, 2008 and U.S. Provisional Application No. 61/101,633, entitled "ADAPTOR SERVICES," filed Sep. 30, 2008, the entire contents of both are also incorporated herein by reference.

TECHNICAL FIELD

This application relates to systems for developing insurance products and offerings. In particular, this application relates to development of flexible and reusable components to permit business users to develop and configure insurance products.

BACKGROUND

In the insurance industry, insurance applications have been written that enable users, such as insurance policy salespeople, to sell insurance products.

When an insurance company desires to sell a new insurance product, the existing insurance products fail to provide a flexible architecture to permit business users to develop and test insurance products/offerings, components of insurance products and offerings, or templates that describe portions of insurance products/offerings.

To compound the problem, insurance applications may be integrated with other applications that perform various features. For example, insurance applications may be integrated to enable customization of business processes. The integration between an insurance application and the other applications may be extensive and not easily changed.

BRIEF SUMMARY

A business user may use a network-based system to deploy a package manifest for a product offering such as an insurance product offering based upon reusable components. The insurance product offering may be a new product offering developed using at least some reusable components of insurance product offerings stored in a component library.

The system may include a server computer having a processor coupled to a memory and in communication with a configurable engine server, such as a third party engine server used to access third party systems and/or data. The system may include runtime variables information and profile information. Prior to deployment of the insurance product offering, a pre-deployment coherency check may be performed by the server computer in response to a pre-deployment coherency check request. The pre-deployment coherency check may include determining whether the insurance product offering conforms to a predetermined set of coherency rules. Following the coherency check, the server computer may generate an insurance product package manifest in response to the server computer determining that the insurance product offering conforms to the predetermined set of coherency rules. The insurance product package manifest may be generated to include a list of the insurance product components and executable code to enable execution of the insurance product offering in a runtime environment for testing modeling, or commercial operation. The package manifest may also include release variable information, and may correspond to the insurance product components included in the offering.

The system may also include a configurable engine server, a memory including a staging area memory, and a processor in communication with the memory and the configurable engine server. The processor may be configured to receive a create manifest request for an insurance product offering. The create manifest request may include a list of insurance product components and insurance product component meta data. The processor may be further configured to obtain engine object information for each of the insurance product components from an engine adapter database, and send a create engine object request to the configurable engine server based upon the engine object information. The create engine object request may direct the configurable engine server to create package engine objects for respective insurance product components, and return packaged engine object information. The package engine objects may correspond to the respective insurance product components and the packaged engine object information.

The configurable engine server may be configured to store the package engine objects in a staging area memory and return the packaged engine object information to the processor. The processor may be further configured to merge the received packaged engine object information with the insurance product component meta data and generate an insurance product package manifest that may be stored in the staging area memory. The insurance product package manifest may be generated to include the list of the insurance product components and executable code to enable execution of the insurance product offering.

In addition to receiving a create manifest request including a list of insurance product components and meta data for an insurance product offering, the system may also determine whether the create manifest request is for a model execution job or a standard release for commercial use. If the create manifest request is for a model execution job, the system may perform a model execution coherency check. If, on the other hand, the create manifest request is for a standard release, the system may perform a standard release coherency check. Following successful performance of either the model execution coherency check or the standard release coherency check, the system may generate the insurance product package manifest to include the list of the insurance product components and executable code to enable execution of the insurance product offering.

Other systems, methods, features, and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

FIG. 13 depicts a New Offering Summary user interface.

FIGS. 19A and 19B depict a user interface of the Insurance Configuration Facility (ICF)-library for exporting a component.

FIGS. 20A and 20B depict an offer builder user interface.

FIGS. 21A and 21B depict a library user interface of the Insurance Configuration Facility (ICF)-library.

FIGS. 22A and 22B depict a data entry user interface for entering data related to an offer.

FIGS. 23A, 23B, and 23C depict a data entry user interface for entering data related to an offer.

FIGS. 24A, 24B, and 24C depict two parts of a user interface for modifying a component within the Insurance Configuration Facility (ICF) repository.

FIGS. 26A and 26B depict user interfaces associated with a search function of the Insurance Configuration Facility (ICF).

FIG. 43 depicts an example tabular representation of a manifest.

DETAILED DESCRIPTION OF THE DRAWINGS AND THE PRESENTLY PREFERRED EMBODIMENTS

Figure 1:
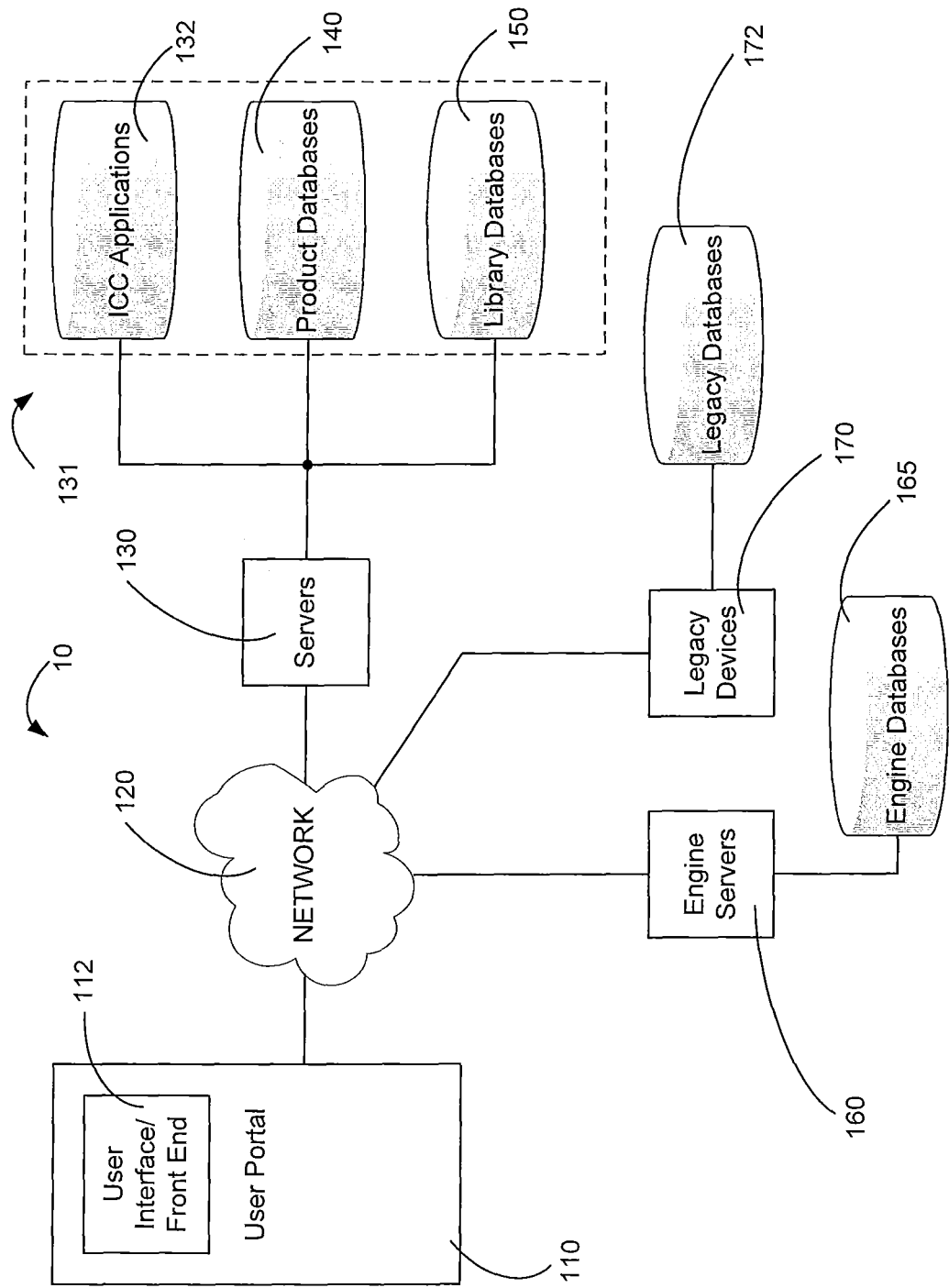
FIG. 1 depicts a system for developing reusable product definition structures.

FIG. 1 depicts an example system 10 for developing and using reusable product definition structures or components in the insurance industry. System 10 includes a user portal 110 having a user interface/front end 112. As an example, the user interface/front end 112 may be a graphical user interface. As another example, the user interface/front end 112 may be a web-based user interface. The user portal or terminal 110 may be configured to communicate over a network 120.

The user portal or terminal 110 may be a computer, a handheld device, a pocket PC, a personal computer, or a work station. As used hereinafter, the user portal 110 may be referred to or used interchangeably with the terms terminal or work station. As an example, the user portal or workstation or terminal 110 may include one or more computer processors, controllers, or microcontrollers configured to execute software stored on a memory or hard drive. The user portal 110 may include random access memory, flash memory, a flash ROM interface, SRAM, hard drive, CD-ROM drive or any other data and instruction storage device. The user portal 110 may include a graphics circuit for generating a graphical user interface 112 on a display included in the user portal 110 or to an externally attached display. The user portal 110 may include an interactive screen to receive a selection via a stylus or pointing device. As an example, the user portal 110 may be a pocket PC or a tablet PC configured to receive an input via a touch screen graphical user interface.

The user portal 110 may include an operating system and various software applications and interfaces comprised of computer executable program code stored on a memory. The software applications and modules may include a web browser, network software, and wireless networking software. The software applications may interpret and interoperate with web-based protocols and languages including JAVA™, JAVA-script™, HTML, XML, MICROSOFT.net™, and Active-X®.

The user portal or terminal 110 may include a web-based user interface 112. In addition, the user portal or terminal 110 may include portal technologies and web-based application user interfaces. The user portal or terminal 110 may store information locally, remotely, or a combination thereof. In response to a user request via the user portal 110, the user portal 110 may request to store information, via a web-based operation, in the databases 131, associated with either the servers 130 or stored on other storage media connected to network 120.

The user interface 112 may provide a user a customizable view of a series of insurance components and the summary data of the insurance components. In response to the stimulus received by the user interface 112, the user portal 110 may make a request to the servers 130 for a portion of the data descriptive of an insurance component. The retrieved data may be displayed on user interface 112.

The network 120 may include a wireless network, a dedicated network, an Ethernet, the Internet, and/or other communication systems. The user portal 110 may communicate with the servers 130 through the network 120.

As a non-limiting example, the servers 130 may include a server, a cluster of database servers, computing devices, and a meta-computer system. Each server, cluster of database servers, computing device, and meta-computer system may include one or more processors coupled to one or more tangible memory devices or tangible computer readable media. The servers 130 may be located in a central region or location. Alternatively, the servers 130 may be distributed across a geographical area and interconnected by either private and/or public communication networks.

The servers 130 may include one or more computer processors, controllers, or microcontrollers configured to execute software stored on a memory or hard drive. The software may include computer executable program codes or instructions. The servers 130 may include random access memory, flash memory, a flash ROM interface, SRAM, hard drive, CD-ROM drive or any other forms of tangible storage medium. Servers 130 may include communication systems for communicating over communication networks. Servers 130 may include computer readable media to support a computer program product. The readable media may include non-transitory signals stored upon the readable media to describe computer program code. The servers 130 may include one or more graphics circuits for generating a graphical user interface 112 on a display of the user portal 110 or to an externally attached display. The servers 130 may connect and operate with various network interfaces including wireless and landlines. As an example, the terminal 112 may communicate with the servers 130 over the network 120. The terminal 112 may interact with the servers 130 to develop an insurance product offering by sending an insurance product offering request to the servers 130.

The servers 130 may include an operating system and various software applications, modules, and interfaces that include computer executable program code or instructions. As a non-limiting example, the software applications, modules, and interfaces may include a user interface, database management software, web browsers, server side support software, remote access software, network software, and wireless networking software. As used herein, modules are defined as at least one of hardware, software, or a combination thereof. The servers 130 may further include support architectures such as architectures based on the .NET Framework™ that work in conjunction with various technologies including, for example, MICROSOFT® Windows Workflow Foundation (WF), MICROSOFT® Windows Communication Foundation (WCF), and MICROSOFT® Windows Presentation Foundation (WPF).

The servers 130 may include databases 131. Alternatively, servers 130 may access one or more databases 131 through various network systems 120. The databases 131 may include an ICC applications database 132, library database 150, and product database 140. The servers 130 may access legacy devices 170 and associated legacy databases 172. The servers 130 may also access configurable engine servers 160, which may be referred to as computational engines, configuration engines, and engine server 160. The servers 130 may also access the engine databases 165. As an example, the insurance product offering request sent by the terminal 112 may include a selected category location to create, retrieve, form, or store an insurance product offering under development. In response to the insurance product offering request, the servers 130 may communicate with the library database 150 and product database 140 to retrieve, store, or create the desired insurance product offering in the selected category location within a designated one of the databases 131. For example, the product database 140 may include a plurality of category locations.

Example databases may include a Relational Database Management System (RDBMS), an object-oriented database, an extensible markup language (XML) database, a file system, memory structures, and other now known or later developed data organization and storage mechanisms. Each database server may include a random access memory (RAM), a read-only memory (ROM), an erasable programmable read-only memory (EPROM), flash memory, optical memory, magnetic (hard-drive or tape) memory and other memory devices.

The engine servers or rules engines 160 may access engine databases 165 via networks or local storage. Engine servers 160 may include rule engines configured to process information and or claims associated with insurance products or offerings. Example rules engines 160 may include Blaze Advisor® engine, from Fair Isaac Corporation of Minnesota and Insbridge® Suite from Insbridge, Inc. of Texas. Another example of engine servers 160 may include the BLAZE software engine.

The legacy devices 170 may access legacy databases 172 via networks or local storage.

The servers 130 may support a remote method invocation (RMI). Using the RMI, the servers 130 may govern execution of component adapters on different processes or even on different devices connected over the network 120. In general, a component adapter may initiate operations on one or more engine objects resident in engine servers or computational engines 160 to maintain the hierarchical structure of the engine objects related to insurance product components, insurance product templates, and insurance product offerings, as discussed relative to the examples depicted in FIGS. 5-8 and FIGS. 11-12.

RMIs may include Simple Object Access Protocol (SOAP), Microsoft Component Object Model (COM), Microsoft Windows Communication Foundation (WCF), Common Object Requesting Broker Architecture (CORBA), and Java RMI. Thus, system 10 improves information technology resource optimization and leverages skills to develop and increase throughput in the insurance product development area.

System 10 implements a centralized rules-management utility on the servers 130 and user portal 110. A business user of the system 10 may access and extract business rules housed in legacy applications through the user portal 110 to enable efficient and effective underwriting, product development, and policy processing of insurance-related products. The legacy applications or functions may include legacy policy systems or devices 170. The legacy devices 170 may include hardware, firmware, computer executable program code, data files and databases stored in the legacy database 172. Legacy applications may include creation of forms, scheduling, process flow application, and insurance product deployment platforms.

System 10 wraps legacy functions and devices 170 into an optimized core transaction processing system. System 10 decouples and wraps legacy functions to isolate and componentize functionality and centralize data access and business rules management.

System 10 provides incremental legacy system replacement with smaller implementations and shorter time frames. System 10 further allows the business user to develop, optimize, test, and deploy new insurance products. System 10 may include externalized rules that allow the business users to specify, outline, define, or implement products, underwriting, and business processes.

System 10 allows for product componentization and assembly through reusable product structures. The product componentization allows system 10 to develop insurance products with a desired level of granularity. System 10 may combine componentization of insurance products/offerings, flexible granularity, and reusable product structures.

The componentization, flexible granularity, and reusable product templates and structures permit rapid and predictable development and deployment of insurance product configurations. Insurance product templates, or templates, may include hierarchically arranged and predetermined relationships between insurance product components that describe or specify some portion of an insurance product/offering or line of business. Insurance product components may include an insurance product template or an insurance product offering. System 10 may include flexible tailoring of insurance products or offerings to meet a specific client or market need without substantial reconfiguration of information systems or revision of software services, data storage and configurations, or user interfaces. Example insurance products or products may include insurance for a loss related to a property, a business, a home, a car, or a life. Insurance products may also include an umbrella or general casualty coverage. Insurance offerings may include combinations of various types of individual insurance products or a rider on an insurance product.

System 10 may improve integration of disparate legacy applications and promote or provide centralized rules management and standardization of data definitions. Centralized rules management and standardization of data definitions may allow System 10 to mask inconsistencies in different applications and legacy devices 170.

System 10 may include conversion and assimilation of best of breed components. System 10 may include a rule engines implemented on the engine servers 160. Each of the rule engines may include hardware, firmware, software, modules, processors, memories, computer executable program code, or a combination thereof. The conversion and assimilation of components may be implemented through predefined adapters that provide well-defined functional encapsulation. As an example, engines 160 may pass instructions and data and be controlled through well-defined functional encapsulation and predefined adapters. The servers 130 may communicate with various component adapters. Servers 130 may include processors to execute computer code in a process to make a procedure call to a component adapter interoperated within the ICC functionalities resident on the servers 130.

A component adapter may be either a synchronous or an asynchronous adapter to interface between the functionality and respective configurable engines. During operation, the component adapter may handle communications between one or more application and objects within the configurable engines of engine servers 160. The component adapter may initiate the creation, deletion, versioning, or deployment of engine objects which may be instantiated on the configurable engine servers 160 in response to the respective creation, deletion, version, or deployment of a component of an ICC application. Two program objects may be integrated if one or more operations applied to a first program object will also be applied to the second program object. The component adapter may receive commands from the ICC design and configuration environment 230 executed on the servers 130.

Figure 2:
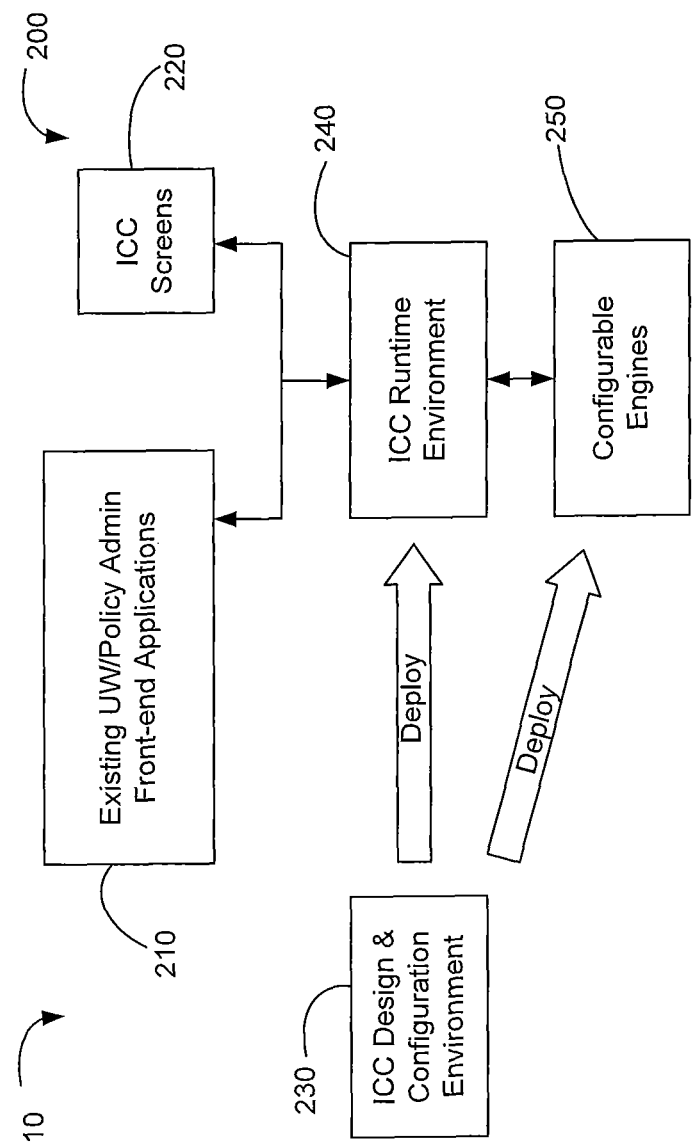
FIG. 2 depicts a high level architecture of an Insurance Configuration Component (ICC) system included in the system of FIG. 1.

In FIG. 2, an example Insurance Configuration Component (ICC) 200 may include executables executed on servers 130 and interacted with via user portal 110 is described with continuing reference to FIG. 1. The ICC Architecture 200 may include software, hardware, and communication technologies, modules, applications, databases, drivers, network links, memory links, or a combination thereof. The ICC Architecture 200 may include web-based components, executable program code, microcode, firmware, or a combination thereof instantiated on the servers 130. Accordingly, the business user of the user portal 110 may access the functionality of the ICC Architecture 200 via a web-based user interface/front end 112.

Accordingly, as used herein, a business user may be defined as a person or organization primarily focused upon developing insurance products for deployment into an insurance market. In contrast, information technology users may be defined as a person or organization primarily focused upon development and maintenance of software programs and applications, information systems, networking, and integration of information system for supporting a business operation.

The ICC Architecture 200 may include existing Underwriting and Policy Administration (UW/PA) Front-End Applications 210. The existing UW/PA Front-End Applications 210 may include legacy systems such as PA, AMS, portals, Point of Service (POS), underwriting (UW) desktops, or any other legacy systems already deployed by an insurance provider. An insurance provider may use the ICC Architecture 200 to seamlessly interact with both an existing rules engine with a new underwriting engine.

The ICC screens 220 may provide user interface screens to support the policy runtime environment 240 in the ICC design and configuration environment 230. The ICC screens 220 may include user interface screens displayable on the user portal 110. The ICC design and configuration environment 230 may be used to develop, test, and deploy various insurance products. The ICC design and configuration environment 230 may allow users to modify core product definitions and rules governing insurance products or offerings in a consistent format.

In general, a core product definition may be a product that is included in one or more of most insurance products or offerings. As an example, a coverage insurance product component may include part of a core product definition. A core product rule may include a set of rules that determine the amount of insurance premium associated with an insurance policy or coverage. In addition, the ICC design and configuration environment 230 may also provide an abstraction layer for computer executable program code, microcode, modules, components, and component adapters, which insulate business users from the underlying technology utilized by the ICC design and configuration environment 230.

The ICC screens 220 displayed on the user interface 112 may provide an ICC runtime environment 240. Prior to deployment of an insurance product or rule, a business user may use the ICC runtime environment 240 to test the core product definitions and rules using predetermined models and data. The ICC runtime environment 240 may componentize the key underwriter and policy administrating capabilities of in-place legacy systems and develop components for use in new systems and/or subsystems. The ICC runtime environment 240 may interact with configurable engines 250. The configurable engines 250 may include ratings, underwriting rules extraction, forms generation, and data gathering functionalities or applications. The configurable engines 250 may be local to servers 130 or located remotely on engine servers 160 or legacy devices 170.

The ICC Architecture 200 may include configurable engines 250. The configurable engines 250 may include one or more of computer executable program code, software, hardware, firmware, programmable logic, memory arrays, configurable field programmable gate arrays or a combination thereof. The configurable engines 250 may include executable programs stored in the engine database 165. The configurable engines 250 may execute on engine servers 160. Configurable engines 250 may include hardware or software functionality implemented on or with legacy devices 170 and stored in legacy database 172. Alternatively or in addition, configurable engines 250 may include executable program code or data stored on servers, which may be accessed by the configurable engine 250 through network 120.

The configurable engines 250 may be accessed and controlled through component adapters configured to interface with a particular configurable engine 250. The component adapters provide an adaptation or abstraction layer of service to insulate the business user from the underlying functionality of the configurable engines 250. The component adapters may include computer executable program code, instructions, or web-based functions. The component adapters and other related services may be implemented in hardware, firmware, computer executable program code, and or in addition to software stored in the memory associated with the ICC applications database 132. Some component adapters may be stored in the engine databases 165 and legacy databases 172. The ICC Architecture 200 may provide insurance based tool packages to provide business users with the functionality of these components.

Figure 3:
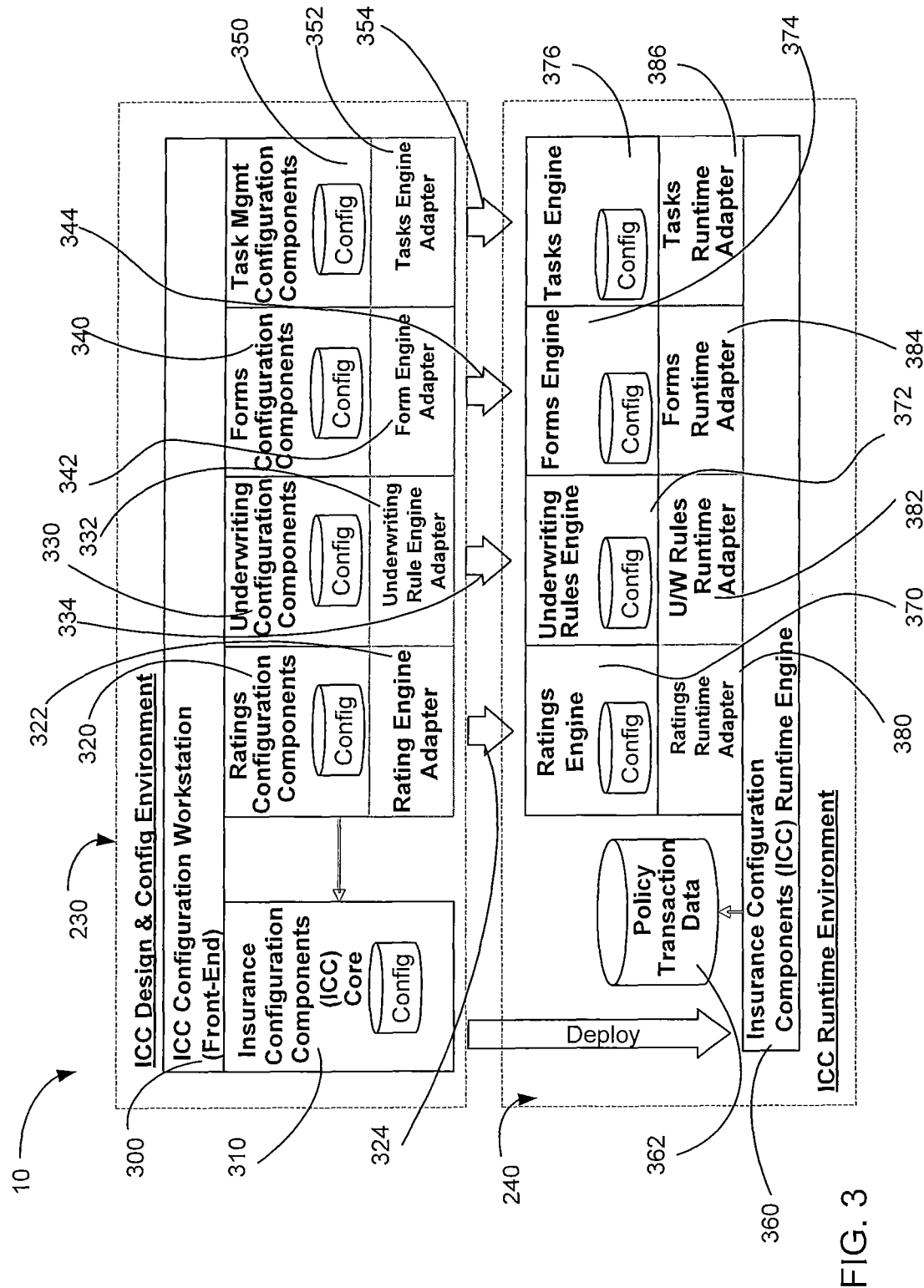
FIG. 3 depicts an example interrelationship between the ICC design and configuration environment and the ICC runtime environment shown in FIG. 2.

In FIG. 3, an example system 10 may include modules associated with one example of the ICC design and configuration environment 230 and ICC runtime environment 240. In FIG. 3, with continuing reference to FIGS. 1-2, the ICC design and configuration environment 230 may include modules stored in the ICC applications database 132 for an ICC configuration workstation front end 300 that is displayed on the user portal 110. The ICC configuration workstation front end 300 may be displayed with, on, or through the user interface/front end 112.

The ICC design and configuration environment 230 may include an ICC configuration workstation front end 300. The ICC configuration workstation front end 300 may include a web-based application or a standalone software application. The ICC configuration workstation front end 300 may enable business users to configure the system 10. The ICC configuration workstation front end 300 may further include web-based user interface information configured to be displayed on the user interface 112 of the user portal 110.

The ICC configuration workstation front end 300 may permit business users to modify the behavior and/or configuration of capabilities of other related elements in the system 10. Business users may use the ICC configuration workstation front end 300 to configure the behavior of functions related to ratings of insurance risk and policies, underwriting assessments, forms generation and population, and tasks management. The ICC configuration workstation front end 300 may include interoperability with third-party tool providers.

The ICC design and configuration environment 230 may include an Insurance Configuration Component (ICC) core 310 configured to support flexible product definitions and product-level edits. Product definitions may include combinations of lines of business, coverages, sub-coverages, and other insurance product components. A product-level edit may include functionality to modify a product definition by selectively replacing portions of the insurance product components, rule types, relationships between the insurance product components, or attributes assigned to insurance product components through the ICC configuration workstation front end 300. The ICC core 310 may include hardware, computer executable program code, modules, and web-based modules, programs, applets, and web pages stored in the ICC applications database 132 that are accessible by the servers 130 through network 120.

The ICC core 310 may provide or implement the overall process, transaction flows, and acts to develop insurance products or offerings. The ICC core 310 may further include user interface screens stored in the ICC application database 132 to capture data functions and specify user roles and privileges. The data may be displayed on the user interface 112 of user portal 110.

ICC core 310 may support insurance product development, insurance product project management, organizational and security management, access to products, offerings, information, libraries, and ICC reference data. ICC reference data may include valid lists and code or state values. The ICC reference data may be used to verify attributes, associations between insurance templates and components, and rule types for each specified insurance product component.

The ICC design and configuration environment 230 may also support computer executable program code, microcode, modules, and components having software stored at least partially in the ICC applications database 132 or servers 130. The ICC design and configuration environment 230 may further include a rating configuration component 320, an underwriting configuration component 330, a forms configuration component 340, and a task management component 350.

The rating configuration components 320 may interface with ratings engine component adapters 322, and support definitions of rating rules in a generic format. The ratings rules for an insurance product or offering may be associated with specific insurance rating decisions. The rating rules may include insurance risk of loss ratings information. The ratings information may include cost, loss, and risk attributes associated with an insurable event. The ratings rules may provide a linkage between determining differentials and rules for a given risk. The ratings rules may be adapted based upon changing business needs and risk environments.

The ratings configuration components 320 may publish the rating rules to ratings engines via ratings engine component adapters 322. The product definitions provided by the ICC core 310 allow business users to specify insurance products without redefining the data structures associated with ratings engines.

The underwriting configuration components 330 support the creation and the definition of underwriting rules and scoring for an insurance product in a generic format. The underwriting rules may determine the eligibility of a customer to purchase an insurance product or offering based upon business-related factors.

In addition, the granularity of the insurance product definition may permit the underwriting configuration components 330 to support underwriting rules and scoring of a component of an insurance product. The underwriting configuration components 330 publish these rules to rules engines via underwriting rules engine component adapter 330 without the need to redefine the data structures.

The form configuration components 340 support definition of policy forms and documents. The forms configuration component 340 publishes rules to document generation engines, via forms engine component adapters 342.

The task management configuration components 350 support definition of task and workflow rules. The task management configuration component 350 publishes rules to industry leading tasks and workflow engines via task engine adapters 352. This permits business users of the ICC configuration workstation or terminal 112 to use the product definitions without the need to redefine the data structures to enable flexible task generation. Instead, as an example, a business user may develop product definitions that may include a plurality of insurance product components associated within an insurance product framework or assembly. The business user may select one or more insurance product components that may be specified independent from the server engines 160, engine databases 165, legacy devices 170, and legacy databases 172. The business users may further specify the insurance product structure based upon relationships established between the insurance product components.

The ICC runtime environment 240 may include one or more configurable engines. The configurable engines of the ICC runtime environment 240 may include hardware, firmware, software, modules, processors, memories, computer executable program code, or a combination thereof. The ICC runtime environment 240 may include a ratings engine 370, an underwriting rules engine 372, a forms engine 374, and a tasks engine 376. Each of the ratings engine 370, the underwriting rules engine 372, the forms engine 374, and the tasks engine 376 may include hardware, firmware, modules, software, and components.

The ratings engine 370 may make rating decisions based on rates, determined differentials, and rules for a given risk. The ratings engine may adapt to changing business needs and risk environments.

The underwriting engine 372 may assess the eligibility of a customer to receive an insurance product or offering. Insurance underwriting may include assessing the eligibility of a customer or potential customer to purchase an insurance product or offering and setting prices based upon the risk of loss associated with the insurance product or offering.

The forms engine 374 may generate forms for display through ICC configuration workstation front end 300 on user interface 112. The data may be accessed by the user portal 110 and viewed on the user interface/front end 112. Data and information may be reviewed, entered, or modified via the user interface/front end 112. Forms engine 374 may include server tools to create dynamic web data entry forms to receive information or data related to an insurance product or offering. The task engine 376 may communicate with task scheduler services. The task engine 376 may identify resources to track the development process of an insurance product, offering, or components.

The ratings engine 370 may oversee runtime interactions between legacy applications, ICC engines, and any ICC generated screens or flows. The ratings engine 370 communicates with an ICC runtime engine 360 via the ratings runtime adapter 380. In the event that the policy data is required to support transactions between the ratings engine 370 and ICC runtime engine 360, but is not present in a legacy system, the ICC runtime environment 240 may store the data related to the legacy system internally. The ratings engine runtime component adapter 380 provides a runtime interface between the ICC runtime engine 360 and the ratings engine 370. The runtime component adapter 380 interacts with the rating engine adapter 322 via link 324 to perform data mapping and technical integration with each rating engine 370.

The underwriting rules engine runtime component adapter 380 provides a runtime interface between the ICC runtime engine 360 and the underwriting rules engine 372. The underwriting rules runtime component adapter 382 provides data mapping and technical integration with each underwriting rules engine 372.

The forms engine runtime component adapter 384 provides a runtime interface between the ICC runtime engine 360 and the forms engine 374. The forms runtime component adapter 384 performs data mapping and technical integration with the forms engine 374. The forms engine runtime component adapter 384 may include user oriented interfaces to support the forms selection operation.

The task engine runtime component adapter 376 provides the runtime interface between the ICC runtime engine 360 and the task engine 376. The task runtime component adapter 386 maps data and integrates with the task engine 376. The ICC runtime engine 360 may access policy transaction data 362. The policy transaction data 362 may be stored on servers 130, legacy device 170, or in network accessible databases 132, 140, and 150.

Figure 4:
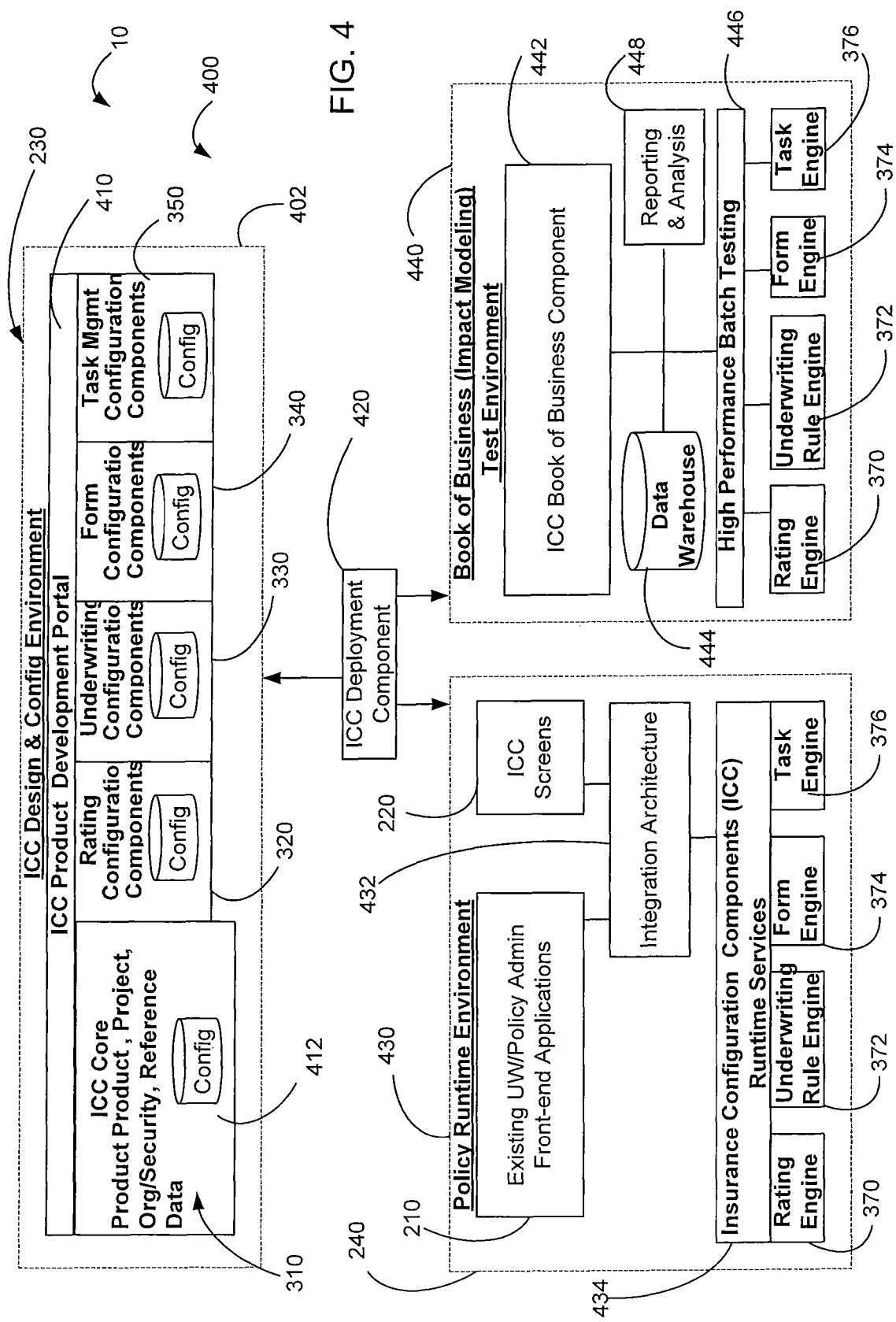
FIG. 4 depicts the relationship between the ICC design and configuration environment, a policy runtime environment, and a book of business (impact modeling) test environment.

With continuing reference to the examples depicted in FIGS. 1-2 and 4, the ICC configuration workstation front end 300 may allow business users to access, modify, and configure ICC core product data definitions resident in the ICC configuration component core 310. The core product data definitions specify the structures and attributes associated with the insurance product to be deployed or tested in the ICC runtime environment 360. The business users may also configure componentized ICC capabilities associated with the ratings configuration component 320, the underwriting configuration component 330, the forms configuration component 340, and the task management configuration component 350.

The business users and information technology users may configure the ICC transactions and screen/flows. Business users and information technology users may also use the ICC core 310 to configure calls to the componentized ICC capabilities including ratings configurations, underwriting configurations, forms configurations, and task management configurations When an insurance product is deployed, information technology users deploy the ICC configuration to an appropriate runtime component. The information technology users may also implement any additional integration required by ICC transactions to integrate the ICC configuration workstation 310 with legacy policy administrations (not depicted), legacy devices 170, or engine servers 160. The legacy policy administrations may include existing hardware and software that is used, in whole or in part, to administrate insurance product offerings and policies.

In FIG. 3, the ratings configuration component 320 may communicate with the ratings engine component adapter 322. The ratings engine component adapter 322 may communicate via network 120 to engine servers 160 to access and control ratings engine 370. The ratings engine component adapter 322 may include a configurable web-based addressing format or link 324 that corresponds to configurable logic or memory in one of the engine servers 160 or engine database 165 to transfer information or request for services.

Configurable web-based addressing format or link 324 may include a network or web-based designator or link. The web or network-based designator may be one or more of a network address, an internet address, a Universal Resource Locator (URL), Hypertext Transfer Protocol (HTTP), Secure Hypertext Transfer Protocol (HTTPS), or other link or datalink address that corresponds to the configurable logic or memory in one of the engine servers 160 or the engine database 165.

The underwriting configuration component 330 may interoperate with the underwriting rules engine component adapter 332. The underwriting rules engine component adapter 332 may include a configurable web-based addressing format or line 334 that corresponds to configurable logic or memory in the underwriting rules engine 372.

In response to a service request from the underwriting configuration component 330, the underwriting rules engine component adapter 332 may identify one of the engine servers 160 responsible for executing software to implement the underwriting rules engine 372. The underwriting rules engine component adapter 332 may encapsulate a service request in a message to be passed through the network 120 to the identified one of the engine servers 160 responsible for executing the underwriting rules engine 372. In other examples, the underwriting rules engine component adapter 332 may receive responses from the identified engine servers 160 and pass return values, results, or messages to the corresponding underwriting configuration component 330.

The forms configuration component 340 may co-operate with a forms engine component adapter 342 to interface with forms engine 374 based upon a configurable web-based addressing format or link 344. The configurable web-based addressing format or link 344 may correspond to configurable logic or memory in engine database 165 or the forms engine 374. As an example, the forms engine component adapter 344 may communicate through the network 120 with the forms engine 374.

The task management configuration component 350 interoperates with the task engine component adapter 352 to enable communication between the task configuration component 350 and task engine component adapter 352. The task engine component adapter 352 may include configurable web-based addressing format or link 354 that identifies a configurable logic or a memory in the tasks engines 376 or engine database 165.

In FIG. 4, an example of the system deployment 400 includes an example of the ICC design and configuration environment 230 and configuration environment 402. With continuing reference to the examples depicted in FIGS. 1-3, in FIG. 4, the system deployment 400 includes a design and configuration environment 230, a runtime policy environment 430, and a book of business (impact modeling) test environment 440.

The ICC design and configuration environment 402 includes an ICC product development portal 410. The ICC product development portal 410 provides a user interface displayable on the user portal 110. The ICC product development portal 410 provides a control and abstraction layer between the user interface of the ICC product development portal 410 and the underlying functionality of the ICC design and configuration environment 230.

The ICC design and configuration environment 402 also includes an example of the ICC core 310, as ICC core 412. An example of ICC core 412 may include various modules. The ICC core 412 may include computer executable program code executable on servers 130 to allow the business user of the ICC design and configuration environment to develop insurance products and offerings, manage insurance-related product development projects, manage organizational and security-based project and product-related issues, and store and retrieve reference data associated with the ICC core applications. The ICC core 412 modules may also include links to generated user interface information to be displayed on the user portal 110 by the ICC product development portal 410. The ICC core application may generate web-based user interfaces with links to the servers 130.

ICC core 412 may include an ICC core project organization/security reference data. Business users may access the ICC product development portal through the web-based user interface 112 to configure ICC core product and data definitions.

A business user of system 10 may also configure projects, organization/security, and reference data through the ICC product development portal. The ICC product development portal 410 may configure the componentized ICC capabilities including the ratings configuration component 320, the underwriting configuration component 330, the forms configuration component 340, and the task management configuration component 350 information.

System 10 further includes ICC deployment component 420. Typically, the ICC deployment component 420 may be configured by information technology users. When configured, the ICC deployment component 420 enables deployment of ICC configurations to appropriate runtime components, as will be described.

An information technology user may implement the additional integration required to support ICC transactions, integration with legacy policies, administration support policies, policy runtime environments, and book of business or impact modeling. In particular, the ICC deployment component 420 provides for message passing and data encapsulation to interface the ICC design and configuration environment 230 to the runtime policy environment 430 and book of business test environment 440.

In FIG. 4, an example ICC runtime environment 240 is similar to the policy runtime environment 430. The policy runtime environment 430 may include existing underwriting/policy administering applications 210 and ICC screens 220. The existing underwriting/policy administering applications may include legacy, AMS, AMS.NET, portal, POS, and underwriting desktops.

The policy runtime environment 430 may include ICC screens that are integrated with ICC runtime services 434 via an integration architecture 432. The integration architecture may include ESB, EIA, and BPM. The ICC runtime services 434 may provide an interface to the rating engine 370, UW rules engine 372, forms engine 374, and tasks engine 376.

The user interface 112 may display the ICC product development portal 410. The ICC product development portal 410 may specify product definitions, rules, forms, and tasks that are imported to the policy runtime environment 430 during deployment of the insurance product. By invoking the runtime policy environment, the business user may deploy insurance products or offerings into a test environment for validation of the design. Product information stored in the databases associated with the ICC core 310 may be extracted and deployed in coordination with the ICC deployment component 420.

Executing out of the servers 130, the policy runtime environment 430 links the structures and associated attributes, which specify the insurance product or core, through the integration architecture 432 to the ICC runtime services 434. The ICC runtime services 434 interacts with the ICC runtime engine 360 to communicate data and results between the configurable runtime engines 370, 372, 374, and 376. Results associated with the test deployment are returned to the ICC runtime services 434, which provide the results to either the existing UW/policy administration front-end applications or ICC screens for display. Results are passed through the ICC deployment component 420 to the ICC product development portal for review on the user portal 110.

The book of business impact modeling test environment 440 includes an ICC book of business component 442. As an example, the ICC book of business component 442 may include modules having computer executable program code, executable on servers 130, computer processors and related hardware, and configurable logic to provide a test environment for verifying and modeling insurance products and offerings. The ICC book of business component 442 may provide services, integration, and user interfaces for configuration and management during testing and/or modeling of new, modified, or existing insurance products or offerings. The ICC book of business component 442 may include an interface to a data warehouse 444, a high-performance data batch testing component 446, and a reporting and analysis component 448.

In FIG. 4, an example high-performance batch testing component 446 allows testing of product components on the rating engines 370, the UW rules engine 372, the forms engine 374, and the tasks engine 376 prior to deployment of an insurance product.

The high-performance batch testing component 446 and book of business impact modeling test environment 440 analyze the effect of different rules, ratings, forms, and tasks on the business performance of a proposed insurance product before deployment or sale of the insurance product. For example, a business user may use the ICC product development portal 410 to specify insurance products, account hierarchies, and user roles. The business user may invoke the high-performance batch testing 446 using data stored in the data warehouse 444. During execution, the reporting and analysis module 448 may collect designated information to develop reports and capture analytic results to predict commercial performance of the proposed product.

Business users may use the ICC product development portal 410 to relate the account hierarchy to product definitions or previously specified products. The ratings configuration components 320 may provide a business user with an interface to specify or develop rating rules to govern a new product.

The ICC product development portal 410 may include an interface to the rating configuration components 320 for defining underwriting rules and input underwriting rules for new or existing products.

The ICC product development portal 410 may interface with form configuration components 340 to develop form rules and receive the form rules. The ICC product development portal 410 may interface with the task management configuration component 350 to develop task rules and to input task rules.

The business user may launch the ICC deployment component 420 to invoke the book of business test environment 440 in order to test the new rules. The business user may also utilize the ICC product development portal 410 to deploy the rules/product definitions to the runtime environment 430.

The reuse of insurance product components and templates may allow a business user to create a new product or offering with a familiar or known quality. The use of templates advantageously allows a business user to develop an insurance product or offering without the need to create new component parts from scratch.

Figure 5:
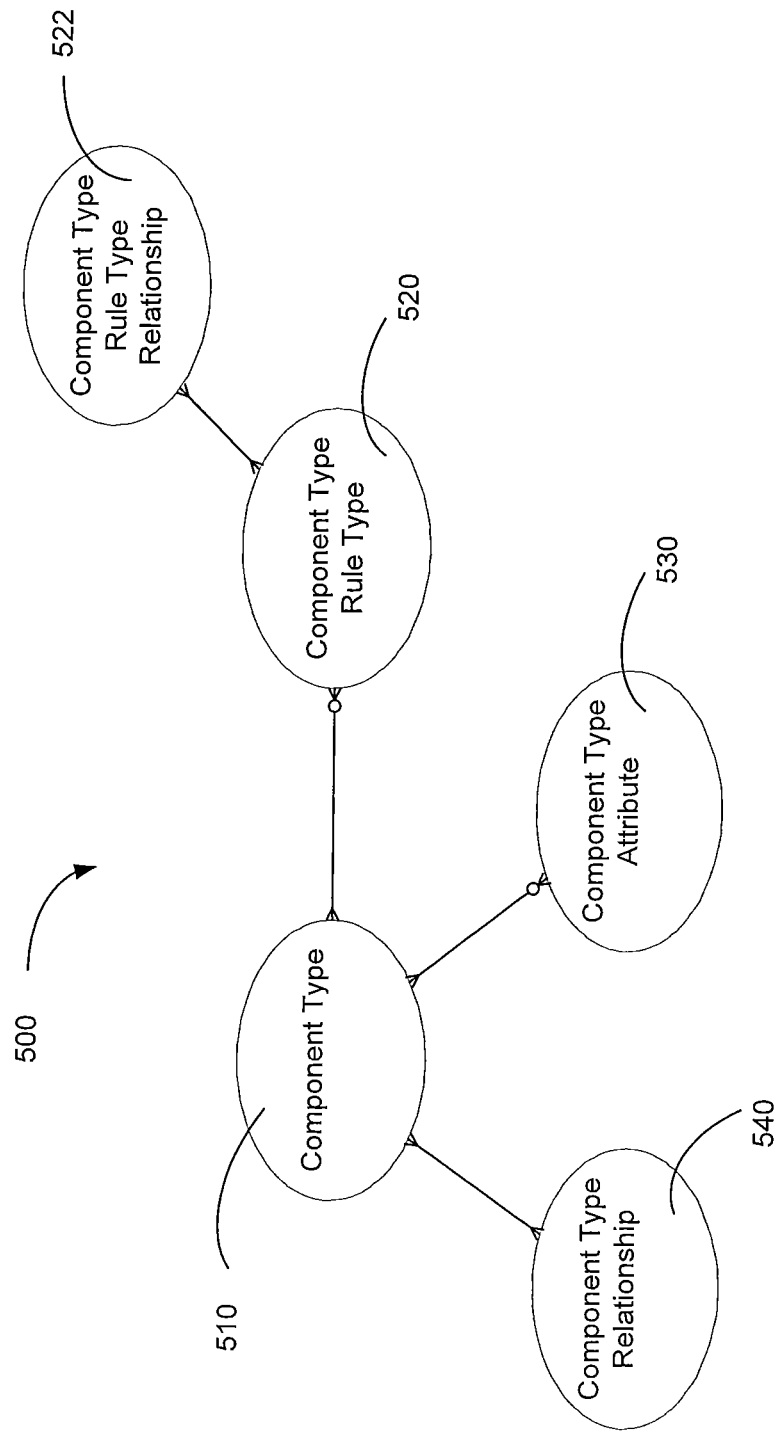
FIG. 5 depicts a component type table.

In FIG. 5, an example database includes component type tables 500 configured to provide the ability to represent one or more insurance product components. The tables may be stored in a memory, a database server, or a module. As an example, the database tables may include link list of memory locations containing attributes, links, pointers, rules, and other insurance product information or data. Accordingly, the insurance product components may include hardware, software, and/or a combination thereof. The database tables 500 may be used to flexibly and selectively implement various insurance product components. In FIGS. 5-8, insurance products/offerings or templates for insurance products/offerings may be developed by specifying hierarchical relationships between components within the branches, such as rule sets.

The component type tables 500 may include a component type table 510 to develop different types of components. Examples of component types may include an insurance product/offering, line of business, coverage, or rule. Entries in the component type table 510 may describe a particular component type as a product component, a line of business component, or a coverage component. Component types may have associated rule types which describe the types of rules that may be related to a component type.

The rule types table 522 supports a hierarchy of rule types associated to a component type. Rule types may also have related rule types table 522. A rule type may also include rule sub-types or rule sub-sub types. The user interface/front end 112 may display a rule type window. As an example, the rule type window may display a rule type "underwriting" and ratings. The rule type window may display sub-rule types "financials," "eligibility," and "risk assessment," under the rule type "underwriting." The rule type window may display the sub-sub-rule types "credit" and "bankruptcy" under the sub-rule type "financials."

The component type table 510 may be associated with a component type rule types table 520, a component type attributes table 530, and component type relationships table 540.

The component type table 510 may include a data structure within a database. The component type table 510 may include attributes and functionalities in 520 to develop the operation and parameters of corresponding component types. The component type rule types table 520 may include a data structure to associate the component type to information related to the rule type. Entries in the component type rule types table 520 may include a list of rule types, types of rules associated with the rule, and dates that the rule types were identified. The component type rule types table 520 may be limited to receive predetermined valid rule types.

The information in the component type rule types table 520 may be used by component adapters to communicate with one of the engine servers 160. The component adapters are predefined adapters that provide well-defined functional encapsulation for each of the engines. Servers 160 may be utilized to test and deploy each insurance product component or product depending upon the component type used to form an insurance product component. Each component adapter may map attributes, functions, and information for each insurance product component to the databases or configurable logic associated with one or more configurable engines 250.

The ratings runtime adapter 380 may access the component rule types table 520 of each component to determine the rules to be applied to the instantiated component type in an insurance product component. The ratings runtime adapter 380 may map the component rule types table entries to an appropriate memory structure in the ratings engine 370.

In other words, the component type rule types tables serve to provide a superset of rule types that may be selected when configuring an insurance product component. The adapters will be configured based upon the rule types associated to each component type. However, the adapters will access the component rule types to determine which rules should be applied for a given instantiated component.

Each component adapter may further include a table or structure within a database to associate the component to attributes and links to other databases or configurable logic associated with the configurable engines 260. The engine servers 160 may execute the configurable engines 260. In some examples of system 10, the component adapters may include attributes or links to a component rule types relationship table.

For example, the valid rule types related to component type "coverage" may be premium, group 1, and group 2. The list of the rule types and the n-layers of rule type hierarchy related to each component type specifies what is available to the business user when creating, configuring, managing, or maintaining an instance of a product/offering component.

Examples of valid rule types may include rating rules, underwriting rules, form rules and task rules. Examples of valid sub-types of underwriting rules, risk analysis rules, catastrophe rules, and financial rules. Examples of valid sub-types of rating rules may include base rating rules, premium discount rules, and final rating rules.

A rule type table 520 may include tables or structures within a database to specify a classification of similar business rules focused upon a theme of insurance product functionalities. For example, a rule type table 1720 may be based around a common underwriting or rating theme. In addition, the rule type table 520 may include levels of hierarchical classification. As an example, the rule type table 520 may be configured as sub-rules types and sub-sub-rule types.

The database structure of each component type rule types table 520 may be configured as a single physical table that is logically partitioned. In other examples, the database structure of the component type rule types table 520 may include separate tables that are linked. In addition, the data base structure of each component type may include a configurable addressing format or link 324 that corresponds to configurable logic or memory in one of the engine servers 160 or engine databases 165 to transfer information or a request for services.

As an alternative example, the component type rule types table 520 may include a table or structure within a database to associate a component based upon the component type to attributes and links to other databases or configurable logic associated with the configurable engines 260. In addition, the component type rule types table 520 may include attributes or links to a component type rule type relationship table 522.

The entries in the tables or database structures that describe the rule type table 520 may be a configurable addressing format or link 324. Rule type table 520 or a database structure of each rule type table 520 may include a network address, an Internet address, a Universal Resource Locator (URL), Hypertext Transfer Protocol (HTTP), Secure Hypertext Transfer Protocol (HTTPS), or other network or data-link address that corresponds to the configurable logic or memory in one of the engine servers 160 or the engine database 165.

The component type attributes table 530 may include tables or structures within a database to specify the available attributes for each component type. The tables of the component type attributes table 530 may include definitions or specification of valid attribute values for a given component type table 500. Attributes include a deductible type, a co-insurance amount, or a limit amount.

The component type tables 500 permit formation of special relationships between related insurance product components based upon an inheritance relationship. For example, insurance product components may be related as a family of insurance product components. An insurance product component may be a parent insurance product component in relationship with a child insurance product component. The child insurance product component may inherit the various properties, attributes, and rule types of the parent insurance product component. As long as the inheritance relationship is maintained, changes to the component type tables 500 of the parent insurance product component are reflected forward into the child insurance product component.

In some cases, the inheritance relationship between the parent insurance product component and the child insurance product component may be permanently severed or broken. After the inheritance relationship between the parent insurance product component and the child insurance product component is severed or broken, subsequent changes to the parent insurance product component are not updated into the child insurance product component.

Figure 6:
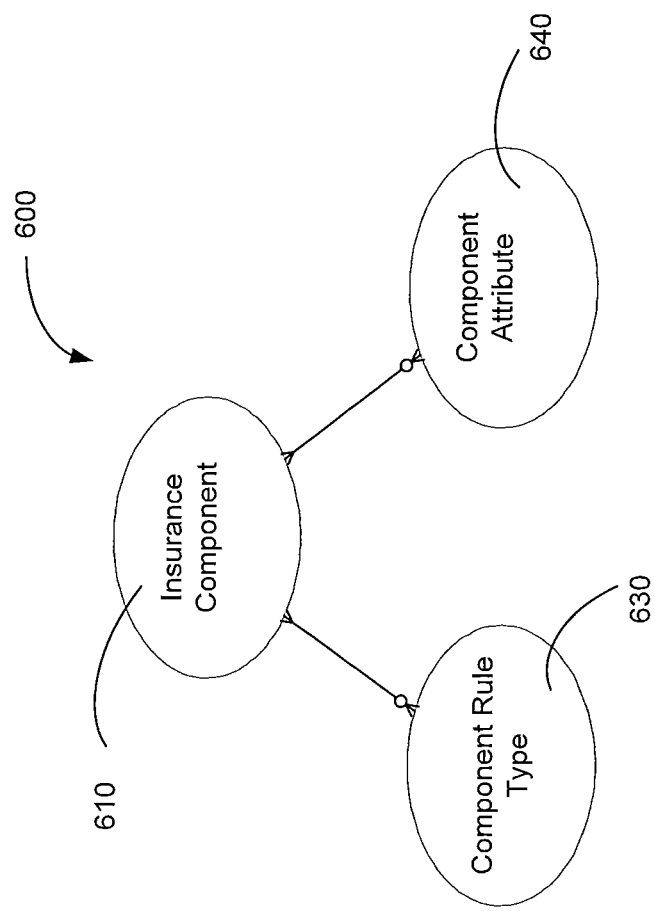
FIG. 6 depicts a reusable insurance component of a component library.
Figure 7:
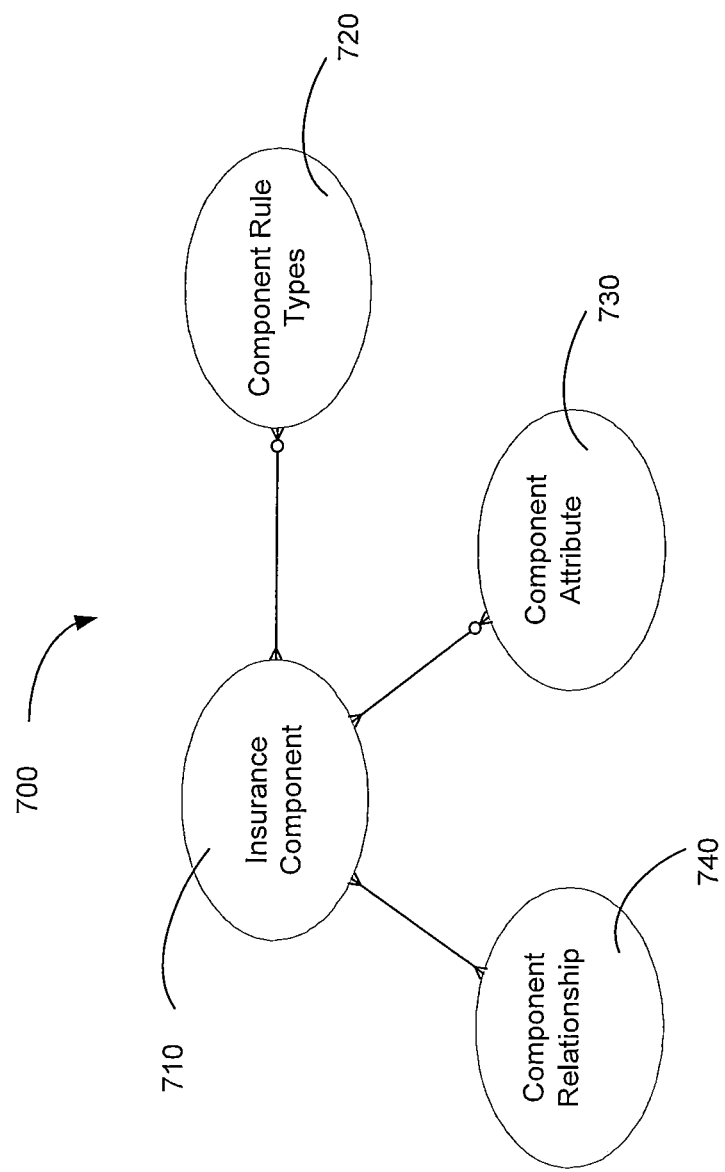
FIG. 7 depicts the relationships used to form a product or offering structure.

In FIGS. 6 and 7, an example of the product system components in FIG. 5 may be used to create and manage the components, the templates, and the product/offerings based upon the entry of attributes and establishment of relationships and rules/rule types contained within the various and respective component tables.

The component type table 500 and the corresponding component type relationships table 540 may include a table of entries to relate the component types table 510 to other component types. The component type relationships table 540 may specify the configuration that governs the hierarchical structure of the product/offering as illustrated in FIG. 8B, as a product tree or product definition 842. Illustratively, as shown in FIG. 5 the component type relationships table 540 may specify the relationship of a component type to another component type or to an insurance product template comprising a plurality of previously related or developed components.

Some example component types may describe a portion of a product "Business Owners Policy" (BOP) 832, a line of business "Property" 834, and/or coverage "Building" 836. For example, the component type relationships table 540 may create relationships between a product "Business Owners Policy" 832 and a line of business "Property" 834. A product component type may have many lines of business component types. Likewise, the component type relationships table 540 may also create relationships between a line of business component type 834 such that a line of business component type 834 may have many coverage component types 836 and 828. The component type attribute table 530 may relate a list of values that may be used in configuring each component type table 510. As a non-limiting example, the coverage component type may contain component type attributes such as a deductible type, a co-insurance amount or amounts, or limit amounts.

The entries into the component type tables 510 create and specify the valid relationships, valid rules, and valid attributes of the components that may include a product/offering or template. Accordingly, the product tree 842 includes relationships between specific components based on information specified in the component type relationships table 540.

Some example component types may describe a portion of a product BOP 832, a line of business 824, and/or coverage 822. For example, the component type relationships table 540 may create relationships between a product BOP 832 and a line of business 834. A product component type may have many lines of business component types. Likewise, the component type relationships table 540 may also create relationships between a line of business component type 834 such that a line of business component type 834 may have many coverage component types 836 and 828. The component type attribute table 530 may relate a list of values that may be used in configuring each component type table 510. As a non-limiting example, the coverage component type may contain component type attributes such as a deductible type, a co-insurance amount or amounts, or limit amounts.

The component type attribute table 530 may specify the valid attributes that may be assigned to the component tables of an insurance product component, as depicted in FIGS. 6 and 7. Valid entries in the component tables may be based upon information captured within the component type attribute table 530 and component type rule types table 520. The component type tables 510 may create the valid corresponding relationships between each component and provide the basic "structure." The relationships in combination with the components may form a hierarchical "tree" structure. The valid component type attributes and valid rule types listed in association with the component type tables 510 may provide the business user with a list of attributes to select when configuring one of a component, template, or product/offering.

In FIG. 6, an example reusable component 600 may be created and stored in an insurance product component library included in the library databases 130. The reusable component 600 includes flexibility that enables definition and maintenance of reusable insurance product components. Based upon the component types described in the tables associated with FIG. 5, a business user may create components for use in an insurance product, template, or line of business.

As depicted in FIG. 6, with continuing reference to FIGS. 1-5, an example of an insurance product component 610 may be linked or associated with a component rule types 630 and a component attributes 640. For example, a reusable component 600 may be specified as a "loss of use," based on component-type "coverage". Another component may be created as a "collision" product component based on the component type "coverage". These components may be reused in any number of products/offerings or templates where these coverages are applicable. The insurance product component library may include components created for each component type.

Accordingly, the business user of the product development portal 410 may select the attributes and the values of the attributes to be applied to a given component as specified in each respective component attributes 640.

A business user may also select rule types to be applied to a given insurance product component 610. The rule types may be created or assigned in the component type rule type table 520 of the respective component.

When a component is reused to create an insurance product template or a product offering, the attribute and rule type selected in the component library are pre-selected for the component in the context of the insurance product template or the product/offering. For example, the user interface 112 may display pre-selected entries for each selected component. The displayed pre-selected entries may be accepted or modified based upon the functional definition of the selected component. As a result, the ICC design and configuration environment 230 may utilize the user interface 112 to govern and centralized product definitions developed by business users.

By using a product data structure, components may be reused and supported in levels of definition. Validation and edits of the data associated with each component ensure the data quality. In addition, the granularity provided by the component permits the business user to understand which system owns a particular attribute. Allowing each component to include an inheritance-based model further promotes design and implementation of products based upon a master definition as maintained in a component library.

An inheritance-based model may establish parent-child relationships between a first insurance product component (parent component) and a second insurance product component (child component.) A child component inherits, through an inheritance relationship, the underlying functionality and definitions of a parent component. Any change or modification to a parent component is automatically propagated forward onto the child component and any progeny of the child component. An inheritance-based model allows users to make changes to parent components and without user involvement, automatically propagate those changes to any related children. This eases the maintenance of product component changes as well as the ability to introduce these changes quickly.

The product development portal 410 may support a business process based interaction model that also supports configurable process definitions. The product development process is thereby based on a product definition and the business user type/channel for the insurance product. As a result, the business user may only consume the services related to ratings and underwriting rules as part of the processing acts, which streamlines the product development process.

In addition, by associating the rule types with component adapter services, ICC design and configuration environment 230 works in conjunction with the ICC runtime environment 240 to configure the configurable engines 250. The rules provide for adaptable services to enable best of breed insurance product tools or legacy integration for configurable underwriting, rating, form selection, and task management business rules. Rule types are developed by the business user when specifying the information about a particular insurance product component and these rule types and associated attributes may be used to connect to one of the engines servers 160. For example, a business user may specify that for a particular coverage type component, the "rating/base rating" rule type may apply, and that particular rule type is associated to rating rules stored in an externally available ratings engine.

The dynamic user interface 112 allows for generation and presentation of new products to business users. The ease of generation and presentation facilitate deployment of rule-driven data capture and conversational questions and answers for the new business quotation and underwriting process.

In addition, because the ICC product development portal 410 supports both the policy runtime environment 430 and book of business impact modeling testing environment 440, the business user is presented with a unified rules management work bench. The unified rules management work bench enables the business user to create and maintain business rules centrally through a single facility.

The product offering structure allows business users to create templates and products/offerings based upon component types and the configurations specified in the component type table 510. The business user may use or reuse components from the component library to create an insurance product template or a product offering. The components may be assembled to create a component relationship, as depicted in FIG. 6.

Similar to the definition of a component type table 510, FIG. 7 depicts an example of a product/offering structure 700. The product/offering structure 700 includes at least one insurance product component 710 having an associated component rule types 720 and a component attributes 730. In addition, the insurance product component 710 may include component relationship 740.

An insurance product template or a product offering based upon components from the component library may include preselected component attributes 730 and component rule types 720. A business user may deselect component attributes that do not apply to the insurance product component 710 in the context of the insurance product template or the product/offering being developed.

The business user may select additional component type attributes from the attributes listed in the component type attribute table 530. The business user may deselect and/or select the appropriate rule types for the insurance product component 710 within the insurance product template or product/offering under development.

For example, an insurance product may be described as a plurality of insurance product components 710. Each insurance product component 710 may be based on a component type 500 and specify some or all of the contents of a component type table 510, a component type rule types table 520, a component type attribute table 530, and a component type relationships table 540.

The plurality of insurance product components 710 may include at least one relationship to at least one other component of the insurance product. Each relationship may be created based upon valid entries in the component type relationships table 540 of each component. The relationships for each of the insurance product components 710 are a function of the component type rule relationships table 740 of each of the insurance product components 710. The combination of the relationship creates hierarchical relationships that describe a structure of the insurance product.

Each insurance product component 710 may be based upon entries in the component type rule types table 520. The entries in each component type rule types table 520 may indicate the valid rule types for a particular component type. The ICC core 310 may select entries of the component type rule types table to be mapped or associated with a component adapter. Each instantiation of an insurance product component 710 may be associated with an appropriate component adapter. As described above, the selected component adapter may link or map the component to the databases or configurable logic associated with one or more configurable engines 250 or the engine servers 160 configured to execute the configurable engines 250.

In an alternative example, the component type rule types table 520 may associate the insurance product component 710 to a configurable content resident on one or more of a plurality of configurable engines 250.

The component type attribute table 530 of each insurance product component 710 may also include one attribute entry in each component attribute table of each of the components, where each attribute specifies a portion of the coverage or coverage conditions of the insurance product.

Figure 8A:
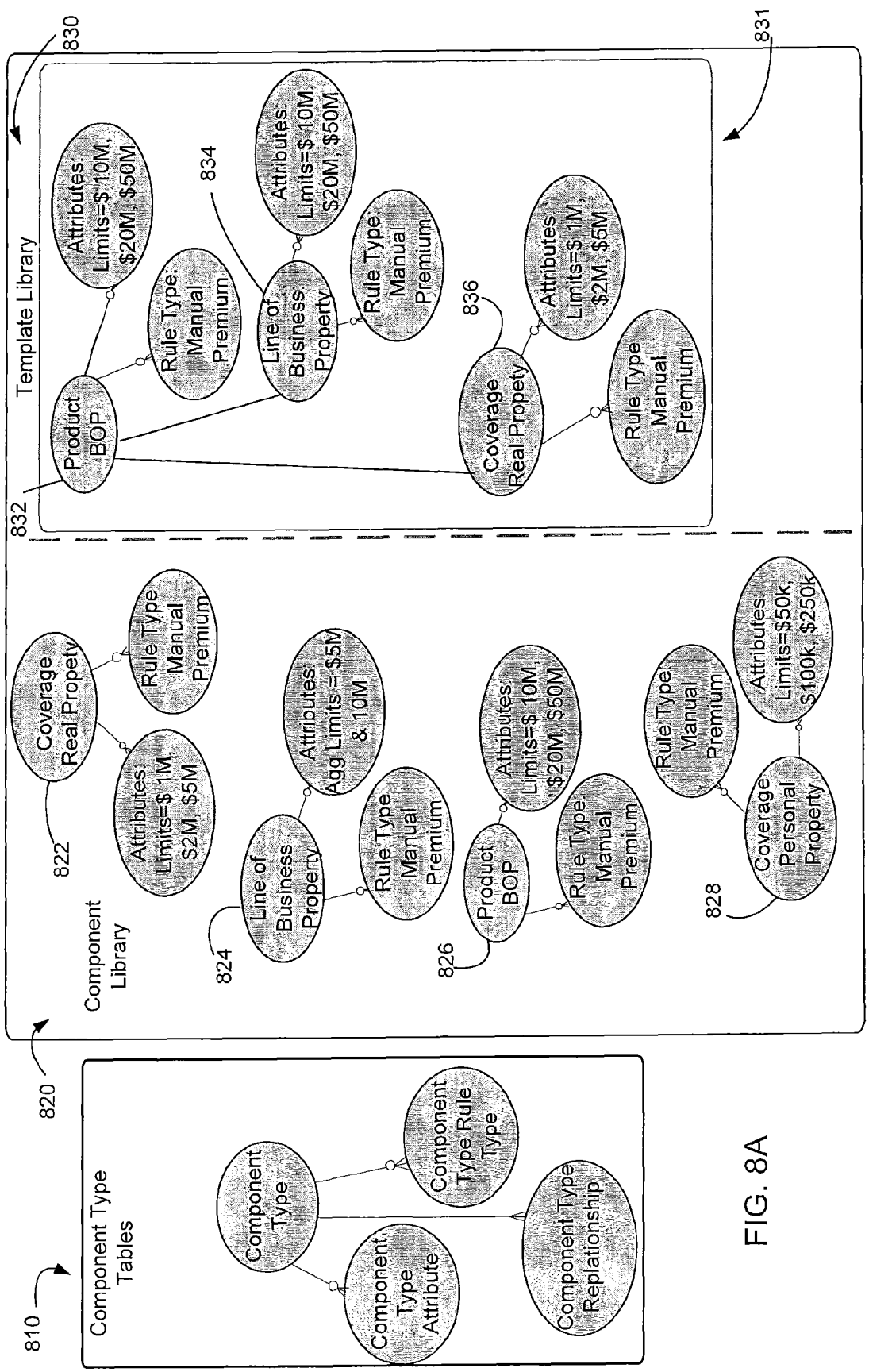
FIG. 8A depicts example component libraries and template libraries based upon the reusable insurance components.
Figure 8B:
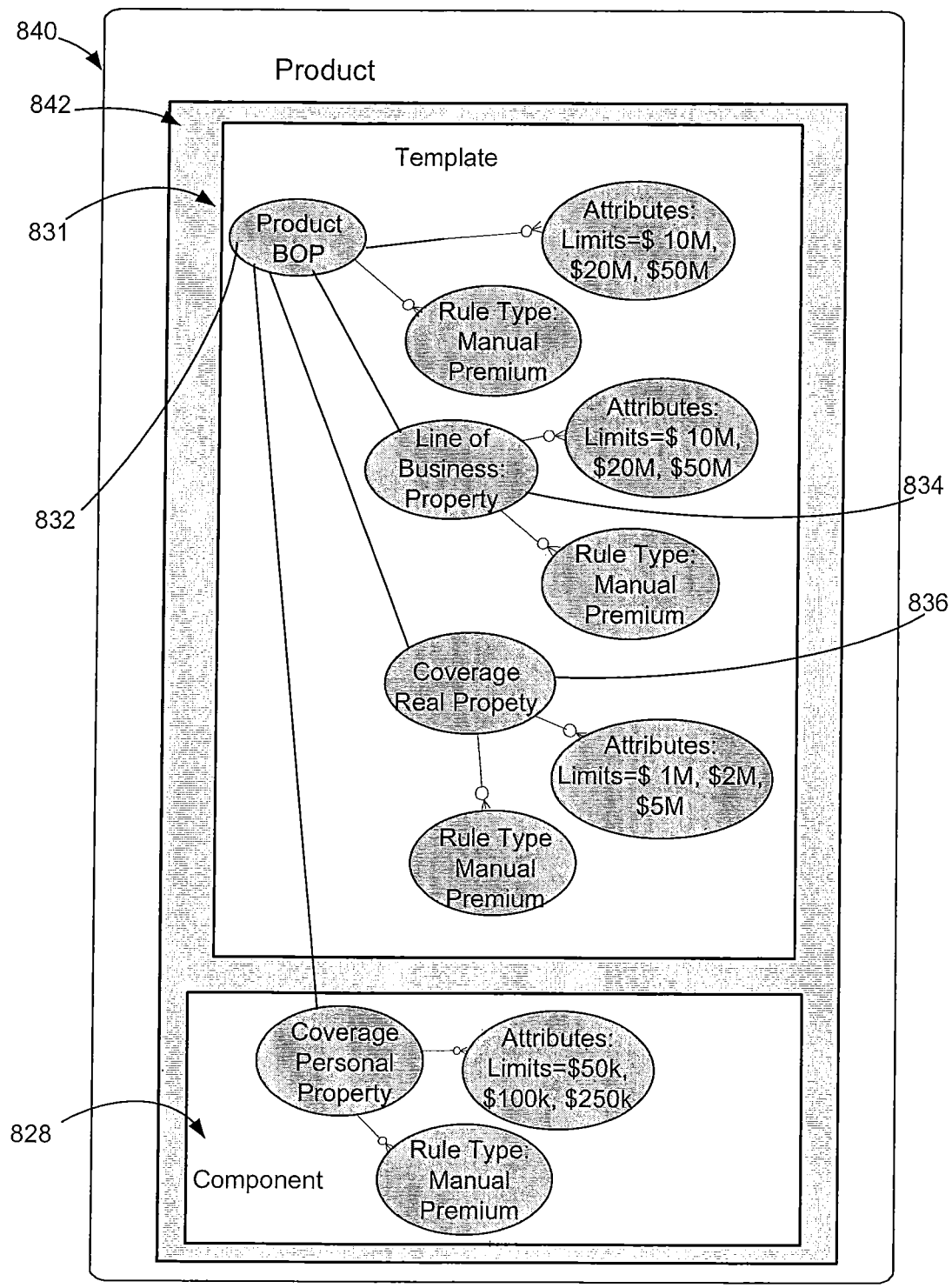
FIG. 8B depicts an example product made up of the example component libraries and template libraries.

For example, in FIGS. 8A and 8B, a business user may create four representative insurance product components 822, 824, 826 and 828 as part of a representative component library 820. A first component is the "coverage: real property" component 822. A second component in the component library 820 is a "line of business property" component 824. A third component in the component library 820 is a "product BOP" component 826. A fourth component in the component library 820 is a "coverage personal property" component 828. In other examples, fewer or greater numbers of components 500, 600, and 700 may be included in the component library 820.

In FIG. 8A, an example of the coverage real property component 822 includes an attribute with limits having potential assigned values of $1,000,000, $2,000,000, and $5,000,000. The coverage real property component 822 may have a component type rule type set to manual premium. A manual premium may be defined as a premium that may be entered by the business user. In some example insurance product components, the component type rule type may be set to predetermined values.

The line of business property component 824 may include a component type attribute named aggregate limits (Agg. Limits) with potential values of $5,000,000 and $10,000,000. The line of business property component 824 may further include a component type rule type set to manual premium. The product BOP component 826 may include a component type attribute (Agg. Limits) with potential values of $10,000, 000, $20,000,000, and $50,000,000. A component type rule type may have a value set to manual premium.

The coverage personal property component 828 may have a component type attribute of (Limits) with potential values of $50,000, $100,000, and $250,000. The coverage personal property component 828 may include a component type rule type with a value set to manual premium. The template library 830 may include one or more templates for defining products that are pre-instantiations. The insurance product templates may permit authorized users to create templates. A librarian may also create insurance product templates and insurance product components.

In FIG. 8A, one example insurance product component is an insurance product/offering template 832. The insurance product/offering template 831 may include a "product BOP" component 832, a "line of business property" component 834, and a "coverage real property" component 836. The product BOP component 832 may include a component type relationship to the line of business property component 834. In addition, the line of business property component 834 may have a component type relationship to the coverage real property component 836. Each of the components 832, 834, and 836, may include associated attributes and rule types.

In FIG. 8B, the product library 840 may include a first product definition 842. The first product definition 842 may include an instantiation of the insurance product templates 832, 834, 836, and the component 828. The product BOP component 842 includes the insurance product template 831.

The line of business property component 834 may further include a component type relationship to the coverage personal property component 838. The component 828 may be instantiated and linked to the insurance product template 831 to form a product.

During development, coherency rules may be applied to components, templates, and product/offerings to provide a foundation for reusability and long-term maintenance. The ICC core 310 may apply coherency rules to each instance of a component, template, and product/offering. The ICC core 310 may examine the coherency rule for components, templates, and product/offerings to determine whether the respective components, templates, and product/offerings include valid attribute assignments or table entries. The ICC core 310 may determine whether components, templates, and product/offerings are authorized for use in a particular insurance product based upon archival status, deployment status, regulatory status, and publication status.

The ICC core 310 may determine whether the relationships and associations between the various insurance product components are valid and stable. The ICC core 310 may further determine whether the relationships and associations between the various insurance product components are supportable by the runtime environment 430 or the book of business (impact modeling) test environment 440. The ICC core 310 may analyze a selected rule type, sub-rule type, and sub-rule type. The ICC core 310 determines whether a selected rule type is supported by the runtime environment 430 or the book of business (impact modeling) test environment 440.

For example, the component coherency rules may be checked at designated checkpoints during the product development process to prevent creation of invalid structures or components in the product library 840. The coherency rule may be applied at different levels of the product/offering hierarchy in order to govern the structural coherency of the particular product/offering.

As another example, the insurance product component facility may invoke a coherence module or function when an insurance product component, template, product or offering is saved or created. The insurance product component facility may also invoke a coherency function when there is a determination that an insurance product component has a status change. Example status changes include a "New" insurance product component changed to a "Draft" status when that component is ready for editing, a "Draft" insurance product component changed to "Approved" status when that component has been approved for production use, an "Approved" insurance product component changed to "Production" status when that component has been placed into production and a "Production" insurance product component changed to an "Archived" status when that insurance product component has been removed from production and placed into an archive.

An example status change may include storing the insurance product component in a different category or category locations of a library of insurance product components, receiving regulatory approval, or submitting the insurance product component for regulatory approval. Each category location may be associated with a product lifecycle parameter. As a further example, the coherency function may be invoked when a component is related to a parent insurance product component stored in an insurance product component database or within a context of an offering being developed.

As an example, if the triggering event for invoking the coherency function is saving a component to the library database 150 or product database 140, the coherency function may determine that insurance product component is coherent provided the component status of the insurance product component is set to "New." Alternatively, if the component status of the insurance product component is not set to "New," then the insurance product component may be considered coherent provided all the required attributes of the insurance product component are specified. The coherency checking function may generate a warning indication if the component status is set to "New" and any of the required attributes of the insurance product component are not specified or if the insurance product component shares at least one of a name, type, version #, and parent with a sibling on the offering being developed. Otherwise, the insurance product component may be considered incoherent.

In the event that the triggering event is a "Status Change," the coherency checking function may determine that the insurance product component is coherent if the status of all the parent insurance product components of the insurance product component is not "New," the insurance product component's status is also not "New," all required attributes of the insurance product component are specified, and the insurance product component does not share a name, type, version #, and a parent insurance product component with a sibling insurance product component used in the insurance product offering. Otherwise, the insurance product component may be considered incoherent.

Another example triggering event is creation of an "Association" of insurance product components. For example, if the triggering event is "Association", the coherency checking function may determine that the component is coherent if the status of the insurance product component is not "New," all required attributes of the insurance product component are specified, and the insurance product component does not share a name, type, version #, and a parent insurance product component with a sibling insurance product component. Otherwise, the insurance product component is considered incoherent.

When performing a Coherence Check, the user interface 112 may provide the business user with a message describing the situation if there is any incoherence warning or error.

In some instances, only the product/offering structures that adhere to a data coherency rule may be deemed "coherent." Depending upon the particular business or IT policies, the ICC design and configuration environment 230 may only allow deployment of products deemed to be coherent into a runtime environment. Because the coherency rules may be updated frequently or modified per installation, the coherency rules may be developed and encapsulated within an application component. An application component may include a computer program code module stored in the ICC applications database 132 and executable on the servers 130. The encapsulation of coherency rules allows the encapsulated application component to be easily updated in the future with minimal impact to the overall ICC design and configuration environment.

As another example, the ICC design and configuration environment 230 may break coherency. As an example, a business user may configure a product at the time of deployment of an insurance product/offering to limit the scope of the inherency of a component, template, product, or offering.

In the event that a previously fielded product or offering requires adjustment, the ICC design and configuration environment 230 may re-import the instances of the product/offering. The re-imported instances may selectively establish coherency with the library. Alternatively, the instance may be imported without reestablishing the coherency requirements, as if the previously deployed insurance product or offering was a newly-generated insurance product or offering.

The ICC design and configuration environment 230 may determine which components would no longer pass the coherency check. Thereafter, those components that are no longer coherent become independent components, templates, products/offerings from the parent components, templates, or products/offerings.

Instead, the independent components, templates, or products are treated as a new component within the component library 820, template library 830, or product library 840. Thereafter, coherency checks may proceed as if the to be modified product or offering were a new product or offering without importing undesirable changes due to the inheritance relationships of the components within the component library 820 and template library 830.

Figure 25:
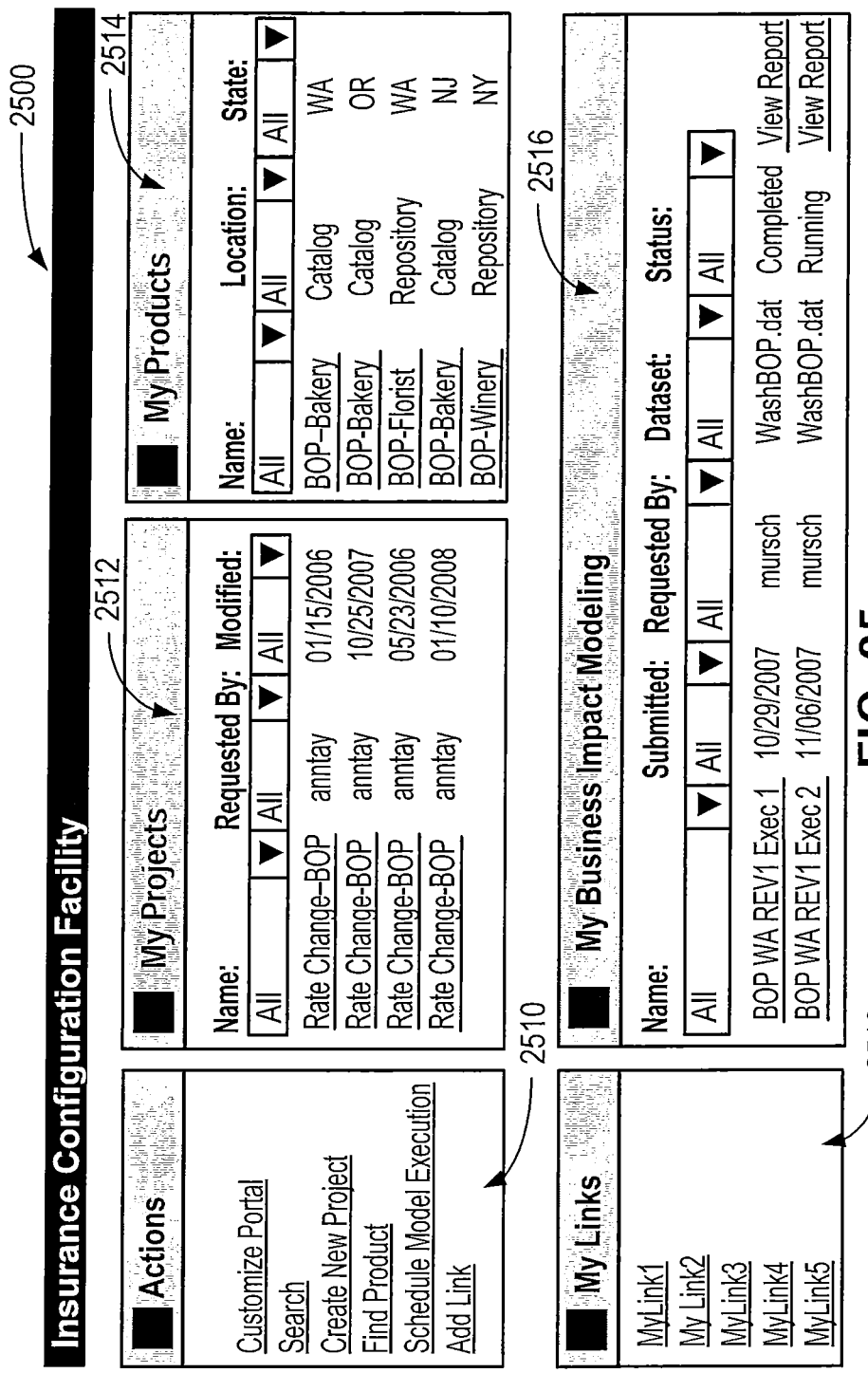
FIG. 25 depicts a user interface of the Insurance Configuration Facility (ICF).

In FIG. 25, an example of the user interface 112 includes the business user interface 2500 of the insurance configuration facility (ICF). The business user interface 2500 includes an actions window 2510, a My Projects window 2512, a My Products window 2514, a My Business Impact Modeling window 2516, and a My Links window 2518.

The actions window 2510 includes links to various software functionalities incorporated into the ICF. Illustratively, the actions window 2510 may include links "Customize Portal," "Search," "Create New Project," "Find Product," "Schedule Model Execution," or "Add Link." In response to selection of the links in the actions window 2510, the servers 130 determine the desired function requested by the user portal 110 and generate an appropriate user interface 112 to support the requested functionality.

Figure 10:
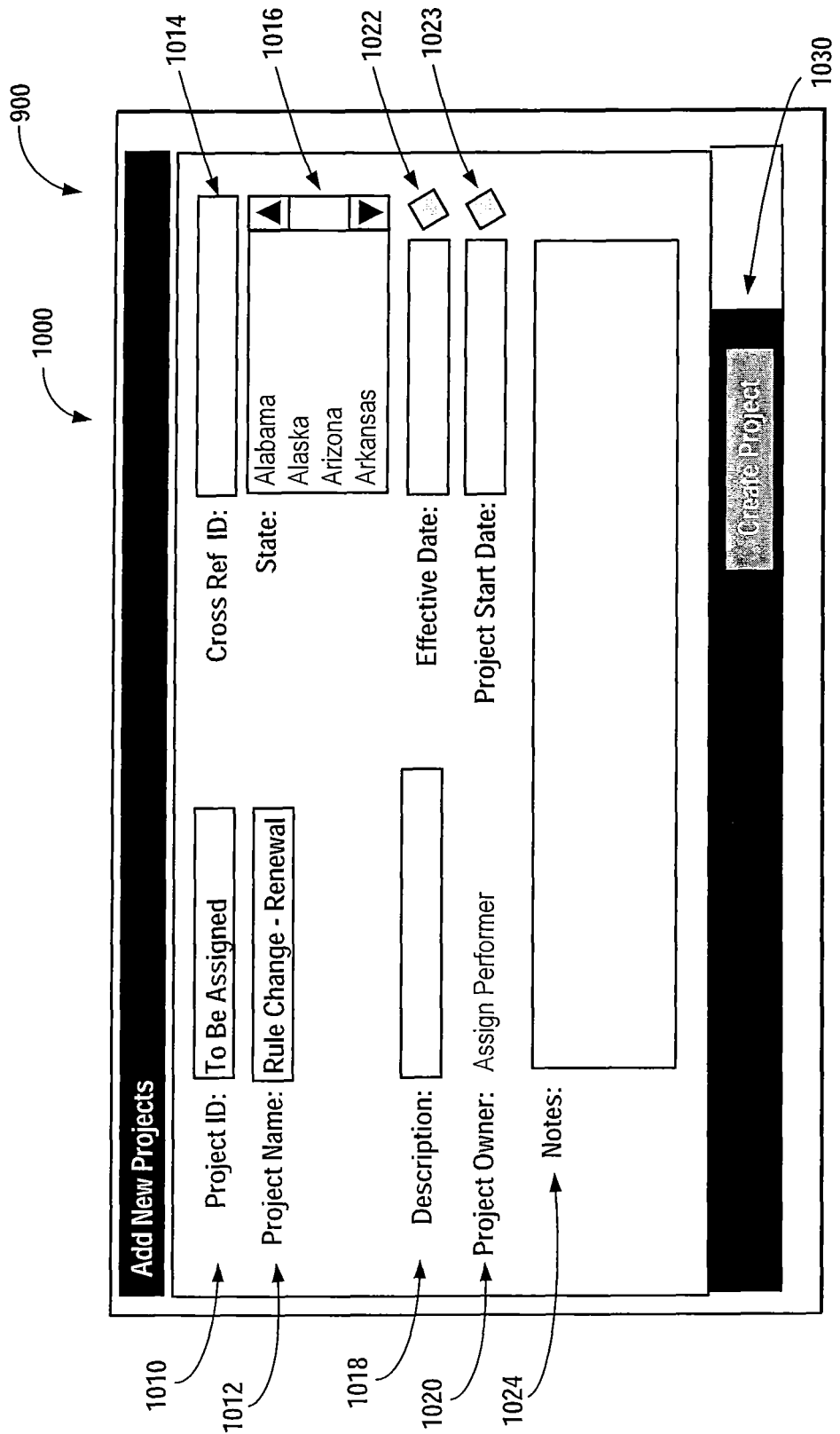
FIG. 10 depicts a user interface for adding a new project with an Insurance Configuration Facility (ICE) of FIG. 9.
Figure 32:
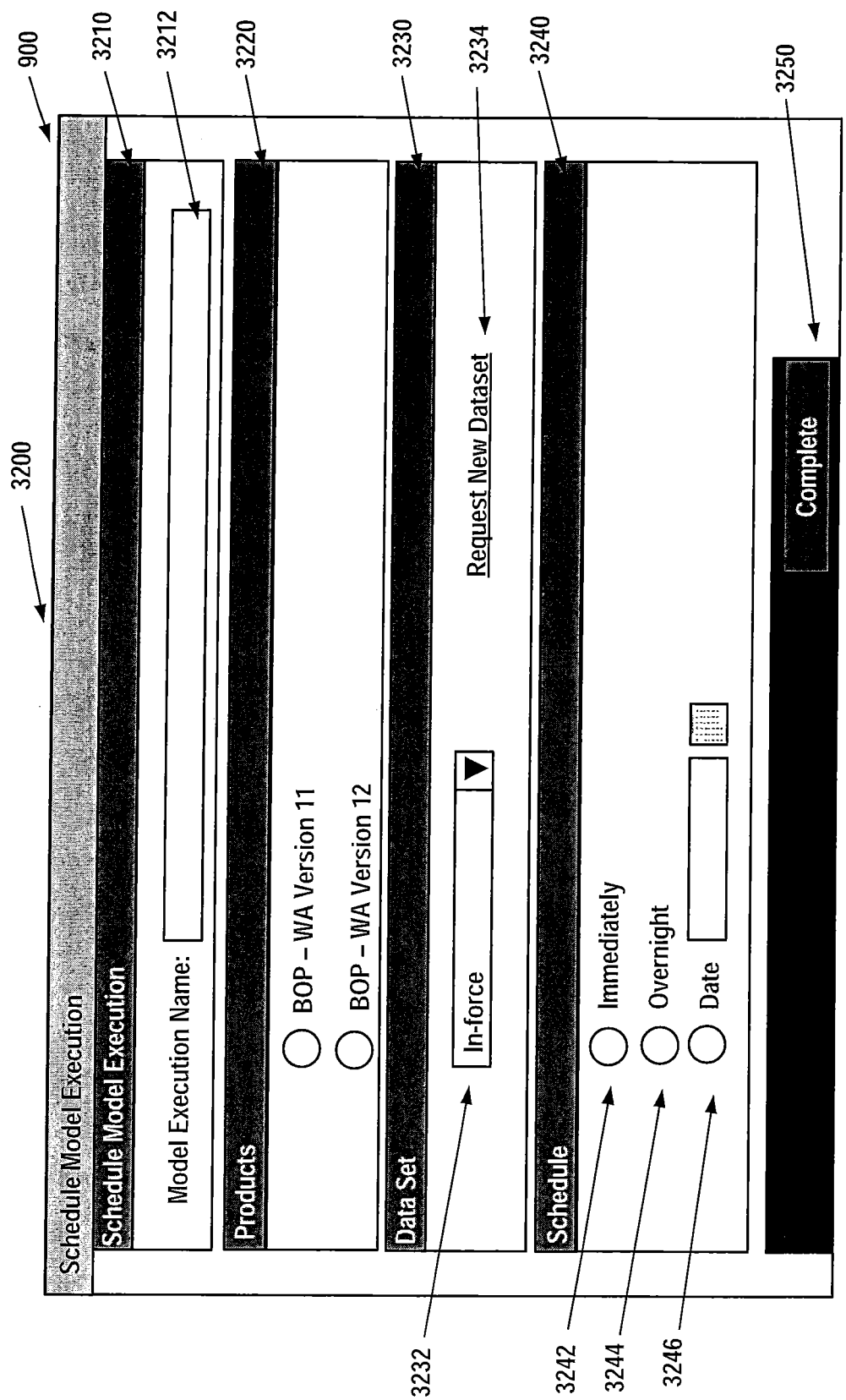
FIG. 32 depicts a schedule module execution user interface within the Insurance Configuration Facility (ICF) of FIG. 10.

As an example, in response to selection of one of the links, "Customize Portal," "Search," "Create New Project," "Find Product," "Schedule Model Execution," or "Add Link," the servers 130 invoke a corresponding function. As an example, in response to selection of the "Schedule Module Execution" link, the servers 130 may generate the Schedule Model Execution user interface 3200, as depicted in FIG. 32. Alternatively, in response to selection of the "Find Product" link, the servers 130 may generate and provide the user interface 112 with the search tool 2600, as depicted in FIG. 26. In response to selection of the Create New Project link, the servers may generate the Add New Project user interface 1000, as depicted in FIG. 10. In response to selection of the "Customize Portal" link, the servers 130 may generate and provide a user specific user interface for configuring the user interface 110, user portal 112, and user profile.

In response to selection of the search function, the servers 130 may invoke a search function to locate insurance product component, insurance product templates, or insurance product offerings that correspond to search criteria. Similarly, selection of the find project function may permit a business user to search the projects under development.

In response to selection of a create new project function, the servers 130 may invoke one or more user interfaces to specify and create a new insurance product project. In response to selection of a schedule model execution function, the servers 130 may invoke one or more user interfaces to commence or schedule testing of a new or existing insurance product component, template, or offering. For example, as depicted in FIG. 32, the servers 130 may receive request to schedule a model execution. In response, the servers 130 may generate a schedule model execution user interface 3200, which includes selections for models of insurance product offerings, data sets, and scheduling information.

The My Projects window 2512 includes a list of projects with associated names and dates. In addition, the My Projects window 2512 includes pull-down menus to allow the business user to interact with projects stored in association with the My Projects Window. The My Products window 2514 includes a list of products accessible by the business user along with their corresponding location and the state for which the products were created. The My Business Impact Modeling interface 2516 may include a listing of impact modeling executions associated with the date on which the model execution was submitted for execution within the impact modeling test environment 640. In addition, the My Business Impact Modeling user interface 2516 may indicate the requester of the impact modeling execution, the data set upon which the executed results are based, and a status of the impact modeling execution request. Illustratively, the status may be one of completed, pending, or running. In addition, My Business Impact Modeling user interface 2516 includes links to view the reports associated with the executed impact modeling.

Figure 9:
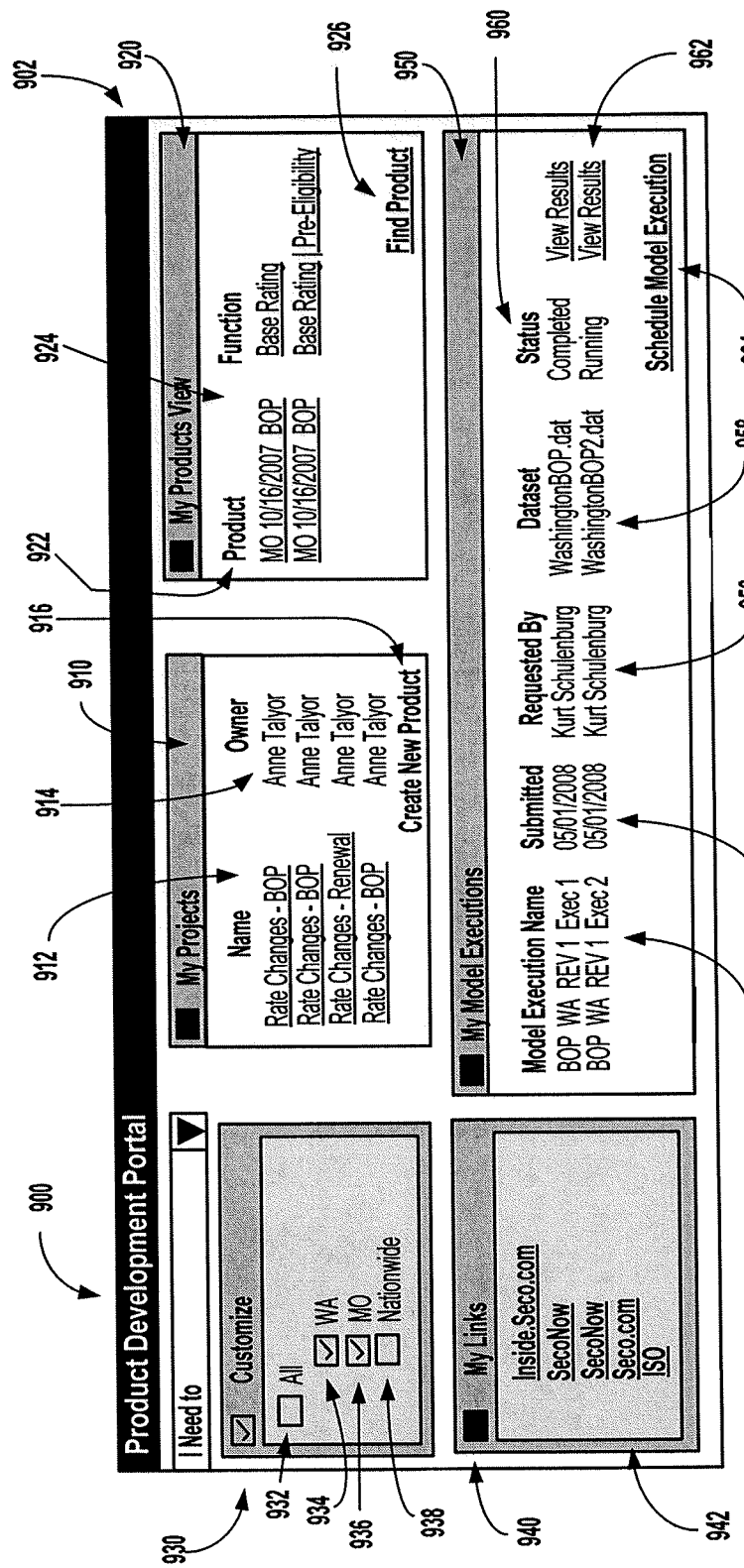
FIG. 9 depicts a user interface for an Insurance Configuration Facility (ICE) within the ICC.

In FIG. 9, an example user interface of insurance configuration facility 2500 includes a product development portal 900 of the ICC design and configuration environment 230. As used herein, product development portal 900 may also be referred to as an insurance configuration facility 900. With continuing reference to FIGS. 1-8, FIG. 9 depicts a product development portal user interface 902 that may be displayed on user portal or terminal 110. The product development portal user interface 902 may be a web-based user interface or other application specific user interface. As depicted in FIG. 9, the product development portal user interface 902 includes various child windows or window panes. Each respective window, child window, or window pane may provide a business user of the user portal 110 with access to various functionalities of the ICC design and configuration environment 230.

For example, a first child window may be configured as a My Projects user interface 910. The My Projects user interface 910 may further include a name category 912, owner category 914, as well as a create new project link 916. Under the name category 912, the My Projects user interface 910 may allow the business user to manage the various insurance products or offerings projects being developed. The owner category 914 may also list the name of an individual or entity within an insurance company associated with a particular development project.

Illustratively, FIG. 9 depicts name category 912 having a first project entitled "Rate Change BOP." The project "Rate Change BOP" is associated with an owner characteristic 914, which may be assigned to the project. As depicted in FIG. 9, the first project is assigned to an owner entitled "Anne Taylor." In addition, the My Project child window 910 further includes the Create New Project link 916.

Figure 12:
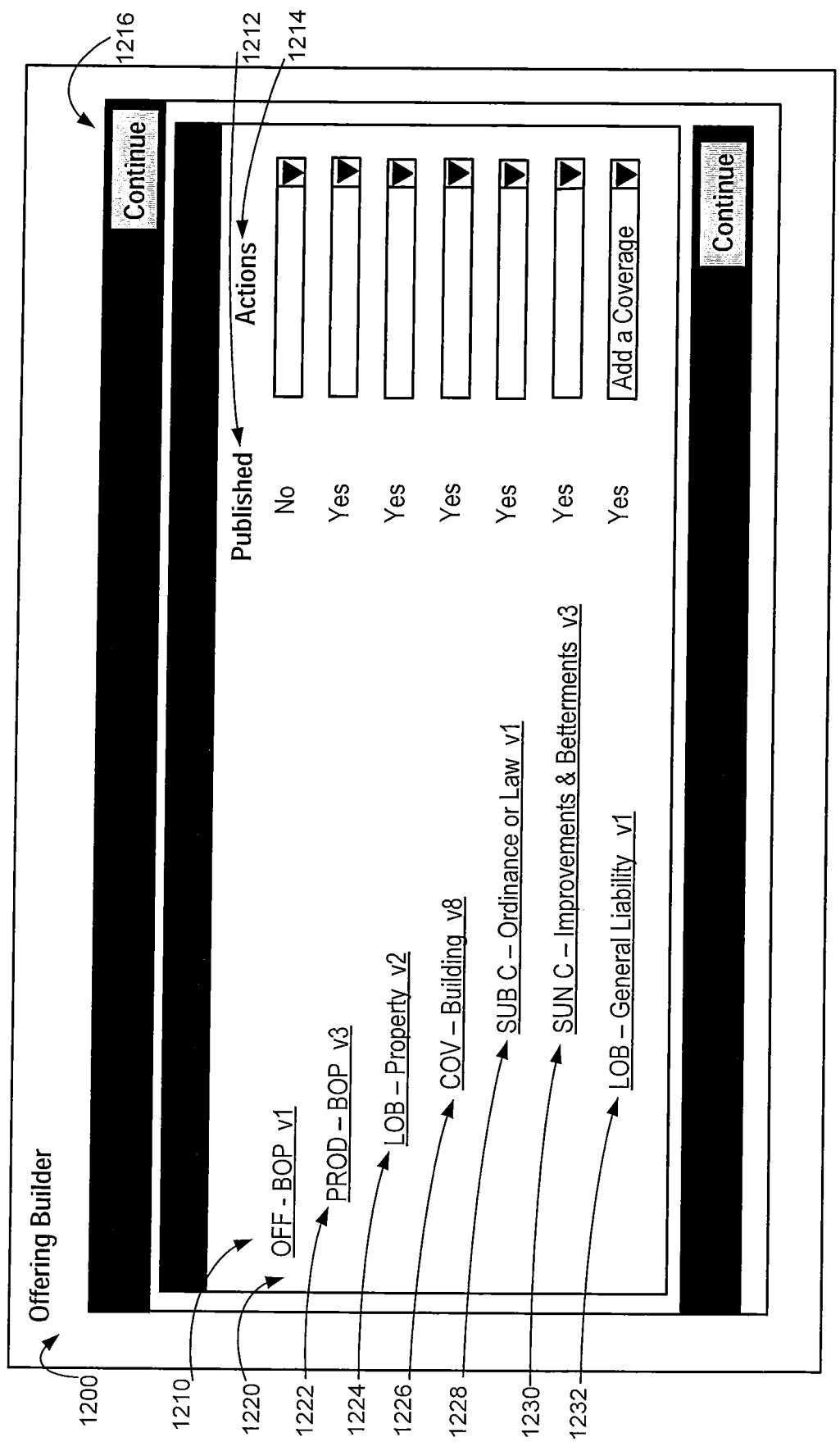
FIG. 12 depicts an offer builder user interface to display a hierarchical relationship of insurance product components and insurance product development lifecycle status information for a new insurance product offering.

In response to selection of the Create New Project link 916, the user portal 110 may request a user interface from servers 130. The user interface may permit the business user to create a new product development project. As an example, in response to receipt of a request linked to the Create New Project link 916, the servers 130 may generate an provide the Add New Project user interface 1200 to user portal 110, as depicted in FIG. 12.

The product development portal user interface 902 may further include a My Products view window 920 for organizing and creating new product definitions. For example, as depicted in FIG. 9, My Product view window 920 includes a product parameter or category 922 and a function parameter or category 924.

The product category 922 describes a specific product along with the date of creation and identifies the type of product. In addition, there is an associated functions parameter for each of the product characteristics 922. As depicted in FIG. 9, the "MO Oct. 16, 2007 BOP" product is associated with a "base rating" functions parameter or category 924.

In addition, the My Product view user interface 920 may further include a find product link 926. The find product link 926 may initialize a search function 26, such as the example search function depicted in FIGS. 26A and 26B. The search functionality may allow the business user to search for a specific product or function within a database. Illustratively the business user of My Products window 920 may search one of the databases including library databases 140 or the products databases 150. For example the product databases 140 may include a plurality of category locations. Each of the category locations may include one or more insurance product components, insurance product offerings, or a combination thereof.

The product development portal 902 may further include a Customize window 930. As depicted in FIG. 9, the Customize window 930 may allow a business user to select various geographical locations for which a project or product/offering is being configured. Illustratively, the business user may select the All box 932, the Washington State (WA) box 934, the Missouri State (MO) box 936, or the Nationwide box 938. Accordingly, the business user may specify that a project to be defined or a product/offering to be defined has a particular geographical or legal jurisdiction associated with the project or product/offering.

The product development portal 902 may further include a My Links window 940. The My Links window 940 may include additional links to websites and user interfaces. Illustratively, as depicted in FIG. 9, the My Links window 940 includes five links 942. The five links 942 may include a first link to "Inside.Seco.com," a second link to "SecoNow," a third link to "SecoNow.com," a fourth link to "Seco.com," and a fifth link to "ISO."

A business user may add or delete links shown in the My Links window 940 based upon a particular customer or client need. The product development portal 902 may further include a My Model Executions window 950. The My Model executions window 950 may monitor the execution of models of insurance products or offerings in the ICC real time environment. In addition, the My Model Executions window 950 may allow a business user to gain access to the results of the analysis. Accordingly, the business user of the product development portal 902 may submit various product configurations for analysis based upon a selected data set and view the results of the analysis.

As depicted in FIG. 9, My Model Executions window 950 includes a model execution name 952, a submitted by parameter 954, a requested by parameter 956, a data set parameter 958, and a status parameter 960. In addition, upon completion of the execution of a model using the book of business impact modeling test environment 640, results may be viewed by selection of a few results link 962. In addition, the business user of the product development portal 902 may schedule the execution of a model for a particular product by selection of the Schedule Model Executions link 964.

The My Model Executions window 950 may permit a business user to interactively request execution of a particular product model based upon a particular data set. The business user may then request and view the results of the model execution to identify business-related issues or opportunities.

As an example, the My Model Executions window 950 includes a first model execution name listed as "BOP WA Rev1 Exec1" that is associated with a first data set entitled "Washington BOP.dat." A second model execution name parameter 952 is listed as "BOP WA Rev1 Exec2" having an associated data set "Washington BOP2.dat." In addition, the status parameter 960 provides the business user of the product development portal 902 information regarding whether the execution of a model is completed, still running, pending, or failed.

In FIG. 10, an example user interface 112 includes a second add new project user interface 1000. The new project interface 1000 may include data entry fields for a project ID 1010, a project name 1012, a cross-reference ID 1014, a state/jurisdiction name 1016, a description of the project 1018, an effective date for the project 1022, a project owner assignment 1020, a project start date 1023, and additional notes 1024. After the business user of the second add new project user interface 1000 has added the appropriate information to the data entry fields, a new project is created by selection of the "Create Project" button 1030.

Figure 11:
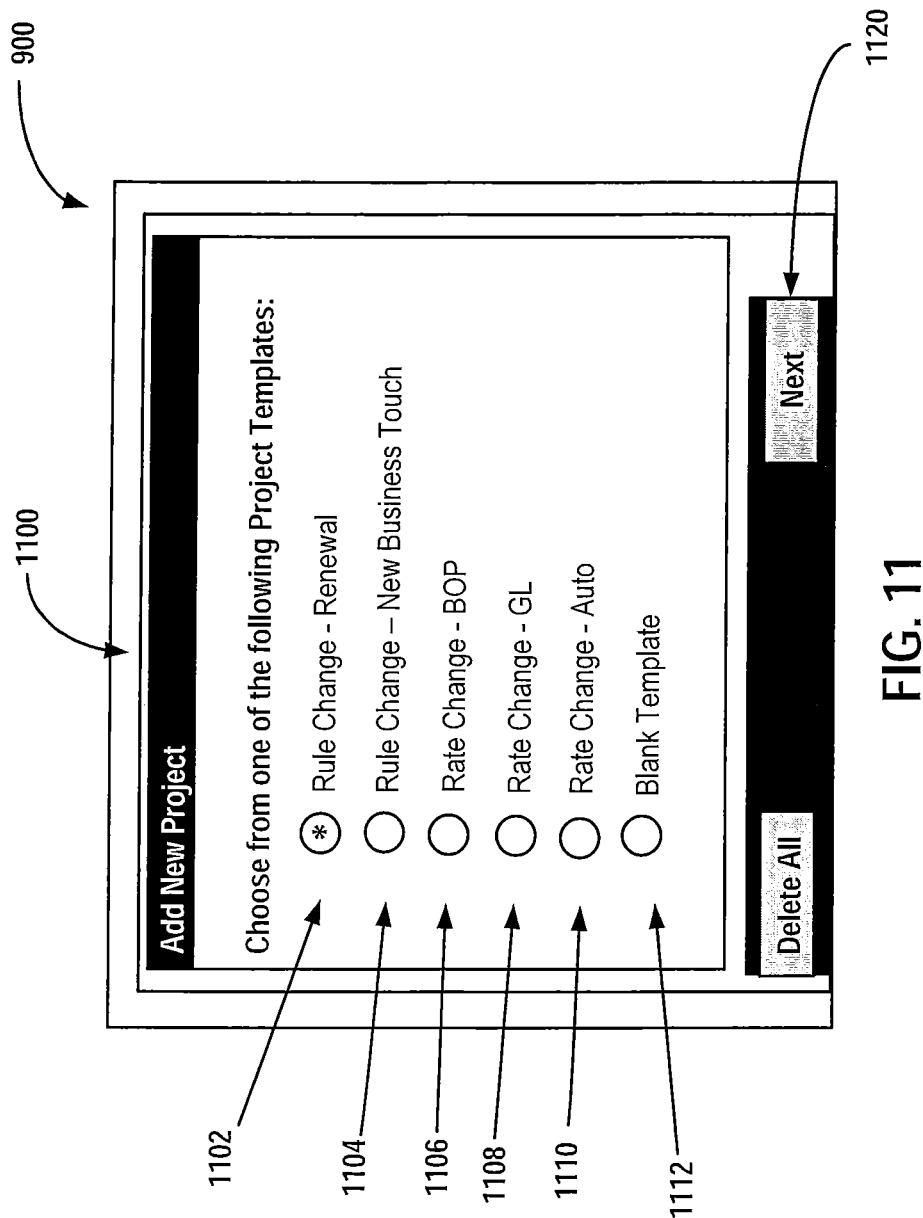
FIG. 11 depicts a second user interface for adding a new project with the Insurance Configuration Facility (ICE) of FIG. 9.

In FIG. 11, an example user interface window 112 includes an Add New Project user interface 1100 generated by servers 130 in response to selection of the Create New Project link 916. The user portal 110 cooperates with the servers 130 to display the Add New Project user interface 1100 and receive business user inputs for controlling the building of an insurance product offering.

The Add New Project user interface 1100 may include a listing of project templates 1110. The project templates 1102-1112 may allow a business user to select an insurance product template for a new project. Illustratively, the Add New Project user interface 1100 may list project templates 1102-1112 that include: a "Rule Change-Renewal" template 1102, a "Rule Change-New Business Touch" template 1104, a "Rate Change-BOP" template 1106, a "Rate Change-GL" template 1108, a "Rate Change-Auto" 1110, or a "Blank Template" 1112. In one example, the business user selects the desired template by highlighting a corresponding radio selection button and selecting a Next button 1120. In other examples, any other selection mechanism(s) may be used.

Upon selection of the Next button 1120 of the Add New Project user interface 1100, the user portal 110 may request that the servers 130 create a corresponding new project based upon the selected template. The servers 130 provides the user portal 110 with a second Add New Project user interface 1100 that enables specific designations related to the new project.

In FIG. 12, an example user interface 112 including an offer builder user interface 1200. The offer builder user interface 1200 may display a hierarchical relationship of insurance product components and insurance product development lifecycle status information for a new insurance product offering. As an example, the lifecycle status information may indicate that an insurance product component, template, or product has at least one status of under development, newly created, being tested, ready for submission for regulatory submission, submitted for regulatory approval, approved for deployment in an insurance market, deployed in an insurance market, expired, or a combination thereof. In FIG. 12, the hierarchical relationship of insurance product components may display an insurance product component structure or insurance product framework 1210. The insurance product framework 1210 may alternatively be described as an insurance product offering framework 1210. An example of an insurance product offering may include nodes and branches arranged to form an insurance product framework 1210. An example, depicted in FIG. 14, insurance product offering 1404, named BOP Composite WA, may include an insurance product offering structure 1406. The insurance product framework may also be depicted as a product tree 1440. The insurance product offering structure may include a root node to which hierarchically arranged branches are attached.

The insurance product structure or insurance product framework 1210 may include hierarchically arranged or predetermined relationships. The framework of insurance product components may describe or specify some portion of an insurance product/offering or line of business. The offer builder user interface 1200 may display published status information 1212. The published status information 1212 may indicate that the insurance product component is either published or not published.

The offer builder user interface 1200 may further include an actions selection interface 1214. The actions selection interface 1214 may permit a business user to indicate the action to be taken regarding an insurance product offering including in the insurance product offering being created.

The insurance product component structure or insurance product framework 1210 may include different types of insurance product components. As an example, the insurance product component structure or framework 1210 depicted in offer builder user interface 1200 may include an offering 1220, a product 1222, a first line of business 1224, a coverage 1226, a first sub coverage 1228 and a second sub coverage 1230, and a second line of business 1232. The offer builder user interface 1200 may include a 'Continue' control button 1216 to continue to the logical step in the process.

Each of the insurance product components may be hierarchically linked to a node on the insurance product component product structure or framework based upon tier parameters. The tier parameters may include classification information stored as tier classification parameters. The tier parameters may specify valid or compatible component locations within the insurance product component framework. The component may be attached to the insurance product component framework in a compatible tier. Locations of potential points of attachment may be identified and provide a location for placement of nodes to which the insurance product component may be attached. The location of a node used to attach an insurance product component may be verified by the servers 130 prior to attachment or addition of the insurance product component to the insurance product component structure. In some examples, the node may include properties, assigned by the servers 130, which reflect the tier to which the node belongs. The servers 130 may determine whether the insurance product component is compatible with a desired position in the insurance product configuration component based upon the tier classification parameter(s) of the insurance product component.

An example hierarchically linked set of insurance product components may include or be arranged in a plurality of tiers. The hierarchically linked set of insurance product components may also be arranged in a tree-like structure or framework. In the tree-like framework, the insurance product components may be linked to the main body of the insurance product offering as branches. Based upon the tier parameters of the insurance product components, additional insurance product components may be added as a sub-branches. The tier relationships and tier parameters, which may include the tier classification parameters, may be based upon the component type relationship table of each of the insurance product components in the insurance product offering.

In FIG. 13, an example user interface 112 includes a new offering summary user interface 1300. The new offering summary user interface 1300 is generated by servers 130 to provide the business user with information regarding a new insurance product offering that is being created. The data fields may be pre-populated based upon the manner in which the new offering is created. In some examples, the new offering summary user interface 1300 may receive data to be applied to a new insurance product offering being generated.

The new offering summary user interface 1300 may include data fields 1310. The data fields 1310 may include an offering name field 1320, a short name field 1322, an identifier (ID) field 1324, a version number 1326, a description field 1328, an author field 1330, a location field 1332, a published field 1334, a published data field 1336, a status field 1338, a state listing selection 1340, a last modified by field 1342, a last modified date field 1344, a system effective date field 1346, a system expiration date field 1348, a destruction date field 1350, and a notes field 1352.

The offering name field 1320 may include the name of an insurance product offering. The short name field 1322 may include a shortened name of the insurance product offering identified in the offering name field 1320. The identifier field may include a numeric or alpha numeric identifier of the insurance product offering being created. The version number 1326 may include specification of a version of the insurance product offering being created. The description field 1328 may include a description of the insurance product offering being created. The location field 1332 may include the category location or database location into which the insurance product offering is to be stored upon creation. The published field 1334 may include a publication status of the insurance product offering. As an example, the publication status may include unpublished or published. A published data field 1336 may include information related to the publication status of the insurance product offering. The published data field 1336 may include information related to the publication date, name of the publisher, and revision information. The status field 1338 may include insurance product offering status.

As an example, also discussed above, the status field may include various predetermined status selections. An example of the possible predetermined status selections may include New, Draft, Pending, Approved, Production, Archived, or Expired. The status field may be set to "New" for a newly created insurance product component or offering. The status field may be set to "Draft" for an insurance product component or offering ready for editing. The status field may be set to "Pending" for an insurance product component or offering submitted for approval to a regulatory agency. The status field may be set to "Approved" for an insurance product component approved for production use by a regulatory agency. The status field may be set to "Production" for an insurance product component placed into production. The status field may be set to "Archived" for an insurance product component or offering removed from production and placed into an archive. The status field may be set to "Expired" for an insurance product component or offering that may no longer be used in a product environment due to regulatory or commercial considerations.

The state listing selection 1340 may include a list of governmental jurisdictions, such as States of the United States, into which the insurance product offering may be deployed or used. The last modified by field 1342 may include an individual or group identifier of the person or organization that last modified the insurance product offering. The last modified date field 1344 may include a date on which the insurance product offering was created or last modified. The system effective date field 1346 may specify the date on which the insurance product offering is available for use in the production system. The system expiration date field 1348 may specify the date on which the insurance product offering is no longer available for use in the production system. The destruction date field 1350 may specify the date on which the insurance product offering has been permanently removed from the system. The notes field 1352 permits the addition of other information regarding the development of the insurance product offering. While the parameters of the data fields 1310 are described with respect to an insurance product offering, similar data fields and parameters may be used to identify and describe insurance product templates and insurance product component.

The locations field 1332 permits the business user to designate where in the databases 131 the new product offering is to be stored. For example, the location field may permit a business user to create a new product in the product repository 1810. In some examples, the locations field may include a list of component categories in which a business user may create a new product offering, insurance product component, or insurance product template. The list of component categories may be upon the system user rights assigned to the business user or a user profile. The new offering summary user interface 1300 may include a 'Save and Continue' control button 1360 to save the information regarding the development of the insurance product offering structure and continue development.

Alternatively, the business user may create the new product offering as a project stored in association with a business user account. After creation, the business user may access the newly created insurance product offering via the insurance configuration facility 900. For example, the new insurance product offering may be a project or a product listed in either the My Projects window 912 or my products window 914. The location where a particular insurance product offering, insurance product component or template is located may be dependent upon the lifecycle status information associated with the insurance product offering, insurance product component or template, or a combination thereof. As an example, the lifecycle status information may indicate that an insurance product component, template, or product is stored in a particular location within the product database 140 and the library database 150.

Figure 17:
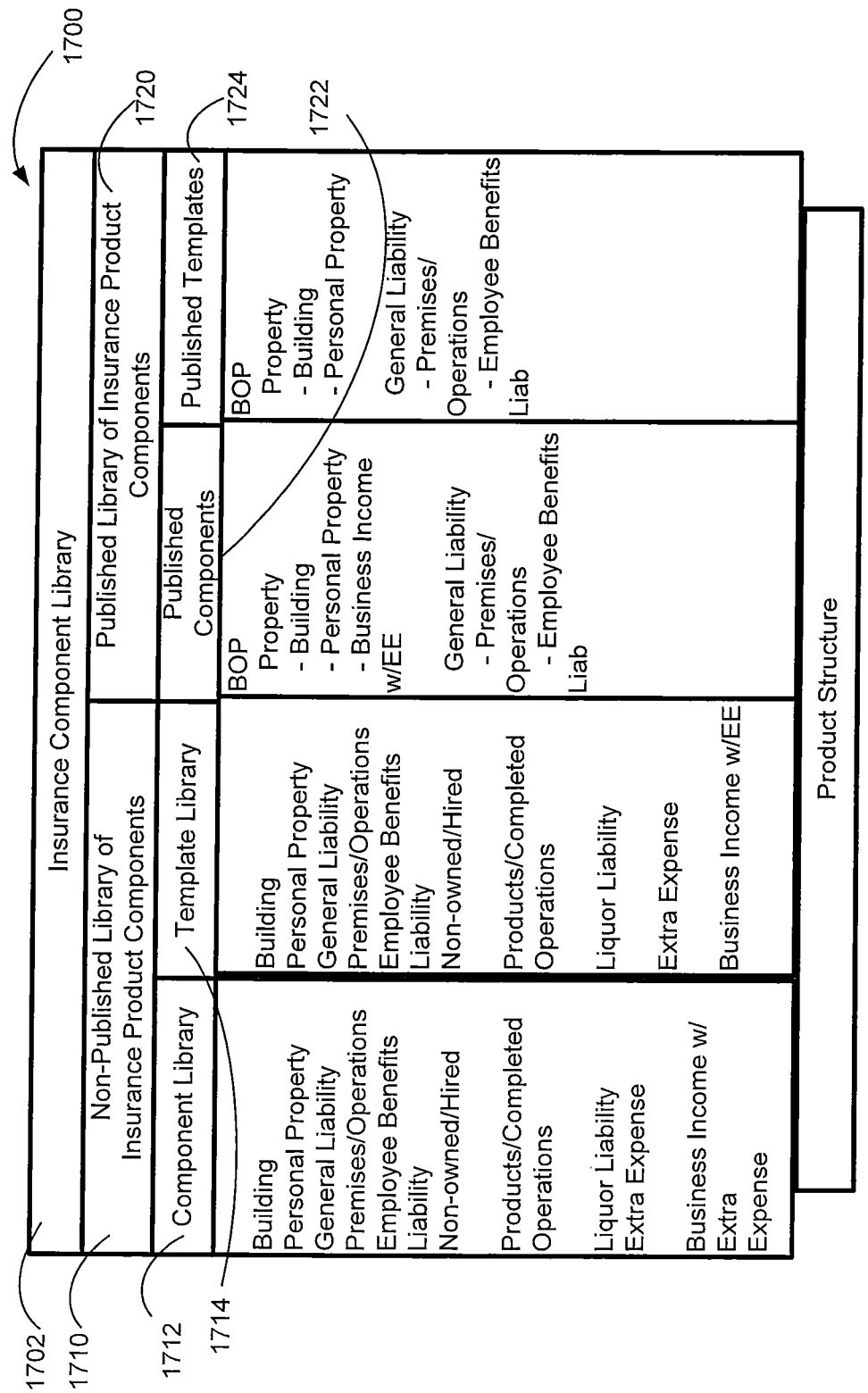
FIG. 17 depicts a library database for developing insurance products/offerings, insurance product templates, and/or components.
Figure 18:
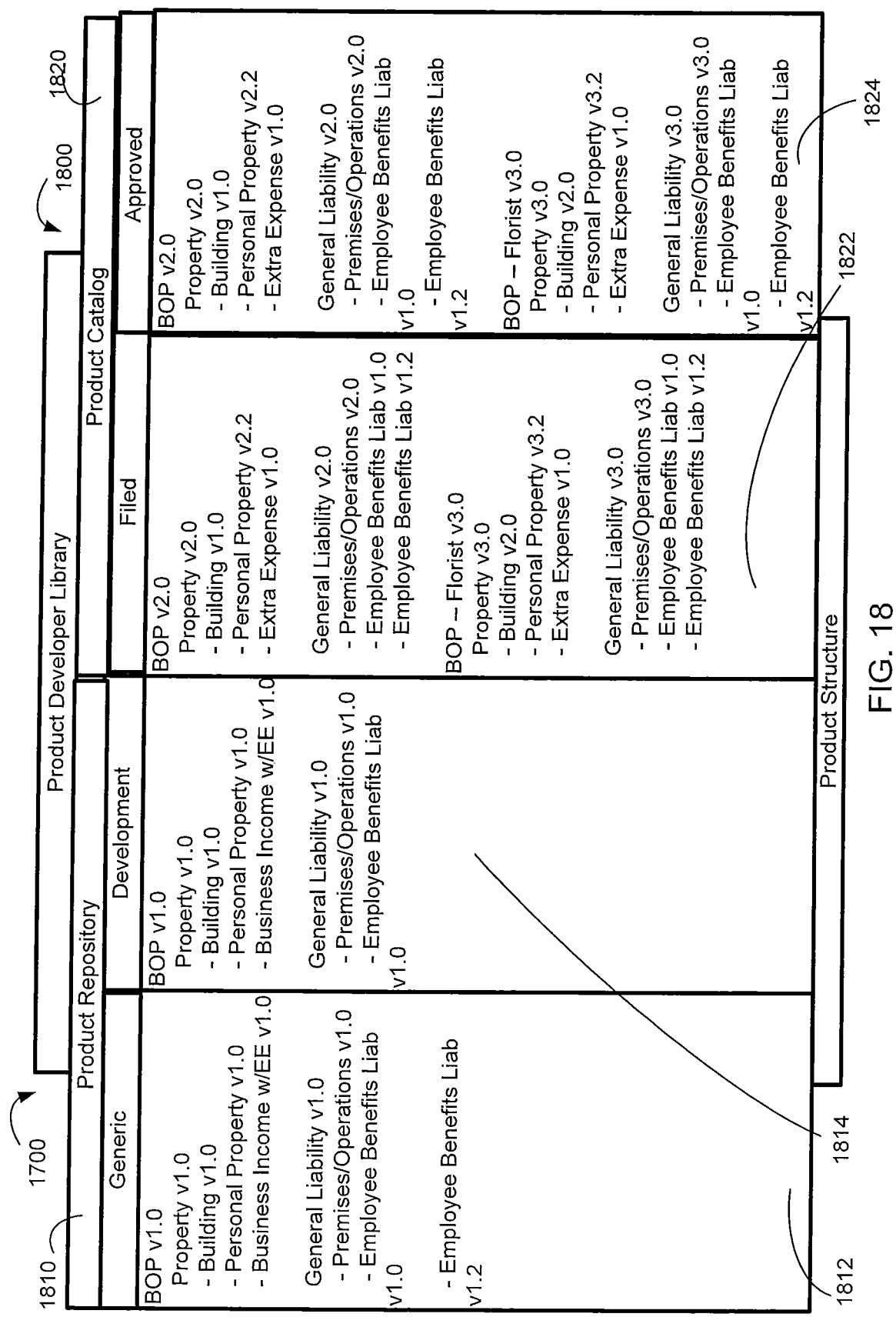
FIG. 18 depicts a library database for developing insurance products/offerings, insurance product templates, and/or components.

As an example, the lifecycle status information of the insurance product component, template, or product may indicate that insurance product component, template, or product is stored in the non-published library of insurance product components 1710, a published library of insurance product components 1720, insurance product repository 1810, and product catalog 1820, as depicted in FIGS. 17-18. Similarly, moving an insurance product component, template, or product offering from one location within location within the product database 140 and the library database 150 to another location within location within the product database 140 and the library database 150 may cause the servers 130 to update the lifecycle status information to reflect the new location.

Figure 14:
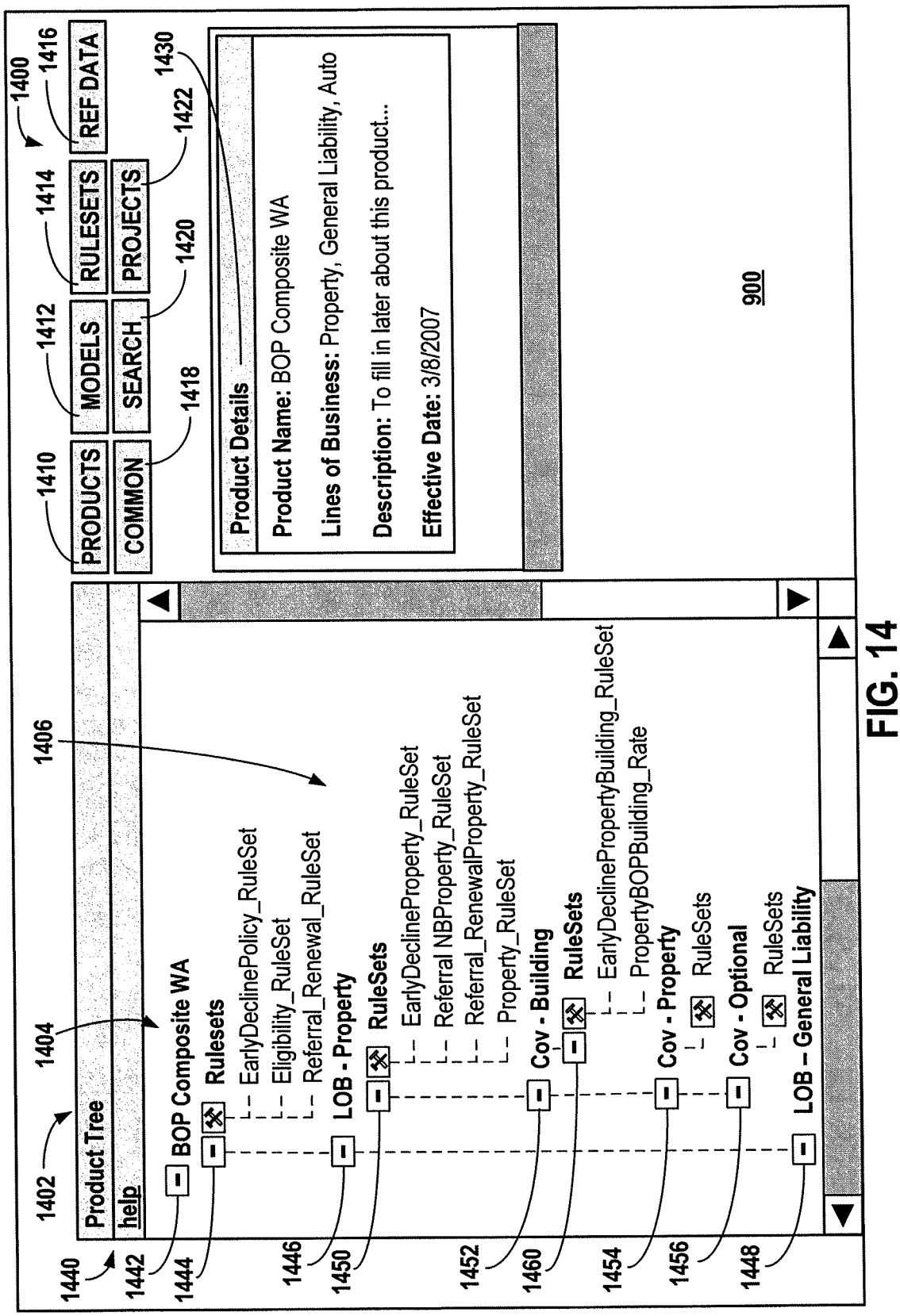
FIG. 14 depicts a user interface generated by an Insurance Configuration Facility (ICF) within the ICC system for displaying a product tree of an insurance product offering.

FIG. 14 depicts an Insurance Configuration Facility (ICF) 1400 that includes an example ICF user interface 1402. In other examples, other interfaces with different configurations may be used to implement the functionality described. The ICF user interface 1402 may include various menu options such as PRODUCTS 1410, MODELS 1412, RULES 1414, REF DATA 1416, COMMON 1418, SEARCH 1420, and PROJECTS 1422.

As depicted in FIG. 14, with continuing reference to FIGS. 1-13, the ICF user interface 1402 may further include a display of an insurance product offering 1404 arranged to depict the insurance product offering structure 1406 as a product tree 1440 for a particular selected product being developed. The insurance product offering structure or product tree 1440 may include a hierarchical view of insurance product components including insurance product offerings, lines of businesses associated with insurance products, components and rules of a particular insurance product.

In response to selection of the models 1412 menu option, the insurance configuration facility 1440 may navigate the user to a separate user interface to view and edit the "Models" associated with the insurance product offering being viewed. In this sense, a "Model" is a record of the outcomes on the insurance company's business related to the specific insurance product offering. In response to selection of the resets 1414 menu option, the insurance configuration facility 1440 may display rule sets that may be applied to the insurance product offering or insurance product component under development.

In response to selection of the search 1420 option, the servers 130 may generate or provide a search user interface for display on user interface 112. An example search user interface may include a search tool 2600, as depicted in FIGS. 26A and 26B.

In addition, the product tree 1440, named BOP Composite 1440, may display the hierarchical nature of various templates selected as branches to create new products. For example, the product tree depicted in FIG. 14 includes a "BOP Composite WA," main branch or root branch for development of a product intended for distribution and sale in the state of Washington. The "BOP Composite WA" branch 1442 includes hierarchically linked secondary branches such as "Rulesets" branch 1444, a "LOB (line of business) Property" branch 1446, and a "LOB (line of business) General Liability" branch 1448.

The Rulesets branch 1444 may include additional hierarchally linked rulesets in the form of one or more tertiary or third branches. The additional hierarchally linked rulesets may further include one or more fourth branches that delineate rules available to be applied in order to define the insurance product. As a non-limiting example, Rulesets branch 1444 may include the tertiary branch rule sets of an "EarlyDeclinePolicy_RuleSet," branch, an "Eligibility_RuleSet" branch and "Referral_Renewal_RuleSet" branch. Although not depicted, each rule set may further include sub-rule sets and sub-sub-rule sets to create as many hierarchical branches as needed to describe a product being developed. Additional rule sets may also be added.

The LOB Property branch 1446 further includes the hierarchical entries of a "Rulesets" branch 1450, "Coy-Building (coverage-building)" branch 1452, a "Coy-Property (coverage-property)" branch 1454, and a "Coy-Optional (coverage-optional)" branch 1456. The Rulesets branch 1450 may include rules that govern the overall line of business-property portion of an insurance product offering. Illustratively, Rulesets branch 1450 may include the additional rule set entries of an "EarlyDeclinePolicy_RuleSet," a "Referral_NBProperty_RuleSet," a "Referral_Renewal Policy_RuleSet," and a "Property_RuleSet."

By way of contrast, the "Coy-Building" branch 1452 may include an associated "Rulesets" branch 1460. The Rulesets branch 1460 may further include an "Early Decline Property Building_Ruleset" branch and a Property BOP Building_Rate_Ruleset" branch.

Accordingly, the Insurance Configuration Facility (ICF) 1400 may be accessed to develop an insurance product/offering composed of a hierarchical tree of insurance product components and rule sets. As depicted by the product tree 1440, the ICF 1400 permits the business user to establish various levels of granularity within an insurance product/offering or template. The degree of granularity, reflected by each subsequent branch of the tree, allows for further specification of the insurance product being developed. Accordingly, a product developer may selectively include assorted rule sets, for example, to develop a particular product/offering to meet the needs of an insurance business based upon the location/jurisdictional and commercial conditions in the marketplace.

As depicted in FIG. 14, the Insurance Configuration Facility (ICF) 1400 may include a Product Detail interface 1430 that specifies a "Product Name," "Lines of Business," "Description," and "Effective Date" of a product offering that is either being developed, tested, or deployed. The business user of the user portal 110 may undertake various actions to develop a product by a specification or selection of the features associated with the elements of the product development portal 902.

Illustratively, in response to selection of the Create New Project link 916, depicted in FIG. 9, the user portal 110 may request that the servers 130 provide the ICF user interface 1402 of the ICF 1400. The product detail window 1430 specifies that the product name associated with the displayed product tree is "BOP Composite WA," which is associated with the "BOP Composite WA" 1442. The "Line of Business" associated with the product name includes property, general liability and automotive, which corresponds to the various entries shown on product tree 1440. In addition, the product details interface 1430 displays a description to permit the business user the opportunity to describe a product as defined under the product tree 1440. In addition, the product details display 1430 may provide an effective date for the described product name.

Figure 15:
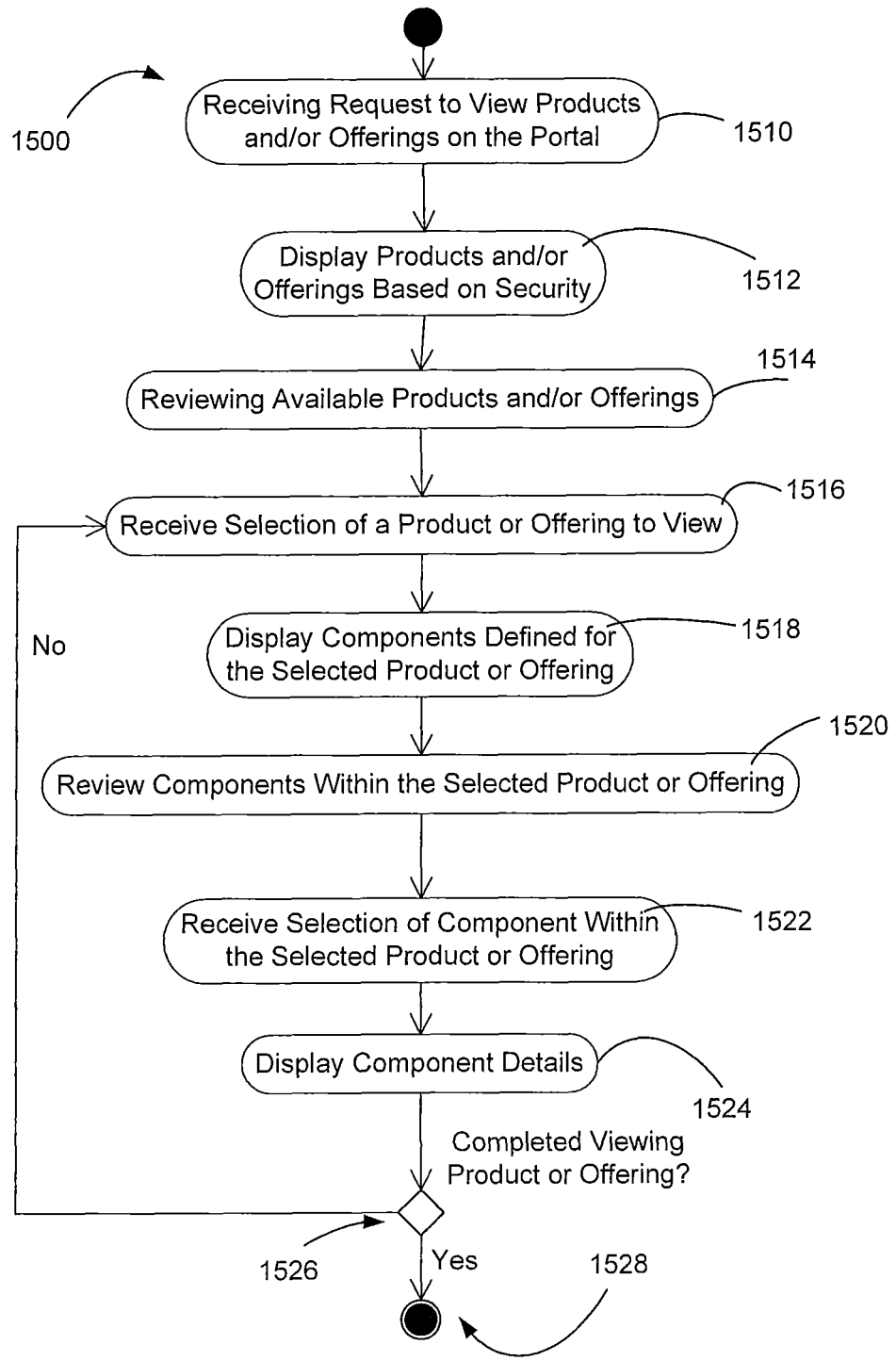
FIG. 15 depicts an operational flow diagram for product/offering development.

In FIG. 15, an example operation 1500 to generate insurance products or offerings. At act 1510 the business user may access or view existing insurance products and/or offerings through the user interface 112. The products and/or offerings may be displayed through the ICC configuration workstation front end 300 on user portal 110. The user portal 110 may include an interactive screen to receive a selection via a styles or pointing device. As an example, the user portal 110 may be a pocket PC or a tablet PC configured to receive an input via a touch screen graphical user interface. In addition, the user interface 112 may display a plurality of category locations in the databases 131 from which the business user may select a particular insurance product offering or template. While the description of the operations of system 10 may describe an insurance product offering or template, the operations of system 10 may apply to either insurance product offerings or templates. In addition, by extension, the operation may further apply to insurance product components.

At act 1512, to request to view or access a particular insurance product offering or template, the terminal or user portal 110 may send an insurance product offering request to the servers 130. As an example, in response to receipt of the user request, the terminal 112 may send a request to retrieve an existing insurance product offering. The insurance product offering request may include a selected category location in the databases 131. In response to selection of a category location that contains insurance product offerings, the user interface/front end 112 may receive a further input that specifies the selected insurance products offerings on the user portal 110. The request to view the selected insurance products may be sent via the communication network 120 to servers 130. Servers 130 receive the request and provide the information to the ICC core 310 modules resident on the servers 130.

Similarly, the business user may search for or select a product or component from the library, as later described with respect to search tool 2600. To search the library, in response to a request received via the user interface 112, the user portal 110 transmits a request to servers 130 to obtain a list of products and/or offerings for display on the user interface 112. Thereafter, the operation continues to act 1512.

At act 1512, the servers 130 may determine whether the business user is entitled to receive the requested information for the selected insurance product or offering. Servers 130 may access security management information associated with the ICC core 310 functionality and determine whether the business user is authorized to view the requested information. If the business user is unauthorized, the servers 130 return an indication to the user portal 110 that the business user is unauthorized to access the information. Based upon the received indication, the ICC configuration workstation front end 300 displays an indication on the user interface 112 that the business user is unauthorized to access the requested information from the library.

If the ICC core 310 determines the business user is authorized to receive the request insurance product information, the ICC core 310 further determines the location of the information related to the selected insurance product or offering. The servers 130 send a get or similar request to the product database 140 to request the product definition information related to the selected product or offering. In response to the request for the product definition information, the servers 130 may create a displayable graphical representation of the requested product or offering.

Servers 130 may parse the received product definition information to display a product tree 842. The product tree 842 displays a hierarchical view of the insurance product or offering and permits the business user to review the various insurance lines of business, insurance product components and rule sets associated with the selected product.

As an example, the servers 130 may generate the ICF user interface 1402, which includes a product tree 1440. The product tree may be organized based upon a governmental or regulatory jurisdiction. For example, the servers may group insurance product offerings based upon state line boundaries. The servers may further differentiate the group or insurance products based upon rulesets or lines of businesses.

Alternatively, the servers 130 may determine which, if any, insurance product definition information the business user is entitled to receive. In response to the request, the servers 130 may provide a list of offerings or products to the user portal 110 for display on the user interface 112. The system display list of products and/or offerings may be based on the security authorization of the business user of portal 110.

At act 1514, the user portal 110 displays the products and/or offerings available for the business user to review. In addition, the user interface 112 may provide the business user with potential inputs to select one or more products and/or offerings. As an example, as depicted in FIG. 18, the servers 130 may get a library of products or offerings from a product repository 1812 or product catalog 1770 stored on the product database 140. The servers 130 may provide the insurance product information stored in the product repository 1812 or product catalog 1770 to the user portal 110 for display upon the user interface/front end 112.

In another example, user interface 112 may display a list of insurance products associated with the business user. Depending upon the access rights assigned to a user, the user interface 112 displays a limited number of insurance products or offerings. At act 1514, the details of each displayed insurance product or offering may be obtained by highlighting the insurance product or offering with the cursor. For example, the business user may place a mouse cursor over the desired product and actuate one of the mouse buttons to select a product.

In another example, as described later relative to FIG. 18, the servers 130 may get a library of products or offerings from a product repository 1812 or product catalog 1820 stored on the product database 140. The servers 130 may provide insurance product information stored in the product repository 1812 or product catalog 1820 to the user portal 110 for display upon the user interface/front end 112.

In another example, depicted in FIG. 9, the product development portal 900 may display a list of insurance products associated with the business user, as displayed in the My Products window 920. For example, the business user may place or move a mouse cursor over the desired product and select the product by actuating one of the mouse buttons to select a product displayed in the My Products view window 920.

At act 1516, the user portal 110 receives the business user selection of a product or offering to view. In response to receipt of the business user selection, the business user portal 110 transmits an insurance product offering request to servers 130. The insurance product offering request may include one or more of the offering name field 1320, the short name field 1322, the identifier (ID) field 1324, the version number 1326, and the selected category location from among the category locations, or a combination thereof. The business user interface 112 may display components information that specifies the selected insurance product offering to servers 130.

The servers 130 may retrieve or get insurance product information stored in the product database 140 associated with the selected product or offering. Based upon the received insurance product information, the servers 130 may use the attributes or other information associated with the respective component type tables to determine the relationships between each of the insurance product components and to characterize or formulate the information for display. In addition, the servers 130 may access the product database 140 and the library database 150 to locate the information associated with the selected insurance product or offering.

In response to receipt of the information associated with the selected insurance product or offering, the servers 130 may execute the ICC core 310 modules to generate a user interface/front end 112 for display on the user portal 110. As an example, the ICC core 310 may create a web-based interface that includes embedded links to the information associated with the selected insurance product or offering. As another example, the ICC core 310 may configure the information related to the selected insurance product or offering for display on a graphical user interface 112 resident on the user portal 110.

At act 1518, the user portal 110 receives display information for the components that specify the selected product or offering. As an example, the web-based user interface/front end 112 may display the components that specify the selected product or offering. The user interface 112 may display the insurance product components and the insurance product framework or structure. The insurance product framework may include nodes and branches that are interconnected to depict relationships and dependencies. As an example, the user interface may generate a hierarchical view or product tree view of the selected insurance product or offering.

At act 1520, the user interface 112 may display the selected product or offering to permit the business user to review the components. The web-based user interface/front end 112 may be configured to receive a selection of one of the components or templates within the product offering. The user interface 112 may display the product offering as a hierarchical view including templates and components that may be expanded or collapsed. The user interface/front end 112 may allow a business user to push into the various levels of the hierarchical view of the insurance products, lines of businesses associated with insurance products, components and rules of a particular insurance product. Alternatively, the user interface/front end 112 may allow a business user to collapse the hierarchical view of the selected insurance product or offering.

In addition, the business user may view product details through the ICC configuration workstation front end 300 displayed on user interface 112. As an example, the business user may also select the menu options that permit viewing of models of an insurance product component, different rules that can be applied to the insurance product component, and reference data for a model of the insurance product component. The ICC configuration workstation front end 300 may further permit a business user to push or drill down into the characteristics of the selected insurance product or offering.

As part of the review process, at 1520, the business user may highlight a particular component of interest to be selected for the addition of a definition, refinement, addition, or deletion. As an example, the user interface 112 may permit the business user to view product details in the product details window 1430, as depicted in FIG. 14. As an example, the business user may also select the other menu options, such as models 1412, rules 1414 and ref data 1416, to further review the characteristics of the selected insurance product or offering. The user interface 112 may receive a user input to highlight a particular component of interest to be selected for the addition of a definition, refinement, or deletion. Thereafter, the operation 1500 continues to act 1522.

At act 1522, the user interface 112 may receive a selection of a component within the selected product or offering. Upon receipt of the user selection of the component, the user portal may send a request for component information related to the selected component through the network 180 to servers 130.

In response to the request for information related to the select component, the ICC core 310 resident on the servers 130 may retrieve the component information related to the selected component from the product database 140 or library database 150. Upon retrieval of the component information, the servers 130 may characterize or formulate the component information for display on the user interface/front end 112 of user portal 110.

Thereafter, the servers 130 send the component information to be displayed to the user portal 110 and update the user interface 112 accordingly. Thereafter operation continues to act 1524 and displays component details.

If the previously received information already includes specific details of the selected component, at act 1524 the user interface 112 displays the component details. However, if necessary, the user portal 110 requests servers 130 to provide the additional component detail from either the library databases 140 or the product databases 150. Upon receipt of the additional component details from servers 130, the user portal 110 displays the component details through the user interface 112.

At act 1526, the operation determines whether the business user desires to view other products or offerings. The business user may review an additional product, offering, or components within a product or offering. If the business user selects to leave the viewing of products or offerings, the operation 1500 proceeds to exit 1528. Otherwise, the operation 1500 returns to act 1516.

Figure 16A:
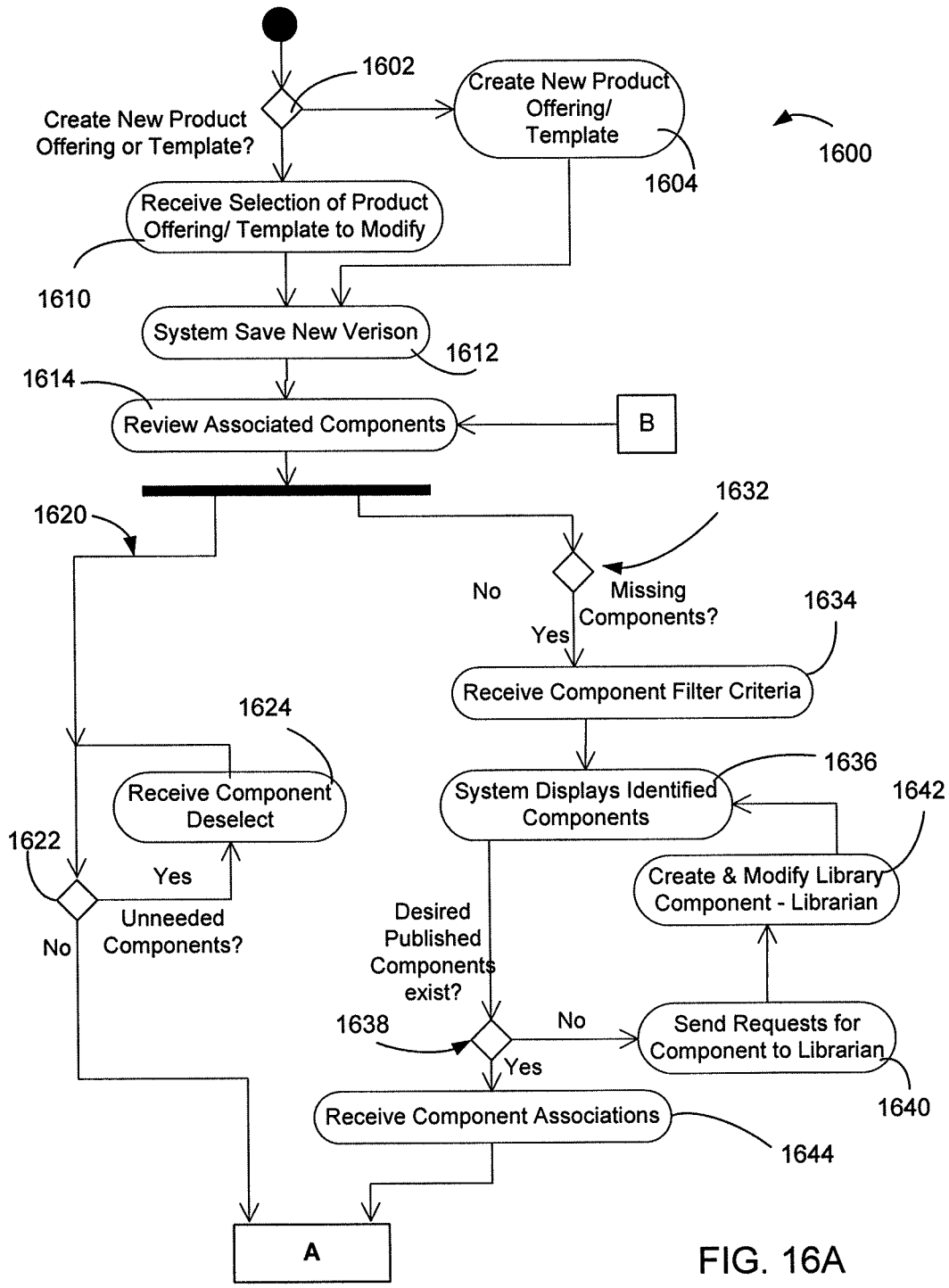
FIGS. 16A and 16B depict an operational flow diagram for creating or modifying one of a product or offering.
Figure 16B:
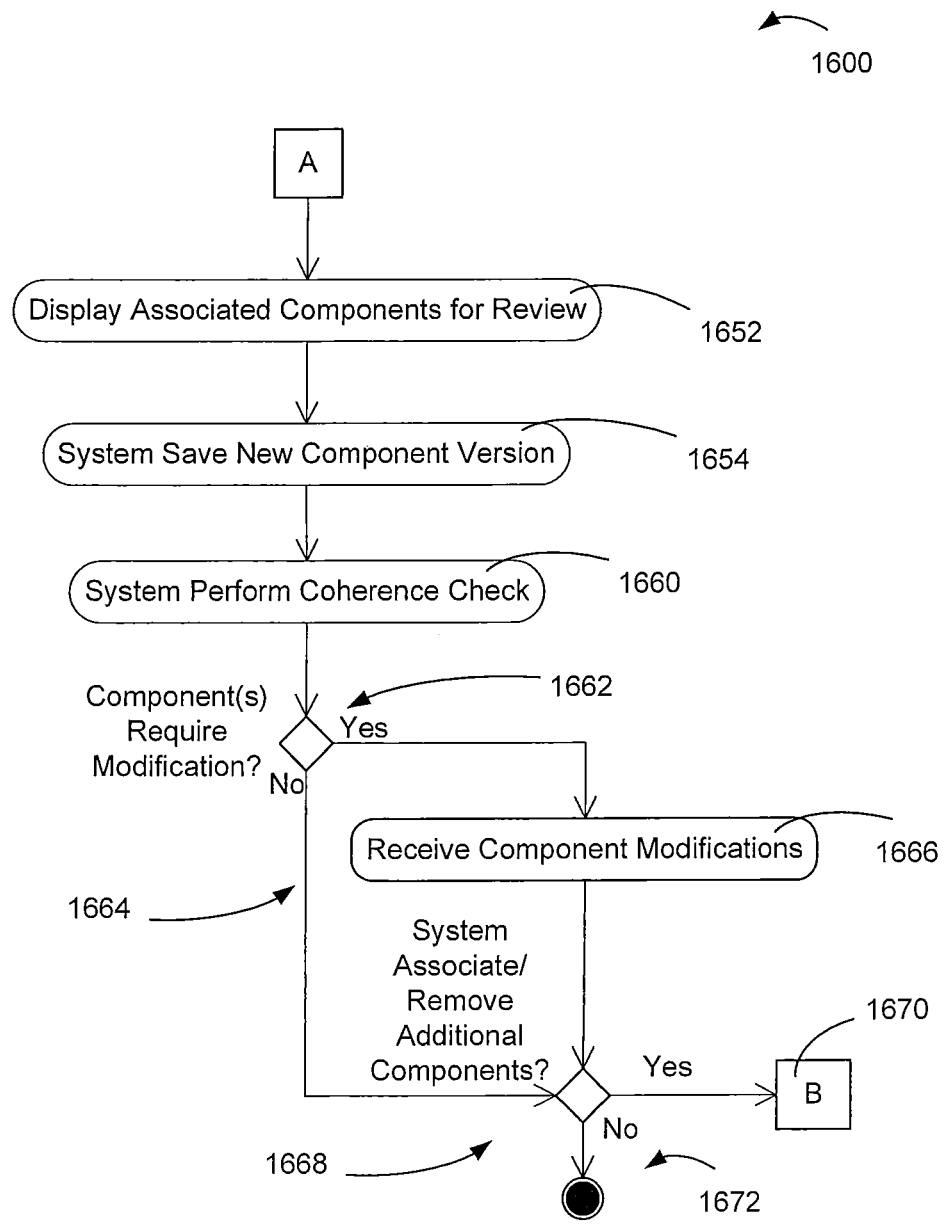

In FIGS. 16A and 16B, an example of a product/offering developer operation 1600 for modifying library components that may be used to create an insurance product offering or template is discussed with reference to FIGS. 1-15.

As an example, the servers 130 may interact with the terminal 110 to generate a user interface 112 to permit a business user to create a new product offering or template. At act 1602, the user interface 112 may receive a user interface input selecting to create a new insurance product offering or insurance product offering template base upon an existing insurance product offering or template. The user interface 112 may also receive an indication to create a new insurance product offering or template that previously did not exist, which may be referred to as a blank sheet offering. As an example, in response to receipt of a create new insurance product offering indication, the terminal 110 may send an insurance product offering request to the servers 130. The insurance product offering request may include a selected category location from among the category locations in the databases 131. Thereafter, the operation 1600 may proceed to act 1604. Otherwise, the operation 1600 may proceed to act 1610.

At act 1604, in response to receipt of the insurance product offering request from the terminal 110, the servers 130 may generate an insurance product offering in the selected category location. In addition, newly created in insurance product offering may include one or more insurance product components associated within an insurance product framework. Through user interface 112, at act 1610, the business user may select a product or an offering to be developed. As an example, the business user may select an insurance line of business, an insurance product, a line of business, a coverage, or a sub-coverage from the hierarchical tree structure of the insurance product template 831. Alternatively, the business user may select to create a new insurance product offering by selection of a create new version or create like function.

Figure 20A:
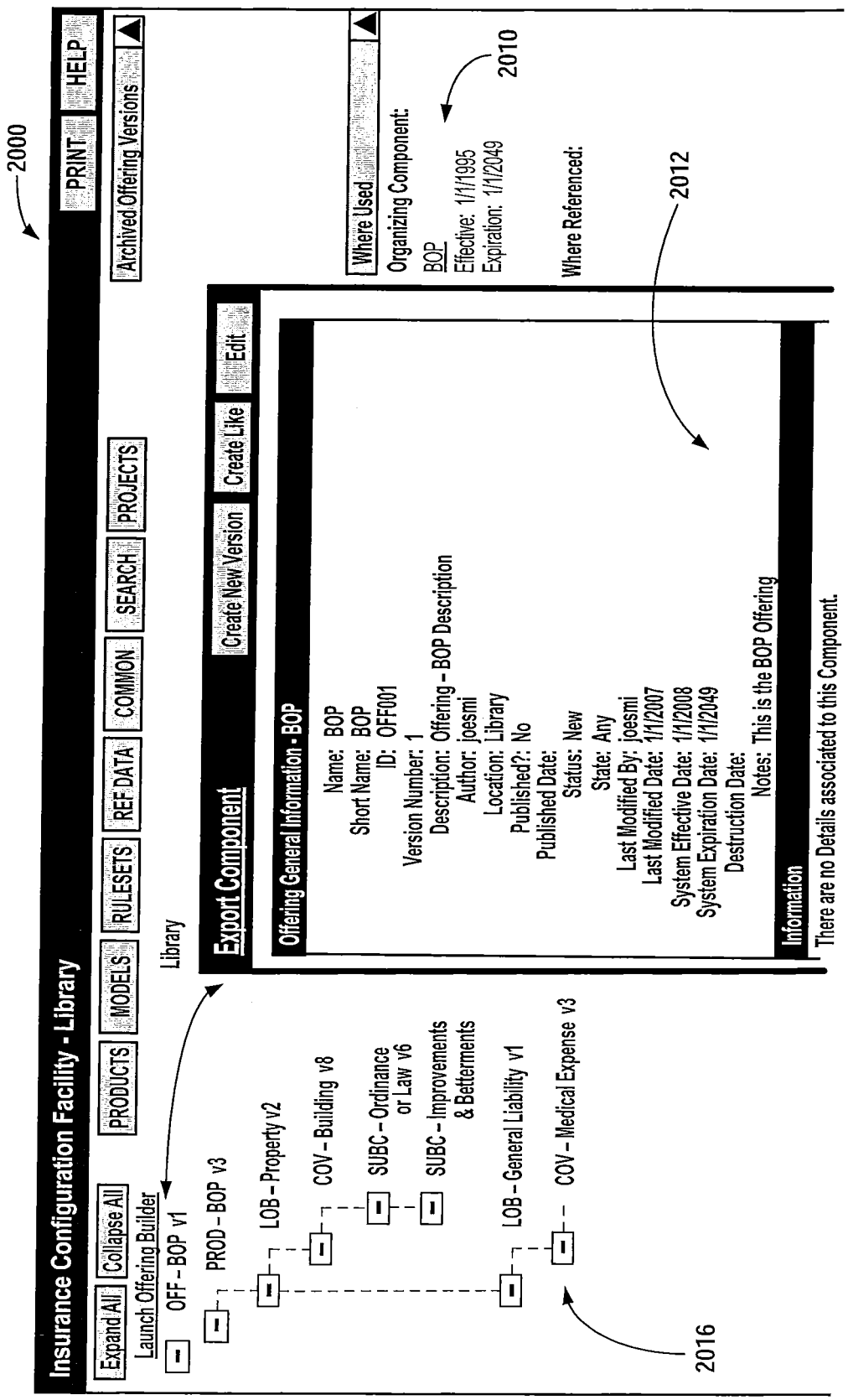

As an example, depicted in FIGS. 20A and 20B, in response to selection of the "Offering General Information—BOP," from the library tree 2020, the user portal 110 may request that the servers 130 retrieve information related to the "Offering General Information—BOP." The servers 130 access at least one of the library database 150 or product database 140 to retrieve information related to the selected offering.

Referring again to FIGS. 16A and 16B, in response to selection of an insurance product offering, template, or component the terminal 110 may generate an insurance product offering selection, which is sent to the servers 130. The insurance product offering selection may include one or more of the offering name field 1320, the short name field 1322, the identifier (ID) field 1324, the version number 1326, and the selected category location.

The servers 130 may access at least one of the library database 150 or product database 140 to retrieve information related to the selected insurance product component. In response to receipt of the selected product or offering, the servers 130 may retrieve or send the information to the user portal 110 for display in the user interface/front end 112, and the operation proceeds to act 1612.

At act 1612, the business user may save the selected product offering as a new version to the library database 150. As an example, depicted in FIGS. 20A and 20B, a business user may select "Create New Version," "Create Like," or "Edit." As an example, in response to a business user selection to create new version of the insurance product offering or template, the terminal 112 may send a create new version indication to the servers 130. In response to receipt of the create new version indication, the servers 130 may create a new version of the insurance product offering. As another example, in response to a user selection of a create like function, the terminal 112 may send a create like indication to the servers 130. In response to receipt of the create like indication, the servers 130 may create new insurance product offering or template.

In response to the selection, the servers 130 may save the selected product or offering in product library database 150 as a new version with a new version number. In the case where the business user selects "Create New Version," the server may create a new version of the product offering and stores the new version in the library database 150. Alternatively, in the case where the business user selected "Create Like" option, the servers 130 may create a new insurance product offering, component, or template by copying the contents of an existing insurance product offering, component, or template into the library database 150. The user interface 112 may receive user instructions to expand or collapse the hierarchical view of the library, insurance product components within the library, or new version of the product.

At act 1614, the business user may review the components associated with the product or offering to be modified. The user interface 112 may display information related to the new version of the offering. The user interface 112 may display a viewable products window. The viewable products window may include hierarchically arranged insurance product framework that includes insurance product components. The insurance product components may be interconnected within the insurance product framework and structure to form tiers of insurance product components. The hierarchically viewable products window may display the name, description, business effective date, business expiration date, and action related to a particular insurance product or component.

Figure 19A:
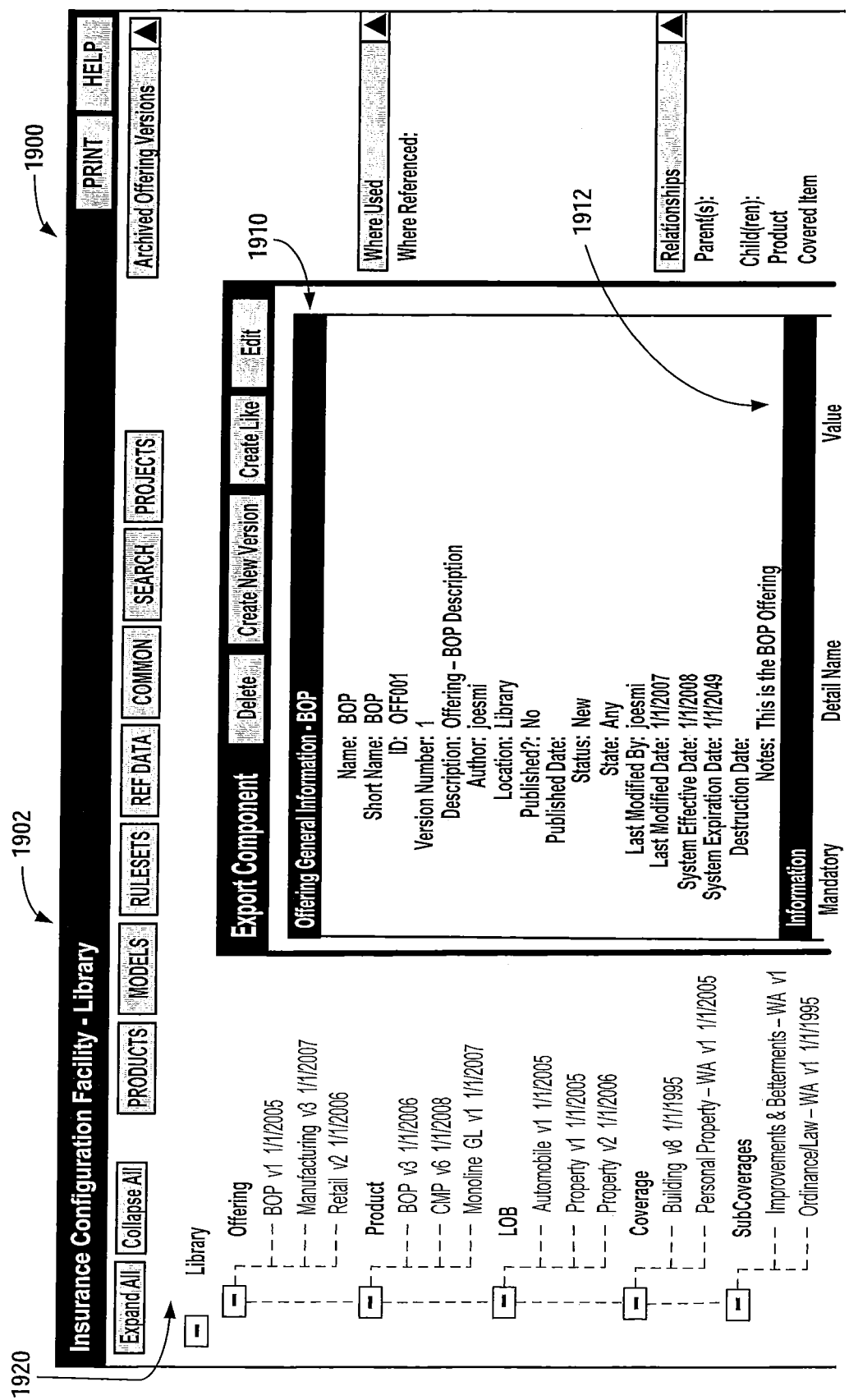
Figure 19B:
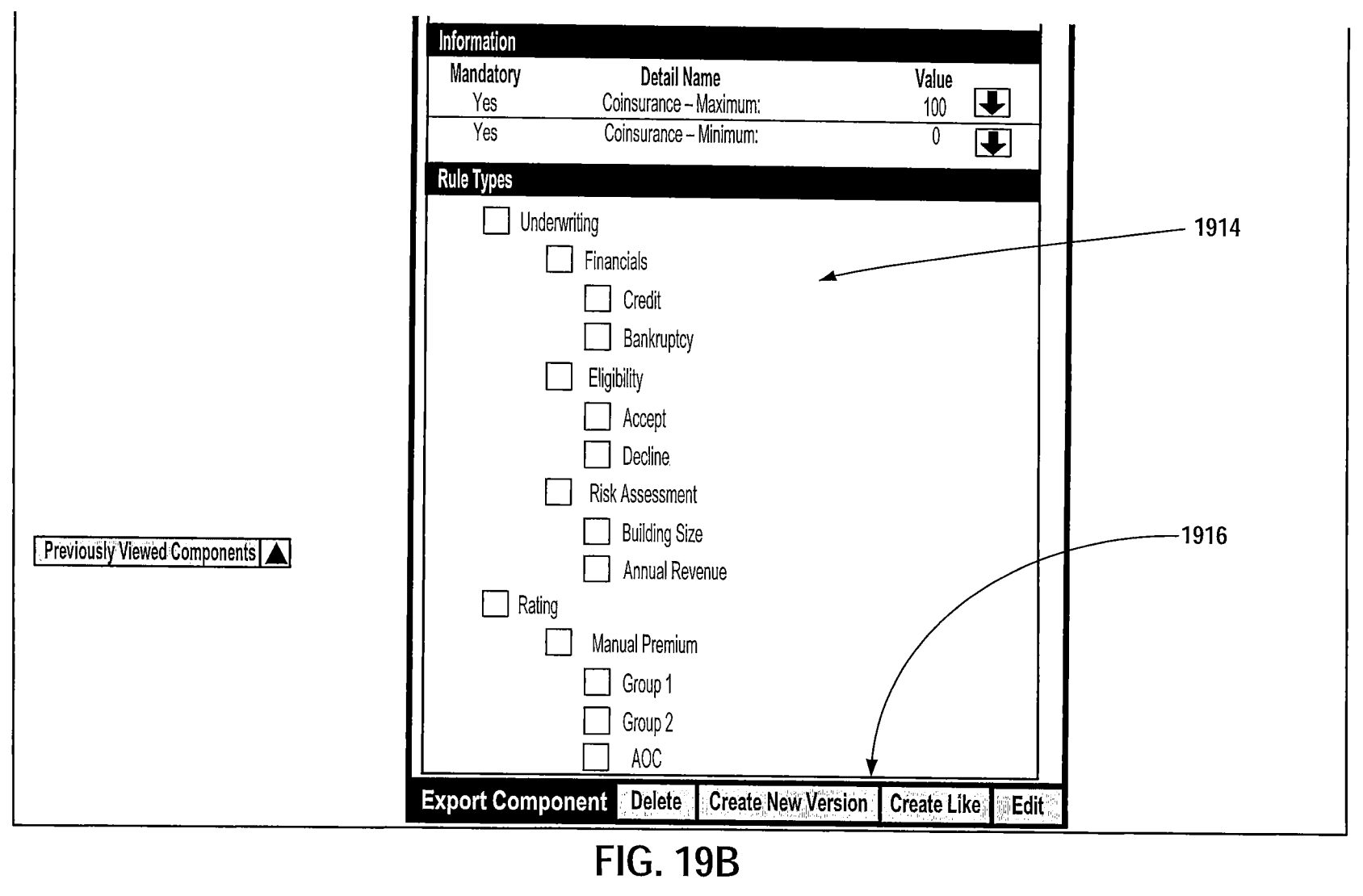

As an example, the servers may generate a user interface configured to display the components associated with the product or offering to be modified. One example of the user interface 112 may display information related to the new version of the offering in the "Offering General Information—BOP" window 1912, as depicted in FIGS. 19A and 19B. In addition or alternatively, the user interface 112 may display hierarchically viewable products window 1920. The hierarchically displayed insurance product may include the relationship between various insurance products, lines of businesses, coverages, and sub-coverages. The user interface may allow the business user to expand or collapse the hierarchical view of the insurance product being modified. The products window may display the name, description, business effective date, business expiration date, and action related to a particular product.

Following review of the components within the ICC design and configuration environment 230, the user interface may receive selections of different functions to create and/or modify insurance product components.

Referring to FIGS. 16A and 16B, the user interface may receive a first selection 1620 to permit deletion of undesired insurance product components. At act 1622, the business user may determine whether a particular component is unneeded for the modified product or offering. If there are no unneeded components, the operation may continue to act 1652. Otherwise, the operation proceeds to act 1624.

At act 1624, the user interface may receive deselections of components that are unneeded. The deselection process permits a business user to "prune" away undesired insurance product components. The deselection process continues until all the unneeded components are removed. After the undesired components of the product or offering are removed, the user interface 112 may receive an indication that the "pruning" process is completed. In response, the user portal 110 may provide an indication to the servers 130 that the product offering was modified and request that the updated offer information displayed. In response to the request for the updated offer information, the hierarchically viewable product window 1920 may be updated to remove the deselected components.

At act 1632, the business user may review the insurance product offering to determine whether there are any missing components. If there are no missing components, the operation proceeds to act 1652. In the event that there are missing components, the operation proceeds to act 1634. Otherwise, after the unnecessary components are removed, the operation proceeds to 1652.

At act 1634, the business user may access a search function in the ICC design and configuration environment 230. Filter criteria may be used to identify an insurance product component or an insurance product template that exists in the library databases 140. A search tool may be used to locate the desired insurance product component or insurance product template. As depicted in FIGS. 26A and 26B, an example search tool 2600 may include a search user interface 2610 and a search results user interface 2620. The search tool 2600 may permit the business user to select from a list of insurance product components to be retrieved from either the product database 140 or the library database 150. Alternatively, the business user may enter the name of a desired product or library component to be retrieved from the product database 140 or library database 150.

After providing the search criteria information, the business user may initiate the search function by actuating the search button 2618. The user portal 110 may communicate the search criteria information to servers 130. Servers 130 search the product database 140 or library database 150 to locate the insurance product components that correspond to the search criteria information.

The user portal 110 sends the search criteria information to servers 130. In response, servers 130 searches the product database 140 or library database 150 to locate potential insurance product components that correspond to the search criteria information.

After the servers 130 identified the desired insurance product components in either the product database 140 or the library database 150, the servers 130 provide the results of the search to the user portal 110 for display in a user interface 112. As an example, the servers 130 may generate a product search results window 2620, as depicted in FIG. 26B. Thereafter, the operation proceeds to act 1636.

At act 1636, the user portal 110 displays components that meet the filter criteria as specified at act 1634. The business user may select one of the insurance product components identified by the search. The identified insurance product component may be added to the product or offering. To add the selected insurance product offering, the terminal 110 may send an insurance product component selection of one of the insurance product components stored in the database to the servers 130. In response to receipt of the insurance product component selection for addition to the insurance product framework, the servers 130 may invoke a coherency validation function to determine whether addition of a selected insurance product component to the insurance product offering is permitted based upon a set of predetermined coherency rules. If the selected insurance product component complies with the predetermined coherency rules, the servers 130 may add the insurance product component to the insurance product framework. If the insurance product component fails to comply with the predetermined coherency rules, the servers 130 may reject the addition of the insurance product component to the insurance product framework. Alternatively, or in addition, the servers 130 may add the insurance product component to the insurance product framework and generate an error or warning message for display on the user interface 112 to indicate a coherency problem.

The servers 130 may further determine whether a published indicator attribute of the selected insurance product component is set to published or unpublished. If the selected insurance product component is unpublished, the servers 130 may reject addition of the unpublished insurance product component to the insurance product offering. Alternatively, or in addition, the servers 130 may generate an error message or warning message for display on the user interface 112. After adding the selected component, the operation proceeds to act 1638.

At act 1638, as an example, the user interface may allow a business user to provide an indication of whether the desired published component exists in either the product database 140 or the library database 150. If the desired published component does not exist, the operation proceeds to act 1640. Otherwise, if the desired components already exist in the product database 140 or the library databases, the operation proceeds to act 1644.

At act 1640 the business user may requests that a librarian or other qualified business user with oversight control of the library database 150 create and/or publish the desired component.

At act 1642, the librarian creates or modifies a library component to create a new insurance produce component, which may be stored in library database 150 as a newly created insurance product component. After the desired insurance product component is created or modified and stored in the library database 150, the business user is notified that the insurance product component is available. As an example, the newly created insurance product component may be viewed and accessed from the insurance product component library 1712, as depicted in FIG. 17. If the new insurance product component is an insurance product template, as depicted in FIG. 17, the newly created insurance product template may be viewed and accessed in the template library 1714. Thereafter, the operation 1600 may return to act 1636.

At act 1644, the user interface 112 may receive a component association to associate the desired component with the offer or product. As an example, depicted in FIGS. 23A, 23B, and 23C, the business user may associate the desired components with the selected product or offering to be modified. In response, ICC core 310 may associate the desired components with the selected product or offering to be modified. After associating the desired components to the other components within the selected product or offering to be modified, the operation continues to act 1652.

At act 1652, the user interface 112 may allow the business user to review the associated components. The user interface 112 may display insurance product component information associated with the desired insurance product component. The user interface 112 may display product offering general information. The user portal 110 may receive data through the user interface 112 to add details and additional information to the selected insurance product component. The business user may select rule type designations based upon predefined rule types. In addition, the rule types may include hierarchically arranged sub-rule types.

Figure 22A:
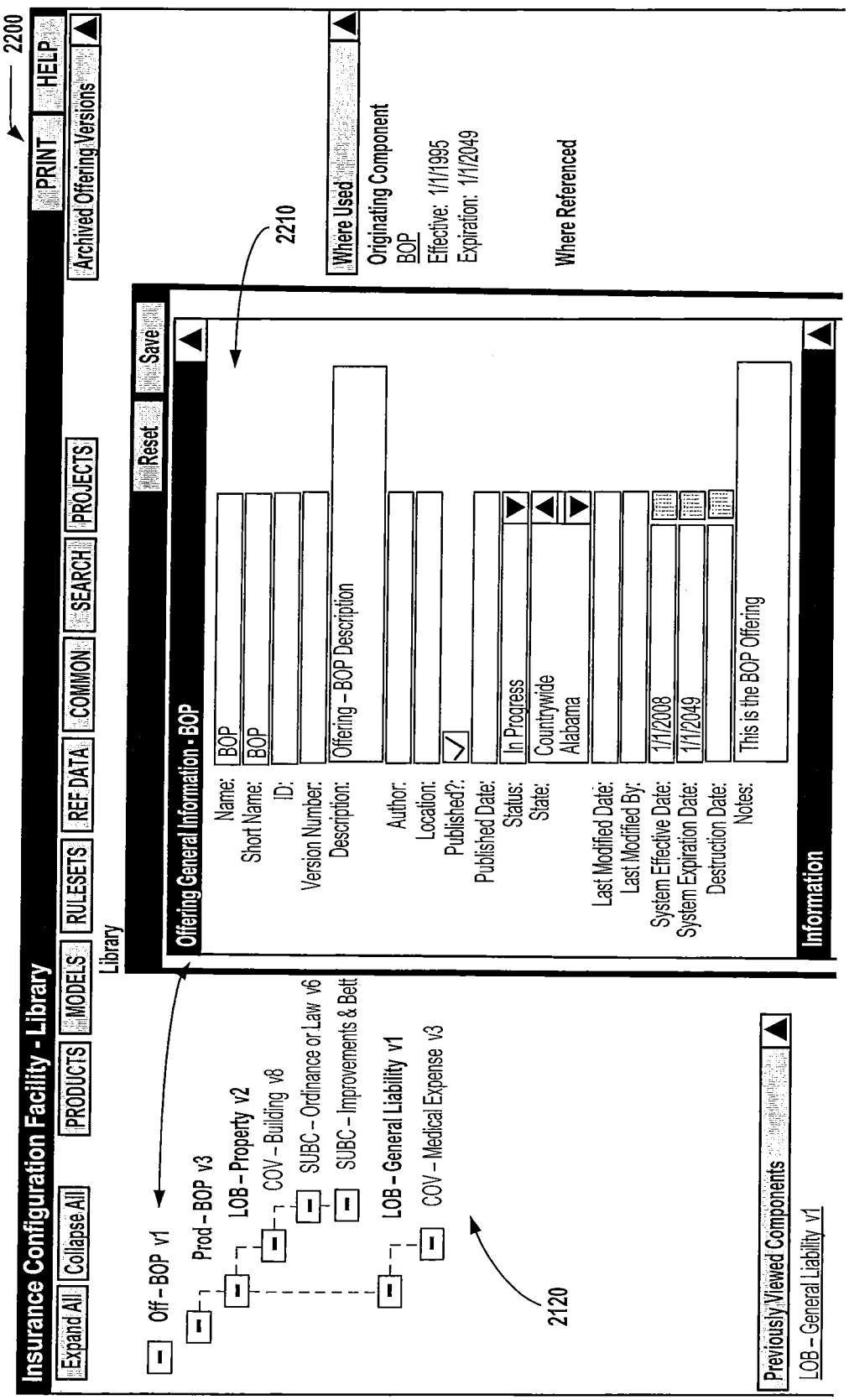

As an example, depicted in FIGS. 22A and 22B, the product offer data entry user interface 3000 includes a product offering general information window 2210 configured to receive data through the user interface 112. In addition, the product offer data entry user interface 2200 includes an "Add Details" link configured to allow a business user to create an additional information entry. As depicted in the rule types window 2212, the user portal 110 may receive rule type designations by selection of predefined rule types. Illustratively, the business user may assign rule types associated with an "Underwriting" selection or a "Ratings" selection. In addition, as depicted in the rule types window 2212, the rule types may include hierarchically arranged sub-rule types. For example, the "financials" rule type selection is subordinate to the "underwriting" rule type selection. Also, the "credit" and "bankruptcy" rule types selections are subordinate rule types of the "Financials" rule type.

The user interface 112 may provide information related to coverage information, sub-coverages, and covered items. The user interface 112 may also provide information related to coverage information, sub-coverages, and covered items. In response to a user interface generated indication to proceed, the operation may continue to act 1654.

At act 1654, the user interface 112 may prompt the business user to save the product or offering as a new version of the product or offering in the library database 150. After saving the new version of the product/offering or template in the library database 150, the operation may continue to act 1660.

At act 1660, the operation 1600 may initiate a coherency check to verify that the components of the insurance product/offering or template pass the coherency check. To perform the coherency check, the core ICC 310 extracts information stored in the tables associated with each component. The core ICC 310 analyzes the table entries to each respective component type versus the attributes and relationships. Thereafter, the operation 1600 continues to act 1662. In the event the coherency check fails, the user interface provides an indication to the business user that there is a coherency check failure and identifies potential sources of the error to be corrected. For both insurance product offerings and insurance product components, the system performs several types of coherence checks at this point: 1) that the component being saved does not already exist on the product at the same level at which it is being saved; and 2) that the component has all required parameters.

At act 1662, the user interface 112 may receive a selection to permit the business user to modify the associated components to address errors or issues raised by the coherency check. The user interface 112 may also permit modification of the insurance product/offering or template to address other product/offering development reasons. If the components used in the modified product or offering require modification, the operation continues to act 1666. Otherwise, if the components do not require modification 1064, the operation 1600 proceeds to a decision tree 1668.

At act 1666, the business user may modify a selected component. The business user may select various attributes to be modified. The user interface 112 may receive information to be entered into attribute fields displayed on the user interface 112.

Figure 21A:
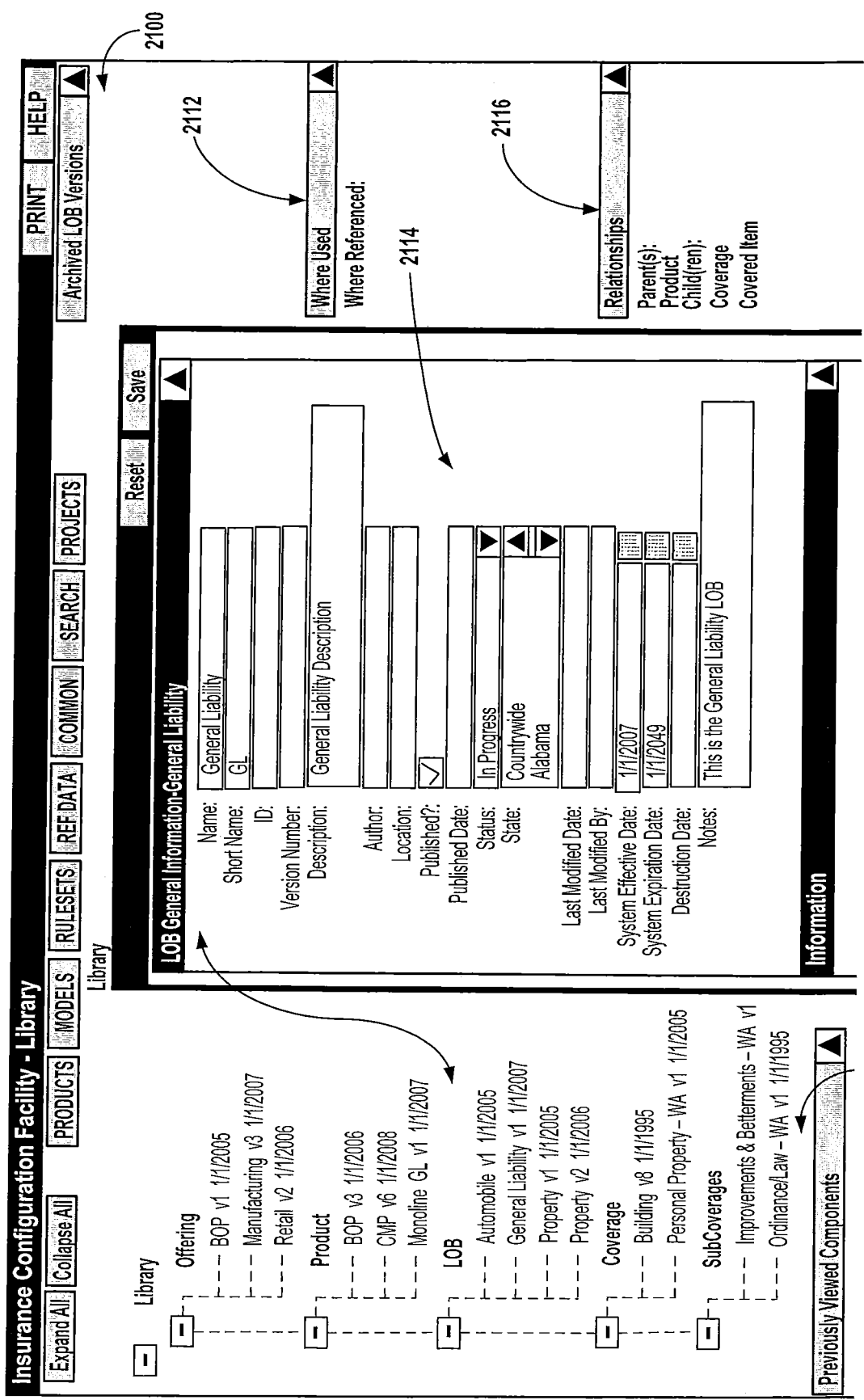

The user interface 112 may receive an indication of whether a particular insurance coverage related attribute was mandatory and a value associated with the attribute. As an example, depicted in FIGS. 21A and 21B, the business user may select various fields in the library user interface window 2100. As shown in FIGS. 21A and 21B, the library user interface window 2100 may be configured to display a line of business (LOB) general information window 2114 associated with the "General Liability v1 1/1/2007" insurance product component. The "General Liability v1 1/1/2007" insurance product component is hierarchically under the LOB (line of business) insurance product component. The user interface 112 may receive information to be entered into fields displayed in library user interface window 2100.

As an example, a business user may select the "Description" field by placing a cursor over the field. The user interface 112 may receive a new or modified entry into the highlighted field.

Alternatively, as depicted in the information window 2118, the user interface 112 may receive an indication of whether a particular insurance coverage related attribute was mandatory and a value associated with the attribute. As depicted in the information window 2118, the "Coinsurance-Maximum" attribute is mandatory and has a value of "100."

In addition, the library user interface 2100 displays a relationship window 2116. The relationship window 2117 provides information regarding the inheritance relationship between parent insurance product component and the child insurance product offering of the particular insurance product component under review. In addition, the library user interface 2100 may modify the relationships to create a new insurance product component, insurance product or offering, or insurance product template.

In addition, the user interface 112 may display relationship information between different insurance product components. The relationship information may include parent and child relationships of the particular insurance product component under review. The business user may modify the relationships to create a new insurance product component, insurance product or offering, or insurance product template.

The user interface 112 may permit the product developer to substitute a different insurance product component. In response to the substitution request, the selected insurance product component is deleted and a different insurance product component is added to the insurance product. After the product developer has modified the selected insurance product components, the operation proceeds to act 1668.

At act 1668, the business user may determine whether to associate or remove additional insurance product components from the modified product or offering. If the modifications to the insurance product or offering are complete, the business user may select to exit operation at act 1672. Otherwise, the business user may select act 1670 to return to act 1614.

In FIG. 17 and FIG. 18, an example of an insurance component library system 1700 may be accessed by librarians and qualified or authorized business user of the ICC design and configuration environment 230. The ICC design and configuration environment 230 may restrict access to the insurance component library system 1700 based upon the business user's role and authority.

Insurance component library system 1700 may include one or more databases stored on the products database 140 and library databases 150. The products database 140 and library databases 150 may be subdivide to include a plurality of insurance product component categories or component category locations. For example, the insurance product component categories of the insurance component library system 1700, depicted in FIG. 17 and FIG. 18, may include a Non-Published Library of Insurance Components 1710, a published library of insurance components 1720, an insurance Product Repository 1810, and a Product Catalog 1820.

Each of the insurance product component categories or component category locations may be associated with a product development cycle. Each insurance product component may be assigned or associated with an insurance product component lifecycle status information that reflects the component category location in which the insurance product or component is stored the lifecycle status information may include one or more lifecycle status parameters that indicate the development status of an insurance product component, insurance product template, or insurance product offering. Alternatively, the lifecycle status parameter may be divided into component lifecycle parameters and product lifecycle parameters.

As an example, the ICC design and configuration environment 230, operable with the servers, may use the product lifecycle parameter or the component category location to govern when or how a particular insurance product component or template may be used to create or develop an insurance product offering. In addition, as the product component lifecycle parameter is changed through the development process, the servers 130 may automatically move the insurance product component to a different component category location.

The ICC design and configuration environment 230 may include, as an example, multiple insurance product component categories or component category locations. The insurance component library system 1700 may include an insurance component library 1702. The insurance component library 1702 may include insurance product templates and insurance product components. The insurance component library 1702 may be further subdivided into additional insurance component categories or component category locations. As an example the insurance component library 1702 may include a non-published library of insurance components 1710 and a published library of insurance components 1720. Insurance product components and insurance product templates stored in the non-published library of insurance components 1710 may be assigned a product lifecycle parameter or attributes to indicate that it is unpublished.

Alternatively, the non-published library may be referred to as a category location assigned a category parameter that indicates insurance product components contained in the non-published library are unpublished. As an example, each insurance product component may be assigned a publication status parameter that may be set to indicate that the insurance product component is either published or unpublished.

The Non-Published Library of Insurance Components 1710 may include an insurance component library 1712 and an insurance product template library 1714. The insurance component library 1712 may include a variety of insurance product components under development. The insurance product components in the insurance component library may include prototype or prototypical insurance product component that may be modified to meet a specific business requirement or customer requirement.

The template library 1714 may include insurance product templates under development or insurance product templates that may be used as a prototype or prototypical insurance product component that may be modified to meet a specific customer requirement or business need.

The published library of insurance components 1720 may include a published component library 1722 and a published template library 1724.

The user interface 172 may display the insurance component library 1712. In FIG. 17, an example component library 1714 may include components available to a business user for development of an insurance product template or a product/ offering, as previously discussed.

Example insurance product components contained in the insurance component library 1712 may include a building component, a personal property component, a general liability component, a premises/operations components, an employee benefits liability component, a non-owned/hired component, a products/completed operations component, a liquor liability component, an extra expense component, and a business income with extra expense component.

User interface 112 may display the template library 1714. Example insurance templates or insurance template components stored in the template library 1714 may include building insurance template, a personal property insurance template, a general liability insurance template, a premises/operations insurance template, an employee benefits liability insurance template, a non-owned/hired insurance template, a product/ completed Ops insurance template, a Liquor liability with extra expense insurance template, and a business income with extra expense (w/EE) insurance template.

The user interface 112 may also display the published component library 1722. Example published insurance product components stored in the published component library 1722 may include a Business Owner Product (BOP) insurance template. The BOP insurance template may include a property line of business insurance template and a general liability line of business insurance template. The property line of business insurance template includes a building component template and a personal property component template.

In FIG. 17, an example of the general liability line of the business insurance template may include a premises/operations component template and an employee benefits liability component template. An insurance product template may be developed as an interrelated combination of associated insurance product components that specify a portion of an insurance product/offering, insurance line of business, insurance coverage or insurance product component.

The published component library 1722 of insurance component library system 1700 may include previously created insurance product components published for use in a product by a product developer. An example of previously created insurance product components stored in the published component library 1722 may include a building component, a personal property component, a general liability component, a premises/operations component, an employee benefits liability component, a non-owned/hired component, a products/completed ops component, a liquor liability component, an extra expense component, and a business income with extra expense component. The Published Template Library 1724 may include a BOP template having a further property line of business and a general liability line of business. The property line of business may include a building component, a personal property component, and a business income with extra expense component. The general liability line of business of the BOP template may include a premises/operations component and an employee benefits liability component.

The component library and template libraries may be accessed by users with librarian access rights to develop or modify the respective components of the component library 1712 and template library 1714. The ICC design and configuration environment 230 may permit control of the quality and nature of components and templates to be used by a product developer. Upon completion of the development and testing of the respective components and templates, the librarian may publish the respective components and templates.

Published library 1720 includes the Published Component library 1722 and a Published Template library 1724. Upon publication of an insurance product template from the template library 1714, the insurance product template becomes a published insurance product template available in the Published Template Library 1724. The published templates may be selected by a product developer to develop or create insurance products or offerings.

In response to publishing the component, the servers 130 may move the previously unpublished insurance product component from the non-published library of insurance product components 1710 to publish insurance component library 1722 of the published library of insurance product components 1720. In some cases, the servers 130 may automatically remove the previously unpublished component from the non-published library of insurance product components 1710. Similarly, in response publishing an insurance template component, the server may move the unpublished insurance product template from template library 1714 of the non-published library of insurance product components 1710 to the published template library 1724 of insurance product components 1720. In some cases, the server removes the previously unpublished insurance product template from the non-published library of insurance product components 1710. In FIG. 18, an example of an insurance product development environment 1800 may be stored in product database 140. The product developer environment 1800 may include an insurance Product Repository 1810 and a Product Catalog 1820. The product repository 1810 may include a generic menu of insurance products 1812 and a development menu of insurance products 1814. In other example of the insurance product development environment 1800, the ICC design and configuration environment 230 may support multiple category locations within the insurance product development environment 1800.

The generic menu of insurance products 1812 may include versions of the insurance products/offerings available to be filed or approved and insurance products/offerings that are in the process of creation, testing, benchmarking, or refinement. As an example, the user interface 112 may display the generic menus of insurance products 1812 including a BOP version 1.0, property insurance product or component version 1.0, a personal property insurance product version 1.0, and/or a business income with extra expense insurance product version 1.0. In addition, the user portal 110 may display additional entries in the generic menu of insurance products 1812 including a general liability insurance product version 1.0, premises/operations insurance product version 1.0, an employee benefits liability (Liab) insurance product version 1.0, and an employee benefits liability (Liab) insurance product version 1.2.

The product catalog 1820 may include products filed with the state regulators or approved products. The product catalog 1820 may include a filed insurance product catalog 1822 and an approved category 1824 of insurance products. The filed category 1822 may include, for example, those products previously developed by a product developer that are filed with the regulatory agencies within the respective state or nation in which the insurance product is to be sold or offered for sale. After an insurance product is filed with the respective regulatory agencies, the product developer library 1800 may safeguard the integrity of the filed product. The product developer library 1800 may temporarily or permanently break inherency between the insurance product components in the filed product and the underlying insurance product component models that are part of the Insurance component library system or functionality 1700 or the insurance product repository 1814.

The products that receive approval from the regulatory agency for sale within a specific state or a national approval for sale of the insurance product within a national jurisdiction may be placed in the approved category of products 1824. The product developer library 1800 may preclude inherency between the approved insurance product 1824 and the parent insurance product component stored in either the product database 140 or the library database 150.

Also, similar to publishing a component, the servers 130 may automatically move the insurance product between the various category locations within the insurance product development environment depending upon a lifecycle parameter or attribute assigned to the insurance product. For example, in response to submitting an insurance product for agency approval, the servers may move the insurance product from the product repository 1810 to the product catalog 1820. As another example, the insurance product ready for submission to an agency for approval may be moved to the filed insurance product catalog 1822. In response to receipt of an agency approval and assignment of an approved status to the lifecycle parameter of the insurance product, the servers 130 may move the insurance product to the approved category 1824 of insurance products.

In FIGS. 19A and 19B, an example user interface 112 of a business user interface of the insurance configuration facility-library 1900 includes an insurance configuration facility-library (ICF-Lib) user interface 1902 and drop-down menu selections such as "PRODUCTS," "MODELS," "RULESETS," "REF DATA," "COMMON," "SEARCH," and "PROJECTS."

The "PRODUCTS" drop down menu selection may display a list of insurance products including filed products 2422 and approved products 2424. In addition, the "PRODUCTS" drop down menu selection may display entries in the product repository 2412.

The "MODELS" drop down menu selection may display a list of models of insurance product components, products or templates that may be used in conjunction with the My Business Impact Modeling 3316.

The "RULESETS" drop down menu selection may request the servers 130 provide the rulesets associated with a selected insurance product component. In response, the servers may retrieve the rulesets information from the library database 150 or products database 140 for display on the user interface 112 of user portal 110. The user portal 110 may allow the business user to edit and store the rulesets of a selected insurance product component via the insurance configuration facility-library 1900 displayed on the user interface 112.

The "REF DATA" drop down menu selection may request the servers 130 to provide reference data related to a selected insurance product component. In response, the servers may retrieve the reference data information associated with the selected insurance product component from the library database 150 or products database 140 for display on the user interface 112 of user portal 110. The user portal 110 may allow the business user to edit and store the reference data of a selected insurance product component via the insurance configuration facility-library 1900 displayed on the user interface 112.

In other examples, another form of user interface or menus providing similar functionality may be implemented. The business user interface of the insurance configuration facility-library 1900 may further include an "Export Component" window 1910 including an offering general information-BOP window. The Export Component window 1910 further includes information panel 1912 and rule types panel 1914. The Export Component window 1910 may include control buttons 1916 such as "DELETE," "CREATE NEW VERSION," "CREATE LIKE," and "EDIT." User interface 1900 may also include an expandable/collapsible insurance product framework in the form of a product tree 1920.

The library tree 1920 may provide a hierarchical view of different components available to the business user to create other offerings, products, lines of business, coverages, and sub-coverages. As depicted in FIGS. 19A and 19B, the library tree 1920 may include an offerings branch, a product branch, a line of business (LOB) branch, a coverage branch, and a sub-coverages branch.

Focusing on the offerings branch within the library tree 1920, the offerings branch includes a "manufacturing version 3" offering that was last finalized on Jan. 1, 2007. Thus, the library tree 1920 may also provide versioning and date information. Similarly, the products branch includes a "Monoline GL version 1" product that was stored on Jan. 1, 2007.

As a further example, the LOB branch of the library tree 1920 includes lines of businesses for both automobile and property. The line of business branch also includes a first version of the "property" line of business entry stored on Jan. 1, 2005, and a second version of the "property" line of business stored on Jan. 1, 2006.

The coverage branch also allows the business user to view the granularization of coverage. The granularization permits the business user to specify different types of coverage components depending upon the specific insurance need of the potential client. Illustratively, the coverage branch sub-tree includes coverage for a "building" and coverage for a "personal property." As depicted in FIGS. 19A and 19B, the personal property branch under coverage specifies that the personal property coverage is associated with a policy associated with the state of Washington, version 1.

To provide even further granularity, the sub-coverage branch of the library tree 1920 includes selection of types of coverage that can supplement the coverage listed in the coverage tree. Illustratively, the "improvements and betterments" branch of the sub-coverage may be used in a product in association with the buildings coverage component.

In FIGS. 20A and 20B, an example of user interface 112 includes an example of a Library Export user interface 2000. The Library Export user interface 2000 includes an "Offerings General Information" window 2012, an "Information" window 2014, a "Products" window 2016, and a "Rule Types" window 2018. The "Offerings General Information" window 2012 displays information related to a BOP offering. The BOP offering is also displayed as part of the hierarchically viewable insurance products window 2020, as "OFF-BOP v1."

The Offerings General Information window 2012 may display the name, short name, ID, version number, and description of the offering. In addition, the window 2012 may also display information related to the author, the location of the particular component, the publication status, as well as other pertinent information.

The products window 2016 may display the name, description, business effective date, business expiration date, and action related to a particular product. In addition, the products window 2016 provides a link to create new products in response to selection of the add product link.

User interface 2000 also includes a hierarchically viewable products window 2020 that displays a hierarchical view of an insurance product offer "BOP v1" selected from the library. As depicted, a hierarchically viewable products window 2020 displays an OFF-BOP v1 tree having a product designation of "BOP v3." The hierarchically viewable products window 2020 further includes Line of Business (LOB) branches for "Property v2" and "General Liability v1." The hierarchically viewable products window 2020 also depicts the relationship of various coverages and sub-coverages to a respective line of businesses.

As further depicted in FIGS. 20A and 20B, the "where used" window 2010 displays information regarding the effective date and expiration date of an originating component, which is related to the component displayed in the offering general information window 2012.

In FIGS. 21A and 21B, an example of user interface 112 of the Insurance Configuration Facility-library 1900 further includes a library user interface 2100. The library user interface window 2100 may include an insurance product structure window 2110, a where used window 2112, a line of business (LOB) general information window 2114 for the general liability insurance product component, a relationships window 2116, an information window 2118, and a rule type window 2120 that corresponds to the general liability component under the line of business branch as depicted in the library 1920.

The insurance product structure window 2110 may display the insurance product framework or structure of the insurance product offering. The insurance product framework may include a hierarchical tree framework, as depicted in FIG. 21A. For example, when a selected insurance product component is added to an insurance product offering, the servers 130 may add the selected insurance product component to the insurance product framework to form a branch within the hierarchical tree framework of the insurance product offering.

The where used window 2112 may allow the business user to determine where a specified component within the library of offerings, products, line of businesses, coverages, and sub-coverages was also used.

User interface 2100 may further include a relationship window 2116 may provide the business user or librarian with information regarding the relationship information. Example relationship information may include inheritance relationship information. The inheritance relationship interface may indicate the parentage and children of the selected insurance product component used in the creation of an insurance product offering. The relationship window 2016 may provide information regarding the properties that a particular component will inherit from another related component such as a parent component. Also, the relationship window 2116 may display information regarding what related components, coverage, and/or covered items could be affected by changes to the stored library component. The relationship window 2116 may further provide produce usage information. As an example, the product usage information may include identifiers of other insurance product offerings and insurance product templates that use the selected insurance component.

The rule type window 2120 may include rule types 2122, sub-rule types 2124, and sub-sub-rule types 2126. As depicted, the rule types 2122, the sub-rule types 2124, and sub-sub-rule types 2126 are displayed in a hierarchical tree like configuration. The rule types may be associated with a component type rule types table, as depicted in FIG. 5, to specify the characteristics of component rule types, as depicted in FIGS. 6-7.

In FIGS. 22A and 22B, an example of user interface 112 includes a product offer data entry user interface 2200. The offer data entry user interface 2200 includes a product offering general information window 2210, an information window, a products window, and a rule types window 2212.

The product offering general information window 2210 displays attributes for an offering with a name "BOP." The offering general information window 2210 may receive data related to a particular offering. In FIGS. 22A and 22B, the offering general information window 2218 is configured to receive information related to a product offering with the name "BOP," which corresponds to the first version of an offering depicted in the hierarchically viewable products window 2110.

The data entered in the offering general information window 2210 may be displayed in the export component window 2012 depicted in FIGS. 20A and 20B. As an example, the offering general information window 2012 reflects the data entered in the offering general information window 2210.

The offer data entry interface 2200 may receive rule types necessary for implementing a particular product offering. The rule types window 2212 may include selections for various rule types. As an example, rule types, depicted in FIGS. 22A and 22B, include underwriting rule types and ratings rule types. The underwriting rule type is related to or associated with the underwriting rules engine 430 to be used to evaluate or deploy the product offering.

In addition, the business user may use the rule types window 2212 to select subcategories or sub-rule types within the underwriting rule types. The underwriting rule types may include, for example, rule types associated with financials, eligibility, and risk assessment.

By selecting the respective rule types, the business user of the library may configure the links between a particular component within the library to a respective configurable logic within a respective one of the engine servers 160 or stored in the engine databases 165. Advantageously, the business user of the library function may specify the rule types without the need to understand the underlying complexities of associating a particular component of the library to particular configurable engines 250 or the configurable logic or information within or associated to an engine 250.

Figure 23A:
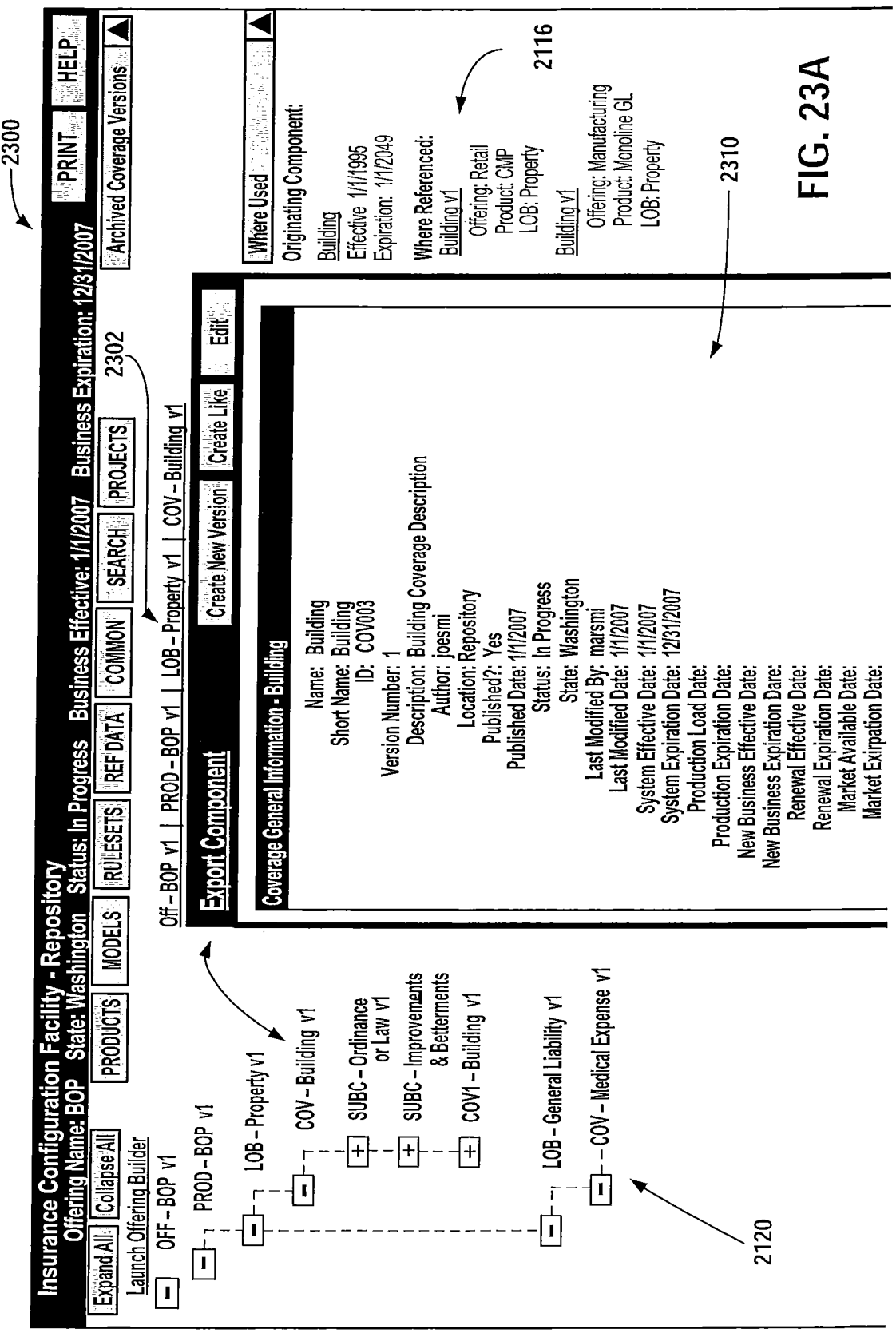

FIG. 23A, FIG. 23B, and FIG. 23C depict the business user interface of the insurance configuration facility-repository 2300. The repository user interface 2300 includes an export component window 2302. The export component window 2302 may include a coverage general information window 2310, a coverage information window 2312, a sub-coverages window 2314, covered items window 2316, and rule types window 2318. As depicted in FIGS. 23A, 23B, and 23C, the coverage general information window 2310 displays information related to insurance coverage such as insurance coverage of a building. Display of the example export component window may be initiated from the hierarchically viewable products window 1920, by a business user selection of, for example, the "COV-Building v1" branch of the "OFF-BOP" tree which corresponds to the information displayed in the example coverage general information window 2310.

The user interface 2300 may further display portions of the product offering related to the insurance coverage component displayed in the coverage general information window 2310. In addition, the "where used" window 1910 may display information related to an originating component, which is related to the coverage component displayed in the coverage general information window 2310.

As depicted in FIG. 23B, the rule types window 2318 reflects the selection of underwriting, financials, and credit rules associated with the coverage component depicted in the coverage general information window 2310.

Accordingly, when the business user of the ICC design and configuration environment 230 institutes a runtime simulation of a line of business including the coverage component "building" v1, the underwriting configuration component 330 may invoke the underwriting rules engine component adapter 332, which will include a link 340 to a particular underwriting engine based on the rules type selected in the rule types window 2318.

Figure 24A:
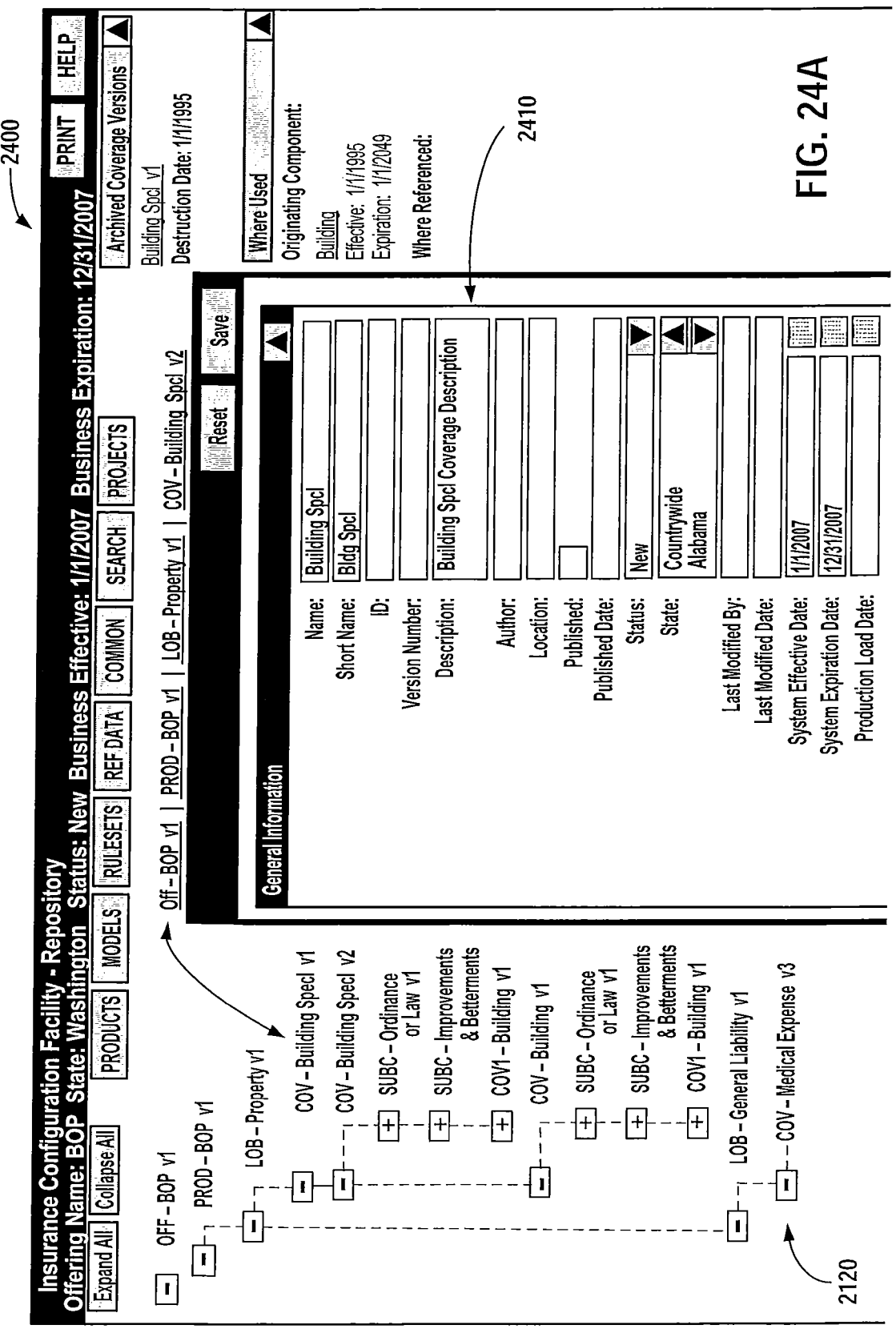

In FIGS. 24A, 24B, and 24C, an example user interface 112 includes a business user interface of the repository library 1810 for entering general information related to a component stored in the repository of the library 2400. The repository window 2402 includes a general information window 2410, a coverage information window 2422, a sub-coverages window 2424, a covered items window 2426, and a coverage rule types window 2428. In FIG. 23C, the user interface 2300 may include control buttons 2322 such as "CREATE NEW VERSION," "CREATE LIKE," and "EDIT."

In the illustrated example, the component related to the general information displayed in the general information window 2410 is for a "building Spcl" v2 coverage of a line of business (LOB) related to a property. As depicted in the hierarchically viewable products window 2920, the "building SPCL" v2 coverage component is related to the "line of business (LOB)-property v1." The coverage information window 2422 may include information related to coverages, such as maximum and minimum co-insurance values. The sub-coverages window 2424 depicts information associated with the sub-coverages related to the coverage for the "building Spcl" v2 such as, for example, information related to the ordinances or law description, and improvements and betterments description.

As shown in the hierarchically viewable products window 2110, the "COV-Building Spcl" v2 includes branches for the sub-coverages "Ordinance or Law v1" and "Improvements and Betterment Description."

The covered items window 2426 may display the name and description of the item(s) covered. As an example, the covered items may relate to the component "Building Spcl v1." The hierarchically viewable products window 2120 may include a first version of a coverage named "Building v1" and a second version of a coverage named "Building Spcl v2," which are attached to the product offering structure within the tier of insurance product components. The "Building v1" component is hierarchically placed under the coverage component "Building Spcl v2."

The covered rule types window 2428 may describe the rule types associated with the selected components. In this example, the covered rule types window 2428 indicates that the "Building Spcl v2" component is related to coverage rule types underwriting, and sub-rule types financials and credit as selected by a user.

In FIGS. 26A and 26B, an example of user interface 112 includes a search tool 2600. Selection of a search function within the search menu 1020 of FIG. 10 may invoke a request from the user portal 110 to servers 130 to provide the search user interface 2610 of the insurance configuration facility 2500 or product development portal 900 of the ICC design and configuration environment 230. The search interface 2610 includes a Search Window 2612, a Product Window 2614, and a Project Window 2616.

Utilizing the Search Window 2612, the business user may specify a search for another product, project, library components, model executions, or an otherwise defined element supported within the insurance configuration facility 2500 or product development portal 900 of the ICC design and configuration environment 230. In addition, the business user may enter a name of one of a product, project, library component, or model executions.

Utilizing the Product Window 2614, the business user of the insurance configuration facility 2500 or product development portal 900 of the ICC design and configuration environment 230 may limit the search to between particular effective dates as well as identify the geographical areas to be associated with the search. Illustratively, the Product Window 2614 may include specification of a parameter such as a state, which may allow the business user to specify one or more states, regions, nationwide coverage areas or geographical-based parameters within which to limit the search.

The Project Window 2616 may allow the business user to specify a project status. For example, the business user of insurance configuration facility 2500 or product development portal 900 of the ICC design and configuration environment 230 may specify that the project status is one of open, closed, pending, or other.

Upon specification of the search parameters of interest, the business user of the insurance configuration facility 2500 or product development portal 900 of the ICC design and configuration environment 230 may invoke a search by selection of the search button 2618. Upon selection of the search button 2618, the ICF 1400 invokes a search for the item of interest. Accordingly, the user portal 110 sends a request to the servers 130 requesting identification of the desired item. Upon conclusion of the search, servers 130 provides the user portal 110 with a display of the search results, as depicted in FIG. 26B.

As depicted in the example of FIG. 26B, the ICF 1400 provides the user portal 110 with a Product Search Results interface 2620. The Product Search Results user interface 2620 may include fields as specified in the search.

In the illustrated example, the search results include a line of insurance (LOI) category 2622, a state category 2624, an effective date category 2630, and an associated information link column 2640. In other examples, other parameters may be included. As an example, the business user may specify a category location among a plurality of category locations in the product database 140 or library databases 150. The business user may select to modify a search by selection of the Modify Search button 2650.

In addition, the Product Search Results user interface 2620 may include links 2640 to the information identified within the search. Selection of the links 2640 may initiate a navigation to a selected hyperlinked document or menu. A non-limiting list of examples of hyperlinked information may include "Base Rating," "Pricing," and "Pre-Eligibility" information.

Figure 27A:
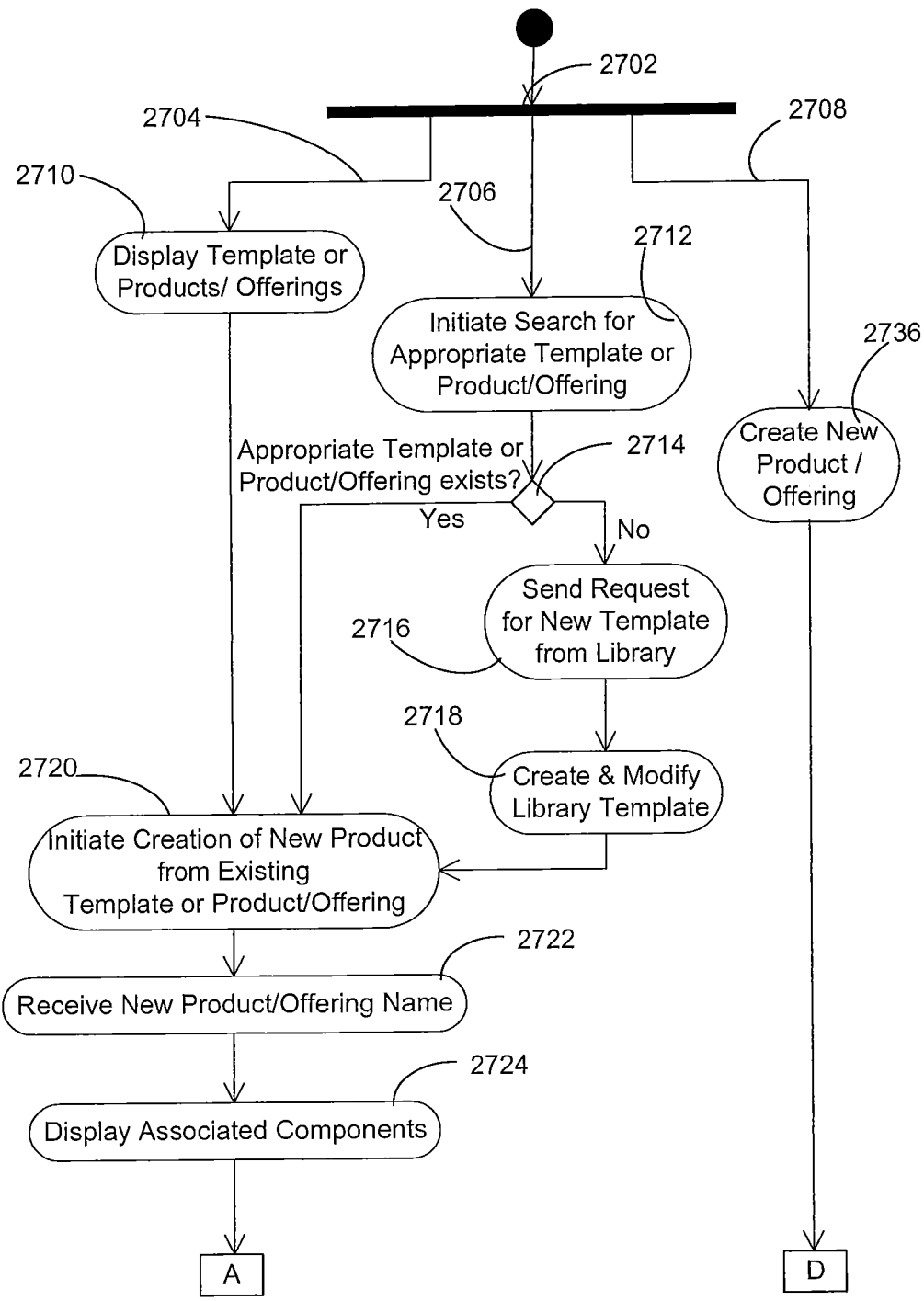
FIGS. 27A, 27B, and 27C depict a system for developing an insurance product template or a product offering for an insurance product.
Figure 27B:
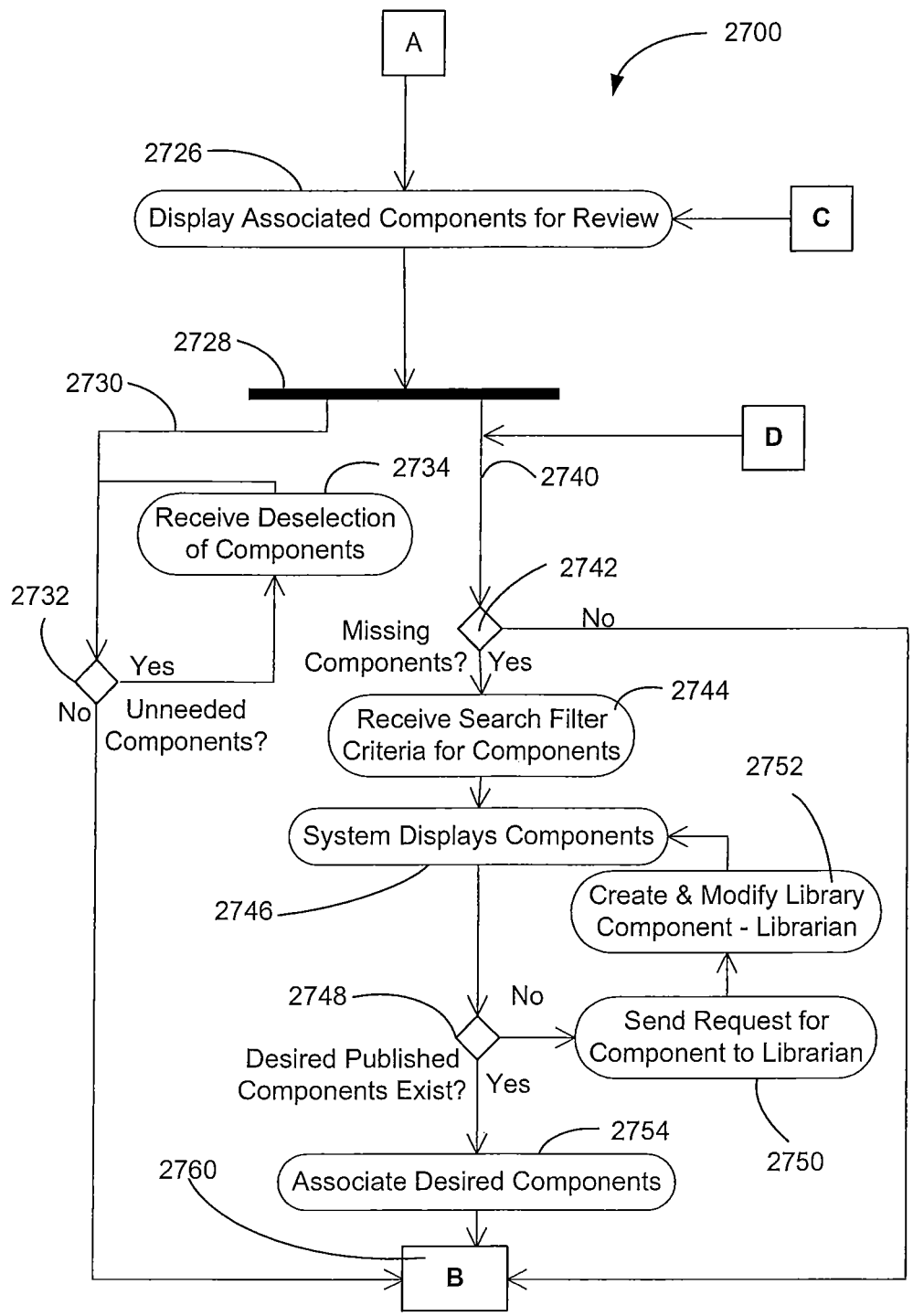
Figure 27C:
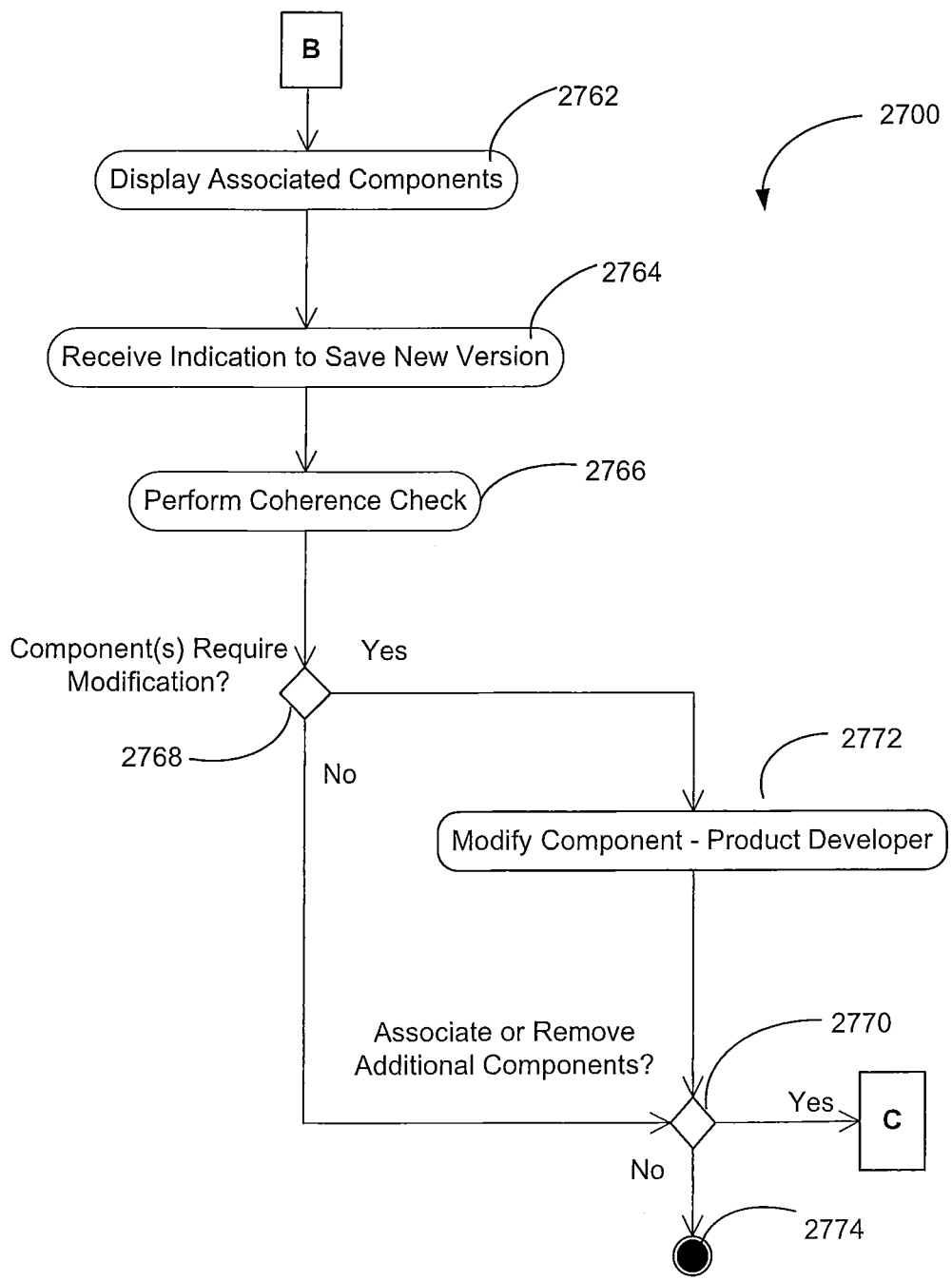

In FIGS. 27A, 27B, and 27C, an example operational flow diagram 2700 described development of a new insurance product with the ICC configuration workstation front end 300, which is displayed through user interface 112 on the user portal 110. An insurance product developer may access a product repository 1810 and product catalog 1820.

As depicted in FIG. 25, the insurance configuration interface 2500 may receive the selection of a create new project input. As an example project, the business user may wish to create a new insurance product based upon an existing product. Returning to FIG. 27A, at decision 2702, the ICC configuration workstation front end 300 may receive an indication from a business user or a desired design flow to follow. The ICC configuration workstation front end 300 may receive a selection of a desired design process to follow via user interface 112. In response to selection of path 2704, the operation continues to act 2710. In response to selection of path 2706, the operation continues to act 2712. In response to selection of path 2708, the operation continues to act 2736.

At act 2710, the business user of the insurance configuration facility may view templates or product offerings that already exist from the product repository 1810. In response to a request to view templates or product offerings, the ICC configuration workstation front end 300 resident on the user portal 110 sends a request to the ICC core 310 to provide a display of insurance product templates or available insurance products that are available as a template for a new insurance product in the product database 140 or the library database 150. The servers 270 may get or retrieve the generic menu of products 1812 and development menu of products 1814 for review by the product developer.

Alternatively, following flow path 2706, at act 2712, the business user may search the insurance component library 1702, product repository 1810, product catalog 1720, or a personal database associated with the business user to locate an appropriate template or product offering. The business user may use a search facility associated with the ICC core 310 to locate an appropriate existing product to be modified or to create a new product from scratch. As an example, the business user may use the search facilities associated with the product development portal user interface 902, depicted in FIG. 9, to locate an appropriate existing template or product to be modified or to create a new product from scratch. The business user may select from among the search results an appropriate template or product/offering. Thereafter, the operation proceeds to act 2714.

At act 2714, the user portal 110 may receive a listing of available templates or product/offerings stored in the product database 140 or library database 150. Depending upon the business user authorization and security level, the ICC configuration workstation front end 300 may only display the published component library 1722 and published template library 1724 on the user interface 112. The user interface 112 may allow the business user to review characteristics and features of the retrieved insurance products or insurance product templates to determine whether an appropriate template or product/offering exists. If an appropriate template or product/offering does not exist, the operation proceeds to act 2716.

At act 2716, if the product developer does not locate a suitable insurance product template or insurance product component in the product repository 1810, product category 1820, published templates library 1724 or published component library 1722, the business user may request generation of a new blank template by a librarian. The librarian may create a new insurance product template or insurance product component. Thereafter, the operation continues to act 2718.

At act 2718, the requested insurance product template or product/offering may be created by an individual authorized as a librarian. A library may be defined as a special business user that is permitted to modify or create insurance product components, templates, and offerings in the insurance component library 1700.

After an appropriate template or product/offering is located or created, the librarian may publish the newly created insurance product template in the published template library 1724. The published template library 1724 may be stored in the library database 150. The librarian may publish a new insurance product/offering as an insurance product component in the published component library 1722 portion of the insurance component library 1702. The new insurance product component may be stored in the databases 150. After the librarian publishes the requested insurance product template or insurance product component, the operation continues to act 2720.

At act 2720, the ICC configuration workstation front end 300 may configure the user portal 110 to allow the business user to create a new product from the existing template or product/offering. As an example, the user interface 112 may allow the product developer to access the product repository 1810. The business user may reuse existing templates or products/offerings to more rapidly develop and test new products or offerings for sale in the insurance area. After the business user completes creating a product from an existing template and/or product/offering, the operation continues to act 2722.

At act 2722, the business user may provide a name for the new product/offering and add additional information as warranted. Thereafter, the operation proceeds to act 2724. At act 2724, after the appropriate template or product/offering is created, the ICC configuration workstation front end 300 displays insurance product components and insurance product framework on user interface 112. Thereafter, the operation proceeds to act 2726.

At act 2736, the terminal 110 may send servers 130 an insurance product offering request. The insurance product offering request may include a selected category location from among the category locations in the product database 140 or library database 150. In response to receipt of the insurance product offering request, the servers 130 may create and store the new insurance product offering in the selected category location. As an example, the servers 130 may generate a user interface for creating a new insurance product offering, as previously described relative to the offer builder 1200 and new offer summary 1300.

At act 2726 of FIG. 27B, an example of the ICC configuration workstation front end 300 may display insurance product components on the user interface 112 for review by the user. After reviewing the displayed insurance product components associated with the new template or product/offering, the design process proceeds to junction 2728. At junction 2728, the business user may select either design path 2730 or design path 2740.

Following design path 2730, at act 2732, ICC configuration workstation front end 300 may allow the business user to deselect undesired insurance product components through the user interface 112. At act 2734, the user interface 112 may receive an indication from the business user to deselect a component. In response to deselection of the undesired components, ICC configuration workstation front end 300 refreshes the display of insurance product components to display the new insurance product/offering without the deselected insurance product components. If the new insurance product template or product/offering does not include unnecessary components, the design process may continue to act 2762. Otherwise, the deselection process continues until all unnecessary components are deselected and removed from the new insurance product template or product.

Returning to design flow path 2740, at act 2742, missing components from the insurance product template or product/offering may be added. If there are no missing components, the business user continues to junction 2760.

Otherwise, if there are missing components, at act 2744, the search or library functions may be involved to locate an appropriate component. For example, at act 2744, the business user accesses the search system to filter criteria necessary to locate the appropriate component to be added to the insurance product template or product/offering. Thereafter, the operation continues to act 2746.

At act 2746, the workstation user interface 300 displays available insurance product components that meet the search or filter criteria of act 2744. The business user may review the qualities and attributes of the available components. Thereafter, the operation proceeds to act 2748.

At act 2748, the published insurance product component that meets the criteria, stored in the Product Repository 1710, the published component library 1722, or Published Template Library 1724, is selected. If none of the published insurance product components meet the criteria or are inadequate, the operation proceeds to act 2750.

At act 2750, the user interface may allow the business user to request a library or qualified business user to create a desired insurance product component. The request to create the desired insurance product component may include information to specify modifications to be made to an existing insurance product component, insurance product template, or insurance product offering from a librarian or a product developer qualified as a librarian. Thereafter, the operation proceeds to act 2752.

At act 2752, the ICC Design and Configuration System 300 may allow an authorized business user to create an insurance product component or modify an existing insurance product component resident within the insurance component library 1702 to meet the business requirement. After the requested desired component for the insurance product is developed, the business user may receive notification from the librarian or the developer of the insurance product component that the appropriate insurance product component is available. Accordingly, after the insurance product component for the insurance product is available, the operation returns to act 2746. After the desired missing insurance product components are selected, the operation 2700 continues to act 2754.

At act 2754, the desired insurance product component is associated to other insurance product components in the insurance product template or product/offering under development. Referring back to FIG. 4, insurance product components are associated to each other by specifying a component-type relationship. After the new insurance product component is associated with the existing insurance product components in the insurance product template or product/offering, the operation continues to act 2762.

As depicted in FIG. 27C, at act 2762, ICC configuration workstation front end 300 may display the associated insurance product components on user interface 112. Upon completion of a review of the associated insurance product components, the operation continues to act 2764.

At act 2764, ICC configuration workstation front end 300 may configure the user interface 112 to allow the insurance product template or product/offering to be saved as a new version. In response to receipt of a save instruction, user portal 110 may send a request to servers 270 to store the new version. Thereafter, the operation continues to act 2766.

At act 2766, the ICC configuration workstation front end 300 may request execution of a coherency check on all or a portion of the newly developed insurance product. In response to receipt of the request for a coherency check, the user portal 110 transmits a request for a coherency check to servers 270. The servers 270 perform a coherency check to verify that the insurance product components and underlying functionality of the insurance product components or important relationships of the insurance product components are proper and correctly implemented. Thereafter, the operation proceeds to act 2768.

At act 2768, based upon a coherency report, the ICC design and configuration environment 230 may determine whether any of the insurance product components in the insurance product/offering or template require modification. If the insurance product components within the insurance product template or product/offering require modification, the operation may continue to act 2772.

At act 2772, the product developer may use the ICC configuration workstation front end 300 to modify the insurance product components as necessary. The user interface 112 may receive a modification to the coverage information based upon selection of an Add/Remove Details link associated with an insurance product component or template. The user interface 112 may be further configured to receive a business user selection to add a sub-coverage link to insurance sub-coverage component.

As an example, depicted in FIG. 24, the coverage information window 2422 may receive a modification to the coverage information upon selection of an Add/Remove Details link. As another example, as depicted in the sub-coverage window 2424, the user interface 112 may receive as business user selection of an add sub-coverage link to add additional insurance sub-coverage components.

As yet another example, the rule type elections may be displayed, enabled, or modified. The ICC configuration workstation front end 300 may display on user interface 112 a limited number of available coverage rule types from which to select a coverage rule type based upon the insurance product component, where the coverage rule types are consistent with a model of the desired operation of the insurance product component. In some cases, the configuration workstation front end 300 may only allow some of the listed coverage types displayed on user interface 112 to be selected. After the insurance product component modifications are completed, the operation continues to act 2770.

Otherwise, if none of the insurance components require modification, the operation continues to act 2770. At act 2770, the ICC configuration workstation front end 300, via user interface 112, prompts the business user to provide an indication of whether additional insurance product components are to be associated or removed from the insurance product or offering or insurance product template. In the event that additional insurance product components need to be removed or associated with the insurance product template or product/offering, the operation returns to act 2726. Otherwise, at act 2774, the product developer may save the newly developed insurance product template or product/offering in the product repository 1810, published library of insurance product components 1720, or non-published library of insurance product components 1710, along with the modified insurance product components and exits the operation 2700.

Figure 28A:
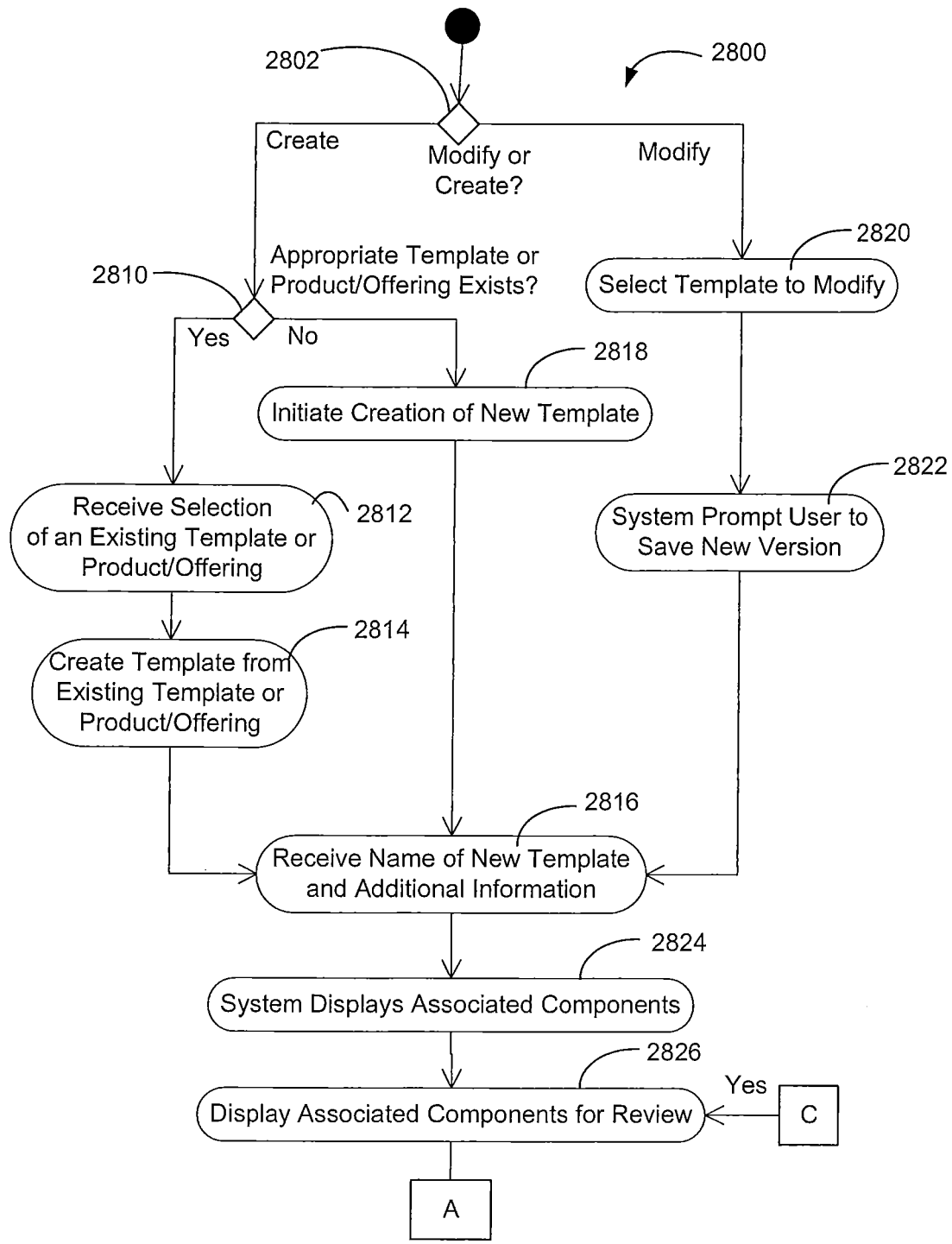
FIGS. 28A, 28B, and 28C depict an additional system for creating or modifying an insurance product template or a product offering.
Figure 28B:
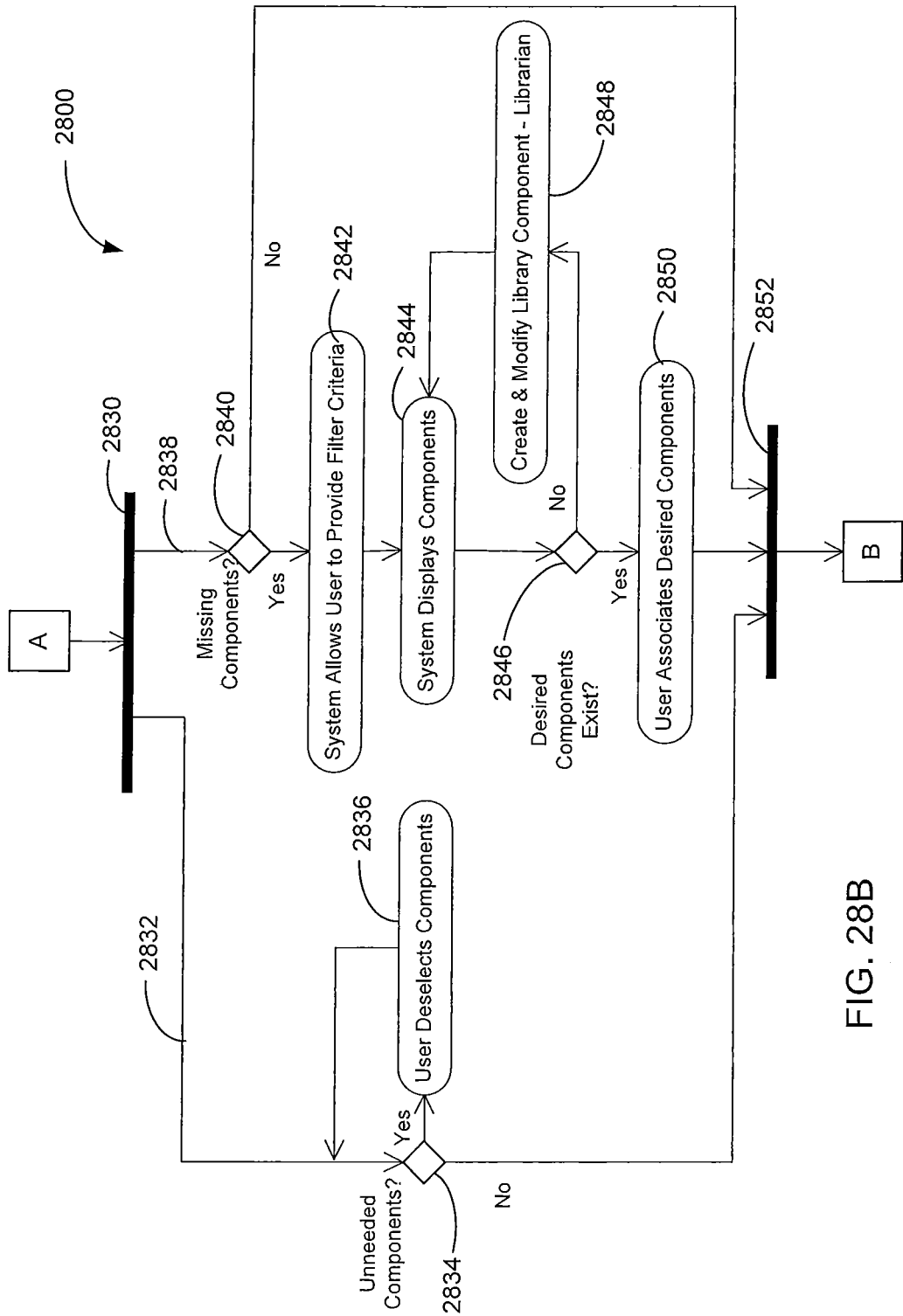
Figure 28C:
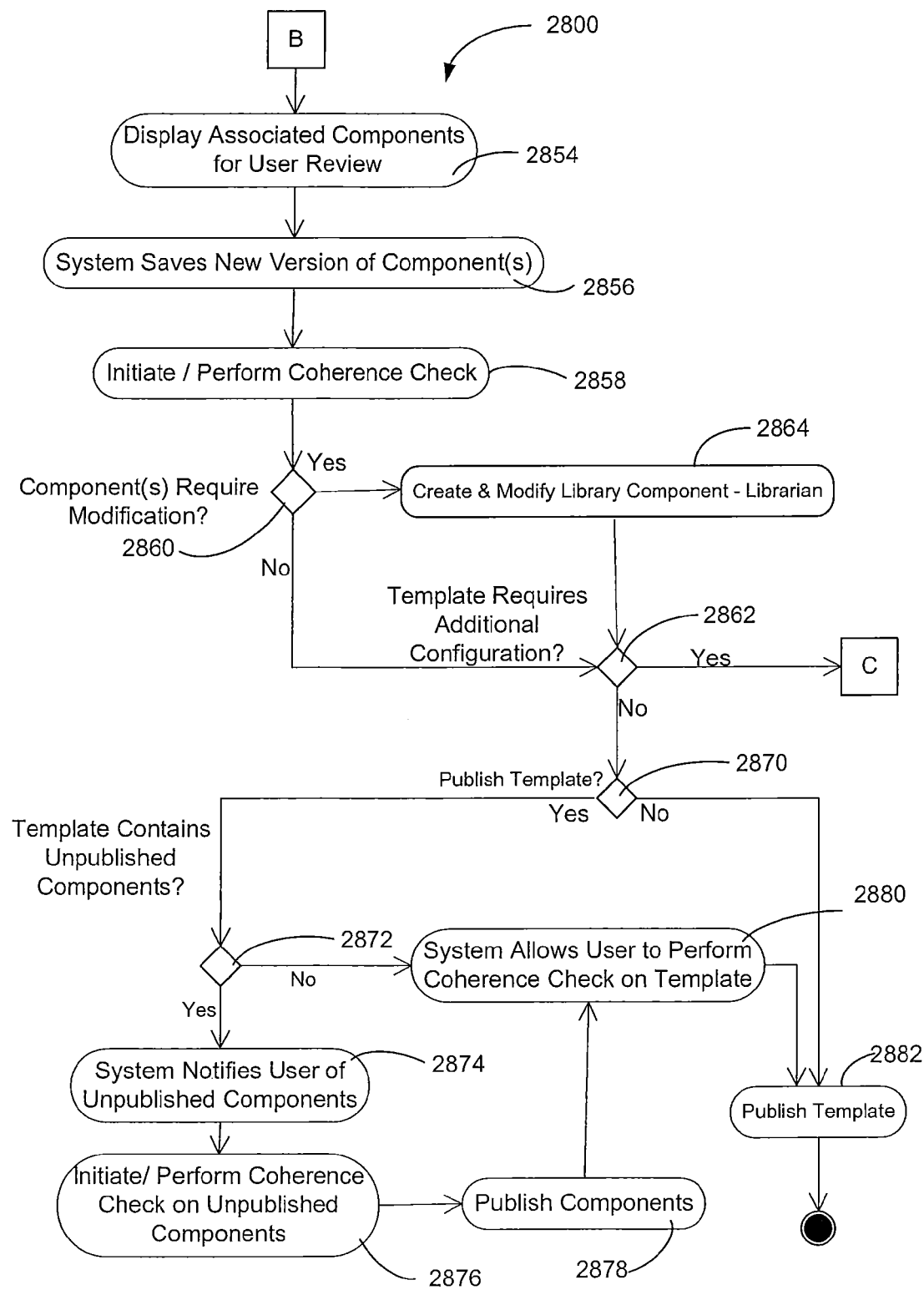

In FIGS. 28A, 28B, and 28C, an example operation 2800 includes a system for creating or modifying an insurance product template or a product/offering. At act 2802, the business user determines whether an existing template or product/offering should be modified to form the desired template or product/offering. If the business user desires to create a new template or product/offering, the terminal 110 transmits an insurance product offering request to the server. The insurance product offering request may include a selected category location from among a plurality of category locations in the insurance component library 1700. Thereafter, the operation 2800 continues to act 2810. Otherwise, if the business user decides to modify an existing template or product/offering, the operation 2800 continues to act 2820.

At act 2810, the ICC design and configuration environment 230 generates a selection to determine whether an appropriate template or product/offering exists. If an appropriate template or product/offering does not exist, the operation continues to act 2818. Otherwise, the appropriate template or product/offering does exist, and the operation 2800 continues to act 2812.

At act 2812, the ICC design and configuration environment 230 receives a selection of an existing template or product/offering that is to be copied to create a new template or product/offering. At act 2814, the ICC design and configuration environment 230 creates an insurance product template from an existing template or product/offering. At act 2818, a new blank template is created, as describe previously. Thereafter, the operation 2800 continues to act 2816.

Alternatively, at act 2820, the business user may modify an insurance product template. The user interface 112 may display category locations from which the business user may select an insurance product template. For example, the ICC configuration workstation front end 300, via user interface 112, may display the Published Template Library 1724 of the Published Library of Insurance Product Components 1720. Alternatively, the user interface may display the contents of the product developer data base 1800. The user interface may receive an insurance product offering selection of one of the insurance product templates stored in the product developer database 1800 or the insurance component library 1700. Upon receiving the selection, the servers 130 access the product database 140 and library database 150 to retrieve the selected insurance product template to be modified. Thereafter, the operation 2800 proceeds to act 2822.

At act 2822, the process 2800 allows the business user to save the new version of the insurance product template to be modified. Thereafter, the operation 2800 proceeds to act 2816.

At act 2816, the ICC configuration workstation front end 300 may allow the business user to name the new template and add additional information to more fully describe the insurance product template or product/offering that is being created. Thereafter, the operation 2800 proceeds to act 2824.

At act 2824, the system 2800 displays, the ICC configuration workstation front end 300 may configure the user interface 112 to receive associations between insurance product components within or with the new insurance product template as a function of the insurance product framework or structure. In response to receipt of the associations, new or updated associations are communicated to the servers 130.

The ICC configuration workstation front end 300 may display components and component relationships as specified in the insurance component library 1702 or product repository 1810. The user interface 112 may permit the business user to review the associated insurance product components and determine whether any further action is necessary.

As an example, ICC configuration workstation front end 300 may configured the user interface 112 to receive a user interface input to highlight one of the insurance product components of an insurance offering being built by the product developer. The user interface 112 may display a component window to be exported. The ICC configuration workstation front end 300 may include an exported window. As an example, depicted in FIG. 31A, the user interface 112 may include the export component window 3102. The export component window may include a coverage general information window 3110, a coverage information window 3112, a sub-coverage window 3114, covered items window 3116, and rule types window 3118.

In addition, the ICC configuration workstation front end 300 may configure user interface 112 to permit the product developer to associate additional insurance product components to the displayed insurance product template. Thereafter, the operation 2800 proceeds to act 2826.

At act 2826, the ICC configuration workstation front end 300 may configure the user interface 112 to display the insurance product template and associated insurance product components. The user interface 112 may be further configured to display the associated insurance product components of the new template or product/offering, and permit the business user to review the associated insurance product components and/or the newly created template or offering. The operation 2800 continues to 2830, as depicted in FIG. 28B. At 2830, the business user may follow two different design paths, 2832 or 2838.

Following design path 2832, at act 2834, insurance product components may be removed from the insurance product template. If there are no unnecessary insurance product components, the operation 2800 continues to junction 2852.

Otherwise, at act 2836, the ICC configuration workstation front end 300 may configure the user interface 112 to receive an indication that a component is undesired. The undesired components may be identified by deselecting the insurance product components. As an example, the user interface 112 may receive a user instruction to remove the deselected insurance product components from the displayed insurance product template. After the unnecessary insurance product components are deleted, the operation 2800 continues to junction 2852.

Following design path 2838, the operation proceeds to act 2840, where the user interface may display the insurance product components to permit the business user to review for missing components. In the case that there are no missing insurance product components, the operation proceeds to act 2852.

Otherwise, the operation proceeds to act 2842. At act 2842, the user interface 112 may receive, from the user, filter criteria to locate a desired insurance product component in the insurance component library 1702 or insurance product components residing in the product repository 1810. Thereafter, the operation 2800 proceeds to act 2844.

At act 2844, the ICC configuration workstation front end 300 may configure the user interface 112 to display insurance product components that most closely relate to the filter criteria provided in act 2842. Based upon the displayed insurance product components, at act 2846, the ICC configuration workstation front end 300 may configure the user interface 112 to receive selections of the desired insurance product components. The selected insurance product components may be added to the insurance product template via interaction with ICC configuration workstation front end 300. If the desired insurance product components are not displayed, the operation 2800 continues to act 2848.

At act 2848, in response to the determination that the desired insurance product components are not displayed or available, the ICC configuration workstation front end 300 may generate a request that a librarian or qualified individual to create a new insurance product component within the insurance component library 1712. The new insurance product components may be generated from scratch or a modified version of an existing library insurance product component. After the library insurance product component is constructed, the operation 2800 returns to act 2844.

If the desired insurance product components do exist, or have been created, the operation 2800 proceeds to act 2850.

At act 2850, ICC configuration workstation front end 300 may configure user interface 112 to receive selection of the desired insurance product components. The user interface 112 may also receive association information. The ICC configuration workstation front end 300 may transmit the association information to the servers 130. In response to the association information, the servers 130 may associate the selected insurance product components within the insurance product template or product/offering. Thereafter, the operation 2800 proceeds to junction 2852.

At junction 2852, the flow diagram may proceed to act 2854, as depicted in FIG. 14C. At 2852, the ICC configuration workstation front end 300 may configure user interface 112 to display all the associated insurance product components within, for example, the insurance product template. After the business user reviews the insurance product template, the operation 2800 proceeds to act 2856.

At act 2856, ICC configuration workstation front end 300 may send a request to servers 130 to save the new version of the newly created template or product/offering in the product database 140 or library database 150. Thereafter, the operation 2800 proceeds to act 2858.

At act 2858, the ICC configuration workstation front end 300 may prompt the user, through the user interface 112, to initiate a coherency check. Alternatively, after receipt of an indication that the business user has completed a user review, the servers 130 may automatically initiate a coherency check. During the coherency check, the servers 130 may automatically review either all or a portion of the insurance product component portions and other sub-templates within the insurance product template or product/offering for coherency with the most up-to-date insurance product component versions. In addition, the servers may determine whether a published indicator of any of the insurance product templates or insurance product components is set to non-published. The servers 130 may generate an coherency error or warning in the event the published indicator is set to non-published. After the coherency check is completed, the operation 2800 proceeds to act 2860.

At act 2860, the ICC configuration workstation front end 300 may configure user interface 112 to receive an indication that at least one of the insurance product components associated within the insurance product template or product/offering requires modification. If the insurance product components require modification, the operation 2800 proceeds to act 2864.

At act 2864, the library functions may be used to create and modify the library insurance product components. After the library insurance product components are created or modified to meet the insurance product requirements, or in the event that insurance product component modifications are not required, the operation 2800 proceeds to act 2862.

At act 2862, the insurance product template may be examined to determine whether additional configuration is required. If the insurance product template requires additional configuration, the operation returns to act 2826. Otherwise, the operation 2800 continues to act 2870.

At act 2870, previous publication of the insurance product template into the library is determined. If the insurance product template was previously published into the library, the operation proceeds to act 2882, where the new or modified template is published. If the insurance product template was not previously published, the operation 2800 proceeds to act 2872.

At act 2872, the operation determines whether the newly created template contains unpublished insurance product components. If the operation determines that the insurance product template contains unpublished insurance product components, the operation 2800 proceeds to act 2874.

At act 2874, the operation notifies the business user of the unpublished insurance product components. Thereafter, at act 2876, the operation may perform a coherency check on the unpublished insurance product components. After successfully completing the coherency check on all of the unpublished insurance product components within the new template, the operation 2800 proceeds to act 2876.

At act 2876, the operation 2800 performs a coherency check on the previously unpublished insurance product components and proceeds to act 2878. At act 2878, the operation 2800 publishes the previously unpublished insurance product components and proceeds to act 2880.

At act 2872, if the insurance product template does not contain any unpublished insurance product components, the operation proceeds to act 2880. At act 2880, the operation may initiate a coherency check on the insurance product template prior to publication. The coherency check of the insurance product components in the insurance product template and the insurance product template is performed prior to publication. After performance of the coherency check, the operation 2800 may proceed to act 2882. At act 2882, the completed insurance product template is published into the library and stored in one of the databases 140, 150. Thereafter, other users may utilize the newly created insurance product template.

Figure 29:
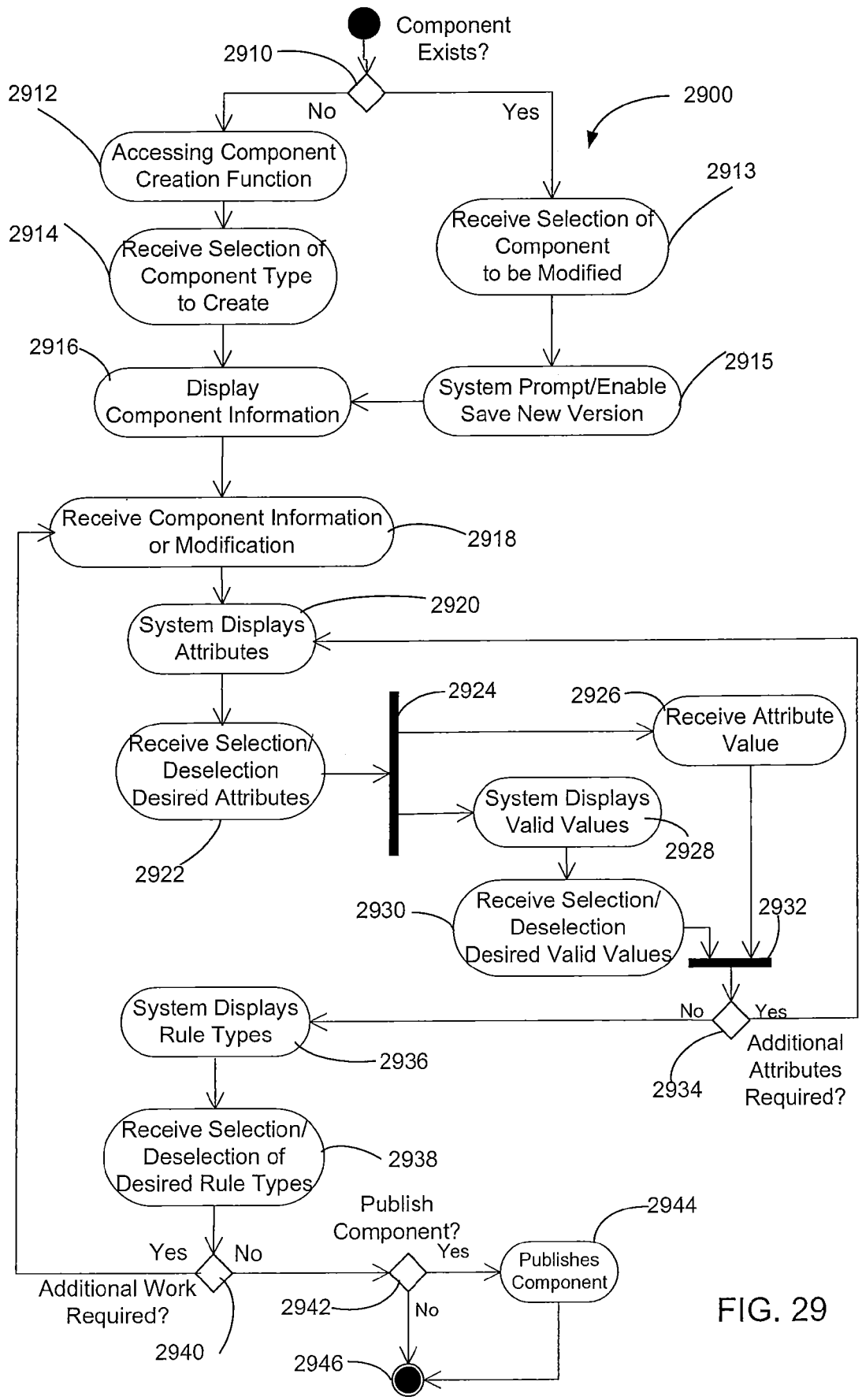
FIG. 29 depicts a system for modifying and creating components of an insurance product offering.

In FIG. 29, an example operational flow diagram creates and modifies components of an insurance product template or insurance product offering. At act 2910, the existence of the insurance product component within the library, to meet the needs of the new insurance product template or insurance product/offering, is determined. If the insurance product component exists, the operation 2900 proceeds to act 2813.

At act 2913, the user portal may receive a selection of an existing insurance product component from the product repository 1812 or the published component library 1722. After selection of the insurance product component, the operation 2900 proceeds to act 2915.

At act 2915, the operation may save the new version of the insurance product component. After the operation saves the new version of the insurance product component, the operation 2900 proceeds to act 2916.

Alternatively, if none of the insurance product components stored in the insurance component library 1702 or product repository 1810 meet the needs of the insurance products, at act 2912, the business user may access the component creation functions to create a component. Thereafter, the operation 2900 continues to act 2914

At act 2914, the insurance product component creation function may receive a selection of a component type to be created. The ICC configuration workstation front end 300 may configure user interface 112 to display a variety of component types available. After receipt of the selection of a component type, the operation 2900 continues to act 2916.

At act 2916, ICC configuration workstation front end 300 may configure the user interface 112 to display the component information of either the selected component type, or the newly saved version of an existing insurance product component. Thereafter, the operation 2900 proceeds to act 2918.

At act 2918, ICC configuration workstation front end 300 may configure user interface 112 to receive component information or modifications to allow the component information. Thereafter, in response to receipt of the component information, the user portal 110 transmits the updated component information to servers 130, and the operation 2900 proceeds to act 2920.

At act 2920, the ICC configuration workstation front end 300 configures the user interface 112 to display the attributes associated with the insurance product component. Thereafter, the operation 2900 proceeds to act 2922.

At act 2922, ICC configuration workstation front end 300 may configured the user interface 112 to receive selections or deselections of desired attributes associated with the insurance product component being created. Thereafter, in response to receipt of selection or deselection of various attributes of the insurance product component, the ICC configuration workstation front end 300 may receive a save indication from the user interface 112. In response to the save indication, the user portal 110 may send the servers 130 the updated attribute information, and the operation 2900 proceeds to junction 2924.

In a first operation, at act 2926, the ICC configuration workstation front end 300 may configure user interface 112 to receive a value for the selected attributes. The operation may receive coverage information including a value for attributes to be assigned. An example user interface, depicted in FIG. 24B, may include the coverage information window 2422, where the coverage information window 2422 may receive a value for attributes to be assigned. After all of the values have been entered, the operation proceeds to junction 2432.

After the values have been entered, the operation 2900 proceeds to junction 2932.

In an alternative operation, at act 2928, the user interface 112 displays predetermined values for each of the attributes or at least a portion of the attributes. For example, As depicted in FIG. 23A, the coverage information window 2312 may include a default value. As an example, the "Coinsurance-Maximum" attribute displayed in the coverage information window 3112 may be assigned a default value of 100. Thereafter, the operation 2900 proceeds to act 2930.

At act 2930, the business user may select or deselect from the list of predetermined values. Based upon the selection or deselection of the desired values, the attribute of the insurance product component is assigned a value. In some instances, the user interface 112 may display a nominal or default value. After the business user completes the assignment of attribute values of the insurance product component, the operation 2900 proceeds to 2932.

Thereafter, at act 2934, the user interface 112 may inquire whether additional attributes are needed to more fully specify the insurance product template. If additional attributes are required to more fully specify the insurance product component, the operation returns to act 2920. Otherwise, if additional component attributes are neither required nor need to be assigned, the operation 2900 proceeds to act 2936.

At act 2936, the user interface 112 displays the rule types associated with the insurance product component. As an example, depicted in FIG. 23A, rule types window 2318 displays the default rule types of "underwriting," "financials," and "credit." As another example, depicted in FIG. 32B, the coverage rules type window 2338 may allow the business user to select previously defined rules. A coverage rule type may allow the business user to select previously developed rules. Thereafter, the operation 2900 continues to act 2938.

At act 2938, user interface 112 may receive selections and deselections to choose a rule type. The selected and deselected component rule types are transferred to the servers 130, which updates the insurance product components. After the rule types have been established for each insurance product component, the operation 2900 proceeds to act 2940.

At act 2940, the user interface 112 may receive a user interface indication that additional work is required to more fully specify the insurance product component. If additional work or modification of the insurance product component is required, the operation 2900 returns to act 2918. If additional work is not required on the insurance product component, the operation 2900 proceeds to act 2942.

At act 2942, the user interface may receive a user interface instruction to either publish or not publish the insurance product component. If the user does not desire to publish the insurance product component, the operation proceeds to act 2946. Alternatively, if the business user desires to publish the newly created insurance product component, the operation 2900 proceeds to act 2944.

At act 2944, the insurance product component is published into the published components library 1722. The published component may be used to develop insurance products or offerings. After the publication of the insurance product component, the operation 2900 proceeds to exit at 2946.

Figure 30A:
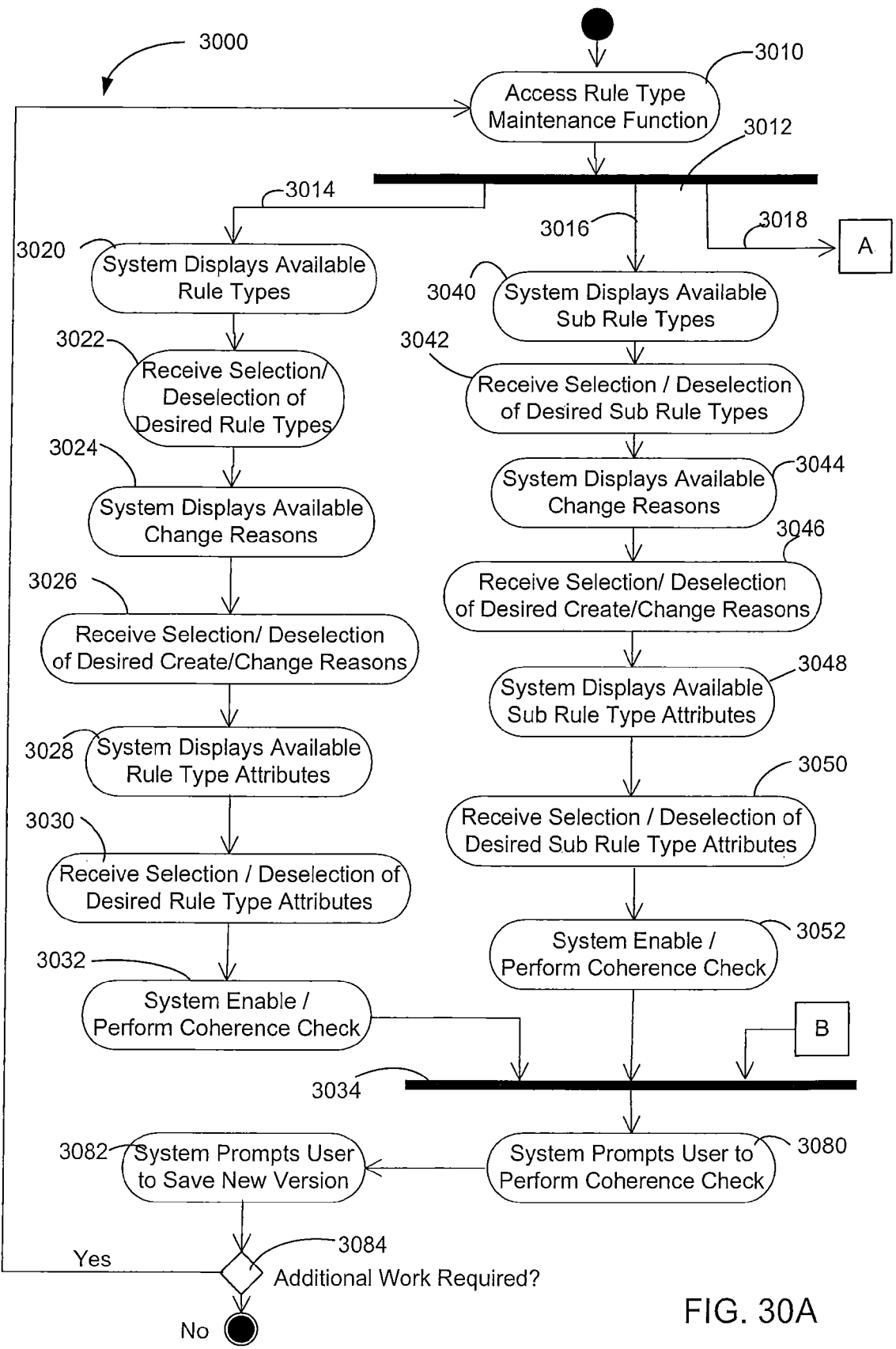
FIGS. 30A and 30B depict a system for creating or modifying rule types within the librarian and product developer library system.
Figure 30B:
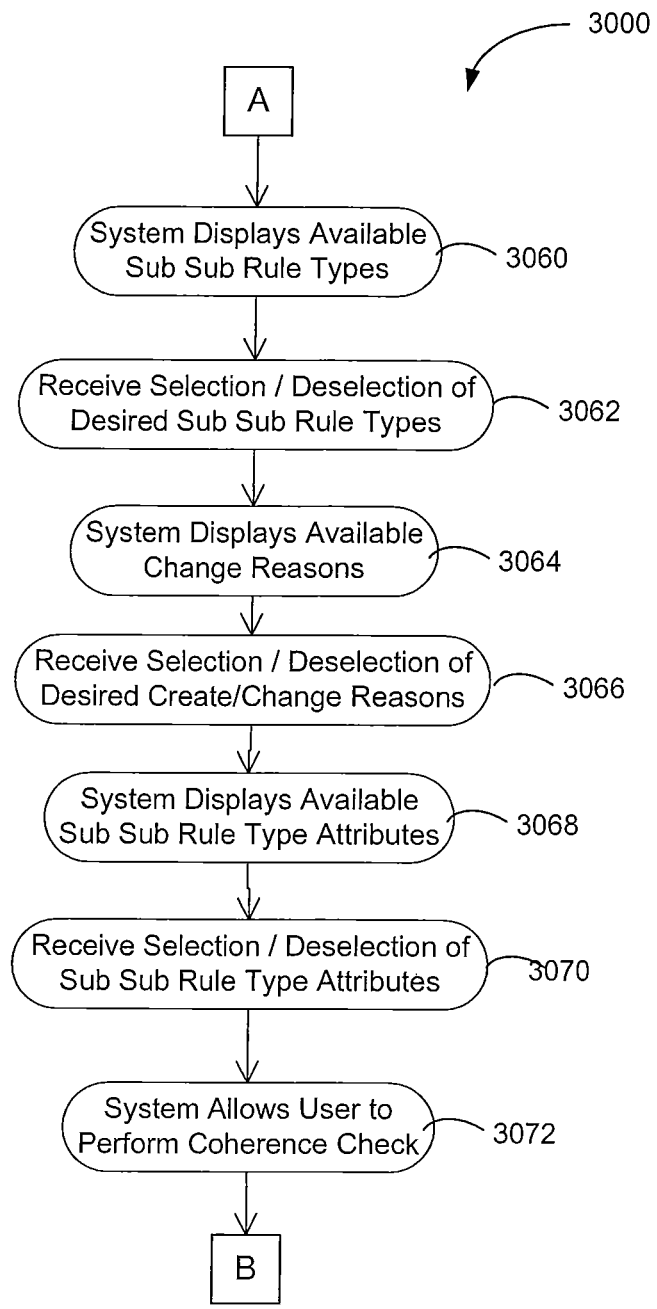

In FIGS. 30A and 30B, an example operational flow diagram creates or modifies rule types of an insurance product component used to develop insurance products or offerings. At act 3010, the business user accesses the rule type maintenance function. After accessing the rule type maintenance function, the operation 3000 continues to junction 3012.

At junction 3012, the business user may follow one of the operations 3014, 3016, and 3018.

If the business user selects operation 3014, at act 3020, the user interface 112 displays the available rule types for a particular insurance product component. Thereafter, the operation 3000 continues to act 3022.

At act 3022, the desired rule types for the insurance product component may be identified based upon selection or deselection of displayed rule types. Thereafter, the operation 3000 proceeds to act 3024.

At act 3024, the user interface 112 may display the available change reasons that the business user may enter to justify the change and provide information to later users of the insurance product component. Thereafter, the operation 3000 proceeds to act 3026.

At act 3026, the selections or deselections of create/change reasons associated with the rule type modification are received and stored. Thereafter, the operation 3000 proceeds to act 3028.

At act 3028, the user interface 112 displays the available rule type attributes. Thereafter, the operation 3000 proceeds to act 3030.

At act 3030, selections or deselections of the displayed rule type attributes are received by user interface 112. Thereafter, at act 3032, the operation 3000 performs a coherency check for the insurance product component with the newly stored rule change.

Otherwise, if the operation 3000 proceeds from junction 3012 to operation 3016, at act 3040, the user interface 112 displays available sub-rule types to the user. At act 3042, the selection or deselection of desired sub-rule types that are displayed on the user interface 112 are received. Upon completion of the selection/de-selection process, the operation 3000 proceeds to act 3044.

At act 3044, the user interface 112 displays available change reasons for the modification of the sub-rule types. Thereafter, the operation 3000 proceeds to act 3046.

At act 3046, the desired create/change reasons to provide documentation for the modification to the sub-rule type of a particular insurance product component may be captured by the user interface 112 and stored in association with the modification. Thereafter, the operation 3000 proceeds to act 3048.

At act 3048, the user interface 112 displays available sub-rule type attributes that may be assigned. Thereafter, the operation 3000 proceeds to act 3050.

At act 3050, the selections and deselections from among the displayed sub-rule type attributes may be captured by the user interface 112. After the attributes are assigned, the operation 3000 proceeds to act 3052.

At act 3052, a coherency check of the modified rule/sub-rule type attributes and insurance product components may be performed. Thereafter, the operation 3000 proceeds to 3034.

If operation 3000 proceeds to operation 3018, at act 3060, the user interface 112 displays the available sub/sub-type rules for an insurance product component. Thereafter, the operation 3000 proceeds to act 3062.

At act 3062, selections or deselections of sub/sub-rule types are captured by the user interface 112. After the selection/de-selection process, the operation 3000 continues to act 3064.

At act 3064, the user interface 112 displays available change reasons that the business user may use to identify the purpose for the modification to the sub/sub-rule types. Thereafter, the operation 3000 proceeds to act 3066.

At act 3066, the user interface 112 may capture selections or deselections of change reasons from the displayed list of desired create/change reasons. After the change reason for the desired change or creation of a sub/sub-rule type is captured, the operation 3000 proceeds to act 3068.

At act 3068, the user interface 112 displays available sub/sub-rule type attributes. Thereafter, at act 3070, the user interface may receive the desired sub/sub-rule type attributes based upon the displayed attributes to further describe or create the performance of the insurance product component. Upon completion of the designation of the sub/sub-rule type attributes, the operation 3000 proceeds to act 3072.

At act 3072, a coherency check of the insurance product component after the sub/sub-rule types may be initiated to verify compliance with the coherency rules. Thereafter, the operation 3000 proceeds to 3034.

From 3034, the operation proceeds to act 3080. At act 3080, the user interface prompts the business user to perform a coherency check of the modified insurance product components prior to saving the changes. After the coherency check is performed, the operation proceeds to act 3082.

At act 3082, the user interface 112 may prompt the business user to save the new version of the insurance product component that includes the newly-created rule types, sub-rule types, or sub/sub-rule types. Thereafter, the operation 3000 proceeds to act 3084.

At act 3084, the operation generates a display on user interface 112 to determine whether additional work is required to further create or modify the rule types associated with an insurance product component. In response to receipt of an indication that additional work is required, the operation 3000 proceeds to act 3010. Otherwise, upon completion of the creation and modification rule types activities, the operation 3000 exits.

Figure 31:
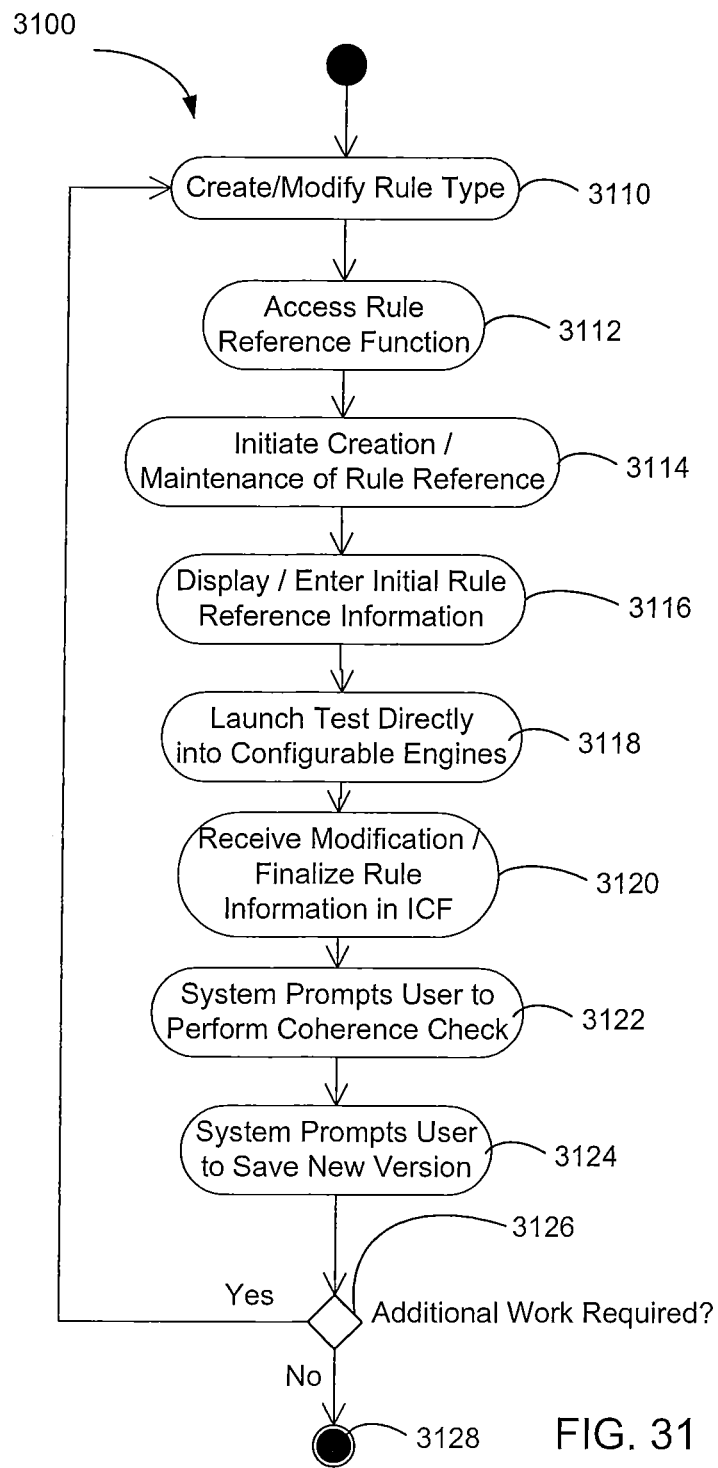
FIG. 31 depicts a system for creating and modifying rule references in the librarian and product developer system.

In FIG. 31, an example operational flow diagram or operation 3100 creates and modifies rule references in the librarian and product developer system. At act 3110, the operation 3100 commences with the creation or modification of rule types. After the rule type is created or modified for a particular insurance product component, at act 3112, a rule reference function is displayed on user interface 112. The rule reference function may display rule references or rule types and the associated links to the rule reference or rule types on the user portal 110. The user portal 110 may be further configured to receive an input from the business user to specify a desired new rule reference function, code description for a selected rule reference, or rule type. Thereafter, the operation 3100 proceeds to act 3114.

At act 3114, the ICC core 310 executed on servers 130 may initiate creation/maintenance of the rule reference. After the rule reference function is initiated, at act 3116, the user interface 112 may display the initial rule reference information for the business user to review. In addition, the user interface 112 may receive entries to the initial rule reference information or modifications to the rule reference information.

In response to receipt of the initial rule reference information and review of the work, the operation proceeds to act 3118. At act 3118, the ICC core 310 executed on servers 130 may launch the rule into the target engines 160 in order to test the rule. The business user may launch directly into the engines to verify the proper function of the created or modified rule type. The adapter component may retrieve the rule reference or rule type information from the network 180 and determine an appropriate engine to create an engine object in the memory of at least one of the engines 160. Thereafter, the ICC core 310 may determine the links available in at least one of the engines 160 to be associated with a particular rule reference or rule type. After determination of the available links and resources in the engines 160, the ICC core 310 may perform a coherence check to verify that the rule type or rule reference is supportable by the engines 160.

After reviewing the results provided by the engines at act 3120, the business user may modify or finalize the rule information through the user interface 112. Thereafter, the operation proceeds to act 3122.

At act 3122, the operation prompts the business user to perform a coherency check of the modified rule type and underlying insurance product component. Upon completion of the coherency check, at act 3124, the operation prompts the business user to save the new version of the rule type.

At act 3126, the user interface may prompt the business user to indicate whether additional work is required. If additional work is required, the business user returns to act 3110. Otherwise, the operation exits to 3128.

In FIG. 32, an example of user interface 112 includes a Schedule Model Execution user interface 3200. Selection of the Schedule Model Execution link 964 of the product development portal 902 requests the servers 130 to provide the user interface 112 with a Schedule Model Execution user interface 3200, as depicted in FIG. 32.

In response to selection of the Schedule Module Execution link 964, the user interface 112 displays the Schedule Model Execution user interface 3200. The Schedule Model Execution window 3210 may include a Model Execution Name 3212 configured to receive a name for the model execution name 952, as depicted in FIG. 9.

In addition, the Schedule Model Execution user interface 3200 may include a Products Window 3220 to specify different products, such as different versions of a product. For example, the Product a first product version is "BOP-WA Version 11" and a second product version "BOP-WA Version 12." In response to selection of a version of the selected product, the System ICC Book of Business Test Environment 640 is configured to schedule execution of a test of the selected product. As depicted in FIG. 9, the My Model Executions window 950 depicts the execution of the "BOP WA Rev 1 Exec 1" model using a "WashingtonBOP.dat" dataset. In addition, the My Model Executions window 950 may display the status of the model execution.

The Schedule Model Execution user interface 3200 may also include a data set interface 3230. The data set interface 3230 may receive a specified data set to be used during module exaction. The data set interface 3230 permits the business user to specify the data to be used during model execution. For example, the data set entry 3230 may include a data set sub-menu 3232, which specifies various options.

As another example, the data set sub-menu 3232 may include a data set for an enforced product, proposed, expired, and/or any other data sets. In response to selection of an entry of the data set sub-menu 3232, the System ICC Book of Business Test Environment 640 is configured to execute the model test based upon the type of data set specified in the data set sub-menu 3232.

The data set entry menu 3230 may further provide a request new data set link 3234. The request for new data set link 3234 may permit the business user to navigate to a data set stored in a data memory such as the ICC core 612 that is accessible by system 10.

The Schedule Model Execution user interface 3200 may further include a schedule menu 3240. The schedule menu 3240 may include entries to specify when the module execution should be run in the book of business test environment 640. Illustratively, the scheduled menu 3240 may provide for the options of immediately 3242, overnight 3244, or date 3246.

The option for immediately 3242, requests that the ICC design and configuration environment 230 immediately invoke and execute the simulation of the specified model product on the book of business impact modeling test environment 640.

Alternatively, the overnight option 3244 may allow the business user to schedule a batch operation to execute during non-peak hours, thereby saving computing time and cost.

After the business user has specified the entries displayed in the Schedule Model Execution user interface 3200, the business user may select the "Complete" button 3250. In response to selection of the complete button, the ICF returns the business user to the product development portal user interface 902.

Referring back to FIG. 9, after the execution of the product model within the book of business (impact modeling) test environment 640, the status of the associated module execution name entry is updated. The product model may be deployed into a model of an insurance production environment to develop insurance product validation performance information based upon a set of predetermined test data. The business user of the product development portal user interface 902 may select the view results link 962 to review the results of the simulation provided by the book of business impact modeling test environment 640.

In response to selection of the view results link 962, the user portal 110 transmits a request to servers 130 to provide a review model execution results/model execution summary user interface 3300 in the user interface 112.

Figure 33:
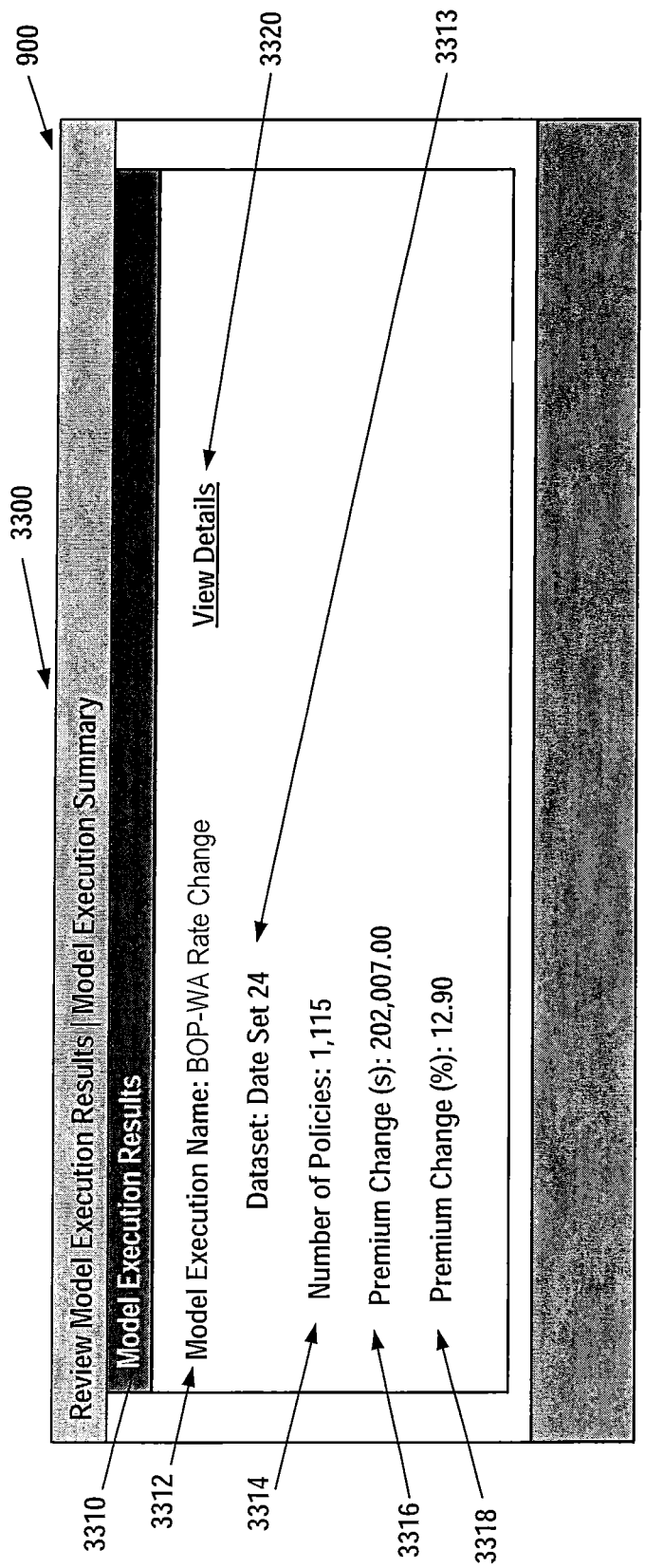
FIG. 33 depicts a review module execution results and module execution summary within the Insurance Configuration Facility (ICF) of FIG. 10.

In FIG. 33, an example of the user interface 112 includes a model execution results user interface 3300 displays a model execution results window 3310. The model execution results window 3310 may include a model execution name 3312, data set 3313, number of policies 3314, premium change ($) 3316, and premium change (%) 3318.

The model execution name 3312 specifies the model that was simulated using the book of business impact modeling test environment 640 and a corresponding data set 3313 as specified by the user. In addition, the Model Execution Results user interface 3310 may display important or key information that describes the business impact of the insurance product offering being evaluated.

The Model Execution Results interface 3310 may display the number of policies 3314 that were considered during the execution of the simulation. In addition, the business user may immediately view the expected financial results as predicted by the book of business impact modeling test environment 640. For example, Model Execution Results interface 3310 may display the premium change parameters 3316 and 3318. The premium change parameter 3316 displays the predicted/projected overall dollar impact of the insurance product or offering. The premium change parameter 3316 may display the predicted/projected percentage yield of the investment. Accordingly, the Model Execution Results interface 3310 may provide a business user developing with insurance product validation performance information. The insurance product validation performance information may for a product or offering regarding a potential client may include, for example, an estimated dollar return from the net premium charged and the potential yield.

The business user may further view the details of the simulation by selection of the view details link 3320. In response to selection of the view details link 3320, the servers 130 may provide the user interface 112 with a web-based document that contains details of the simulation including internal data, external data and/or key assumptions.

As an example, system 10 may receive inputs from a business user, via user interface 112, to the ICC configuration workstation front end 300. For the purposes of this example, the terms user interface 112 and ICC configuration workstation front end 300 may be used interchangeably. Based upon the input to the user interface 112, the system 10 may create or develop insurance products based upon reusable product/offering definitions. The reusable product/offerings definitions may include reusable insurance based components 810 and templates 830, which permit a business user system 10 to develop and configure insurance products based upon a hierarchical set of insurance product components. An example of the hierarchical set of insurance product components is the arrangement of insurance product components 832, 834, and 836 within insurance product template 831. The relationship between insurance product components 832, 834, and 836 describe a hierarchical tree structure or framework, which define the framework or structure of the insurance product template 831.

Depending upon the product need, additional insurance components may be further included to provide a desired level of componentization, flexible granularity, and reusable product structure. The flexible granularity may permit a business user to more rapidly and predictably generate insurance product configurations and flexibly tailor the insurance products or offerings to meet a specific customer or market need.

As another example, system 10 may include a servers 130 in communication with a network 180. The servers 130 may be further configured to interface with an insurance component library database 1710 and an insurance product database 1810, which are stored in network accessible memory databases 140 and 150. The insurance component library database 1710 may store a plurality of insurance product components 820. The insurance product database 1810 may also store at least one insurance product 842. The servers 130 may be further configured to communicate with a plurality of configurable engines 160. The user portal 110 may communicate with the servers 130 via the network 180. The user portal 110 may also generate an insurance product development interface to display at least a portion of the database that stores the insurance component library database 1702.

User portal 110 may receive a first selection of a first insurance product component. In response to selection of the first insurance product component, the user portal 110 may request information associated with the first insurance product component from the servers 130. In response to receipt, by the user portal 110, of the requested information, the user portal 110 may display an attribute associated with the first insurance product component. The user interface 112 may be further configured to receive an assignment of a value to an attribute, which is associated with the first insurance product component or which governs the operation of the first insurance product component.

Similarly, the user portal 110 may receive a second selection of a second insurance product component from the plurality of insurance product components displayed on the user portal, the user portal further configured to receive an assignment of a component relationship between the first insurance product component and the second insurance product component. Thereafter, the user portal 110 may receive a first selection of a first rule type for the first insurance product component. As an example, the first rule type may be associated with a first configurable content resident on one of the plurality of configurable engines.

The user portal 110 may store an insurance product in the insurance product database 1800 as a function of the first insurance product component, the second insurance product component, the assignment of the component relationship between the first insurance product component and the second insurance product component, and the first rule type for the first insurance product component.

Alternatively, or in addition, the user portal 110 may receive a modification request to change the component relationship between the first insurance product component and the second insurance product component. In response to the modification request, the servers 130 may determine whether the modification request is allowable. In response to the determination by servers 130 that the modification request is allowable, the user portal 110 may receive an indication from the servers 130 that the component relationship between the first insurance product component and the second insurance product component is changed.

As another example operation of system 10, the user portal 110 may store the newly defined version of a previously defined insurance product in the insurance product database 1800. The operation of the new version of the insurance product may be created as a function of the first insurance product component, the second insurance product component, the assignment of the component relationship between the first insurance product component, and the second rule type for the second insurance product component.

System 10 may be further configured to permit a business user to request information regarding a selected insurance product component. As an example, the user portal may receive a selection of the first insurance product component via the user interface 112. In response to selection of the first insurance product component, the user portal 110 may request information associated with the first insurance product component. Either after or in response to receipt of the information associated with the first insurance product component, the user portal 110 may display the first rule type associated with the first insurance product component on user interface 112. The displayed associations may be based upon the requested information associated with the first insurance product component.

If the business user desires to change the rule type associated with the first insurance product component, the user portal 110 may receive a new selection of the first rule type for the first insurance product component. In response to the new selection of the first rule type for the first insurance product component, the user portal 110 may send the requested change to servers 130. Thereafter, servers 130 may associate the first rule type with a third configurable content resident on one of the plurality of configurable engines 160.

Alternatively, the business user may select one of a plurality of insurance templates 831 stored a template library 830. Each of the insurance product templates include a plurality of hierarchically associated insurance product components. For example, the first insurance product component may be or include an insurance product template, wherein the insurance product template includes a plurality of hierarchically associated insurance product components.

In response to receipt of a request from the user portal 110 to store the modified or new insurance product, the servers 130 may validate coherency of the first insurance product component and the second insurance product component. Based upon validation of the coherency of the first insurance product component and the second insurance product component, the servers 130 is may provide an indication that the components passed or failed the coherency check. Thereafter, the user interface 112 may prompt the business user to store the insurance product in the insurance product database 1800.

As another example, the system 10 may include a servers 130 having one or more processors in communication with a tangible media or memory. The tangible media or memory may include computer program code executable on one of the processors to create or modify an insurance product component, template, or product. The computer program code may further include instructions to create or store a plurality of insurance product components configurable to form an insurance product, where each of the insurance product components includes a component type table, a component type relationships table, a component type attribute table, and a component type rule types table, as described relative to FIGS. 5-7, and FIGS. 8A and 8B. The computer instructions may be carried out to implement the various examples and systems described herein. For example, the computer instructions may be executed by the processor of servers 130 to store in the component type relationships table of each of the insurance product components at least one relationship to another of the insurance product components.

The respective relationships in each component type relationships table, created or stored by the servers 130, may describe a hierarchical relationship structure of the insurance product. To further develop the insurance product components, the servers 130 may execute computer instructions to store, in the memory of the servers 130, at least one attribute entry in each component type attribute table of each of the components of the insurance product, where each attribute describes an aspect of the insurance product. The servers 130 may further execute to store an association to a configurable content resident on one of a plurality of configurable engines 160 in the component type rule types table of each of the components of the insurance product.

An example association may include a network address, an internet address, or a Universal Resource Locator (URL). The association to the configurable content resident on one of the plurality of configurable engines 160 may includes a network designator configured to invoke a process on one of the configurable engines.

An example component type table 810 of at least one of the components of the insurance product may describe a product component type, a line of business component type, or a coverage component type, as depicted in FIG. 8A. The component type attribute table may, for example, include an attribute entry for a deductible amount, a co-insurance amount, a limit amount, or a combination thereof.

The insurance product components of the insurance product include a component type rule type relationship table. At least one of the component type rule types tables includes a sub-rule which is associated with configurable content resident on one of the plurality of configurable engines 160.

The servers 130 may also execute instructions to modify an entry of the component type rule types table of one of the components of the insurance product. After the modification, the servers 130 may automatically, or upon receipt of a user interface input, verify the modified entry to the component type rule types table as a function of a test with one of the plurality of configurable engines 160. In response to receipt of a response from the one of the plurality of configurable engines, the servers 130 may determine whether the response from the one of the plurality of configurable engines indicates that the modified entry to the component type rule types table passed the test.

As another example, the servers 130 may execute computer executable instructions stored in a server memory to access an insurance product component database comprising a plurality of insurance product components configured to represent portions of an insurance product. The servers 130 may be configured for creating at least one hierarchical relationship between the first insurance product component and a second insurance product component. The hierarchical relationship may describe a structural relationship of the insurance product, as depicted by the insurance product template 831 of FIG. 8. The relationship between insurance product components 832, 834, and 836 are hierarchically related in a structure that forms at least part of a Product BOP.

Thereafter, the servers 130 may be configured to associate the first insurance product component with at least one of a configurable content resident on one of a plurality of configurable engines 160. Each of the insurance product components may include a component type relationships table, a component type attribute table, and a component type rule types table, as depicted in FIG. 8A.

Figure 34:
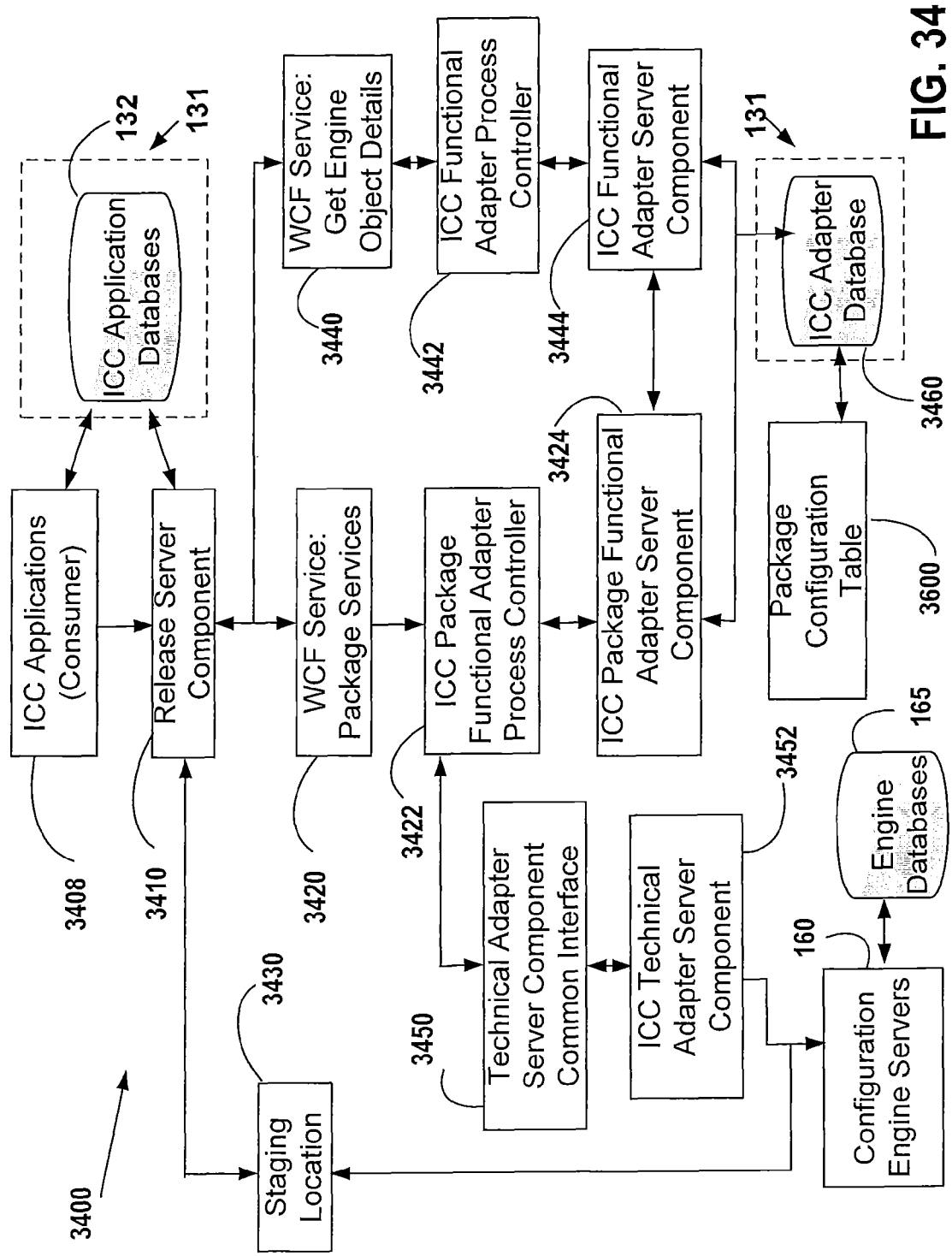
FIG. 34 depicts an example deployment system.
Figure 35:
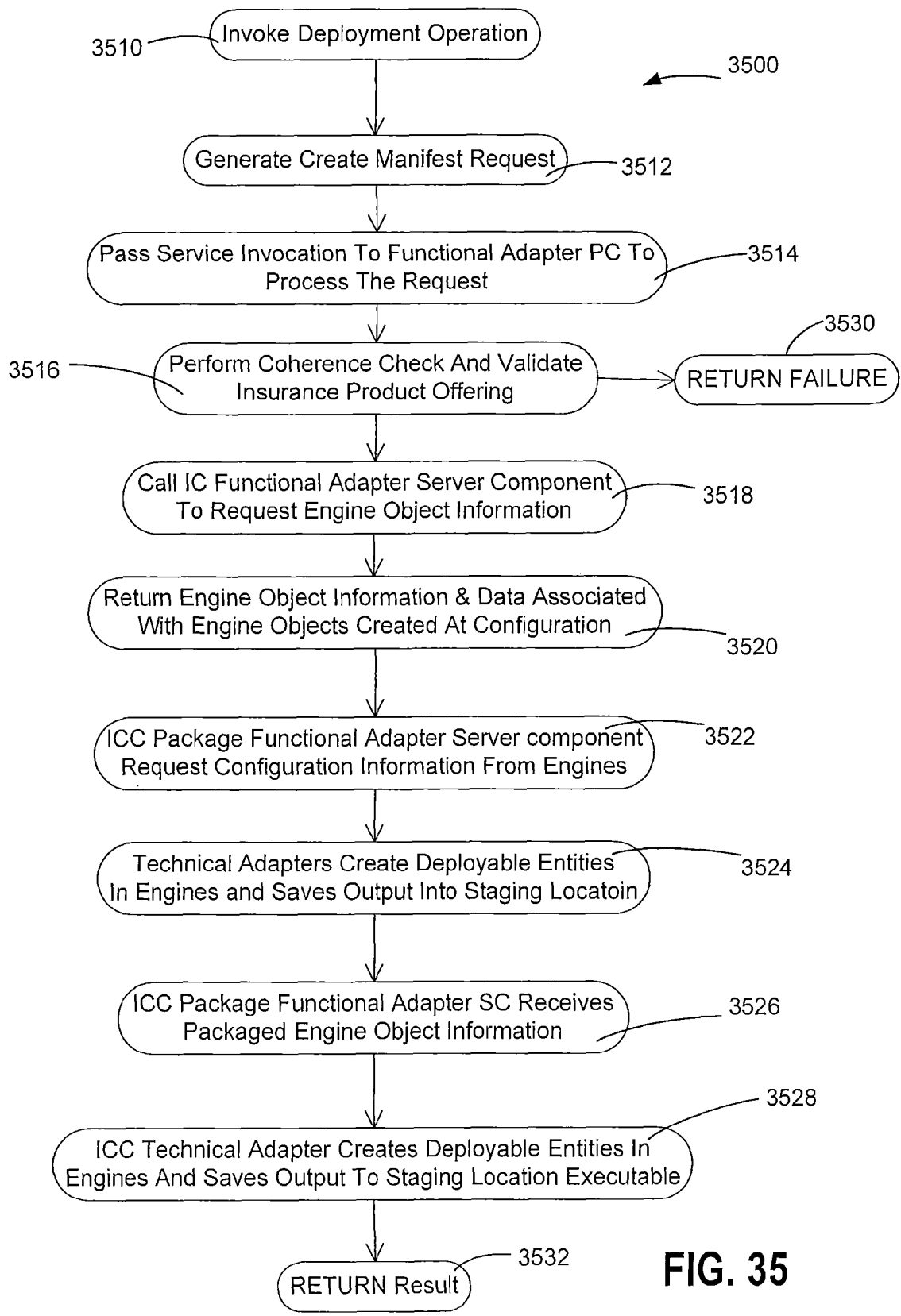
FIG. 35 depicts an example operation of the deployment system of FIG. 34.

In FIG. 34, an example ICC design and configuration environment 230 (FIG. 2) includes an ICC deployment system 3400 executable by one or more servers 130 (FIG. 1). The ICC deployment system 3400 may be executed by the servers to perform a deployment operation 3500, as depicted in FIG. 35. The ICC deployment system 3400 and the ICC deployment operation 3500 will be described with reference to FIGS. 1-33 and the pending U.S. patent application Ser. No. 12/331,689, entitled "Adapter Services," which is hereby incorporated by reference in its entirety.

Figure 40:
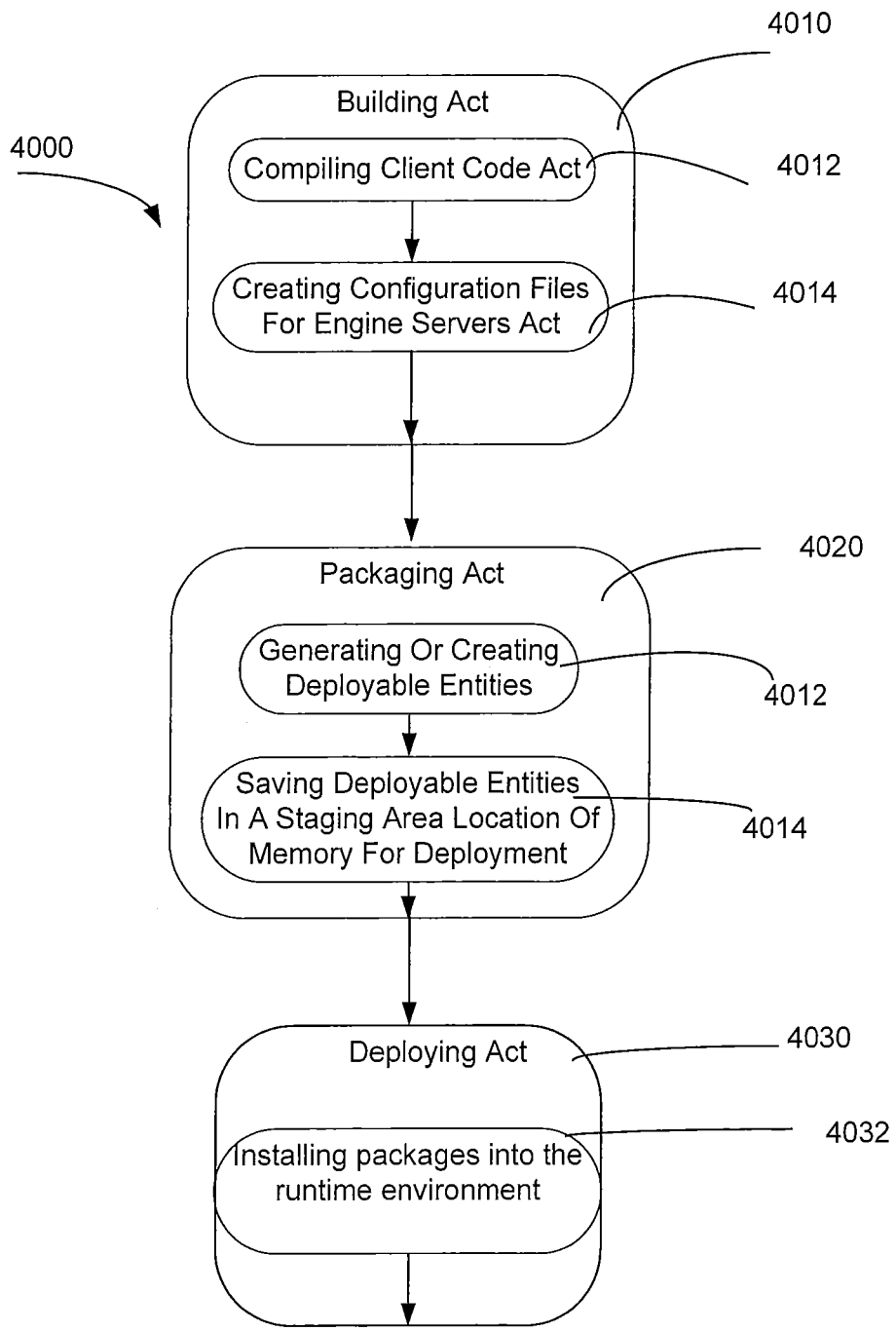
FIG. 40 depicts an example operational flow diagram for building, packaging and deploying a deployable entity for an insurance product offering.

As an example, in FIG. 40, the deployment of an insurance product offering including one or more ICC insurance product components or ICC applications 3408 into the ICC runtime environment 240 (FIG. 2) may include a building act 4010, a packaging act 4020, and a deploying act 4030. In the ICC deployment system 4000, the building act 4010 may include a compiling client code act 4012 and creating configuration files for engine servers act 4014. The packaging act 4020 may include a generating or creating deployable entities act 4022 and a saving deployable entities in a staging area location act 4024. The compiling of client code act 4012 and creating configuration files for the engine servers act 4014 may be referred to as configuration of the engine servers 160. The creation and saving of deployable entities may include "packaging" or creating a "package" or "package manifest" of executable code, including client code, for the runtime environment 240. The deployment act 4030 prepares the insurance product offering to be executable in the ICC runtime environment 240 by the servers 130, as depicted in FIGS. 1 and 2. The deployment act may also include installing the "packages" into the runtime environment 240 at act 4032. The ICC design and configuration environment 230 may include functions for initiating and overseeing the installation of the packages created and saved during the packaging act 4020 as well as supporting the build act 4010 and the deployment act 4030.

Figure 36:
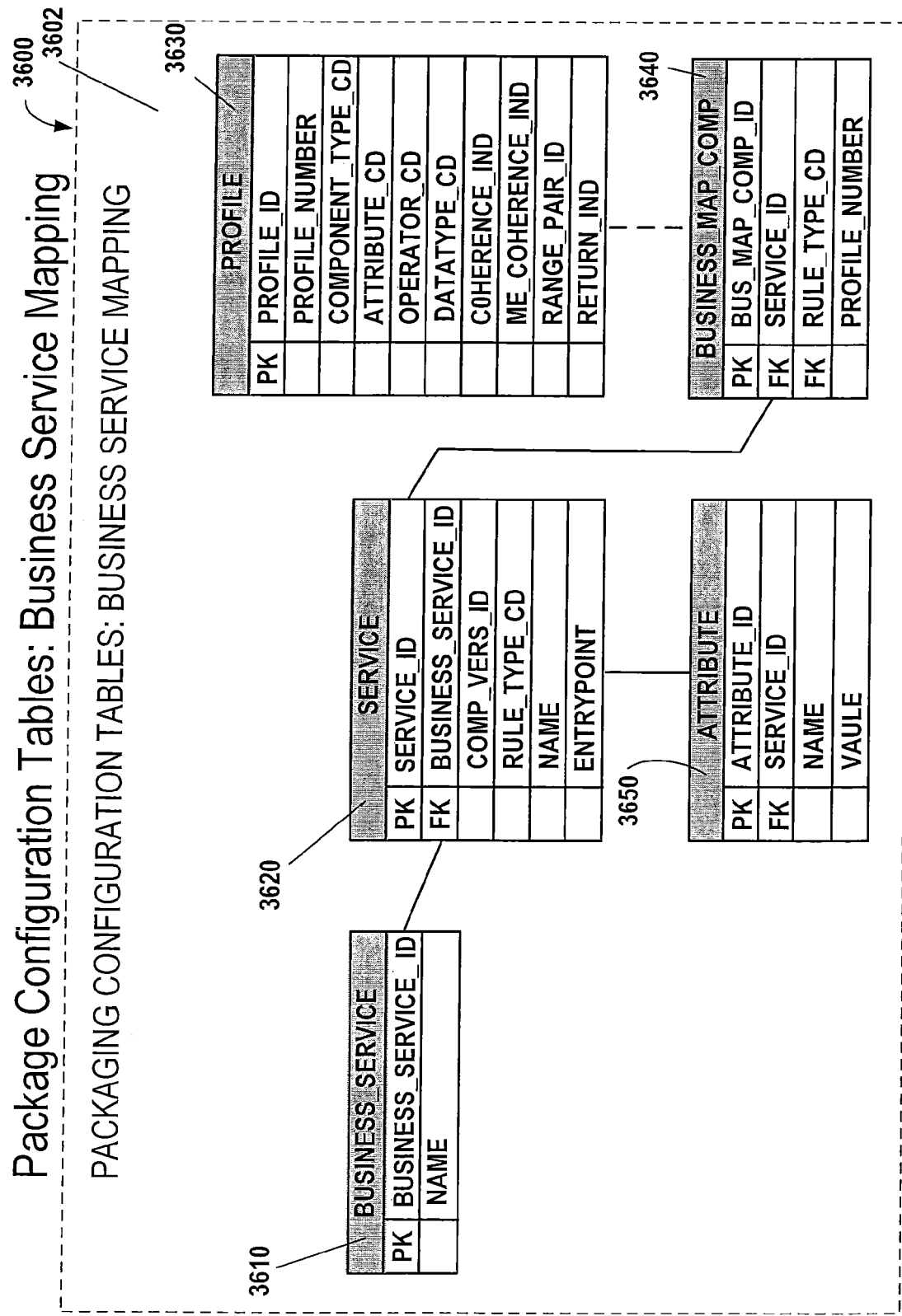
FIG. 36 depicts an example of a business service mapping.

In FIG. 34, the ICC package functional adapter server component 3424 and the ICC functional adapter server component 3444 may access the ICC adapter database 3460. The ICC adapter database 3460 may include the packaged deployment configuration tables 3600, as depicted in FIG. 36. In addition, in some examples, the ICC adapter database 3460 may include or be associated with the ICC applications database 132. The ICC adaptor database 3460 may further include engine mapping information. The engine mapping information may be accessed by the ICC functional adapter server component 3444. The engine mapping information may include pointers or links to engine objects that reside in the configuration engines 160.

As depicted in FIG. 34, the high level packaging process and high-level adapter application architecture will be explained. The ICC deployment system 3400 may include the ICC applications 3408 and the release server component 3410 in communication with the ICC application databases 132. The ICC applications 3408 may be created within the ICC design and configuration environment 230 and stored in the ICC Application databases 132 as part of a new insurance product offering to be deployed. The ICC applications 3408 may be provided to the release server component 3410. The release server component 3410 may communicate and interoperate with the package services module 3420, operable with package services such as Windows Communication Framework® (WCF) based package services, and the ICC application databases 132.

The ICC deployment system 3400 may be divided into three areas. The first area includes the deployment related aspects of the release server component 3410. The second area includes an ICC package functional adapter server component 3424. The third area includes an ICC technical adapters server component 3452 for the configuration engine server 160. As one example, the ICC technical adapters server component 3452 may include support for a Blaze® brand engine server. An another example, the ICC technical adapter server component 3452 may include support for a function adapter for the InsBridge® brand engine server. The technical adapter for the Blaze® brand engine server and the InsBridge® brand engine server may each be an example of a configurable engine server implementation of one of the configurable engine servers 160.

The mapping of business services 3610 to be deployed may be provided by the package configuration tables 3600, depicted in FIG. 36. As an example, the package configuration tables 3600, may be configuration tables. The package configuration tables 3600 may be populated manually. Alternatively, the package configuration tables 3600 may be populated automatically, or some combination of automatic and manual population. Although flexible, the functionality that the ICC system 10 provides via the ICC technical adapter server component 3452 may be restricted by the APIs of third party engine servers 160 used within an insurance product offering set for deployment.

The release server component 3410 may be responsible for maintaining the specific releases and the corresponding list of ICC insurance product components or applications 3410 within an insurance product offering. An example ICC insurance product component or application 3410 may be included in an insurance product offering or insurance product line of business (LOB), which a product developer may flag as a candidate for deployment or testing.

When a business user indicates that a model execution job is ready to be scheduled for an insurance product offering or ICC application 3408, through the user interface 112, the business user may request that the ICC deployment system 3400 create a package for the selected insurance product offering. The resulting output from the ICC deployment system 3400 may be referred to as a release deployment, a package manifest, or a package for deployment. A release may be defined as an insurance product offering package that contains all the necessary callable executables and/or engine objects that may be deployed into the ICC runtime environment 240 for use in conjunction with other third party systems and/or legacy systems as an insurance product.

An example ICC runtime environment 240 may include a commercial environment such as a computing system having servers that allow a commercial enterprise, such as an insurance company to offer an insurance product offering for sale. Another type of runtime environment may include "Test," where the packages for deployment may be tested prior to being deployed into an insurance production environment for commercial purposes. In the test environment, such packages may not only be tested for functionality within the package, but also with respect to any third party engines/software/data and/or any other legacy systems with which the package must interface to be fully functional. As an example, the user may select a link in the actions window 2510 of the user interface 112 to schedule a model execution job. The model execution job may be selectively run in a "sandbox environment," which is used for modeling and further development of insurance product offerings.

The release server component 3410 may generate a create manifest request to generate a manifest or manifest package. The create manifest request may include a detailed list of the insurance product components or applications 3408 and the attributes of each of the insurance product components 3408 included in a particular insurance product offering. At various points during the insurance product development, the ICC system 10 may perform a coherency check. The type and degree of the coherency check may depend upon the development lifecycle or lifecycle status of the insurance product components and/or the insurance product offering. For example, the coherence check may occur at any point in the preparation of a model execution or a release. Passing the coherency check may be a prerequisite for proceeding to the packaging act 4020, depicted in FIG. 40.

The release server component 3410 may be responsible for invoking the package services module 3420. The package services module 3420 may include a common interface in the adapter layer that handles all interactions with third party engines 160 related to packaging.

As described above, an insurance product offering may include insurance product components 3408 that are associated by an insurance product framework. In FIG. 36, a data model 3602 that relates to the insurance product offering to be deployed may include a set of package configuration tables 3600 that represent the insurance product framework. The package configuration tables 3600 may include a business service table (Business_Service) 3610, a services table (Service) 3620, a profile table (Profile) 3630, a business map component table (Business_Map_Component) 3640, and an attributed table (Attribute) 3650.

In order to create a manifest and perform a coherence check for the insurance product offering, the release server component 3410 may determine the specific insurance product components 3408 being deployed. As further depicted in FIG. 36, the business user may indicate one or more "Business Services" 3610 to be deployed. The Business Services may be associated with a series of configuration tables, such as SQL tables, containing additional information.

In response to generation of a create manifest request, the release server component 3410 may invoke an ICC package functional adapter server component 3424, on the servers 130, via the package service 3420. The release server component 3410 may also generate a create manifest request to generate a manifest or manifest package. The create manifest request may include a list of insurance product components 3408 and related meta data included in the insurance product offering. The meta data may include insurance product component meta data and attributes for each of the insurance product components 3408 used in the insurance product offering.

The insurance product component meta data may also include information regarding the parent insurance product components and any other ancestor insurance product components back to a root insurance product component. An ancestor insurance product component may be an insurance product component from a proceeding generation of insurance product components, such as those used in another insurance product offering. For example, the ancestor insurance product component may be a grandfather or great grandfather component. A root insurance product component may be the first family member in a family of insurance product components, where succeeding generations inherit properties from the preceding generation of insurance product components. The meta data may also include information related to, or descriptive of, the insurance product framework or structure within which the ancestor insurance product component was included. As an example, the meta data may include information to specify the branches and nodes of the insurance product framework and identify the insurance product components attachment location to a branch. The create manifest request meta data may further include information describing the insurance product structure within which the particular ancestor insurance product was included. As an example, the meta data may include the attributes of the other insurance product components, the detailed list of the other insurance product components, and insurance product framework information.

The release server component 3410 may pass, to the ICC package function adapter server component 3424, a comprehensive list of the ICC insurance product component versions of the ICC applications 3408 contained in the insurance product offering to be deployed or released, tested, or modeled. Based on the list of ICC applications 3408, the ICC package functional adapter server component 3424 may determine which engine servers 160 may be used during runtime of the insurance product offering. After the ICC package functional adapter server component 3424 determines which engines 160 may be used during runtime execution of the insurance product offering, the ICC package functional adapter server component 3424 may identify relevant engine data to be extracted from the insurance product components 3408 and insurance product framework of the insurance product offering. Thereafter, the servers 130 execute the ICC package functional adapter server component 3424 to extract the relevant data and create a manifest for the insurance product offering.

Figure 39:
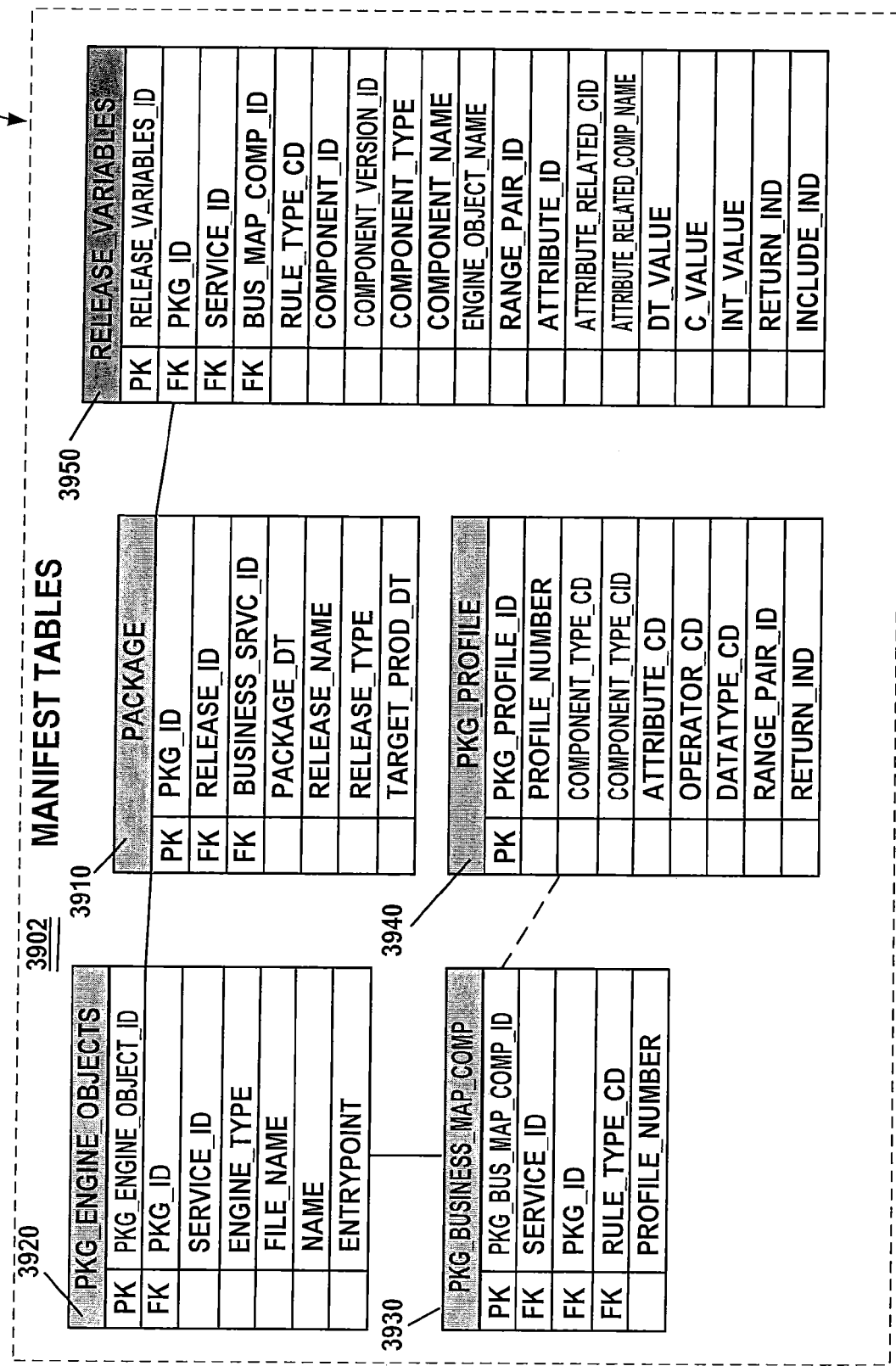
FIG. 39 depicts an example manifest table of a packaged manifest.

The manifest generated by the servers 130 may include a series of XML and text files that are used to confirm the functionality and/or coherency of the insurance product offering. The manifest may also include associated variables and other related information and records used in operation of the insurance product offering. In addition, the manifest may include stored information created prior to and during functionality and coherency checking of the insurance product offering. The manifest may be organized in a plurality of categories. An example database listing representative of a sample of the categories of executables and data included in a manifest 3900 is depicted in FIG. 39. The insurance provider test package manifest 4340, depicted in FIG. 43, may include the manifest 3900.

Referring to FIG. 36, to accomplish these operations, the ICC package functional adapter server component 3424 may be executed by the servers 130 to analyze the package configuration tables 3600 to determine the business services, identified in the business service table 3610, that may be deployed. The business service identified in the business service table 3610 may be passed from the release server component 3410 to the ICC package functional adapter server component 3424. The package configuration tables 3600 may be used to inform the ICC package functional adapter server component 3424 of the third party engine servers 160 that may be invoked to execute parts of the insurance product offering during any runtime environment execution, such as during runtime model execution, commercial operation, or testing.

The package services module 3420 may receive a create manifest request from the release server component 3410. In response to receipt of the create manifest request from the release server component 3410, the package services module 3420 may call the ICC functional adapter process controller 3422, which passes the create manifest request to the ICC package functional adapter server component 3424.

In response to the create manifest request, the servers 130, may execute the ICC package functional adapter server component 3424. The ICC package functional adapter server component 3424 identifies engine services for each of the third party engine servers 160 that need to create engine objects or executables to interface with the insurance product offering. Thereafter, the ICC package functional adapter server component 3424 calls the ICC technical adapter server component 3452 for each of the identified engine services of the engine servers 160 when operation of third party systems is needed by the insurance product offering. The servers 130 store the engine object or executable in the staging location 3430.

In addition, the ICC package functional adapter server component 3424 is executed by the servers 130 to generate information to include in the manifest 3900. The manifest 3900 may contain specific information for each of the identified engine services that are used to create the engine objects or executables. The manifest 3900 may also contain specific information for each of the insurance product components 3408 and the insurance product structure of the insurance product offering provided by the release server component 3410. The processing described below may be performed for each business service associated with the insurance product offering. The business service may be associated with one or more engine services defined or created in the package configuration table 3600. The engine services may be provided by the identified third party engine servers 160.

The ICC package functional adapter server component 3424 may determine which third party business services 3610 are being packaged for release in the insurance product offering based upon the package configuration tables 3600. Based upon information contained in the create manifest request, the ICC package functional adapter server component 3424 may be executed to retrieve a list of all the services 3620 and business map components 3640 and their associated conditions that may need to be packaged in the insurance product offering. For example, each business map component 3640 may be associated to one or more rule types as specified by the business user through the insurance product development portal 900.

Based upon the association to a rule type, the ICC package functional adapter 3424 may be executed to iterate through a component list of insurance product components 3408 associated with the insurance product framework that are tagged for deployment. The ICC package functional adapter server component 3424 may determine whether the insurance product components 3408 included in the component list are coherent. The servers 130 may analyze the package configuration tables 3600 to determine whether the insurance product components satisfy entries of the profile table 3630.

Each business map component 3640 may be associated, by database relationships, to a "profile", which may include a series of records on the profile table 3630. The "profile" may specify which attributes in the product hierarchy are required for the business map component 3640. Each map component included in the business map component table 3640 may include a rule type code entry that specifies a rule type, where the rule type corresponds to an engine object in one of the engine servers 160. Based upon the profile table associated with each business map component 3640, the package function adapter server component 3424 may interrogate each of the insurance product components 3408 in the insurance product structure to determine whether each of the insurance product components 3408 includes a rule type that matches the rule type associated with the business map component 3640. If there is a matching rule type, the ICC package functional adapter server component 3424 may traverse the insurance product offering hierarchy and validate that the attributes in the profile table 3630 are assigned a valid value in a logically corresponding insurance product component 3408. If a value for the attribute in a logically corresponding insurance product component 3408 is invalid or not present, the package function adapter server component 3424 may raise an exception and return a failure notification to the release server component 3410.

If there is a match, then the information of the insurance product component 3408 may be saved into a category of the manifest 3900, such as the "RELEASE_VARIABLES" category 3950, depicted in FIG. 39. In addition, the package business mapping component category 3930 may be included as part of the manifest 3900. In other examples, executables and other information within the package business mapping component category 3930 are not generated.

The ICC package functional adapter server component 3424 may also generate a configuration information request. The configuration information request may be passed through the technical adapter server component common interface 3450 to the ICC technical adapter server components 3452 associated with the third party engine servers 160. The ICC technical adapter server components 3452 associated with the third party engine servers 160 may be identified by the contents of the package configuration tables 3600, as previously discussed.

The ICC technical adapter server components 3452 may instruct the identified third party engine servers 160 to create callable executables or engine objects that are relevant to the insurance product offering being prepared for deployment or release. For example, the Blaze® brand engine server may include callable ability office database (ADB) executables, herein referred to as an ADB file. The executables and engine objects may be referred to interchangeably as examples and not by way of limitation.

The configuration information request may include storage instructions to direct the ICC technical adapter server components 3452. The storage instructions may include a file path to a location in the staging location 3430, where the executables for the third party engine servers 160 are to be placed. The staging location 3430 may be a located on the servers 130. In addition, the ICC technical adapter server components 3452 may return the packaged engine object information to the package functional adapter server component 3424. The packaged engine object information may include packaged engine object identifiers that correspond to insurance product components 3408 contained in the list of components extracted from the create manifest request.

The ICC package functional adapter server component 3424 may associate the packaged engine object information with corresponding insurance product component meta data to include in the manifest 3900 for the insurance product offering. The ICC package functional adapter server component 3424 may store the manifest 3900 in the staging location 3430.

As an example, the manifest 3900 may be an XML file and a series of text files. The XML file may contain the names of and the relative path to executable files that may be created by the third party engine servers 160, such as ADB executable files created with a Blaze® brand engine server and/or SRP executable files created with an InsBridge® brand engine server. The XML files also may include the component versions contained in each of these executables or engine objects.

The ICC package functional adapter server component 3424 may interrogate the profile tables 3630 in the package configuration tables 3600 to determine specifically the data attributes for each version of the insurance product component 3408 included in the release or deployment.

If all of the required data attributes are present, the ICC package functional adapter server component 3424 may identify the corresponding values and save the identified values into individual text files. There may be one text file per profile table 3630 included in the package configuration tables 3600. The text file may include a logical record for each of the insurance product components 3408 associated with the profile table 3630. All of these profile text files may be associated to a large XML file, or a series of XML files, which is part of the packaged manifest 3900. The XML and text files may include specific routines to perform with the product identification service.

The ICC deployment system 3400 may further include a get engine object details module 3440, an ICC function adapter process controller module 3442, and an ICC function adapter server component 3444.

The ICC deployment system 3400 may further include a staging location 3430, which may be a location on a file server. As an example, the staging location 3430 may be a location within databases 131. Alternatively or in addition, the staging location 3430 may be located in the local memory of servers 130. The ICC deployment system 3400 may further include a technical adapter server component common interface 3450 and technical adapter server component 3452, which are described in the pending U.S. patent application Ser. No. 12/331,689, entitled "Adapter Services," the entire contents of which are incorporated by reference herein. The ICC deployment system 3400 may further include configuration engines 160.

In FIG. 35, the deployment operation 3500 may be executed by the servers to invoke a deployment operation at act 3510. To generate a release or deployment of an insurance product offering, the ICC design and configuration environment 230 may generate a deployment request. In response to the deployment request, the servers invoke to the release server component 3410. Thereafter, the operation proceeds to act 3512.

At act 3512, the release server component 3410 receives the request to generate a deployable or releasable insurance product offering for an identified list of insurance product components 3408 that may span one or more insurance product offerings. In response to receipt of the request to generate an deployable insurance product offering, the release server component 3410 may invoke a preliminary coherency check of the insurance product offering to be deployed or released. The servers 130 may perform a baseline coherency check and validate the insurance product offering. The release server component 3410 may then generate a create manifest request to invoke the package services module 3420. The create manifest request may include a list of insurance product components 3408 and meta data. The meta data in the create manifest request may further include information describing the insurance product structure.

The package services module 3420 receives the create manifest request and forwards the create manifest request to the ICC package functional adapter process controller (PC) 3422 at act 3514. The ICC package functional adapter process controller 3422 may perform an initial filtering function to verify the contents of the create manifest request. Thereafter, the ICC package functional adapter process controller 3422 passes the create manifest request to the ICC package functional adapter server component 3424. Thereafter, the operation continues to operation 3516.

Figure 37:
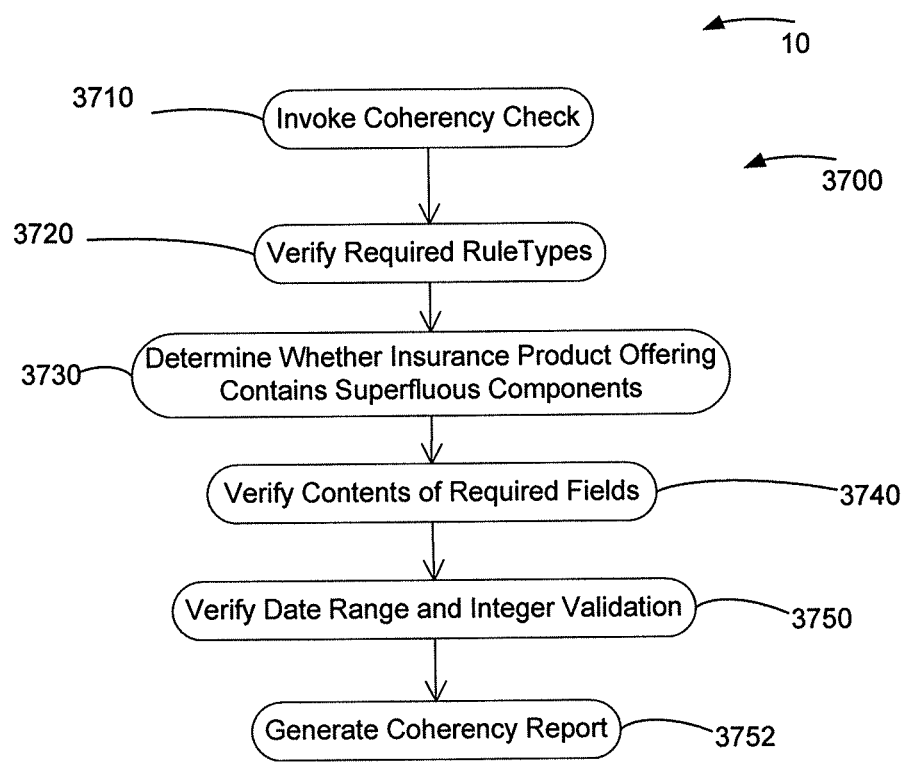
FIG. 37 depicts an example of a deployment coherency check operation.

At operation 3516, the ICC package functional adapter server component 3424 may invoke a deployment coherency operation. In FIG. 37, an example deployment coherency operation includes a deployment coherency check operation 3700. If the deployment coherency operation is unsuccessful, the operation proceeds to return failure at act 3530. At 3530, the servers 130 may generate a coherency error report for review. Otherwise, the operation proceeds to act 3518.

At act 3518, the ICC package functional adapter server component 3424 generates an engine object information request directed to the ICC functional adapter server component 3444. The request engine object information may include a list of insurance product components 3408 extracted from the create manifest request. In response to the engine object information request, the ICC functional adapter server component 3444 determines the engine object information or data that is associated with each insurance product component 3408. The engine object information or data is generated during configuration of the engine servers 160. The ICC functional adapter 3444 sends the engine object information to the ICC package functional adapter server component 3424.

As an example, the ICC function adapter server component 3424 may be executed by the servers 130 to generate a get engine service information request. The get engine service information request, may include engine object names associated with all the insurance product components 3408 contained in the insurance product offering. The request may also include a get engine object details service invocation. The engine service information request may be passed to the function adapter server component 3444 to process the request for engine service information.

At 3520, in response to the request for engine service information, the ICC functional adapter server component 3444 may return the requested engine object information to the ICC package function adapter server component 3424. The ICC function adapter server component 3444 determines the engine object information or data that is associated with each insurance product component 3408. The engine server object information and data associated with each engine object may include details for each identified engine server and the associated configurable engine services. Thereafter, the operation proceeds to act 3522.

At act 3522, the ICC package functional adapter server component 3424 generates a create engine object executable instruction, also referred to as a configuration information request, directed towards the engines 160. The configuration information request may include component identifiers to identify the insurance product components 3408. In addition, the create engine object executable instruction request may further include engine mapping information extracted from engine object information received from the ICC functional adapter server component 3444. The create engine object executable instruction or configuration information request may also include rule type information for each insurance product component 3408. For example, the rule type information may include entries to a rule type code.

The create engine object executable instruction or configuration information request may be passed through the technical adapter server component common interface 3450 to the ICC technical adapters server component 3452, where each configuration engine 160 corresponds to an appropriate ICC technical server component 3452. The technical adapter server controller common interface 3450 may inspect the configuration information request for errors. In addition, based upon the configuration information request, the technical adapter server component common interface 3450 determines which engine servers 160 may be necessary and delegates to request to an appropriate package of engine objects from the ICC technical adapter server component 3452. Thereafter, the operation continues to act 3524.

At act 3524, in response to receipt of the create engine object executable instruction, the ICC technical adapter server component 3452 may create packages of engine objects and store the packages of engine objects to the staging location 3430. The engine objects may also be referred to as deployable executables. The engine objects or deployable executables may be based upon the component identifier for each of the insurance product components 3408 in the insurance product offering. The deployable executables may include a set of compiled rules and rates for the engine servers 160 that are identified for use with the insurance product offering. The ICC technical adapter server component 3452 may store the deployable executables in the staging location 3430 as packaged engine objects. Thereafter, for example, the ICC technical adapter server component 3452 may return file names that identify the packaged engine objects stored in the staging location 3430 to the ICC package functional adapter server component 3424. Alternatively, for example, the ICC technical adapter server component 3452 may return links or pointers that identify the deployable executables.

Each of the technical adapters server component 3452 may generate a request to a corresponding or associated one of the engines 160 to request compiled rules and rates that may be called at runtime of the deployable insurance product offering. As an example, a Blaze® brand engine server may generate ADB executables. An InsBridge® brand engine server may generate an SRP executable. Thereafter, the operation continues to act 3526.

At act 3526, in response to the configuration information request, the package functional adapter server component 3424 receives the packaged engine object information. The packaged engine object information may include packaged engine object identifiers that correspond to insurance product components 3408 contained in the list of components extracted from the create manifest request. Thereafter, the operation continues to act 3528. At act 3528, the package functional adapter server component 3424 may merge the packaged engine object information with the insurance product component meta data. Based upon the merged packaged engine object information and insurance product component meta data, the package functional adapter server component 3424 may generate a manifest for the insurance product offering, also referred to as an insurance product offering manifest. The package functional adapter server component 3424 stores the manifest for the insurance product offering in the staging location 3430. Thereafter, the operation continues to act 3532.

At act 3532, in response to the request to generate a deployable or releasable insurance product offering for an identified insurance product offering, the servers 130 return an indication to the release server component 3410 that the servers 130 successfully generated a deployable or releasable insurance product offering for an identified insurance product offering.

A hierarchical relationship may be specified through data model 3602. The top-most parent of the data model 3602 may include the business service table 3610. Through the ICC user interface 112, the business user may specify the business service 3610 which he would like to use in a Model Execution job and the release manager specifies the business services to deploy in a standard release. In both situations, the business service table 3610 may specify how to organize the ICC insurance product components 3408 and how the insurance product structure will be packaged. The selected business service table 3610 may be used for coherence logic and to create the package for the ICC components which the user identifies. The business service table 3610 may include a business service identifier field and a name field, as described in Table 1.

TABLE 1

| Key Fields | Description |
| --- | --- |
| BUSINESS_SERVICE_ID | The business service identifier field is the primary key for this table. The primary key of a relational table uniquely identifies each record in the table. |

TABLE 1-continued

| Key Fields | Description |
| --- | --- |
|  | The primary key may either be a normal attribute that is guaranteed to be unique or the primary key may be generated by the DBMS, such as a globally unique identifier, or GUID, in Microsoft SQL Server. Primary keys may consist of a single attribute or multiple attributes in combination. |
| NAME | The name field stores the name of the Business Service, and is the name that is display on the Model Execution and Release Details user interface for the user to select. |

The service table 3620 may be related to the business service 3610. As an example, there may be a one-to-many relationship between a business service described in a business service table 3610 and the service as described in the service table 3620. As shown in Table 2, the list of services which comprise a business service 3610 may be specified. The service table 3620 may include a service id field (service_id), a component version identifier (comp_vers_id), a rule type code field,(rule_type_cd), a name field, and an entry point field, which are described in Table 2.

A service described in the service table 3620 may be defined as a deployable entity within the 3rd party engine servers 160. In some cases, the service in the service table 3620 may be directly callable in a runtime environment 240. In other cases, the service in the service table 3620 may not necessarily be directly callable in a runtime environment.

For example, two example engine servers 160 include a Blaze® brand engine server and an InsBridge® brand engine server. In a first example engine server, a Blaze® brand engine server, the services 3620 may include "Projects." In a second example engine server, an InsBridge® brand engine server, the services 3620 may include "Programs." To provide flexibility of design, the services table 3620 provides a pointer or link to the engines for packaging purposes. The InsBridge® brand engine server and Blaze® brand engine server deployable entities may include supported engine objects and services will be accomplished through ICC.

TABLE 2

| Key Fields | Description |
| --- | --- |
| SERVICE_ID | The service identifier field is the primary key for this table |
| BUSINESS_SERVICE_ID | The business service identifier field is the foreign key to the Business Service table 3610. A foreign key may be a field in a relational table that matches the primary key column of another table. The foreign key may be used to cross-reference tables. The business service identifier links the service table 3620 to the business service table 3510, which provides the name for the business service to be supported by the insurance product offering. |
| COMP_VERS_ID | The component version identifier field is the associated with the ICC insurance component that created the deployable entity in the $3^{rd}$ party engine. The component version identifier includes information used to retrieve the specific engine object via the ICC functional adapter server component 3444 Release adapters. |
| RULE_TYPE_CD | The rule type code field is used in conjunction with the COMP_VERS_ID field above for the adapters to identify which engine object needs to be deployed. |
| NAME | The name field stores the name of the Rule/Rate Service. |
| ENTRYPOINT | The entrypoint field is used to indicate the entry point which should be used for this service. |

The business map component (business_map_comp) table 3640 may provide the link between specific components in the offering structure, which the product developers maintain, and the services 3620 which are deployable within each of the engines 160. The business map component 3640 may include a business map component identifier field (bus_map_comp_id), a service identifier field (service field), a rule type code field, (rule_type_code), and a profile number field (profile_number), which are described in Table 3.

Each service table 3620 may include a one-to-many relationship with a business map component table 3640. While there is not a direct, database constrained link between a business map component table 3640 and an ICC insurance product component 3408, the linkage may be established because each business map component table 3640 may be associated to a rule type, as discussed previously. In addition, ICC insurance product components 3408 may also be associated with a rule type, as discussed previously. Each business map component table 3640 may include specific conditions associated to it on the profile table 3630.

TABLE 3

| Key Fields | Description |
| --- | --- |
| BUS_MAP_COMP_ID | The business map component identifier field may be the primary reference or key for the business map component table 3640. |
| SERVICE_ID | The service identifier field may include the foreign key from the service table 3620 that relates the service table 3620 to the business map component identifier table 3640. |
| RULE_TYPE_CD | The rule type code may be the identifier of the actual rule type stored within the ICC application. |
| PROFILE_NUMBER | The profile number field may link the business map component table 3640 to a specific profile, such as a profile included in the profile table 3630. While there is not an enforced relationship, the profile number field may be populated for a business map component table 3640. The profile number may be related to the profile number in the profile table 3630 and the package profile category 3940 of the manifest 3900. |

The profile table 3630 includes a profile identifier field (profile_id), a profile number field, (profile_number), a component type code field, (component_type_cd), an attributed code field, (attribute_cd), and operator code field, (operator_cd), a data type code field, (datatype_cd), a coherency indicator field, (coherence_cd), a model execution coherency indicator field, (me_coherence_ind), a range pair indicator field, (range_pair_ind), and a return indicator field, (return_ind), which are described in Table 4.

Figure 42:
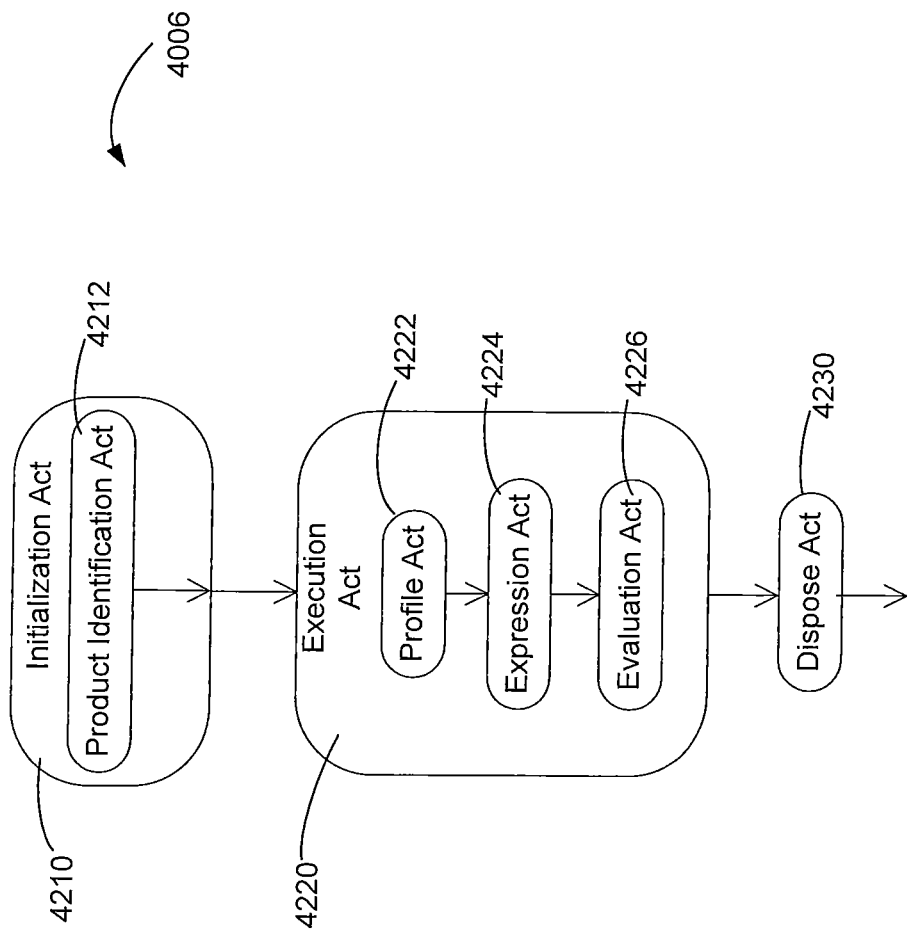
FIG. 42 depicts an example of an operational flow diagram for the runtime initialization components.

The profile table 3630 may be used to associate a series of rules with a specific business map component table 3640, which is related to the rule type of the insurance product component 3408. While there technically is a one-to-many relationship between a business map component table 3640 and a profile, there is an assumed one to one relationship between a business map component table 3640 and a profile number. These conditions may provide instructions to the ICC package functional adapter server component 3424 during the coherence check to identify what component attributes are required and are necessary to saved. These conditions may also provide the run time evaluation rules, (operator_cd), which are used by the product identification service 4206, depicted in FIG. 42, in determining which rules need to be invoked.

TABLE 4

| Key Fields | Description |
| --- | --- |
| PROFILE_ID | The profile identifier field is the primary key for this table. |
| PROFILE_NUMBER | The profile number field identifies a grouping of records on this table that comprise a given profile, which may be related or linked to a business map component table 3640. |
| COMPONENT_TYPE_CD | The component type code field stores the insurance product offering component type code to which this profile applies (e.g. Offering, Product). |
| ATTRIBUTE_CD | The attribute code field stores the Attribute code for the component type above (e.g. EffDt, ProdID). |
| OPERATOR_CD | The operator code field stores the operator that applies to the Attribute above. The only supported operators are = (equal); > (greater than); >= (greater than or equal); < (less than); and <= (less than or equal). |
| DATATYPE_CD | This field stores the datatype of the value of the Attribute (e.g. String, DateTime, Integer). |
| COHERENCE_IND | The coherency indicator field indicates if the component type should be part of the standard release coherence check. If this field is equal to "Y" then this field is required during the coherence check for Standard Releases. If this field is equal to "N" then this field is not required during the coherence check however the value is saved, if present, during the creation of information in the release variables category 3950 of the manifest 3900. |
| ME_COHERENCE_IND | The model execution coherence indicator field indicates whether the component type should be part of the model execution coherence check. If this field is equal to "Y" then this field is required during the coherence check for model execution jobs. If this field is equal to "N" then this field is not required during the coherence check; however, the value is saved, if present, during the creation of information in the release variables category 3950 of the manifest 3900. |

TABLE 4-continued

| Key Fields | Description |
| --- | --- |
| RANGE_PAIR_IND | The range pair indicator field is a column that provides the ability to group two records together for the purposes of date range and integer range validation. For example, by assigning the same value to two records in this table, one for the "official effective date," (Off:EffDt), and another for the "official expiration date," (Off:ExpDt), the code will recognize that these two dates go together and cannot overlap if there are multiple values for these two attributes. |
| RETURN_IND | The return indicator field indicates whether the component type should be returned when invoked during runtime. If this field is equal to "Y", then the component type, attribute, and attribute value may be returned during the product identification run time service. This provides a flexible mechanism for controlling the amount and type of data that is returned during run time. |

To provide flexibility of design, the services table 3620 may provide the pointer to the engines for packaging purposes. The InsBridge® brand engine server and Blaze® brand engine server deployable entities may include supported engine objects and services.

The Attribute table 3650 may include an attribute identifier, (attribute_id), a service identifier, (service_id), a name, (name) and a value, (value), which are described in Table 5.

Just as there may be many component attributes that are relevant to a business map component 3640 for evaluation purposes in a runtime environment, there are attributes which need to apply to the business services. The attribute table 3650 may provide the ability to assign attributes to a business service, which will be used for product identification evaluation at runtime.

TABLE 5

| Key Fields | Description |
| --- | --- |
| ATTRIBUTE_ID | The attributed identifier field may include the primary key for this table. |
| SERVICE_ID | The service identifier field may include the foreign key to the SERVICE table 3620. The service identifier stored in the service identifier field is a foreign key that relates the attribute table 3650 to the service table 3620. |
| NAME | The name field may include a name parameter of the attribute. |
| VALUE | The value field may include the value parameter for the attribute. The attribute may include strings. |

An ICC deployment system 3400 may further include a deployment coherence check operation. The release server component 3410 may be responsible for ensuring that the release or manifest package 4240 being packaged is "coherent," from a packaging perspective. The deployment coherence logic of the deployment coherency check operation 3700 may be different than the coherency check performed by the component configuration coherence module, which may be part of the ICC package functional adapters server component 3424. A component configuration coherence module may be used to make sure that the product structure is accurate. The coherence module discussed in the context of deployment is to make sure a package is accurate.

In FIG. 37, the deployment coherency check operation 3700 may include a plurality of coherence logic modules or component including a required rule type verification function, a superfluous component validation, a required fields validation, and a data range and integer range validation.

In FIG. 37, in response to a request to deploy or release an insurance product offering, the ICC package functional adapter server component 3424 may invoke a deployment coherency check operation 3700 to determine whether each component included in the release complies with predetermined coherency rules. This process can be invoked by the ICC business user. As an example, the ICC deployment system 3400 may invoke the deployment coherency check operation 3700 before packaging. The ICC deployment system 3400 may further require successfully passing the deployment coherency check operation 3700 as pre-requisite to packaging.

At act 3710, the ICC deployment system 3400 may invoke the deployment coherency check operation 3700. In response, the servers 130 commence validation of the insurance product offering including the insurance product components 3408 and insurance product frame work. The operation proceeds to act 3720.

At act 3720, the servers 130 verify the required rule types for each of the insurance product components 3408 are specified. For a specific standard release/model execution job, there must be at least one of the insurance product components that has the rule type specified on each of the business map components table 3640 that are tied to business services to be deployed, specified in the business service table 3610. For the release that is being packaged for deployment, the servers 130 may perform a check to validate that every rule type is accounted for each business map component table 3640 that is associated to the services table 3620, where the services are associated to the specified business services specified in the business service table 3610 for the release. If an insurance product component rule type does not exist for a business map component table 3640, an error is returned. In the event of this coherence error, the missing rule type will be returned. Thereafter the operation continues to act 3730.

At act 3730, the servers 130 determine whether the insurance product offering contains superfluous components. As an example, for a specific Release/model execution job, if the user specifies an insurance product component 3408 with a rule type that is not associated to any business map components table 3640 for the business service specified in each business service table 3610, the deployment coherency check operation 3700 may generate or return a superfluous component error notification. The superfluous component error notification may indicate and identify the insurance product component 3408 that is not applicable to the business service specified in the business service table 3610. Thereafter, the operation proceeds to act 3740.

At act 3740, the deployment coherency check operation 3700 may determine whether the required fields of each of the insurance product components 3408 is specified. As an example, each business map in the business map component table 3640 in the release may be associated to a profile identifier in the profile table 3630. The associations between the business map component table 3640 and the profile table 3630 may determine which attributes the insurance product component 3408 requires to be specified on its associated insurance product components and their parent's insurance product components. As described above, the ICC package functional adapter server component 3424 may traverse the insurance product structure of the insurance product offering to validate that the required attributes have a valid value.

For example, the coherency indicator field, (coherence_ind), of the profile table 3630 may be set to equal to yes, "Y," for a particular row. In the event the coherency indicator field is set to "Y," an insurance product component of that type and attribute may be required in the release manifest. Because every component is added to a release or model execution job in the context of an insurance product offering, the servers 130 may traverse the insurance product framework or structure to validate the insurance product offering. As an example, the servers 130 may validate that an insurance product component of the component type indicated on the profile table 3630 exists in one of the category locations in the library of insurance product components approved for release or deployment. If the insurance product component of the specified type does not exist in one of the category location approved for release or deployment, the servers 130 return an invalid insurance product component selection error.

The servers 130 may also validate that a specified attribute on the insurance product component undergoing the validation process has a valid value. If the servers 130 determine that an attribute of an insurance product component undergoing validation does not exist, the servers 130 generate or return an invalid attribute error. The invalid attribute error and invalid insurance product component selection error are non limiting examples of possible coherency errors. In the event of a coherence error, the servers may generate a coherency error report or message. The coherency error report or message may include information that identifies the particular type of coherency error that occurred. For example, in response to an invalid insurance product component selection error, the servers 130 may report a component name. Alternatively, in response to an invalid attribute error, the servers 130 may report the attribute that is missing and the corresponding insurance product component. Thereafter, the operation proceeds to act 3750.

Figure 38:
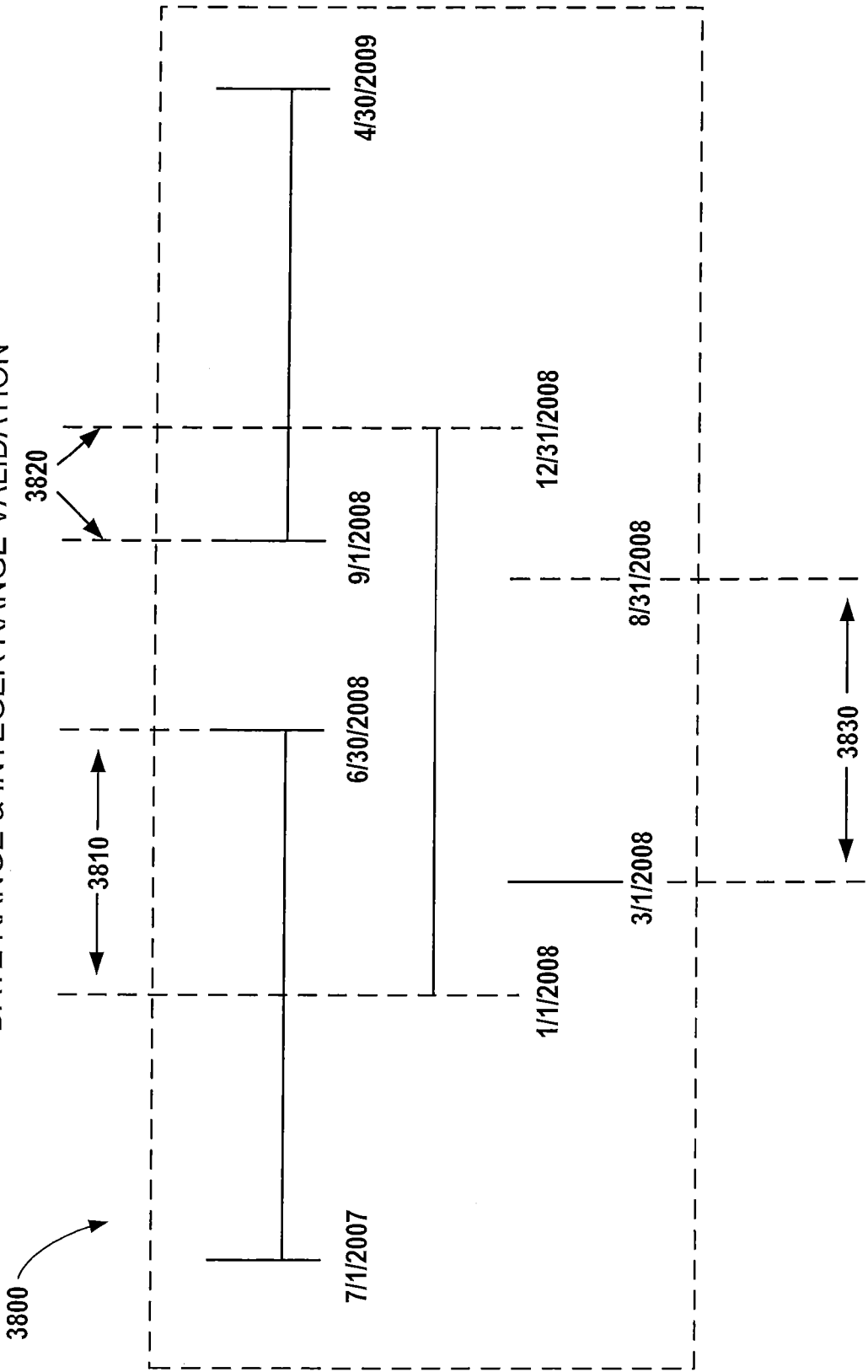
FIG. 38 depicts an example date range and integer range validation.

At act 3750, the servers 130 perform a date range and integer validation test. The final coherence check is to ensure that there is not overlapping date or integer ranges for components in a release. In FIG. 38, an overlap analysis 3800 includes three types of "overlap" that the deployment coherency check operation 3700 checks. FIG. 38 includes a first overlap 3810, a second overlap 3820, and a third overlap 3830 that may result in a coherence error. At act 3752, a coherency report is generated.

In an example overlap analysis, the deployment coherency check operation 3700 may check all the date ranges for overlapping. In another example overlap analysis, only some of the date ranges may be analyzed for situations that generate a coherency error.

For example, the range pair indicator attribute in the range pair indicator (range_pair_ind) field of the profile table 3630 may be used to group two records together and to determine whether a date range and integer range are valid. For example, when a particular insurance product component or version of an insurance product component may be used in the deployed insurance product offering, the range pair identifier attribute may be used to identify the official effective date and official expiration date of the insurance product component or version of the insurance product component.

In particular, the range pair indicator may indicate which dates go together. In the event that the same insurance product component identified includes the date attribute that exists in the release variables category 3950 of the manifest 3900, the range pair identifier may be used in the profile category 3630 to apply a coherence check, as previously described. The coherency check may be based on the component identifier field. The server may invoke the logic to evaluate the various versions of a given component identifier field to identify failures.

In the event of a coherence error, the name, version, attribute and associated root node names of the components with overlapping criteria may be returned. In addition, a business rule for model execution job may include mandates that the user can only "Include" one version of an insurance product component. In one example, the release server component 3410 may enforce the one version of a component requirement as part of the deployment coherence check operation 3700. Alternatively, in another example of a model execution, a model execution package may contain more than one version of the same insurance product component.

In another example, the servers 130 may determine whether there is a requirement to only include one version of an insurance product component in an insurance product offering. If there is no one version requirement, the servers 130 do not generate an error. In the event there is a requirement to only include one version of an insurance product component in an insurance product offering, the servers determine whether multiple versions of the same insurance product component are used in the same insurance product offering. Enforcement of the one version requirement may be done as part of the execution of either the ICC package functional adapter server component 3424 or the release server component 3410. Alternatively, the enforcement of the one version requirement may be enforced as part of an insurance product offering development process in the release server component 3410. For example, a coherency error may be identified by servers 130 when the business user attempts to save an insurance product offering. Alternatively, servers 130 may generate a coherency error when the business user attempt to attach or include more than one version of the same insurance product component.

Finally, in the event coherence errors are identified, a coherency error message or report is generated by servers 130. As an example, the deployment coherency check operation 3700 may return multiple coherency errors. The servers 130 may generate a coherency error report for display on the user interface 112 of terminal 110. The coherency error report may describe the multiple coherency error and prioritize the errors to be correct. In addition, the coherency error report may provide a coherency error link to the insurance product component or either the branch or the node within the insurance product framework associated with each of the coherency errors. In response to section of the coherency error link, the servers 130 may open the insurance configuration facility or insurance product development portal to display the insurance product offering being analyzed and highlight the insurance product component in question. In further response to selection of the coherency error link, the user interface 112 may generate suggested corrective actions to the business users. Alternatively, the user interface 112 may provide a coherency error report when a user selects the insurance product component that corresponds to a coherency error.

At the end of the deployment coherence check operation 3700, if the deployment coherence check operation 3700 was called in isolation or if the coherency check was called as part of a packaging request and found one or more errors, the deployment coherency check operation 3700 may clean-up information created as part of the deployment coherency check operation 3700. The clean-up may include modifying or cleaning-up information included in the release variables category 3950 and other associated categories of the manifest 3900.

As illustrated in FIG. 39, manifest 3900 may include manifest categories 3902. The manifest categories 3902 may include a package category 3910. In some examples, the manifest categories 3902 may further include a package engine objects category 3920, a package business map component category 3930, and a release variables category 3950.

The package category 3910 described in Table 6 tracks the high level package information. The package category 3910 also identifies which ICC release or deployment with which the package category 3910 is associated.

TABLE 6

| Key Fields | Description |
|---|---|
| PKG_ID | The package identifier field is the primary key for this category. |
| RELEASE_ID | The release identifier field is the foreign key to the release variables category 3950, which relates the package category 3910 to the release variables category 3940. |
| BUSINESS_SRVC_ID | The business service identifier field associates the package category 3910 to a specific business service. |
| PACKAGE_DT | The package date field contains the date the package manifest was created. |
| RELEASE_NAME | The release name field contains the name of the ICC release or model execution Job to which the package is associated. |
| RELEASE_TYPE | The release type field specifies whether the package manifest is for a model execution job or a standard release. |
| TARGET_PROD_DT | For standard releases, the target production date field contains the business user specified target production date for the release. |

The package engine objects category 3920, as described in Table 7, may include a list of the services and relevant engine specific information which are included in the package. There may be a one-to-many relationship between the package category 3910 and the package engine objects category 3920 as a business service can be associated to more than one service.

TABLE 7

| Key Fields | Description |
|---|---|
| PKG_ENGINE_OBJECT_ID | The package engine object identifier field is the primary key for the package engine objects category 3920. |
| PKG_ID | The package identifier field is the foreign key to the package category 3910. |
| SERVICE_ID | The service identifier field is the foreign key to the service table 3620-. However, since this table exists as a point in time, a data base, DB, constraint is not enforced. |
| ENGINE_TYPE | The engine type field specifies from which configurable engine the service originated. (i.e. Blaze ® brand engine server or InsBridge ® brand engine server). |
| FILE_NAME | The file name attribute is the name of the configuration file generated by the engines during the packaging process. |
| NAME | The name attribute is the name of the service, as specified on the service table 3620. |
| ENTRYPOINT | The entrypoint attribute is the entry point into the packaged engine entity as specified on the service table 3620. |

The package business map component category 3930, shown in Table 8, may include a list of the business services, related to the business service identifier, (business_service_id), provided in the business service table 3610, that are included in the package manifest.

TABLE 8

| Key Fields | Description |
|---|---|
| PKG_BUS_MAP_COMP_ID | The package business map component identifier field entry is the primary key for the package business map components identifier category 3930. |
| SERVICE_ID | The service identifier field entry is the foreign key to the SERVICE_ID field in the pkg_engine_objects category 3920. |
| RULE_TYPE_CD | The rule type code field entry specifies the rule type code associated to the business map component table 3640. |
| PROFILE_NUMBER | The profile number field entry specifies which profile applies to the business map component table 3640. |

The package profile category 3940, described in Table 9, may list the associated conditions. The package profile category 3940 may include a replica of the relevant records in the profile table 3630, depicted in FIG. 36. Alternatively, the profile tables 3630 corresponding to each of the insurance product components may be associated with or described in the package manifest.

TABLE 9

| Key Fields | Description |
|---|---|
| PKG_PROFILE_ID | The package profile identifier field is the primary key for the package profile category 3940. |
| PROFILE_NUMBER | The profile number field identifies a grouping of records in the package profile category 3940 that comprise a given profile, which may be related or linked to a business map component category 3640. |
| COMPONENT_TYPE_CD | The component type code field stores the insurance product offering component type code to which this profile applies (e.g. Offering, Product). |
| COMPONENT_TYPE_CID | The component type code identifier stores the insurance product component type code identifier. |
| ATTRIBUTE_CD | The attribute code field stores the Attribute code for the component type above (e.g. EffDt, ProdID). |

TABLE 9-continued

| Key Fields | Description |
|---|---|
| OPERATOR_CD | The operator code field stores the operator that applies to the Attribute above. The only supported operators are<br>= (equal);<br>> (greater than);<br>>= (greater than or equal);<br>< (less than); and<br><= (less than or equal). |
| DATATYPE_CD | This field stores the datatype of the value of the Attribute (e.g. String, DateTime, Integer). |
| RANGE_PAIR_IND | The range pair indicator field is a column that provides the ability to group two records together for the purposes of date range and integer range validation. For example, by assigning the same value to two records in the package profile category 3940, one for the "official effective date," (Off:EffDt), and another for the "official expiration date," (Off:ExpDt), the code will recognize that these two dates go together and cannot overlap if there are multiple values for these two attributes. |
| RETURN_IND | The return indicator field indicates whether the component type should be returned when invoked during runtime. If this field is equal to "Y", then the component type, attribute, and attribute value may be returned during the product identification run time service. This provides a flexible mechanism for controlling the amount and type of data that is returned during run time. |

The release variables category 3950, described in Table 10, may be used to snapshot the relevant information from the product offering structures involved in the package. The information contained in the release variables category 3950 may be evaluated by the product identification service 4106 to identify which components need to be returned.

TABLE 10

| Key Fields | Description |
|---|---|
| RELEASE_VARIABLES_ID | The release variables identifier field is the primary key for the release variables category 3950. |
| PKG_ID | The package identifier field defines the package category 3910 to which the record in the release variables category 3950 is associated. It is possible to identify which Release the package is associated with by information included in the package category 3910. |
| BUS_MAP_COMP_ID | The business map component identifier field identifies the business map component 3640 to which the information included in the release variable category 3950 is associated. |
| RULE_TYPE_CD | The rule type code field identifies the rule type specified in the information included in the business map component category 3640 that is responsible for creation of information included in the release variables category 3950. |
| COMPONENT_ID | The component identifier field contains the component identifier parameter or attribute of the insurance product component that has the same rule type as the business map component 3640 for which this record relates. |
| COMPONENT_VERSION_ID | The component version identifier field entry identifies the version of the component that has the same rule type as the business map component 3640 to which this record is related. |
| COMPONENT_TYPE | The component type field entry identifies the component type (e.g. Offering, Product) of a component identified in the component identifier field. |

TABLE 10-continued

| Key Fields | Description |
|---|---|
| COMPONENT_NAME | The component name field entry includes the name of the component identified in the component identifier field. |
| COMPONENT_VERSION | The component version field entry includes the ICC version of the component identified by the component identifier field. |
| ENGINE_OBJECT_NAME | The engine object name field includes the name of the executable engine object component that the functional adapter created. This information is retrieved from the functional adapter. |
| ATTRIBUTE_ID | The attribute identifier field identifies the attribute which is being saved. For example EffDt may be the effective date attribute for an insurance product component. |
| ATTRIBUTE_RELATED_CID | The attributed related cid field includes a component identifier of the component from which the attribute is retrieved. The hierarchy of the component with a matching rule type for a business map component 3640 may be interrogated. The attributed related component identifier field may be saved to appropriately identify where a coherency failure occurred within the hierarchy of the hierarchical tree structure or framework of the insurance product. |
| ATTRIBUTE_RELATED_COMP_NAME | The attribute related component name field includes the name of the insurance product component from which the attribute may be retrieved. The hierarchy of the insurance product component with a matching Rule Type for a business map component 3640 may be interrogated. This field is saved to appropriately identify where in the hierarchical tree structure or framework of the insurance product framework or structure or hierarchical tree a coherence failure has occurred. |
| DT_VALUE | The date validation value field saves date values associated with the validation process. |

TABLE 10-continued

| Key Fields | Description |
| --- | --- |
| C_VALUE | The c value field saves string values. |
| INT_VALUE | The integer value field saves integer values. Since integer validation occurs, this cannot be saved as a string. |
| RETURN_IND | The return indication field indicates whether this record should be returned in a product identification service 4006, depicted in FIG. 40. |
| INCLUDE_IND | The include indicator field entry indicates whether the user has marked the insurance product component to be "Included" for this model execution job. This field does not pertain to Standard Releases. This may be used by the model execution Controller to determine which component version to invoke. |

Information included in the release variables category 3950, described in Table 10, may be used to snapshot the relevant information from the product offering structures involved in the package. The information contained in the release variables category 3950 may be evaluated by the product identification service 4106, which is described below, to identify which components need to be returned to a calling orchestration of an insurance product application included in the insurance product offering being executed by the server.

After the categories of the manifest 3900 as described above have been populated with information and the packaging is complete, the data may be put into a staging location. An example data management system may be based upon XML, DB, or TEXT File. In an XML example, the information contained in the manifest 3900 described above may be stored as an XML file. In a database (DB) example, the production environments may store the data in databases based upon database relationships. To ensure security standards are maintained, the data may be exported from the test environments and thereafter import into the production environment. In this example, the ICC system 10 may be configured to ensure that the database constraints are maintained. In the TEXT File example, the data may be saved in comma separated values (CSV) text files. This reduces the size of the file and may include the added advantage of minimizing or negating the memory management issue.

Based on the development complexity, the three examples described above may be uses individually or mixed and matched. For example, a hybrid system may include use of Text File based files and XML files together. Another example approach may include using a CSV text file.

A configuration table may include the path to a staging location where these files may be stored. A new folder may be created in the staging location with the name of the release identifier. Considering the contents and structure of this folder will be relevant for the ICC runtime services, a complete copy of the folder may be performed when a release or package manifest is built/deployed to an environment. In a development mode, the configuration files may be saved in a known relative path to ensure the relative path will be valid in all environments.

Figure 41:
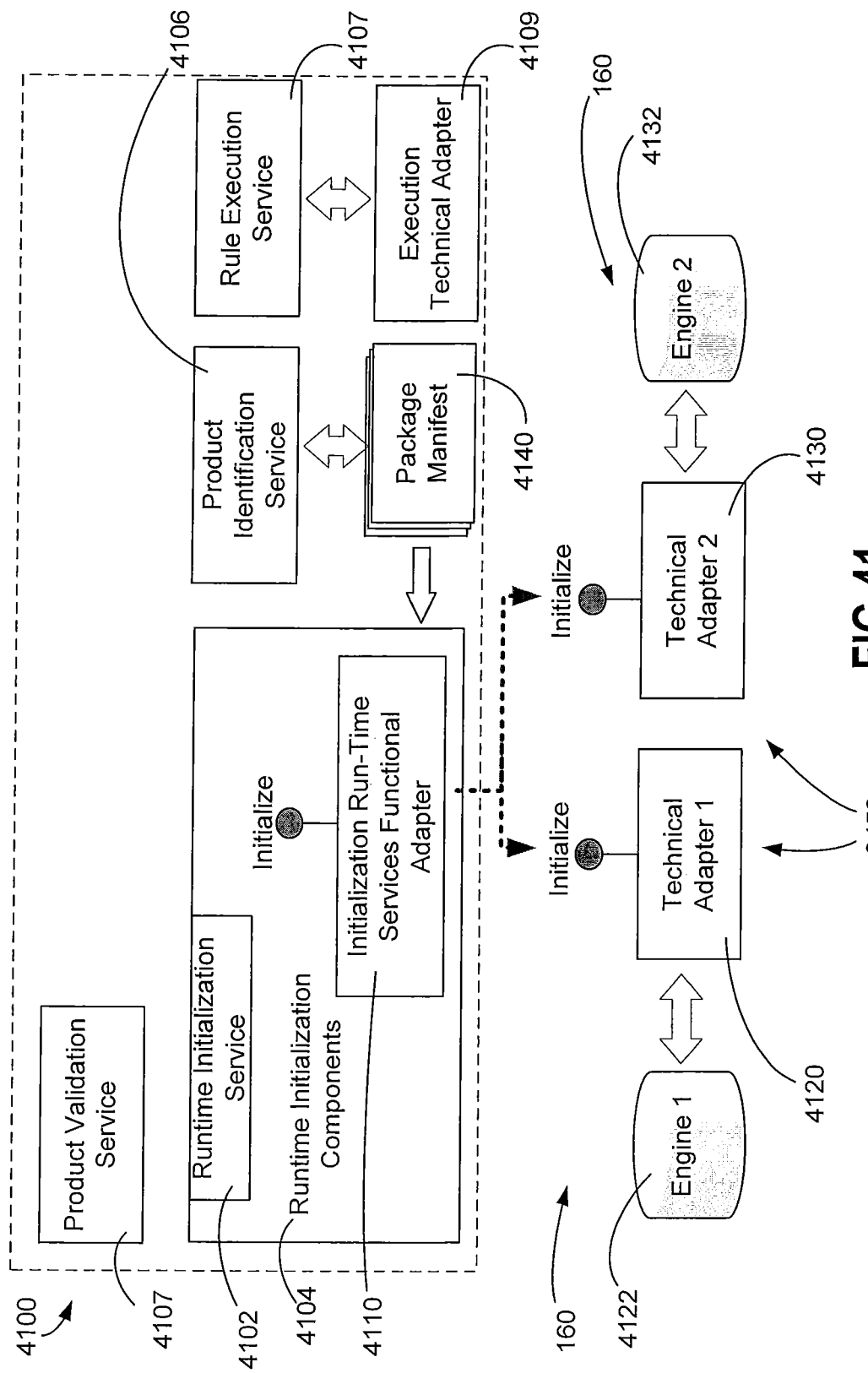
FIG. 41 an example system for creating a deployable entity for an insurance product offering.

In FIG. 41, ICC application runtime services 4100 may include a runtime initialization service 4102 and a product identification service 4106. The runtime capabilities may be extended to include a product validation service 4107, a rule execution service 4108 and corresponding rule execution technical adapters 4109.

Depending on the engine servers 160 that are leveraged by the ICC application, there may be specific initializations for deployed components before they can be invoked at runtime. The product identification service 4106 and the runtime initialization service 4102, depicted in FIG. 41, may provide for the specific initializations for the deployed or the released components, as discussed above with respect to FIGS. 34-39. The runtime initialization service 4102 may also be described with reference to FIGS. 1-33 and the pending U.S. patent application Ser. No. 12/331,689, entitled "Adapter Services, which is incorporated by reference in its entirety.

In FIG. 41, the run time initialization service 4102 may include runtime initialization components 4104. The runtime initialization service 4102 may expose a single initialize operation that accepts no arguments. The runtime initialization components 4104 may include an initialization runtime services functional adapter 4110, which interfaces with technical adapter 1 4220 and technical adapter 2 4230.

The runtime initialization components 4104 may be architected similar to the configuration components with a technical adapter to interact with the engine servers 160. Engines 160 may include Engine 1 4122 and Engine 2 4132. The initialization runtime services functional adapter 4110 may further interact with the ICC technical functional adapter server components 3452. An example of the ICC technical functional adapter server components 3452 may include technical adapter 1, 4120 and technical adapter 2, 4130, which abstract implementation details from the caller or invoking orchestration of one or more of the insurance product components being executed by the server. The initialization runtime services functional adapter 4110 may interrogate the package manifest 4140 to obtain a list of all deployed engine object executables, discussed above, that are part of the package manifest 4140, which may be stored in the staging location 3430. The package manifest 4140 may be moved to a runtime environment storage location to be executed. The runtime storage location may be a database located on a file server. For example, the runtime storage location may be a database located in or associated with databases 131.

As an alternative example, upon generation of the package manifest, the ICC Applications 3408 may set or send a package manifest complete indication to a package manifest transfer function or service. In response to the package manifest complete indication, the servers 130 may transfer the package manifest 4140 to a runtime storage location. Upon completion of the transfer of the package manifest 4140 to the runtime storage location, the servers 130 may generate a transfer complete indication. In some cases, in response to the transfer completion indication, referring to FIG. 25, the business user interface 2500 may generate an indication to the business user that the package manifest 4140 is available for model execution. Thereafter, a business user may initiate a model execution job by selection of the schedule module execution action in the actions window 2510 of the business user interface 2500. Alternatively, the packaged manifest 4140 may be moved manually or through an service request generated by the ICC application runtime services 4100.

For each deployed engine object, the functional adapter 4110 invokes the respective technical adapter 4120, 4130, with necessary arguments to carry out the actual initialization on the respective one of the engines 4122, 4132. Unlike the configuration adapters, the runtime adapters 41 are scaled down versions that do not rely on the underlying AICS architecture components and services, which allows for portability and easy deployment across environments.

In FIG. 41, the product identification service 4106 may include a sophisticated decision-making engine for selecting specific versions of insurance product components in a package manifest at runtime. The product identification service 4106 service may be driven by a multi-attribute algorithm that can be extended and refined as required.

The product identification service 4106 may be consumed by orchestrations of one or more of the insurance product components being executed by the server that need to selectively invoke executable components from a package manifest based on attributes in the input of runtime variables included in the manifest, also referred to as runtime variables information. The service evaluates all applicable filter clauses against component attributes in a package manifest in relation to corresponding values provided as the input of runtime variables by the calling orchestration of the insurance product component being executed by the server and returns the list of insurance product components that match the criteria of the filter clauses. The product identification service 4106 may be tightly coupled to the ICC deployment capabilities. The product identification service 4106 may drive off the package manifest 4140 that is generated by the release server component 3410, as described above, during packaging.

The product identification service 4106 may identify specific component versions and not their invocation. The product identification service 4106 may operate against a single ICC package manifest. An example ICC package manifest represents the ICC insurance product component and corresponding engine elements that are created when deploying a business service. For example, as discussed above, an ICC package manifest may include packaged engine objects and information associated with the manifest categories 3902 that is stored in the staging location 3430 during deployment. There may be a one to one relationship between a package identifier stored in the package category 3910 of the manifest 3900 and a deployed business service.

As one of many examples of a product identification service 4106, the product identification service 4106 may not provide orchestration. In other words, product identification service 4106 may not specify the order in which rules need to be called. Rather, the product identification service 4106 may return component and service information that match filter clauses generated using data, runtime variables, provided as an input to the product identification service 4106. Other examples of a product identification service 4106 may further provide orchestration of a specific order in which rules need to be called. The runtime variables may specify attribute values to be used during execution of the insurance product offering on a configurable engine server 160.

The product identification service 4106 may not guarantee that only one version of a component will be returned. There may be situations where the product identification service 4106 returns multiple versions of an insurance product component due to the conflicting policy hierarchy, the insurance product framework, inaccurately configured attributes, and/or insufficient data provided in the input of runtime variables. In case of multiple version matches for the same component, the product identification service 4106 may not apply any further logic to force the selection of a single version. In the event of an error or conflict, the product identification service 4106 may pass back a result to the invoking orchestration operation of the insurance product component(s) being executed by the server.

The product identification service 4106 may be based upon the concepts of product identification, which depend upon the contents of the manifest 3900. The package manifest 4140, which may include manifest 3900, contains all information required by the runtime services to work with the package and its contents stored in the staging location 3430. The runtime services may include initialization of an executable product offering and product identification. Depending upon the implementation, the information in the manifest categories 3902 could be a single XML file, a set of XML files, a combination of XML and text files and/or a set of database tables. As discussed above, the manifest 3900 may be generated by invoking the release server component 3410. The manifest 3900 may also contain service level information that provides data, attributes configuration information, and pointers to engine objects related to specific services provided by a specified engine 160.

For example, service information for a Blaze® brand engine included in the manifest 3900 may include the name and relative path to the ADB file, entrypoint, the name of the Blaze project, and the server.config file of the ADB. In another example, involving an InsBridge brand engine, service information in the manifest 3900 may include the name and relative path to an SRP file and a Line Identifier.

The manifest 3900 may also include package configuration table information. As an example, each business map component 3640 associated to a business service of the package may include a corresponding profile table 3630 stored in the package configuration tables 3600. The profile table 3630 may include details for each business map component 3640. A profile table 3630 may include a group of expressions that serves two functions. First, at package time, the profile expressions may be used to create information in the release variables category 3950 of the manifest 3900 for the package by interrogating insurance product components that are included in the package. Second, at runtime, the runtime variables are provided as inputs to the product identification service 4106 and may be merged into the profile expressions to create the filter clauses. The filter clauses may be applied against the entries included in the release variables category 3950 of the manifest 3900 to select insurance product components from the package manifest that match the runtime input variables for the package manifest. Accordingly, the filter clauses provide selection of only those insurance product components having corresponding third party servers 160 active during runtime based on the business services.

Information included in the release variable category 3950 may also represent release variables stored in a de-normalized tabular representation for all the insurance product components that are part of the package manifest and their attributes. In case of multi-valued attributes, each value will be represented as a separate row along with the component details and other attributes.

Although the product identification service 4106 may be designed to be consumed as a service, the product identification service 4106 may also be invoked directly as a native component, such as a .NET component DLL. In either case, the package manifest 4140 will be available to the product identification service 4106, either as a configuration setting or a relative path. The product service 4106 may be broadly segmented into three distinct operations including an initialization act 4210, an execute act 4220, a product identification act 4230, and a disposal act 4240.

At the initialization act 4210, the servers 130 depicted in FIG. 1, initiate an initialization routine. The initialization routine may include an easily searchable, in-memory representation of the package manifest 4140. The initialization act 4210 may perform a setup activities or operations, which includes a product identification act 4212. The initialization act 4210 may be exposed to a calling or an invoking orchestration of the insurance product components being executed by the server. The initialization act 4210 may call the setup operations ahead of time to minimize the overhead at runtime.

The execution act 4220 may include a provide act 4222, an expression act 4224, and an evaluation act 4226, which are to be described.

The dispose act 4240 may tear down all the objects used internally by the product identification service 4106 to optimize its operations (e.g. cached manifest) and free up any resources held by the product identification service.

At the initiation act 4210, if the initialization act 4210 has not been explicitly invoked in a prior call, the initialization act 4210 may be invoked as part of the call to invoke the product identification service 4106 on servers 130. The product identification service 4106 may match the runtime variables to the release variables 3950 of the insurance product component to be used at runtime.

The product identification service 4106 may be stateful if invoked by its caller directly as a .NET service and not de-referenced by the caller.

An instance of a product identification service 4106 may flag an "initialized" status variable to true when the initialization act 4210 is invoked. Every subsequent invocation will return without performing any operations if the flag is set to true. In other words, the service instance of the product identification service 4106 will track the invocation of the initialization act 4210 by means of an "initialized" flag. The initialization act 4210 will be executed only once during the lifetime of an instance.

The activities performed in the initialization act 4210 may vary depending on the actual implementation chosen. As an example, in case of an XML based implementation, initialization may involve loading the XML documents into memory and pre-compiling XPath expressions wherever possible. Pre-compiling the XPath expressions selects nodes or node-sets in an XML document to permit navigation of the XML documents. As another example, in case of a delimited text file based implementation, initialization would involve setting up Object Linking and Embedding Database (OLEDB) text driver connections.

The execution act 4220 may be divided into a provide act 4222, an expression act 4224 and an evaluation act 4226. The profile act 4222 may determine the insurance product components used for each Rule/Rate service in the Business Service. For example, the profile act 4222 may access XML files in the package manifest to determine the Rule/Rate service information. If the manifest 3900 includes XML files contained in the package profile category 3940, these XML files may be accessed. The XML files included in the package profile category 3940 contained in the package manifest 4140 may include the profiles for mapping components included in the business map component category 3640 belonging to the business service to which the package manifest 4140 are tied. Alternatively, the package manifest may include or be associated with the profile tables 3630 of each of the insurance product components in the package manifest.

The expression act 4240 may be based upon either the XML files and/or other information included in the package profile category 3940 contained in the package manifest 4140. The expression act 4240 may determine the appropriate insurance product component versions that satisfy the provided data elements. The runtime input variables may be merged with the individual profile expressions to generate filter clauses. The filter clauses may be applied to an in-memory representation of release variables included in the release variables category 3950 to identify the insurance product components that match the set of filter clauses. The insurance product components that match the set of filter clauses may be identified to be returned in the output.

The evaluation act 4226 may return relevant evaluation information in a response message. In addition to the attributes marked with a "return indicator" flag, service parameters returned by the evaluation act 4226 may include runtime components, such as an executable file name (ADB/SRP filename) and function entry points, entity name, and version number. The returned evaluation information may be marshaled back to the invoking orchestration of the insurance product component being executed by the server.

For a model execution run, effective date logic and the integer and date range validation part of a coherence check may not be validated, which may result in multiple versions of the same component being returned to the calling orchestration of the insurance product component being executed by the server. In this case, the release variables included in the release variable category 3950 may be assigned an "Included" indicator that indicates an explicit selection of a component version by the user is returned in addition to the other attributes and service details. The presence of the included indicator or flag marks a version as the active version amongst all versions of the insurance product component returned. In the absence of this "included" indicator, as an alternative example, if there are multiple versions of the same insurance product component returned, the server may select a highest version of a component to be automatically chosen as the active version for execution.

The profile act 4222 may include a determining act, which determines which insurance product component versions need to be returned, and which profiles included in the package profiles category 3940 are applicable. During the deployment process, a section of the manifest category 3902 may be populated to include a list of all the profile tables 3630 of the package configuration tables 3602 that are associated to the package manifest. This section or portion of the package manifest 4140 may include the profile identifier stored in the package profile category 3940, which corresponds to the profile identifier stored in the profile table 3630, and the list of attributes, operators, rule types, and data types. The sample section of the packaged manifest 4140, as represented in database tables, shown in Table 10, may contain this information.

TABLE 10

| Business Service | | Service | | | Business Map Component | | |
| --- | --- | --- | --- | --- | --- | --- | --- |
| BSvcID | Name | SvcID | BSvcID | Name | Profile Number | RuleType | SvcID |
| 1 | Quote | 22 | 1 | Underwriting | 444 | UWCat | 22 |
| | | 33 | 1 | BaseRate | 444 | UWRA | 22 |
| | | | | | 555 | Rate | 33 |

In Table 10, two unique profiles are depicted, wherein each business map component is tied to a unique profile number. As an example depicted in Table 10, "444" and "555" are unique profile numbers. A profile is a predefined set of attributes which are necessary to determine if a rule type is applicable. A simple example of a profile, based on the information above, is shown in Table 11.

TABLE 11

Profile Definition

| Profile ID | Comp Type | Attribute | Oper | Data Type | Pair ID |
|---|---|---|---|---|---|
| 444 | Rule | NBEff | >= | Date | 1 |
| 444 | Rule | NBExp | < | Date | 1 |
| 444 | LOB | LOBID | = | Code | |
| 444 | Off | SIC | = | Code | |
| 444 | BSvc | Ent | = | Code | |
| 444 | Svc | Prod | = | Code | |
| 555 | Rule | NBEff | > | Date | 2 |
| 555 | Rule | NBExp | < | Date | 2 |
| 555 | LOB | LOBID | = | Code | |
| 555 | State | StateID | = | Code | |
| 555 | BSvc | Ent | = | Code | |
| 555 | Svc | Prod | = | Code | |

The expression act 4240 pairs the input parameters (runtime policy input data) with the profile definitions. Since the profiles are predefined, the invoking system may be aware of the applicable data elements. Accordingly, an example set of input parameters is shown in Table 12:

TABLE 12

Runtime Variables

| Comp Type | Attribute | Value |
|---|---|---|
| Rule | NBEff | Feb. 1, 2008 |
| Rule | NBExp | Feb. 1, 2008 |
| LOB | LOBID | BOP |
| BSvc | Ent | SBI |
| Svc | Prod | BOP |
| State | StateID | CA |
| State | StateID | OR |

The product identification service 4106 will loop through the available profiles and merge the runtime variables into the appropriate data types. To achieve this, the product identification service 4606 will pull the Attribute and Operator from the profile table 3630 and the values from the runtime variables. After all of profile elements have been accounted for, an expression for the profile number is added. For example, the expression created for profile 444 may be:
(COMP_TYPE='Rule' AND ATTRIBUTE='NBeff' AND VALUE_DATE>=Feb. 1, 2008) AND
(COMP_TYPE='Rule' AND ATTRIBUTE='NBExp' AND VALUE_DATE<Feb. 1, 2008) AND
(COMP_TYPE='LOB' AND ATTRIBUTE='LOBID' AND VALUE_STRING='BOP') AND
(COMP_TYPE='BSvc' AND ATTRIBUTE='Ent' AND VALUE_STRING='SBI') AND
(COMP_TYPE='Svc' AND ATTRIBUTE='Prod' AND VALUE_STRING=AND 'BOP')
(PROFILE_NUMBER='444').

As depicted in Table 11, profile 444 indicates that the SIC attribute at the offering level is a potential factor in the expression which needs to be created. However, as shown in Table 12, a SIC value was not provided in the realtime variables information. Therefore the SIC condition is excluded from the above expressions. At the same time, profile 444 does not have a StateID attribute and therefore these values that were passed in as runtime variables are simply ignored. However, Profile 555 does have StateID and more than one value is provided. Whenever more than one value exists for the same attribute, ICC will handle these situations as "OR" conditions. For example, the expression for Profile 555 may be:
(COMP_TYPE='Rule' AND ATTRIBUTE='NBeff' AND VALUE_DATE>=Feb. 1, 2008) AND
(COMP_TYPE='Rule' AND ATTRIBUTE='NBExp' AND VALUE_DATE<Feb. 1, 2008) AND
(COMP_TYPE='LOB' AND ATTRIBUTE='LOBID' AND VALUE_STRING='BOP') AND
((COMP_TYPE='State' AND ATTRIBUTE='StateID' AND VALUE_STRING='CA') OR
(COMP_TYPE='State' AND ATTRIBUTE='StateID' AND VALUE_STRING='OR')) AND
(COMP_TYPE='BSvc' AND ATTRIBUTE='Ent' AND VALUE_STRING='SBI') AND
(COMP_TYPE='Svc' AND ATTRIBUTE='Prod' AND VALUE_STRING=
(PROFILE_NUMBER='555').

After completion of the expression act 4240, the servers 130 may initiate the evaluation act 4226. In the evaluation act 4226, the servers 130 may query the packaged manifest 4140 to determine which component versions of the insurance product components are applicable. The expression created above becomes the "WHERE" clause of a query. A simplified tabular representation of the manifest is shown in FIG. 43, where the BMCompID corresponds to the business map component identifier (bus_map_comp_id) included in the release variables category 3950, and which is related to the bus_map_comp_id entry of the business map component table 3640.

In this example, a component version ID evaluates for each of the expressions which was created. In addition to returning the component versions, additional data may also be returned. As an example, the service may return all of the supporting attributes of a component version based on the profile if the "Return Indicator" is set to True.

Service level information from the manifest is also returned as output of product identification service 4106. For Blaze® brand engine servers, the related components may include an ADB Name and an Entrypoint Server File. For InsBridge® brand engine servers, the related components may include an environment, a LOBID, a Program, and a Program Version.

As an example, only attributes identified within the package profile category 3940 may be used in determining which component version of an insurance product component to return. If more than one value for the same attribute is provided as a runtime variable, the product identification service 4106 may create an "OR" condition to permit selection between the more than one value for the same attribute during runtime. If an attribute is specified in the package profile category 3940, but not provided as a runtime variable, the attribute may be ignored when building the expression. In the event the attribute is a required attribute, the evaluation act 4226 may return an exception or error or warning.

The disposal act may be in addition to any default garbage collection mechanism, such as in .Net file. The disposal act may take care of most if not all tasks carried out in the initialization routine. An example disposal act may include an explicit dispose routine implemented and exposed to the calling orchestration of the insurance product components being executed by the server as a placeholder for future modifications to the initialization routine that require custom teardown operations.

The package manifest may include a localized version of service information, profile information and component information that is required by the runtime services to work with the package manifest and its contents. Bundling a local snapshot of relevant data about the package manifest improves performance by providing only relevant data to the package manifest and insulates the package manifest against future modifications to the profile information.

An example of the packaged manifest 4140 may be implemented as a relational database including a plurality of database tables. The packaged manifest 4140 may persist as a set of database tables. Querying and filtering of the packaged manifest 4140 may be implemented based upon data access code leveraging support implement in part in the AICS architecture. Results of the queries can be marshaled to the output as required.

Another example of the packaged manifest 4140 may include XML files, which may include native objects, such as ADO .Net objects and/or serialized native ADO.Net objects. An example of the serialized native ADO.Net object may include DataSets and/or DataTables. In the case of a manifest 4140 based upon XML files, the profile expressions may be parsed into ADO.Net DataColumn filter expressions. The information in the DataTables may be filtered using a combination of the DataTable.Select method and DataTable.Filter property.

Another example manifest package 4140 may include a customized schema of the manifest as XML files. A customize schema of the manifest package 4140 may persist as a custom XML files. In this case, the profile expressions may be parsed into XPath expressions that are evaluated against the nodes in the manifest files. The information in the XmlNodes is filtered using a combination of the XmlNode.SelectNodes method and the XPathNavigator.Evaluate method.

Another example of a packaged manifest 4140 may include delimited text files. The packaged manifest 4140 based upon delimited text files may persist as comma delimited text files. Similar to the database tables, querying and filtering can be implemented based upon or as a function of a data access code. An example may include an OLEDB text driver that provides a Datasource view of the data in the package manifest. In other examples, the manifest package may include a combination of at least two of XML files, database files and text files.

While various examples of the invention have been described, it will be apparent to those of ordinary skill in the art that many more examples and implementations are possible within the scope of the invention. Accordingly, the invention is not to be restricted except in light of the attached claims and their equivalents.

We claim:

1. A method for creating a lifecycle based insurance product comprising:
    retrieving an insurance product offering stored in an insurance product development database with a server computer, wherein the insurance product offering includes one or more business services and insurance product components arranged in an insurance product framework, the insurance product framework including identification of business services supported by the insurance product offering, and each of the insurance product components including a rule type, the rule type associated with a callable executable associated with a corresponding third party engine server;
    invoking a pre-deployment coherency check request with the server computer for the insurance product offering;
    performing a pre-deployment coherency check of the insurance product offering with the server computer in response to receipt of the pre-deployment coherency check request for the insurance product offering, the pre-deployment coherency check including:
    determining whether the insurance product offering conforms to a predetermined set of coherency rules comprising:
    selecting a business service specified by the insurance product offering;
    confirming, with the server computer, that rule type identifier associated with the business service specifies the rule type of at least one of the insurance product components;
    determining a release type attribute for the insurance product package manifest with the server computer based upon a release type associated with the insurance product offering;
    performing a standard release coherency check with the server computer in response to the server computer determining that the release type attribute is set to a standard release;
    performing a model execution release coherency check with the server computer in response to the server computer determining that the release type attribute is set to a model execution release, the model execution release coherency check comprising:
    the server computer excluding an operative insurance product component of the insurance product components from the model execution coherency check based upon the model execution coherency attribute being set to exclude; and
    the server computer including the operative insurance product component in the model execution coherency check based upon the model execution coherency attributed being set to include; and
    generating with the server computer an insurance product package manifest in response to the server computer determining that the insurance product offering conforms to the predetermined set of coherency rules, the insurance product package manifest generated to include a list of the insurance product components and executable code to enable execution of the insurance product offering, the generation comprising:
    saving information of the at least one of the insurance product components in the product package manifest; and
    associating the callable executable with the at least one of the insurance product components.

2. The method of claim 1, wherein a respective insurance product component of the insurance product components includes one or more attributes; and
    wherein determining whether the insurance product offering conforms to a predetermined set of coherency rules comprises:
    determining, with the server computer, which of the one or more attributes of the respective insurance product component are required based upon an association of the respective insurance product component to an other of the insurance product components;
    determining, with the server computer, whether a required attribute of the respective insurance product component is unspecified; and
    generating a coherency error with the server computer in response to the server computer determining that the required attribute is unspecified.

3. The method of claim 1, wherein performing the pre-deployment coherency check of the insurance product offering comprises:
the server computer identifying a missing rule type associated with the rule type identifier, and providing the missing rule type in a coherency error report in response to the server computer determining that the rule type identifier fails to identify any rule type of the at least one of the insurance product components.

4. The method of claim 1,
wherein performing the pre-deployment coherency check on the insurance product offering comprises:
the server computer determining whether a respective insurance product component of the insurance product components is unrelated to all of the one or more business services; and
generating a component error notification with the server computer in response to server computer determining that the respective insurance product component is unrelated to all of the one or more business services.

5. The method of claim 1, further comprising:
determining, with the server computer, whether the insurance product offering includes multiple versions of at least one of the insurance product components;
and generating a coherency error with the server computer based upon the server computer determining that the insurance product offering includes multiple versions of at least one of the insurance product components.

6. The method of claim 1, wherein an operative insurance product component of the insurance product components is associated with a coherency indicator attribute; and wherein performing the standard release coherency check further comprises:
the server computer excluding the operative insurance product component from the standard release coherency check based upon the coherency indicator attribute being set to exclude the operative insurance product component from the standard coherency check; and
the server computer including the operative insurance product component in the standard release coherency check based upon the coherency indicator attribute being set to include the operative insurance product component in the standard release coherency check.

7. The method of claim 1, wherein an operative insurance component of the insurance product components is associated with an include indicator attribute; and wherein generating an insurance product manifest comprises:
the server computer excluding the operative insurance product component from the insurance product package manifest based upon the include indicator attribute being set to exclude the operative insurance product component from the insurance product package manifest; and
the server computer including the operative insurance product component in the insurance product package manifest based upon the include indicator attribute being set to include the operative insurance product component from the insurance product package manifest.

8. A system for managing generation of a deployable runtime component comprising:
a configurable engine server;
a memory including a staging area memory;
a processor in communication with the memory and the configurable engine server, the processor configured to receive a create manifest request for an insurance product offering, wherein the create manifest request includes a list of insurance product components and insurance product component meta data comprising information describing a structure of the insurance product offering;
the processor further configured to obtain engine mapping information for each of the insurance product components, the mapping information identifying third party engine servers for use with respective insurance product components;
the processor further configured to send a configuration information request to the configurable engine server based upon the engine mapping information, wherein the configuration information request directs the configurable engine server to create deployable executables comprising a set of compiled rules and rates the third party engine servers for use with the insurance product offering the configurable engine server further configured to store the deployable executables in the staging area memory and return identifiers of the deployable executables to the processor; and
the processor is further configured to merge the received identifiers of the deployable executables with the insurance product component meta data and generate an insurance product package manifest in the staging area memory, the insurance product package manifest generated to include the list of the insurance product components associated with the identifiers of the deployable executables to enable execution of the insurance product offering using the third party engine servers,
wherein the insurance product components include more than one version of an operable insurance product component of the insurance product components, and the processor is further configured to determine whether a release type attribute associated with the insurance product offering is set to model execution job; and
the processor further configured to determine a version of the operable insurance product component to include in the insurance product package manifest in response to a determination that the release type attribute is set to model execution job, the version of the operable insurance product component determined based upon an include indicator attribute associated with each version of the operable insurance product component.

9. The system of claim 8, wherein the processor is further configured to identify the configurable engine server corresponding to the respective insurance product component of the insurance product components based upon a rule type associated with the respective insurance product component.

10. The system of claim 8, wherein the processor is further configured to identify a list of one or more business services and one or more business map components to be included in the insurance product package manifest based upon the insurance product component meta data contained in the create manifest request; and
the processor is further configured to identify a superfluous insurance product component included within the insurance product components based upon the list of the one or more business services and the one or more business map components.

11. The system of claim 8, wherein the system further comprises a database, and the insurance product offering is associated with package configuration tables that are related within the database, the processor further configured to analyze the package configuration tables to identify a business service to be deployed, wherein the business service is associated with one or more engine services of the configurable engine server.

12. The system of claim 11, wherein the package configuration tables include a business service table, and the processor is further configured to analyze the business service table to identify the business service to be deployed; and the processor is further configured to determine an organization of the insurance product components and the insurance product structure in the insurance product package manifest based upon the identified business service to be deployed.

13. The system of claim 12, wherein the package configuration tables further include a service table related to the business service table, and a business map component table related to the service table, and wherein the service table is further related in a one-to-many relationship to one or more business map component tables.

14. The system of claim 13, wherein the configurable engine server computer is associated with an engine object; and the service table includes a rule type code identifier that corresponds to the engine object of the configurable engine server, and wherein the processor is further configured to determine whether the rule type code identifier is associated with a rule type of one or more of the insurance product components.

15. The system of claim 8, wherein the insurance product component meta data describes an insurance product structure of the insurance product offering that interrelates the insurance product components.

16. The system of claim 8, wherein a first operative insurance product component of the insurance product components is associated with a first include identifier indicator attribute, and a second operative insurance product component of the insurance product components is associated with a second include identifier indicator attribute; and the processor is further configured to determine whether to include one of the first operative insurance product component and the second operative insurance product component in the insurance product package manifest based upon the first include identifier indicator attribute and the second include identifier indicator attribute.

17. The system of claim 8, wherein the insurance product offering includes a business service, and the insurance product offering is associated with a profile table, wherein the profile table includes a rule type identifier for a rule type of an operative insurance product component of the insurance product components; and the processor is further configured to iterate through the list of insurance product components to determine whether the rule type identifier of the operative insurance product component corresponds to a rule type identifier associated with the business service.

18. The system of claim 8, wherein the package engine objects includes at least one of compiled rules and compiled rates for the identified configurable engine server.

19. A tangible computer storage medium comprising:
computer program instructions stored on the tangible computer storage medium, the computer program instructions selectively executed by a processor, the computer program instructions including:
instructions to receive a create manifest request including a list of insurance product components and meta data for an insurance product offering, the meta data comprising information describing a structure of the insurance product offering, and each of the insurance product components including a rule type, the rule type associated with a callable executable associated with a corresponding third party engine server;

instructions to determine whether the create manifest request is for a model execution job or a standard release, the model execution being for simulation and further development that uses at least one first business service, and the standard release being a commercial release of the insurance product offering that uses at least one second business service;
instructions to perform a model execution coherency check using the at least one first business service based upon the create manifest request being for the model execution job, the coherency check comprising confirmation that a first rule type code identifier included in the first business service matches at least one of the insurance product components;
instructions to perform a standard release coherency check using the at least one second business service based upon the create manifest request being for the standard release, the coherency check comprising confirmation that a second rule type code identifier included in the second business service matches at least one of the insurance product components; and
instructions to generate an insurance product package manifest following successful performance of one of the model execution coherency check and the standard coherency check, the insurance product package manifest generated to include the list of the insurance product components associated with the callable executables to enable execution of the insurance product offering using the insurance product components and associated corresponding third party engine servers.

20. The tangible computer storage medium of claim 19, wherein an operable insurance product component of the insurance product components is associated with a coherency indicator attribute, the coherency indicator attribute set to exclude; and the instructions to perform the standard release coherency check comprises instructions to exclude the operable insurance product component from the standard release coherency check based upon the coherency indicator attribute associated with the operable insurance product component.

21. The tangible computer storage medium of claim 19, wherein an operable insurance product component of the insurance product components is associated with a model execution coherency indicator attribute, the model execution coherency indicator attribute set to exclude; and wherein the instruction to perform the model execution coherency check comprises an instruction to exclude the operable insurance product component from the model execution coherency check based upon the model execution coherency indicator attribute being set to exclude.

22. The tangible computer storage medium of claim 19, wherein the insurance product offering is associated with package configuration tables including a profile table having the rule type associated with an operable insurance product component of the insurance product components and a business service table;

and the tangible computer storage medium further comprises:
instructions to determine whether the operable insurance product component is tied to a business service specified in the business service table based upon the rule type associated with the operable insurance product component; and instructions to return a coherency error in response to determination that the operable insurance product component is not tied to the business service specified in the business service table.

23. The tangible computer storage medium of claim 19, further comprising:
   instructions to determine whether a required attribute for an operable insurance product component of the insurance product components is specified; and
   instructions to generate an invalid attribute error in response to determination that the required attribute of the operable insurance product component is at least one of invalid or unspecified.

24. The tangible computer storage medium of claim 19, further comprising:
   instructions to determine whether the create manifest request is for a standard release;
   instructions to determine if more than one version of any one of the insurance product components is contained in the list of insurance product components in response to the create manifest request being for the standard release;
   instructions to generate a coherency error based upon determination that the list of insurance product components contains more than one version of any one of the insurance product components.

25. The tangible computer storage medium of claim 19, wherein the list of insurance product components includes multiple versions of an operable insurance product component included within the insurance product components, the tangible computer storage medium further comprising:
   instructions to execute a model execution job;
   instructions to determine whether the model execution job restricts use of multiple versions of the insurance product components; and
   instructions to generate a coherency error based upon the determination that the model execution job restricts use of multiple versions of the insurance product components.

26. The tangible computer storage medium of claim 19, wherein the insurance product offering includes an insurance product framework including a plurality of nodes and a plurality of branches, wherein an operable insurance product component included within the insurance product components is attached to an operative node of the nodes through an operative branch of the branches, the tangible computer storage medium further comprising:
   an instruction to generate a coherency error report in response to a coherency error associated with the operable insurance product component, the coherency error report including a coherency error link to the operable insurance product component and indication of the operable branch and the operable node within the insurance product framework to which the operable insurance product is attached.

27. The tangible computer storage medium of claim 26, further comprising:
   instructions to receive a selection of the coherency error link; and
   instructions to generate a suggested corrective action based upon the selected coherency error link.

* * * * *